(12) United States Patent
Levy et al.

(10) Patent No.: US 12,534,460 B2
(45) Date of Patent: Jan. 27, 2026

(54) LSD SALT CRYSTAL FORMS

(71) Applicant: Mind Medicine, Inc., New York, NY (US)

(72) Inventors: Daniel Emil Levy, San Mateo, CA (US); Stephen E. Schneider, Raleigh, NC (US)

(73) Assignee: Mind Medicine, Inc., New York, NY (US)

( * ) Notice: Subject to any disclaimer, the term of this patent is extended or adjusted under 35 U.S.C. 154(b) by 363 days.

(21) Appl. No.: 17/729,205

(22) Filed: Apr. 26, 2022

(65) Prior Publication Data

US 2022/0348575 A1 Nov. 3, 2022

Related U.S. Application Data

(60) Provisional application No. 63/182,700, filed on Apr. 30, 2021.

(51) Int. Cl.
*C07D 471/04* (2006.01)

(52) U.S. Cl.
CPC ........ *C07D 471/04* (2013.01); *C07B 2200/13* (2013.01)

(58) Field of Classification Search
CPC .................. C07D 471/04; C07B 2200/13
See application file for complete search history.

(56) References Cited

U.S. PATENT DOCUMENTS

| | | | |
|---|---|---|---|
| 1,394,233 A | 10/1921 | Stoll | |
| 2,090,429 A | 8/1937 | Stoll et al. | |
| 2,090,430 A | 8/1937 | Stoll et al. | |
| 2,265,207 A | 12/1941 | Stoll et al. | |
| 2,438,259 A * | 3/1948 | Stoll et al. | C07D 457/04 546/69 |
| 2,447,214 A | 8/1948 | Stoll et al. | |
| 2,736,728 A | 2/1956 | Pioch | |
| 2,774,763 A * | 12/1956 | Garbrecht et al. | C07C 231/02 544/125 |
| 2,796,419 A | 6/1957 | Kornfeld et al. | |
| 2,809,920 A | 10/1957 | Arthur et al. | |
| 2,997,470 A | 8/1961 | Pioch | |
| 3,038,840 A | 6/1962 | Boris et al. | |
| 3,085,092 A | 4/1963 | Hofmann et al. | |
| 3,239,530 A | 3/1966 | Albert et al. | |
| 4,371,516 A | 2/1983 | Gregory et al. | |
| 4,439,196 A | 3/1984 | Higuchi | |
| 4,447,224 A | 5/1984 | DeCant, Jr. et al. | |
| 4,447,233 A | 5/1984 | Mayfield | |
| 4,475,196 A | 10/1984 | La Zor | |
| 4,486,194 A | 12/1984 | Ferrara | |
| 4,487,603 A | 12/1984 | Harris | |
| 4,925,678 A | 5/1990 | Ranney | |
| 4,959,217 A | 9/1990 | Sanders et al. | |
| 5,167,616 A | 12/1992 | Haak et al. | |
| 5,169,383 A | 12/1992 | Gyory et al. | |
| 5,225,182 A | 7/1993 | Sharma | |
| 5,738,875 A | 4/1998 | Yarwood et al. | |
| 6,063,908 A | 5/2000 | Salamone et al. | |
| 6,476,199 B1 | 11/2002 | Salamone et al. | |
| 6,794,496 B2 | 9/2004 | Ghoshal et al. | |
| 7,157,560 B2 | 1/2007 | Ghoshal et al. | |
| 7,566,549 B2 | 7/2009 | Ghoshal et al. | |
| 8,401,801 B2 | 3/2013 | Mrazek et al. | |
| 9,050,343 B2 | 6/2015 | Peters et al. | |
| 9,192,580 B2 | 11/2015 | Green et al. | |
| 10,098,854 B2 | 10/2018 | Drevets et al. | |
| 10,548,839 B2 | 2/2020 | Tian | |
| 11,364,221 B2 | 6/2022 | Liechti | |
| 11,367,103 B2 | 6/2022 | Izrailev et al. | |
| 11,697,651 B2 | 7/2023 | Muratore et al. | |
| 11,717,517 B2 | 8/2023 | Liechti et al. | |
| 11,959,929 B2 | 4/2024 | Liechti et al. | |
| 11,963,946 B2 | 4/2024 | Liechti | |
| 12,036,220 B2 | 7/2024 | Mack et al. | |
| 2001/0044118 A1 | 11/2001 | Ghoshal et al. | |
| 2002/0012921 A1 | 1/2002 | Stanton | |
| 2002/0028942 A1 | 3/2002 | Jacewicz et al. | |
| 2003/0143655 A1 | 7/2003 | McConnell et al. | |
| 2004/0122106 A1 | 6/2004 | Ohta et al. | |
| 2004/0138098 A1 | 7/2004 | Fein | |
| 2004/0228919 A1 | 11/2004 | Houghton et al. | |
| 2006/0039890 A1 | 2/2006 | Renshaw et al. | |
| 2006/0223998 A1 | 10/2006 | Zhang et al. | |
| 2007/0122859 A1 | 5/2007 | Ghoshal et al. | |

(Continued)

FOREIGN PATENT DOCUMENTS

| | | | |
|---|---|---|---|
| AU | 1083099 A | 5/2000 | |
| CH | 535236 A | 3/1973 | |

(Continued)

OTHER PUBLICATIONS

Nichols (Year: 2018).*
Baker et al (Year: 1972).*
Wacker et al. Crystal Structure of an LSD-Bound Human Serotonin Receptor, Jan. 26, 2017 (Retrieved Aug. 19, 2022) Retrieved from Internet URL: <https://www.cell.com/action/showPdf?pii+S0092-8674%2816%2931749-4 >.
Abramson. "Lysergic acid diethylamide (LSD-25): XXIX. The response index as a measure of threshold activity of psychotropic drugs in man", The Journal of Psychology (1959); 48(1): 65-78.
Adams et al. "Patterns of exploration in rats distinguish lisuride from lysergic acid diethylamide", Pharmacology Biochemistry and Behavior (1985); 23(3): 461-468. doi: 10.1016/0091-3057(85)90022-x.
Advisory Action for U.S. Appl. No. 17/156,233, by Liechti, Matthias Emanuel et al., mailed on Dec. 14, 2023, 3 pages.
Advisory Action for U.S. Appl. No. 17/156,233, by Liechti, Matthias Emanuel et al., mailed on Mar. 20, 2023, 5 pages.

(Continued)

*Primary Examiner* — Jeffrey S Lundgren
*Assistant Examiner* — Ibrahim D Bori
(74) *Attorney, Agent, or Firm* — COOLEY LLP

(57) ABSTRACT

Polymorphic forms of lysergic acid diethyl amide (LSD) in crystalline salt forms. A pharmaceutical formulation of polymorphic forms of LSD in crystalline salt forms including pharmaceutically acceptable excipients. Polymorphic forms of LSD free-base. Polymorphic forms of a salt form of LSD.

29 Claims, 76 Drawing Sheets

(56) References Cited

U.S. PATENT DOCUMENTS

| | | |
|---|---|---|
| 2007/0248652 A1 | 10/2007 | Barzilay et al. |
| 2010/0029670 A1 | 2/2010 | Baettig et al. |
| 2010/0105783 A1 | 4/2010 | Lee et al. |
| 2010/0203130 A1 | 8/2010 | Tygesen et al. |
| 2012/0108510 A1 | 5/2012 | Young et al. |
| 2013/0274764 A1 | 10/2013 | Baker et al. |
| 2013/0287705 A1 | 10/2013 | Khan et al. |
| 2014/0274764 A1 | 9/2014 | Zhu et al. |
| 2014/0302147 A1 | 10/2014 | Hartman et al. |
| 2017/0157343 A1 | 6/2017 | Davidson et al. |
| 2017/0253928 A1 | 9/2017 | Zhu et al. |
| 2017/0258761 A1 | 9/2017 | Burjak et al. |
| 2018/0036303 A1 | 2/2018 | Raz |
| 2018/0055791 A1 | 3/2018 | Nichols et al. |
| 2018/0105876 A1 | 4/2018 | Singh |
| 2018/0228797 A1 | 8/2018 | Bosse et al. |
| 2019/0142851 A1 | 5/2019 | Chadeayne |
| 2019/0350949 A1 | 11/2019 | Küçüksen et al. |
| 2020/0085816 A1* | 3/2020 | Raz ................... A61K 9/4858 |
| 2020/0101041 A1 | 4/2020 | Kleidon |
| 2020/0222656 A1 | 7/2020 | Rustick |
| 2020/0323795 A1 | 10/2020 | Glue et al. |
| 2020/0390755 A1 | 12/2020 | Wang et al. |
| 2020/0397752 A1 | 12/2020 | Perez Castillo et al. |
| 2021/0015738 A1 | 1/2021 | LaRosa et al. |
| 2021/0085671 A1 | 3/2021 | Chadeayne |
| 2021/0137908 A1 | 5/2021 | Kristensen et al. |
| 2021/0172016 A1 | 6/2021 | Fefekos et al. |
| 2021/0251976 A1 | 8/2021 | Stamets |
| 2021/0267977 A1 | 9/2021 | Liechti |
| 2021/0315884 A1 | 10/2021 | Liechti et al. |
| 2021/0322447 A1 | 10/2021 | Plakogiannis et al. |
| 2021/0346341 A1 | 11/2021 | Liechti |
| 2021/0386704 A1 | 12/2021 | Liechti et al. |
| 2021/0407643 A1 | 12/2021 | Liu et al. |
| 2022/0096429 A1 | 3/2022 | Liechti |
| 2022/0096504 A1 | 3/2022 | Blumstock et al. |
| 2022/0128580 A1 | 4/2022 | Liechti et al. |
| 2022/0143051 A1 | 5/2022 | Manfredi et al. |
| 2022/0273628 A1 | 9/2022 | Liechti et al. |
| 2022/0273644 A1 | 9/2022 | Ribeiro et al. |
| 2022/0280501 A1 | 9/2022 | Liechti et al. |
| 2022/0304980 A1 | 9/2022 | Arnold et al. |
| 2022/0347169 A1 | 11/2022 | Liechti et al. |
| 2022/0347195 A1 | 11/2022 | Barrow et al. |
| 2022/0354831 A1 | 11/2022 | Barrow et al. |
| 2022/0362237 A1 | 11/2022 | Barrow et al. |
| 2022/0395499 A1 | 12/2022 | Karlin et al. |
| 2023/0026731 A1 | 1/2023 | Kochinke et al. |
| 2023/0039395 A1 | 2/2023 | Liechti et al. |
| 2023/0059204 A1 | 2/2023 | Plakogiannis et al. |
| 2023/0064429 A1 | 3/2023 | Mack et al. |
| 2023/0075847 A1 | 3/2023 | Mack et al. |
| 2023/0088860 A1 | 3/2023 | Muratore et al. |
| 2023/0107398 A1 | 4/2023 | Mack et al. |
| 2023/0116703 A1 | 4/2023 | Kruegel |
| 2023/0122949 A1 | 4/2023 | Mack et al. |
| 2023/0201160 A1 | 6/2023 | Liechti |
| 2023/0210762 A1 | 7/2023 | Ameri et al. |
| 2023/0218532 A1 | 7/2023 | Mack et al. |
| 2023/0219955 A1 | 7/2023 | Sheshbaradaran et al. |
| 2023/0248705 A1 | 8/2023 | Gobbi et al. |
| 2023/0285384 A1 | 9/2023 | Liechti et al. |
| 2023/0285386 A1 | 9/2023 | Mack et al. |
| 2023/0286975 A1 | 9/2023 | Grill |
| 2023/0301985 A1 | 9/2023 | Barrow et al. |
| 2023/0330085 A1 | 10/2023 | Liechti et al. |
| 2023/0346645 A1 | 11/2023 | Barrow et al. |
| 2023/0414583 A1 | 12/2023 | Trachsel et al. |
| 2024/0041860 A1 | 2/2024 | Dolen et al. |
| 2025/0152565 A1 | 5/2025 | Liechti et al. |

FOREIGN PATENT DOCUMENTS

| | | |
|---|---|---|
| DE | 202020105085 U1 | 11/2020 |
| EP | 0816364 A1 | 1/1998 |
| EP | 1148339 A2 | 10/2001 |
| FR | 1338023 A | 9/1963 |
| GB | 579484 A | 8/1946 |
| JP | 2018503677 A | 2/2018 |
| TW | 201718490 A | 6/2017 |
| WO | WO-2000021930 A1 | 4/2000 |
| WO | WO-2006010587 A1 | 2/2006 |
| WO | WO-2006046417 A1 | 5/2006 |
| WO | WO-2006128658 A1 | 12/2006 |
| WO | WO-2009068214 A2 | 6/2009 |
| WO | WO-2010033392 A2 | 3/2010 |
| WO | WO-2014059197 A1 | 4/2014 |
| WO | WO-2016145193 A1 | 9/2016 |
| WO | WO-2017027678 A1 | 2/2017 |
| WO | WO-2018135943 A1 | 7/2018 |
| WO | WO-2018195455 A1 | 10/2018 |
| WO | WO-2019079742 A1 | 4/2019 |
| WO | WO-2019081764 A1 | 5/2019 |
| WO | WO-2019246532 A1 | 12/2019 |
| WO | WO 2020157569 | 8/2020 |
| WO | WO-2020169850 A1 | 8/2020 |
| WO | WO-2020181194 A1 | 9/2020 |
| WO | WO-2020212948 A1 | 10/2020 |
| WO | WO-2020212951 A1 | 10/2020 |
| WO | WO-2020216832 A1 | 10/2020 |
| WO | WO-2020232255 A1 | 11/2020 |
| WO | WO-2021003467 A1 | 1/2021 |
| WO | WO-2021019023 A1 | 2/2021 |
| WO | WO-2021030571 A1 | 2/2021 |
| WO | WO-2021173273 A1 | 9/2021 |
| WO | WO-2021175816 A1 | 9/2021 |
| WO | WO-2021211358 A1 | 10/2021 |
| WO | WO-2021225796 A1 | 11/2021 |
| WO | WO-2021243461 A1 | 12/2021 |
| WO | WO-2021257169 A1 | 12/2021 |
| WO | WO-2021259962 A1 | 12/2021 |
| WO | WO-2021262871 A1 | 12/2021 |
| WO | WO-2022008627 A2 | 1/2022 |
| WO | WO-2022023812 A1 | 2/2022 |
| WO | WO-2022023813 A1 | 2/2022 |
| WO | WO-2022030571 A1 | 2/2022 |
| WO | WO-2022084892 A1 | 4/2022 |
| WO | WO-2022107095 A1 | 5/2022 |
| WO | WO-2022115796 A1 | 6/2022 |
| WO | WO-2022175821 A1 | 8/2022 |
| WO | WO-2022189907 A1 | 9/2022 |
| WO | WO-2022221942 A1 | 10/2022 |
| WO | WO-2022226408 A1 | 10/2022 |
| WO | WO-2022232093 A1 | 11/2022 |
| WO | WO-2022235500 A1 | 11/2022 |
| WO | WO-2022235529 A1 | 11/2022 |
| WO | WO-2022235531 A1 | 11/2022 |
| WO | WO-2022246572 A1 | 12/2022 |
| WO | WO-2022261058 A1 | 12/2022 |
| WO | WO-2022265878 A1 | 12/2022 |
| WO | WO-2023283386 A2 | 1/2023 |
| WO | WO-2023012524 A2 | 2/2023 |
| WO | WO-2023023182 A1 | 2/2023 |
| WO | WO-2023023192 A1 | 2/2023 |
| WO | WO-2023043870 A1 | 3/2023 |
| WO | WO-2023107966 A1 | 6/2023 |
| WO | WO-2023108277 A1 | 6/2023 |
| WO | WO-2023114529 A2 | 6/2023 |
| WO | WO-2023115006 A1 | 6/2023 |
| WO | WO-2023183618 A1 | 9/2023 |
| WO | WO-2023212244 A1 | 11/2023 |
| WO | WO-2023250298 A1 | 12/2023 |
| WO | WO-2024033910 A1 | 2/2024 |
| WO | WO-2024091506 A2 | 5/2024 |
| WO | WO-2024229454 A2 | 11/2024 |
| WO | WO-2024238035 A1 | 11/2024 |

(56) References Cited

FOREIGN PATENT DOCUMENTS

| | | |
|---|---|---|
| WO | WO-2024263978 A1 | 12/2024 |
| WO | WO-2025128594 A1 | 6/2025 |

OTHER PUBLICATIONS

Advisory Action for U.S. Appl. No. 17/225,715, by Liechti, Matthias Emanuel et al., mailed on Mar. 14, 2023, 3 pages.
Advisory Action for U.S. Appl. No. 17/672,670, by Liechti, Matthias Emanuel et al., mailed on Feb. 23, 2024, 4 pages.
Advisory Action for U.S. Appl. No. 17/672,670, by Liechti, Matthias Emanuel et al., mailed on Jul. 13, 2023, 3 pages.
Advisory Action for U.S. Appl. No. 17/869,896, by Liechti, Matthias Emanuel et al., mailed on Sep. 5, 2024, 5 pages.
Advisory Action for U.S. Appl. No. 18/077,096, by Mack, Peter et al., mailed on Aug. 30, 2024, 5 pages.
Advisory Action for U.S. Appl. No. 18/194,761, by Mack, Peter et al., mailed on Apr. 4, 2024, 4 pages.
Advisory Action for U.S. Appl. No. 18/321,159, by Liechti, Matthias Emanuel et al., mailed on May 21, 2024, 5 pages.
Aghajanian et al., "Serotonin and Hallucinogens." Neuropsychopharmacology (1999); 21(2): 16S-23S. doi: 10.1016/S0893-133X(98)00135-3.
Aghajanian et al., "Serotonin Induces Excitatory Postsynaptic Potentials in Apical Dendrites of Neocortical Pyramidal Cells", Neuropharmacology (1997); 36(4-5): 589-599. doi: 10.1016/s0028-3908(97)00051-8.
Aghajanian et al., "Persistence of lysergic acid diethylamide in the plasma of human subjects", Clinical Pharmacology & Therapeutics (1964); 5: 611-614. doi: 10.1002/cpt196455611.
Akimoto et al., "Changes in brain metabolites related to stress resilience: Metabolomic analysis of the hippocampus in a rat model of depression", Behavioural Brain Research (2019); 359: 342-352. doi: 10.1016/j.bbr.2018.11.017. Epub Nov. 14, 2018.
Alaka et al. "Efficacy and safety of duloxetine in the treatment of older adult patients with generalized anxiety disorder: a randomized, double-blind, placebo- controlled trial." International Journal of Geriatric Psychiatry (2014); 29(9): 978-986. doi: 10.1002/gps.4088. Epub Feb. 20, 2014.
Alexander et al., "LSD: Injection early in pregnancy produces abnormalities in offspring in rats", Science (1967); 157: 459-460. doi: 10.1126/science. 157.3787.459.
Alexander et al., "Lysergic acid diethylamide intake in pregnancy: Fetal damage in rats", Journal of Pharmacology and Experimental Therapeutics (1970); 173(1): 48-59.
Allgulander et al., "Efficacy of sertraline in a 12-week trial for generalized anxiety disorder", American Journal of Psychiatry (Sep. 2004); 161(9): 1642-1649. doi: 10.1176/appi.ajp.161.9.1642.
Am Ende et al. "Improving the Content Uniformity of a Low-Dose Tablet Formulation Through Roller Compaction Optimization", Pharmaceutical Development and Technology (2007); 12: 391-404. doi: 10.1080/10837450701369253.
Anderson et al., "Psychedelic microdosing benefits and challenges: an empirical codebook", Harm Reduction Journal (2019); 16(43): 1-10. doi: 10.1186/s12954-019-0308-4.
Andersson et al., "Twenty percent better with 20 micrograms? A qualitative study of psychedelic microdosing self-rapports and discussions on YouTube", Harm Reduction Journal (2019); 16(1): 1-12. doi: 10.1186/s12954-019-0333-3.
Ansara. "Management of treatment-resistant generalized anxiety disorder." Mental Health Clinician, 2020; 10(6): 326-334.
Ansseau."Controlled comparison of tianeptine, alprazolam and mianserin in the treatment of adjustment disorders with anxiety and depression", Human Psychopharmacology Clinical and Experimental (1996); 11: 293-298.
Antkiewicz-Michaluk et al., "Ca2+ channel blockade prevents lysergic acid diethylamine-induced changes in dopamine and serotonin metabolism", European Journal of Pharmacology (1997); 332(1): 9-14. doi: 10.1016/s0014-2999(97)01025-X.
Appel et al., "Analyzing mechanism(s) of hallucinogenic drug action with drug discrimination procedures", Neuroscience & Biobehavioral Reviews (1982); 6(4): 529-536. doi: 10.1016/0149-7634(82)90036-7.
Appel et al., "LSD, 5-HT (serotonin), and the evolution of a behavioral assay", Neuroscience and Biobehavioral Reviews (2004); 27(8): 693-701. doi: 10.1016/j.neubiorev.2003.11.012.
Auerbach et al., "Lysergic acid diethylamine: effect on embryos", Science (1967); 157: 1325-1326. doi: 10.1126/science.157.3794.1325.
[Author Unknown, Date Unknown] "3.3: Crystalline and Amorphous Solids", LibreTexts Chemistry [online] https://chem.libretexts.org/Under_Construction/Purgatory/AUCHE_110%3A_General_Chemistry_I_(Rempel)/03%3A_States_of_Matter/3.03%3A_Crystalline_and_Amorphous_Solids (Access Date: Mar. 14, 2025); 2 pages.
[Author Unknown] "Is Spray Drying a Viable Alternative to Lyophilization?", Pharmtech (Dec. 15, 2009) [online] https://www.pharmtech.com/view/spray-drying-viable-alternative-lyophilization (Access Date: Apr. 6, 2023); 3 pages.
Axelrod et al., "The distribution and metabolism of lysergic acid diethylamide", Annals New York Academy of Sciences (1957); 66(3): 435-444. doi: 10.1111/j.1749-6632.1957.tb40739.x.
Babor et al., "The Alcohol Use Disorders Identification Test, Guidelines for Use in Primary Care", World Health Organization, Department of Mental Health and Substance Dependence, Second Edition (2001) [online] https://apps.who.int/iris/bitstream/handle/10665/67205/WHO_MSD_MSB_01.6a.pdf?sequence=1&isAllowed=y (Access Date: Nov. 1, 2021); 41 pages.
Bailey et al., "Distinction of Some Dialkyl Amides of Lysergic and iso-Lysergic Acids from LSD", Journal of the Association of Official Analytical Chemists (1973); 56(1): 88-99.
Baker et al., "Molecular structure of LSD", Science (1972); 178(4061): 614-615. doi: 10.1126/science.178.4061.614.
Bandari et al., "Orodispersible tablets: An overview", Asian Journal of Pharmaceutics (2008); 2(1): 2-11.
Bandelow et al., "Epidemiology of anxiety disorders in the 21st century", Dialogues in Clinical Neuroscience (2015); 17(3): 327-335. doi: 10.31887/DCNS.2015.17.3/bbandelow.
Barnett. "Diazepam treatment for L.S.D. intoxication", Lancet (1971); 2(7718): 270; 1 page. doi: 10.1016/s0140-6736(71)92616-x.
Barrett et al., "Serotonin 2A receptor signaling underlies LSD-induced alteration of the neural response to dynamic changes in music", Cerebral Cortex (2018); 28(11): 3939-3950. doi: 10.1093/cercor/bhx257.
Barrett. "Validation of the revised Mystical Experience Questionnaire in experimental sessions with psilocybin", Journal of Psychopharmacology (2015); 29(11): 1182-1190. doi: 10.1177/0269881115609019. Epub Oct. 6, 2015.
Basu et al., "Association of serotonin transporter (SLC6A4) & receptor (5HTR1A, 5HTR2A) polymorphisms with response to treatment with escitalopram in patients with major depressive disorder: A preliminary study", Indian Journal of Medical Research (2015); 142(1): 40-45. doi: 10.4103/0971-5916.162094.
Baumeister. "Classical hallucinogens as antidepressants? A review of pharmacodynamics and putative clinical roles", Therapeutic Advances in Psychopharmacology (2014); 4(4): 156-169. doi: 10.1177/2045125314527985.
Beck. "An inventory for measuring depression", Archives of General Psychiatry (1961); 4(6): 561-571. doi: 10.1001/archpsyc.1961.01710120031004.
Becker et al., "Acute effects of psilocybin after escitalopram or placebo pretreatment in a randomized, double-blind, placebo-controlled, crossover study in healthy subjects", Clinical Pharmacology & Therapeutics (2022); 111(4): 886-895. doi: 10.1002/cpt.2487. Epub Nov. 22, 2021.
Bedard et al., "The 'wet dog shake' behaviour in the rat and 5 hydroxytryptamine", Proceedings of the B.P.S. (Jan. 5-7, 1977); 450P-451P; 2 pages.
Ben-Jonathan et al., "What can we learn from rodents about prolactin in humans?", Endocrine Reviews (2008); 29(1): 1-41. doi: 10.1210/er.2007-0017. Epub Dec. 5, 2007.

(56) References Cited

OTHER PUBLICATIONS

Bercel et al., "Model Psychoses Induced by LSD-25 in Normals: I. Psychophysiological Investigations, with Special Reference to the Mechanism of the Paranoid Reaction", AMA Archives of Neurology and Psychiatry (1956); 75(6): 588-611. doi: 10.1001/archneurpsyc. 1956.02330240026003.

Berge et al., "Pharmaceutical salts", Journal of Pharmaceutical Sciences (Jan. 1977); 66(1): 1-19.

Berman et al., "Evaluation of the Drug Use Disorders Identification Test (DUDIT) in criminal justice and detoxification settings and in a Swedish population sample", European Addiction Research (2005); 11(1): 22-31. doi: 10.1159/000081413.

Bershad et al., "Acute subjective and behavioral effects of microdoses of lysergic acid diethylamide in healthy human volunteers", Biological Psychiatry (Jun. 2019); 86(10): 792-800. doi: 10.1016/j.biopsych.2019.05.019. Epub Jun. 3, 2019.

Bershad et al., "Preliminary report on the effects of a low dose of LSD on resting- state amygdala Functional connectivity", Biological Psychiatry: Cognitive Neuroscience and Neuroimaging (Apr. 2020); 5: 461-467. doi: 10.1016/j.bpsc.2019.12.007. Epub Dec. 20, 2019.

Berthoumieu et al., "Tabletting study for ODT's", Manufacturing Chemist (Nov. 23, 2010) [online] https://manufacturingchemist.com/tabletting-study-for-odts-57763 (Access Date: Nov. 19, 2024); 14 pages.

Bhaskar et al. "A Review on Formulation Approaches in Immediate Release Tablet", Journal of Drug Delivery & Therapeutics (2018); 8(3): 153-161.

Boess et al., "Interaction of tryptamine and ergoline compounds with threonine 196 in the ligand binding site of the 5-hydroxytryptamine6 receptor", Molecular Pharmacology (1997); 52: 515-523. doi: 10.1124/mol.52.3.515.

Boess et al., "Molecular biology of 5-HT receptors", Neuropharmacology (1994); 33(3/4): 275-317. doi: 10.1016/0028-3908(94)90059-0.

Bogenschutz et al., "Psilocybin-assisted treatment for alcohol dependence: a proof-of-concept study", Journal of Psychopharmacology (2015); 29(3): 289-299. doi: 10.1177/0269881114565144. Epub Jan. 13, 2015.

Bogenschutz. "Studying the effects of classic hallucinogens in the treatment of alcoholism: rationale, methodology, and current research with psilocybin", Current Drug Abuse Reviews (2013); 6(1): 17-29. doi: 10.2174/15733998113099990002.

Bonson et al., "Alterations in responses to LSD in humans associated with chronic administration of tricyclic antidepressants, monoamine oxidase inhibitors or lithium", Behavioural Brain Research (1996); 73(1-2): 229-233. doi: 10.1016/0166-4328(96)00102-7.

Bonson et al., "Chronic administration of serotonergic antidepressants attenuates the subjective effects of LSD in humans", Neuropsychopharmacology (1996); 14(6): 425-436. doi: 10.1016/0893-133X(95)00145-4.

Boyd et al., "Preliminary studies of the metabolism of lysergic acid diethylamide using radioactive carbon-marked molecules", Journal of Nervous and Mental Disease (1955); 122(5): 470-471. doi: 10.1097/00005053-195511000-00009.

Boyd. "Preliminary Studies on the Metabolism of LSD", In: Cholden L (ed), Proceedings of the Round Table on Lysergic acid diethylamide and mescaline in experimental psychiatry, Grune & Stratton, London, New York (1956); 57-59; 4 pages.

Boyd. "The metabolism of lysergic acid diethylamide", Archives Internationales de Pharmacodynamie et de Thérapie (1959); 120(3-4): 292-311.

Brandt et al., "Return of the lysergamides. Part II: analytical and behavioural characterization of N6-allyl-6-norlysergic acid diethylamide (AL-LAD) and (2'S, 4'S)-lysergic acid 2, 4-dimethylazetidide (LSZ)", Drug Testing and Analysis (2017); 9(1): 38-50. doi: 10.1002/dta.1985. Epub Jun. 6, 2016.

Brandt et al., "Return of the lysergamides. Part VI: Analytical and behavioural characterization of 1-cyclopropanoyl-d-lysergic acid diethylamide (1CP-LSD)", Drug Testing and Analysis (2020); 12(6): 812-826. doi: 10.1002/dta.2789. Epub Apr. 20, 2020.

Breitbart et al., "Meaning-centered group psychotherapy for patients with advanced cancer: A treatment manual", Introduction, OUP US (2014); 9 pages.

Bretz et al., "Combining multiple comparisons and modeling techniques in dose-response studies", Biometrics (2005); 61(3): 738-748. doi: 10.1111/j.1541-0420.2005.00344.x.

Brown et al., "Pharmacokinetics of escalating doses of oral psilocybin in healthy adults", Clinical Pharmacokinetics (2017); 56: 1543-1554. doi: 10.1007/s40262-017-0540-6.

Bruss et al., "Hamilton anxiety rating scale interview guide: Joint interview and test-retest methods for interrater reliability", Psychiatry Research (1994); 53: 191-202. doi: 10.1016/0165-1781(94)90110-4.

Buchborn et al., "Tolerance to lysergic acid diethylamide: Overview, correlates, and clinical implications", Neuropathology of Drug Addictions and Substance Misuse (2016); 2(79): 846-858.

Bunzow et al., "Amphetamine, 3,4-methylenedioxymethamphetamine, lysergic acid diethylamide, and metabolites of the catecholamine neurotransmitters are Agonists of a rat trace amine receptor", Molecular Pharmacology (2001); 60(6): 1181-1188. doi: 10.1124/mol.60.6.1181.

Buysse et al., "The Pittsburgh Sleep Quality Index: a new instrument for psychiatric practice and research", Psychiatry Research (1989); 28(2): 193-213. doi: 10.1016/0165-1781(89)90047-4.

Cai et al., "Elucidation of LSD in vitro metabolism by liquid chromatography and capillary electrophoresis coupled with tandem mass spectrometry", The Journal of Analytical Toxicology (Jan./Feb. 1996); 20: 27-37. doi: 10.1093/jat/20.1.27.

Canezin et al., "Determination of LSD and its metabolites in human biological fluids by high-performance liquid chromatography with electrospray tandem mass spectrometry." Journal of Chromatography B (2001); 765(1): 15-27. doi: 10.1016/s0378-4347(01)00386-3.

Cao et al., "Structure-based discovery of nonhallucinogenic psychedelic analogs", Science (2022); 375(6579): 403-411. doi: 10.1126/science.abl8615. Epub Jan. 27, 2022.

Carhart-Harris et al., "Neural correlates of the LSD experience revealed by multimodal neuroimaging", Proceedings of the National Academy of Sciences (2016); 113(17): 4853-4858. doi: 10.1073/pnas.1518377113. Epub Apr. 11, 2016.

Carhart-Harris et al., "Psilocybin with psychological support for treatment-resistant depression: six-month follow-up", Psychopharmacology (2018); 235: 399-408. doi: 10.1007/s00213-017-4771-x. Epub Nov. 8, 2017.

Carhart-Harris et al., "Trial of psilocybin versus escitalopram for depression", New England Journal of Medicine (2021); 384(15): 1402-1411. doi: 10.1056/NEJMoa2032994.

Carhart-Harris et al., "LSD enhances suggestibility in healthy volunteers", Psychopharmacology (Berl) (Feb. 2015); 232(4): 785-794. doi: 10.1007/s00213-014-3714-z. Epub Sep. 23, 2014.

Carhart-Harris et al., "Psilocybin with psychological support for treatment-resistant depression: an open-label feasibility study", The Lancet Psychiatry (2016); 3(7): 619-627. doi: 10.1016/S2215-0366(16)30065-7. Epub May 17, 2016.

Carhart-Harris et al., "The paradoxical psychological effects of lysergic acid diethylamide (LSD)", Psychological Medicine (2016); 46(7): 1379-1390. doi: 10.1017/S0033291715002901. Epub Feb. 5, 2016.

Caudle et al., "Standardizing CYP 2D6 genotype to phenotype translation: consensus recommendations from the Clinical Pharmacogenetics Implementation Consortium and Dutch Pharmacogenetics Working Group", Clinical and translational Science (2020); 13(1): 116-124. doi: 10.1111/cts.12692. Epub Oct. 24, 2019.

Celestino et al. "Rational use of antioxidants in solid oral pharmaceutical preparations", Brazilian Journal of Pharmaceutical Sciences (2012); 48(3); 11 pages.

Cerny et al., "Mutterkornalkaloide XIX. Über die Verwendung von N, N'-Carbonyldiimidazol zur Synthese der D-Lysergsäure-, D-Dihydrolysergsäure (I)-und 1-Methyl-D-dihydrolysergsaure (I) amide", Collection of Czechoslovak Chemical Communications (1962); 27(7): 1585-1592; 17 pages with English machine translation.

(56) References Cited

OTHER PUBLICATIONS

Chinwala. "Recent formulation advances and therapeutic usefulness of orally disintegrating tablets (ODTs)", Pharmacy (2020); 8(4): 186; 11 pages. doi: 10.3390/pharmacy8040186.

Cohen et al., "Chromosomal Damage in Human Leukocytes Induced by Lysergic Acid Diethylamide", Science (1967); 155(3768): 1417-1419. doi: 10.1126/science.155.3768.1417.

Cohen et al., "Genetic toxicology of lysergic acid diethylamide (LSD-25)", Mutation Research/Reviews in Genetic Toxicology (1977); 47(3-4): 183-209. doi: 10.1016/0165-1110(77)90003-3.

Cohen et al., "In vivo and in vitro chromosomal damage induced by LSD-25", New England Journal of Medicine (Nov. 16, 1967); 277(20): 1043-1049. doi: 10.1056/NEJM196711162772001.

Cohen. "Lysergic acid diethylamide: side effects and complications", The Journal of Nervous and Mental Disease (1960); 130(1): 30-40. doi: 10.1097/00005053-196001000-00005.

Cohen et al., "Meiotic chromosome damage induced by LSD-25", Nature (1968); 219: 1072-1074. doi: 10.1038/2191072a0.

Collu et al., "Endocrine effects of chronic administration of psychoactive drugs to prepubertal male rats. II LSD", Canadian Journal of Physiology and Pharmacology (1975); 53(6): 1023-1026. doi: 10.1139/y75-142.

Constantin et al., "Therapeutic Interventions for Adjustment Disorder: A Systematic Review", American Journal of Therapeutics (2020); 27(4): e375-e386.

Corey et al., "Chromosome studies on the patients (in vivo) and cells (in vitro) treated with lysergic acid diethylamide", New England Journal of Medicine (1970); 282(17): 939-943. doi: 10.1056/NEJM197004232821702.

Corne et al., "A possible correlation between drug-induced hallucinations in man and a behavioural response in mice", Psychopharmacologia (Berl.) (1967); 11: 65-78. doi: 10.1007/BF00401509.

Creese et al., "The dopamine receptor: differential binding of d-LSD and related agents to agonist and antagonist states", Life Sciences (1975); 17(11): 1715-1719. doi: 10.1016/0024-3205(75)90118-6.

Crews et al., "Clinical Pharmacogenetics Implementation Consortium (CPIC) guidelines for codeine therapy in the context of cytochrome P450 2D6 (CYP2D6) genotype", Clinical Pharmacology & Therapeutics (2012); 91(2): 321-326. doi: 10.1038/clpt.2011.287. Epub Dec. 28, 2011.

Darke et al., "A retrospective study of the characteristics and toxicology of cases of lysergic acid diethylamide (LSD)- and psilocybin-related death in Australia", Addiction, (2024); 119: 1564-1571. doi: 10.1111/add.16518. Epub May 21, 2024.

Database STN, CAS Registry No. 2757566-19-9, "Ergoline-8-carboxamide, 9,10-didehydro-N-ethyl-N-(2-fluoroethyl)-6- methyl-, (8β)-" [CA Index Name]. Chemical Abstracts Service, American Chemical Society; entered Jan. 28, 2022; 1 printed page.

Database STN, CAS Registry No. 2855122-73-3, "Ergoline-8-carboxamide, 9,10-didehydro-N,N-bis(2-fluoroethyl)-6-methyl-, (8β)-" [CA Index Name]. Chemical Abstracts Service, American Chemical Society; entered Nov. 17, 2022; 1 printed page.

Database STN, CAS Registry No. 2855123-59-8, "Ergoline-8-carboxamide, 9,10-didehydro-N,N-bis(2-fluoroethyl)-6-methyl-, (8β)-" [CA Index Name]. Chemical Abstracts Service, American Chemical Society; entered Nov. 17, 2022; 1 printed page.

Database STN, CAS Registry No. 3024529-93-6, "Ergoline-8-carboxamide, 9,10-didehydro-N-ethyl-N-2-propyn-1-yl-6-methyl-,(8β)-" [CA Index Name]. Chemical Abstracts Service, American Chemical Society; entered Jan. 11, 2024; 1 printed page.

Database STN, CAS Registry No. 3024530-02-4, "Ergoline-8-carboxamide, 9,10-didehydro-N-ethyl-N-methoxy-6-methyl-,(8β)-" [CA Index Name]. Chemical Abstracts Service, American Chemical Society; entered Jan. 11, 2024; 1 printed page.

Database STN, CAS Registry No. 3024530-08-0, "Ergoline-8-carboxamide, 9,10-didehydro-N-(2-fluoroethyl)-N-methoxy-6-methyl-, (8β)-" [CA Index Name]. Chemical Abstracts Service, American Chemical Society; entered Jan. 11, 2024; 1 printed page.

Database STN, CAS Registry No. 3024530-10-4, "Ergoline-8-carboxamide, 9,10-didehydro-N,N-diethyl-6-(2-fluoro-2-propen-1-yl)-, (8β)-" [CA Index Name]. Chemical Abstracts Service, American Chemical Society; entered Jan. 11, 2024; 1 printed page.

Database STN, CAS Registry No. 3024530-16-0, "Ergoline-8-carboxamide, 9,10-didehydro-N,N-diethyl-6-(2-oxopropyl)-, (8β)-" [CA Index Name]. Chemical Abstracts Service, American Chemical Society; entered Jan. 11, 2024; 1 printed page.

Database STN, CAS Registry No. 3024530-28-4, "Ergoline-8-carboxamide, 9,10-didehydro-N,N-diethyl-6-(2-fluoroethyl)-, (8β)-" [CA Index Name]. Chemical Abstracts Service, American Chemical Society; entered Jan. 11, 2024; 1 printed page.

Database STN, CAS Registry No. 3024530-30-8, "Ergoline-8-carboxamide, 9,10-didehydro-N-ethyl-6-(2-fluoro-2-propen-1-yl)-N-2-propyn-1-yl-, (8β)-" [CA Index Name]. Chemical Abstracts Service, American Chemical Society; entered Jan. 11, 2024; 1 printed page.

Database STN, CAS Registry No. 65527-59-5, "Ergoline-8-carboxamide, 9,10-didehydro-N-ethenyl-N-ethyl-6-methyl-, (8β)-(9Cl)" [CA Index Name]. Chemical Abstracts Service, American Chemical Society; entered Nov. 16, 1984; 1 printed page.

Davenport. "Psychedelic and nonpsychedelic LSD and psilocybin for cluster headache", CMAJ (2016); 188(3): 217; 1 page. doi: 10.1503/cmaj.1150082.

Davis et al., "Effects of psilocybin-assisted therapy on major depressive disorder: a randomized clinical trial", JAMA Psychiatry (2021); 78(5): 481-489. doi: 10.1001/jamapsychiatry.2020.3285. Erratum in: JAMA Psychiatry. Feb. 10, 2021:569. doi: 10.1001/jamapsychiatry.2020.4714.

De Almeida et al., "Modulation of serum brain-derived neurotrophic factor by a single dose of ayahuasca: observation from a randomized controlled trial", Frontiers in Psychology (2019); 10: 1234; 13 pages. doi: 10.3389/fpsyg.2019.01234.

De Candia et al., "Effects of treatment with etizolam 0.5 mg BID on cognitive performance: a 3-week, multicenter, randomized, double-blind, placebo-controlled, two-treatment, three-period, noninferiority crossover study in patients with anxiety disorder", Clinical Therapeutics (2009); 31(12): 2851-2859. doi: 10.1016/j.clinthera.2009.12.010.

De Gregorio et al., "d-Lysergic Acid Diethylamide (LSD) as a Model of Psychosis: Mechanism of Action and Pharmacology", International Journal of Molecular Science, (2016); 17(11): 1953; 20 pages. doi: 10.3390/ijms17111953.

De Gregorio. "The hallucinogen d-lysergic diethylamide (LSD) decreases dopamine firing activity through 5-HT1A, D2 and TAAR1 receptors", Pharmacological Research (2016); 113: 81-91. doi: 10.1016/j.phrs.2016.08.022. Epub Aug. 17, 2016.

Denson et al., "A controlled study of LSD treatment in alcoholism and neurosis", The British Journal of Psychiatry (1970); 116(533): 443-445. doi: 10.1192/bjp.116.533.443.

Derogatis et al., "The SCL-90 and the MMPI: A step in the validation of a new self-report scale", The British Journal of Psychiatry (1976); 128(3): 280-289. doi: 10.1192/bjp.128.3.280.

Dipaolo. "Evaluation of teratogenicity of lysergic acid diethylamine", Nature (1968); 220: 490-491. doi: 10.1038/220490b0.

Dirami et al., "Effect of a dopamine agonist on the development of Leydig Cell hyperplasia in Sprague-Dawley rats", Toxicology and Applied Pharmacology (1996); 141: 169-177. doi: 10.1006/taap.1996.0273.

Dishotsky et al., "LSD and genetic damage: Is LSD chromosome damaging, carcinogenic, mutagenic, or teratogenic?", Science (1971); 172(3982): 431-440. doi: 10.1126/science.172.3982.431.

Dittrich. "The standardized psychometric assessment of altered states of consciousness (ASCs) in humans", Pharmacopsychiatry (1998); 31(Suppl 2): 80-84. doi: 10.1055/s-2007-979351.

Dolder et al., "Development and validation of a rapid turboflow LC-MS/MS method for the quantification of LSD and 2-oxo-3-hydroxy LSD in serum and urine samples of emergency toxicological cases", Analytical and Bioanalytical Chemistry (2015); 407: 1577-1584. doi.10.1007/s00216-014-8388-1.

Dolder et al., "Development and validation of an LC-MS/MS method to quantify lysergic acid diethylamide (LSD), iso-LSD, 2-oxo-3-hydroxy-LSD, and nor-LSD and identify novel metabolites

(56) References Cited

OTHER PUBLICATIONS in plasma samples in a controlled clinical trial", Journal of Clinical Lab Analysis (2018); 32(2): 1-8. doi: 10.1002/jcla.22265. Epub May 26, 2017.

Dolder et al., "Alcohol acutely enhances decoding of positive emotions and emotional concern for positive stimuli and facilitates the viewing of sexual images", Psychopharmacology (2017); 234: 41-51. doi: 10.1007/s00213-016-4431-6. Epub Sep. 19, 2016.

Dolder et al., "LSD acutely impairs fear recognition and enhances emotional empathy and sociality", Neuropsychopharmacology (2016); 41(11): 2638-2646. doi: 10.1038/npp.2016.82. Epub Jun. 1, 2016.

Dolder et al., "Pharmacokinetics and pharmacodynamics of lysergic acid diethylamide in healthy subjects", Clinical Pharmacokinetics (2017); 56: 1219-1230. doi: 10.1007/s40262-017-0513-9.

Dolder et al., "Pharmacokinetics and Concentration-Effect Relationship of Oral LSD in Humans", International Journal of Neuropsychopharmacology (Apr. 27, 2016); 19(1): 1-7. doi: 10.1093/ijnp/pyv072.

Domínguez-Clavé et al., "Ayahuasca: Pharmacology, neuroscience and therapeutic potential", Brain Research Bulletin (2016); 126: 89-101. doi: 10.1016/j.brainresbull.2016.03.002. Epub Mar. 11, 2016.

Dos Santos et al., "Antidepressive, anxiolytic, and antiaddictive effects of ayahuasca, psilocybin and lysergic acid diethylamide (LSD): a systematic review of clinical trials published in the last 25 years", Therapeutic Advances in Psychopharmacology (2016); 6(3): 193-213. doi: 10.1177/2045125316638008. Epub Mar. 18, 2016.

Duerler et al., "LSD-induced increases in social adaptation to opinions similar to one's own are associated with stimulation of serotonin receptors", Scientific Reports (2020); 10: 12181; 11 pages. doi: 10.1038/s41598-020-68899-y.

Eells et al., "Effects of intraocular mescaline and LSD on visual-evoked responses in the rat", Pharmacology Biochemistry & Behavior (1989); 32: 191-196. doi: 10.1016/0091-3057(89)90232-3.

Egan et al., "Agonist activity of LSD and lisuride at cloned 5-HT2A and 5-HT2C receptors", Psychopharmacology (1998); 136: 409-414. doi: 10.1007/s002130050585.

Eglen et al., "The 5-HT7 receptor: orphan found", Trends in Pharmacological Sciences (Apr. 1997); 18(4): 104-107. doi: 10.1016/s0165-6147(97)01043-2.

Egozcue et al., "Effect of LSD-25 on mitotic and meiotic chromosomes of mice and monkeys", Humangenetik (1969); 8: 86-93. doi: 10.1007/BF00295831.

Eisner et al., "Psychotherapy with lysergic acid diethylamide", The Journal of Nervous and Mental Disease (1958); 127(6): 528-539. doi: 10.1097/00005053-195812000-00006.

Eleusis Therapeutics, "A Double-blind, Placebo-controlled Study to Evaluate Very Low Dose LSD in Healthy Volunteers Aged 55-75 Years" ClinicalTrials.gov ID NCT04421105, version 1, Jun. 4, 2020, 12 pages.

EMCDDA (European Monitoring Center for Drugs and Drug Addiction). "Statistical Bulletin 2021—prevalence of drug use", (2021) [online] https://www.emcdda.europa.eu/data/stats2021/gps_en (Access Date: Nov. 1, 2021); 1 page.

Emerit et al., "LSD: No. chromosomal breakage in mother embryos during rat pregnancy", Teratology (1972); 6: 71-74. doi: 10.1002/tera.1420060109.

Erickson et al., "Severity of anxiety and work-related outcomes of patients with anxiety disorders", Depress and Anxiety (2009); 26(12): 1165-1171. doi: 10.1002/da.20624.

Erowid. "1P-LSD Reports (also 1-propionyl-lysergic acid diethylamide) (125 Total)", The Erowid Experience Vaults [online] https://erowid.org/experiences/subs/exp_1PLSD.shtml (Access Date: Mar. 14, 2025); 4 pages.

Erpelding et al., "Placebo Response Reduction and Accurate Pain Reporting Training Reduces Placebo Responses in a Clinical Trial on Chronic Low Back Pain", Clinical Journal Pain (2020); 36(12): 950-954. doi: 10.1097/AJP.0000000000000873.

Eshleman et al., "Neurochemical pharmacology of psychoactive substituted N-benzylphenethylamines: High potency agonists at 5-HT2A receptors", Biochemical Pharmacology (2018); 158: 27-34. doi: 10.1016/j.bcp.2018.09.024. Epub Sep. 25, 2018.

Evans et al., "What can be done to control the placebo response in clinical trials? A narrative review", Contemporary Clinical Trials (2021); 107: 106503; 8 pages. doi: 10.1016/j.cct.2021.106503. Epub Jul. 6, 2021.

Evarts. "Some effects of bufotenine and lysergic acid diethylamide on the monkey", AMA Archives of Neurology and Psychiatry (1956); 75(1): 49-53. doi: 10.1001/archneurpsyc.1956.02330190065004.

Examiner Interview Summary for U.S. Appl. No. 17/156,233, by Liechti, Matthias Emanuel et al., mailed on Aug. 28, 2023, 3 pages.

Examiner Interview Summary for U.S. Appl. No. 17/156,233, by Liechti, Matthias Emanuel et al., mailed on Oct. 13, 2022, 3 pages.

Examiner Interview Summary for U.S. Appl. No. 17/890,133, by Mack, Peter et al., mailed on Jul. 16, 2024, 3 pages.

Examiner Interview Summary for U.S. Appl. No. 17/890,133, by Mack, Peter et al., mailed on Mar. 19, 2024, 3 pages.

Examiner Interview Summary for U.S. Appl. No. 18/077,085, by Mack, Peter et al., mailed on Jul. 16, 2024, 3 pages.

Examiner Interview Summary for U.S. Appl. No. 18/077,085, by Mack, Peter et al., mailed on Mar. 19, 2024, 3 pages.

Examiner Interview Summary for U.S. Appl. No. 18/077,085, by Mack, Peter et al., mailed on Nov. 7, 2023, 3 pages.

Examiner Interview Summary for U.S. Appl. No. 18/077,096, by Mack, Peter et al., mailed on Jun. 8, 2023, 3 pages.

Examiner Interview Summary for U.S. Appl. No. 18/194,761, by Mack, Peter et al., mailed on Apr. 4, 2024, 2 pages.

Examiner Interview Summary for U.S. Appl. No. 18/194,761, by Mack, Peter et al., mailed on May 14, 2024, 1 page.

Extended European Search Report for European Application No. 21760160.8, by Universitätsspital Basel, mailed Nov. 30, 2023, 7 pages.

Extended European Search Report for European Application No. 21789412, by Universitätsspital Basel, mailed Mar. 6, 2024, 13 pages.

Fadiman. "The psychedelic explorer's guide: Safe, therapeutic, and sacred journeys", Simon and Schuster, Park Street Press (2011); Part Two, Chapters 5 and 8; Part Three: Chapters 9, 11, 13; Part 5: Chapters 21 and 22; pp. 71-82, 103-113, 119-135, 144-166, 178-182, and 282-302; 103 pages total.

Family et al., "Safety, tolerability, pharmacokinetics, and pharmacodynamics of low dose lysergic acid diethylamide (LSD) in healthy older volunteers", Psychopharmacology (2020); 237: 841-853. doi: 10.1007/s00213-019-05417-7. Epub Dec. 18, 2019.

Fava et al., "Major Depressive Disorder", Neuron (2000); 28: 335-341. doi: 10.1016/s0896-6273(00)00112-4.

Fehr et al., "Demethylation of lysergic acid skeleton", Helvetica Chimica Acta (1970); 53(8): 2197-2201; 10 pages with English machine translation. doi: 10.1002/hlca.19700530832.

Felix Mueller, "LSD Treatment for Persons With Alcohol Use Disorder (LYSTA)" ClinicalTrials.gov ID NCT05474989, version 1, Jul. 24, 2022, 11 pages.

Final Office Action for U.S. Appl. No. 17/156,233, by Liechti, Matthias Emanuel et al., mailed on Jan. 20, 2023, 16 pages.

Final Office Action for U.S. Appl. No. 17/156,233, by Liechti, Matthias Emanuel et al., mailed on Nov. 27, 2023, 21 pages.

Final Office Action for U.S. Appl. No. 17/156,233, by Liechti, Matthias Emanuel et al., mailed on Sep. 18, 2024, 24 pages.

Final Office Action for U.S. Appl. No. 17/225,715, by Liechti, Matthias Emanuel et al., mailed on Jan. 11, 2023, 22 pages.

Final Office Action for U.S. Appl. No. 17/672,670, by Liechti, Matthias Emanuel et al., mailed on Jan. 17, 2024, 22 pages.

Final Office Action for U.S. Appl. No. 17/672,670, by Liechti, Matthias Emanuel et al., mailed on Jul. 15, 2024, 22 pages.

Final Office Action for U.S. Appl. No. 17/672,670, by Liechti, Matthias Emanuel et al., mailed on May 4, 2023, 13 pages.

Final Office Action for U.S. Appl. No. 17/869,896, by Liechti, Matthias Emanuel et al., mailed on Jun. 18, 2024, 13 pages.

Final Office Action for U.S. Appl. No. 17/890,133 mailed May 15, 2024, 28 pages.

Final Office Action for U.S. Appl. No. 18/077,085 mailed May 15, 2024, 32 pages.

(56) References Cited

OTHER PUBLICATIONS

Final Office Action for U.S. Appl. No. 18/077,096 mailed Jul. 20, 2023, 28 pages.
Final Office Action for U.S. Appl. No. 18/077,096 mailed Jun. 18, 2024, 26 pages.
Final Office Action for U.S. Appl. No. 18/194,761 mailed Dec. 29, 2023, 15 pages.
Final Office Action for U.S. Appl. No. 18/321,159, by Liechti, Matthias Emanuel et al., mailed on Mar. 22, 2024, 18 pages.
Final Office Action for U.S. Appl. No. 18/321,159, by Liechti, Matthias Emanuel et al., mailed on Nov. 7, 2024, 18 pages.
Fiorella et al., "The role of the 5-HT2A and 5-HT2C receptors in the stimulus effects of hallucinogenic drugs III: The mechanistic basis for supersensitivity to the LSD stimulus following serotonin depletion", Psychopharmacology (1995); 121: 364-372. doi: 10.1007/BF02246076.
Fischman et al., "Ethical and practical issues involved in behavioral pharmacology research that administers drugs of abuse to human volunteers", Behavioural Pharmacology (1998); 9(7): 479-498. doi: 10.1097/00008877-199811000-00002.
Fisher et al., "Recovery rates in generalized anxiety disorder following psychological therapy: an analysis of clinically significant change in the STAI-T across outcome studies since 1990", Psychological Medicine (1999); 29(6): 1425- 1434. doi: 10.1017/s0033291799001336.
Ford et al., "Hallucinogenic Persisting Perception Disorder: A case series and review of the literature" Frontiers in Neurology, May 2022; 13: 878609; 10 pages. doi: 10.3389/fneur.2022.878609.
Frank et al., "Efficacy of interpersonal psychotherapy as a maintenance treatment of recurrent depression", Archives of General Psychiatry (1991); 48: 1053-1059. doi: 10.1001/archpsyc.1991.01810360017002.
Freedman et al., "266-Regional and subcellular distribution of LSD and effects on 5-HT levels", The Pharmacologist, Neurochemistry, Abstracts of Papers for Fall Meeting (Aug. 16-20, 1965); 7(2); 3 pages.
Freedman et al., "Patterns of tolerance to lysergic acid diethylamide and mescaline in rats", Science (1958); 127: 1173-1174. doi: 10.1126/science.127.3307.1173.
Freedman. "The Psychopharmacology of Hallucinogenic Agents", Annual Review Medicine (1969); 20(1): 409-418. doi: 10.1146/annurev.me.20.020169.002205.
Freedman et al., "Tolerance to behavioral effects of LSD-25 in the rat", Journal of Pharmacology and Experimental Therapeutics (1964); 143: 309-313.
Fuentes et al., "Therapeutic use of LSD in psychiatry: A systematic review of randomized-controlled clinical trials", Front Psychiatry (2020); 10: 943; 14 pages. doi: 10.3389/fpsyt.2019.00943.
Gaedigk. "Complexities of CYP2D6 gene analysis and interpretation", International Review of Psychiatry (2013); 25(5): 534-553. doi: 10.3109/09540261.2013.825581.
Gaedigk et al., "The CYP2D6 activity score: translating genotype information into a qualitative measure of phenotype", Clinical Pharmacology & Therapeutics (2008); 83(2): 234-242. doi: 10.1038/sj.clpt.6100406. Epub Oct. 31, 2007.
Gage et al., "Use of pharmacogenetic and clinical factors to predict the therapeutic dose of warfarin", Clinical Pharmacology & Therapeutics (2008); 84(3): 326-331. doi: 10.1038/clpt.2008.10. Epub Feb. 27, 2008. Erratum in: Clin Pharmacol Ther. Sep. 2008;84(3):430.
Galanopoulou et al., "Mesulergine: A review", CNS Drug Reviews (1999); 5(3): 233-248.
Garakani et al., "Pharmacology of anxiety disorders: Current and emerging treatment options", Frontiers in Psychiatry (Dec. 2020); 11(595584); 21 pages. doi: 10.3389/fpsyt.2020.595584.
Garbrecht. "Synthesis of Amides of Lysergic Acid1", The Journal of Organic Chemistry (1959); 24(3): 368-372.
Garcia-Romeu et al., "Cessation and reduction in alcohol consumption and misuse after psychedelic use", Journal of Psychopharmacology (2019); 33(9): 1088-1101. doi: 10.1177/0269881119845793. Epub May 14, 2019.
Garcia-Romeu et al., "Psilocybin-occasioned mystical experiences in the treatment of tobacco addiction", Current Drug Abuse Reviews (2014); 7(3): 157-164. doi: 10.2174/1874473708666150107121331.
Gartlehner et al., "Comparative benefits and harms of second-generation antidepressants for treating major depressive disorder: An updated meta-analysis", Annals of Internal Medicine (2011); 155(11): 772-785. doi: 10.7326/0003-4819-155-11-201112060-00009.
Gasser. "Safety and efficacy of lysergic acid diethylamide-assisted psychotherapy for anxiety associated with life-threatening diseases", Journal of Nervous and Mental Disease (2014); 202(7): 513-520. doi: 10.1097/NMD.0000000000000113.
Gasser. "Die psycholytische therapie in der Schweiz von 1988-1993", Archives Suisses de Neurologie et de Psychiatrie (1996); 147: 59-66; 14 pages with English machine translation.
Gasser et al., "LSD-assisted psychotherapy for anxiety associated with a life-threatening disease: a qualitative study of acute and sustained subjective effects", Journal of Psychopharmacology (2015); 29(1): 57-68. doi: 10.1177/0269881114555249. Epub Nov. 11, 2014.
Geber. "Congenital malformations induced by mescaline, lysergic acid diethylamide and bromolysergic acid in the hamster", Science (1967); 158: 265-267. doi: 10.1126/science.158.3798.265.
Genest et al., "Microcrystalloptic tests for lysergic acid diethylamide and other hallucinogens", Journal of Pharmacy and Pharmacology (1970); 22(11): 839-844. doi: 10.1111/j.2042-7158.1970.tb08449.x.
Gerald et al., "The 5-HT4 receptor: Molecular cloning and pharmacological characterization of two splice variants", EMBO Journal (1995); 14(12): 2806-2815. doi: 10.1002/j.1460-2075.1995.tb07280.x.
Ghasemi et al., "Association between serotonin 2A receptor genetic variations, stressful life events and suicide", Gene (2018); 658: 191-197. doi: 10.1016/j.gene.2018.03.023. Epub Mar. 9, 2018.
Giacomelli et al., "Lysergic acid diethylamide (LSD) is a partial agonist of D2 dopaminergic receptors and it potentiates dopamine-mediated prolactin secretion in lactotrophs in vitro", Life Sciences (1998); 63(3): 215-222. doi: 10.1016/s0024-3205(98)00262-8.
Glennon et al., "Antagonism of the Effects of the Hallucinogen Dom and the Purported 5-HT Agonist Quipazine by 5-HT 2 Antagonists", European Journal of Pharmacology (1983); 91(2-3): 189-196. doi: 10.1016/0014-2999(83)90464-8.
Goetz et al., "The mutagenic effect of lysergic acid diethylamine I. Cytogenetic analysis", Mutation Research (1974); 26: 513-516. doi: 10.1016/s0027-5107(74)80052-7.
Golan et al., "Fingolimod increases brain-derived neurotrophic factor level secretion from circulating T cells of patients with multiple sclerosis", CNS Drugs (2019); 33: 1229-1237. doi: 10.1007/s40263-019-00675-7.
Golding et al., "Preparation of labeled aldehydes and ketones from enamides", Angew. Chem., Int. Ed. Engl.; (Germany, Federal Republic of) (1981); 20(1): 89-90.
Gong et al., "Serotonin receptor gene (HTR2A) T102C polymorphism modulates individuals' perspective taking ability and autistic-like traits", Frontiers in Human Neuroscience (2015); 9: 575; 8 pages. doi: 10.3389/fnhum.2015.00575.
Gonzalez-Maeso et al., "Transcriptome Fingerprints Distinguish Hallucinogenic and Nonhallucinogenic 5-Hydroxytryptamine 2A Receptor Agonist Effects in Mouse Somatosensory Cortex", The Journal of Neuroscience (2003); 23(26): 8836-8843. doi: 10.1523/JNEUROSCI.23-26-08836.2003.
Goodman et al., "Treatment of generalized anxiety disorder with escitalopram: pooled results from double-blind, placebo-controlled trials", Journal of Affective Disorders (2005); 87(2-3): 161-167. doi: 10.1016/j.jad.2004.11.011.
Goodwin. "An intravenous self-administration procedure for assessing the reinforcing effects of hallucinogens in nonhuman primates", Journal of Pharmacological and Toxicological Methods (2016); 82: 31-36. doi: 10.1016/j.vascn.2016.07.004. Epub Jul. 26, 2016.
Gouzoulis-Mayfrank et al., "Methodological issues of human experimental research with hallucinogens", Pharmacopsychiatry (1998); 31(S 2): 114-118. doi: 10.1055/s-2007-979356.

(56) References Cited

OTHER PUBLICATIONS

Graham et al., "The actions of d-lysergic acid diethylamide (LSD-25)", Part 1, General Pharmacology, Journal of the Faculty of Medicine Baghdad, Iraq (1954); 18(1&1): 1-10; 11 pages.

Greden. "The burden of recurrent depression: Causes, consequences, and future prospects", Journal of Clinical Psychiatry (2001); 62(suppl 22): 5-9.

Green et al., "Defining the histamine H2-receptor in brain: the interaction with LSD", NIDA Research Monogram (1978); 22: 38-59.

Greenberg et al., "The economic burden of adults with major depressive disorder in the United States (2005 and 2010)", Journal of Clinical Psychiatry (2015); 76(2): 155-162. doi: 10.4088/JCP. 14m09298.

Greiner et al., "Pharmacotherapy of psychiatric inpatients with adjustment disorder: current status and changes between 2000 and 2016", European Archives of Psychiatry and Clinical Neuroscience (2020); 270(1): 107-117. doi: 10.1007/s00406-019-01058-1. Epub Aug. 22, 2019.

Gresch et al., "Behavioral tolerance to lysergic acid diethylamide is associated with reduced serotonin-2A receptor signaling in rat cortex", Neuropsychopharmacology (2005); 30: 1693-1702. doi: 10.1038/sj.npp.1300711.

Griffiths et al., "Psilocybin can occasion mystical-type experiences having substantial and sustained personal meaning and spiritual significance", Psychopharmacology (2006); 187: 268-283. discussion 284-292. doi: 10.1007/s00213-006-0457-5. Epub Jul. 7, 2006.

Griffiths et al., "Psilocybin occasioned mystical-type experiences: immediate and persisting dose-related effects", Psychopharmacology (2011); 218: 649-665. doi: 10.1007/s00213-011-2358-5. Epub Jun. 15, 2011.

Griffiths et al., "Psilocybin produces substantial and sustained decreases in depression and anxiety in patients with life-threatening cancer: a randomized double-blind trial", Journal of Psychopharmacology (2016); 30: 1181-1197. doi: 10.1177/0269881116675513.

Griffiths et al., "Mystical-type experiences occasioned by psilocybin mediate the attribution of personal meaning and spiritual significance 14 months later", Journal of Psychopharmacology (2008); 22(6): 621-632. doi: 10.1177/0269881108094300. Epub Jul. 1, 2008.

Grob et al., "Pilot study of psilocybin treatment for anxiety in patients with advanced-stage cancer", Archives of General Psychiatry (2011); 68(1): 71-78. doi: 10.1001/archgenpsychiatry.2010.116. Epub Sep. 6, 2010.

Grof et al., "LSD-assisted psychotherapy in patients with terminal cancer", International Pharmacopsychiatry (1973); 8(3): 129-144. doi: 10.1159/000467984.

Guglielmi et al., "Natural compounds and extracts as novel antimicrobial agents", Expert Opinion on Therapeutic Patents (2020); 30(12): 949-962. doi: 10.1080/13543776.2020.1853101.

Guy. "ECDEU Assessment Manual for Psychopharmacology, Clinical Global Impressions (CGI)", U.S. Department of Health and Human Services, Public Health Service, Alcohol Drug Abuse and Mental Health Administration, NIMH Psychopharmacology Research Branch, Rockville, MD (1976); pp. 218-222; 11 pages.

Haden et al., "LSD Overdoses: Three Case Reports", Journal of Studies on Alcohol and Drugs (Jan. 2020); 81(1): 115-118.

Haile et al., "Plasma brain derived neurotrophic factor (BDNF) and response to ketamine in treatment-resistant depression", International Journal of Neuropsychopharmacology (2014); 17(2): 331-336. doi: 10.1017/S1461145713001119. Epub Oct. 8, 2013.

Hakulinen et al., "Serotonin receptor 1B genotype and hostility, anger and aggressive behavior through the lifespan: the Young Finns study", Journal of Behavioral Medicine (2013); 36: 583-590. doi: 10.1007/s10865-012-9452-y. Epub Sep. 4, 2012.

Halberstadt et al., "Pharmacological and biotransformation studies of 1-acyl-substituted derivatives of d-lysergic acid diethylamide (LSD)", Neuropharmacology (2020); 172: 107856; 11 pages. doi: 10.1016/j.neuropharm.2019.107856. Epub Nov. 19, 2019.

Halberstadt. "Recent advances in the neuropsychopharmacology of serotonergic hallucinogens", Behavioural Brain Research (2015); 277: 99-120. doi: 10.1016/j.bbr.2014.07.016. Epub Jul. 15, 2014.

Haley et al., "Brain concentrations of LSD-25 (delysid) after intracerebral or intravenous administration in conscious animals", Experientia (1957); 13(5): 199-200.

Halpern et al., "Do hallucinogens cause residual neuropsychological toxicity?", Drug and Alcohol Dependence (1999); 53(3): 247-256. doi: 10.1016/s0376-8716(98)00129-x.

Hamilton. "A rating scale for depression", Journal of Neurology, Neurosurgery, and Psychiatry (1960); 23(1): 56-62. doi: 10.1136/jnnp.23.1.56.

Hamilton. "Rating depressive patients", The Journal of Clinical Psychiatry (1980); 41(12 Pt 2): 21-24.

Hanaway. "Lysergic acid diethylamine: Effects on the developing mouse lens", Science (1969); 164: 574-575. doi: 10.1126/science. 164.3879.574.

Hancock et al., "Characteristics and significance of the amorphous state in pharmaceutical systems", Journal of Pharmaceutical Sciences (Jan. 1997); 86(1): 1-12.

Hartford et al., "Duloxetine as an SNRI treatment for generalized anxiety disorder: results from a placebo and active-controlled trial", International Clinical Psychopharmacology (2007); 22(3): 167-174. doi: 10.1097/YIC.0b013e32807fb1b2.

Hashimoto et al., "Actions of D-lysergic acid diethylamide (LSD) and its derivatives on 5-hydroxytryptamine receptors in the isolated uterine smooth muscle of the rat", European Journal of Pharmacology (1977); 45(4): 341-348. doi: 10.1016/0014-2999(77)90273-4.

Hashimoto et al., "Effect of CYP2C polymorphisms on the pharmacokinetics of phenytoin in Japanese patients with epilepsy", Biological and Pharmaceutical Bulletin (1996); 19(8): 1103-1105. doi: 10.1248/bpb.19.1103.

Hasler et al., "Acute psychological and physiological effects of psilocybin in healthy humans: a double-blind, placebo-controlled dose-effect study", Psychopharmacology (2004); 172: 145-156. doi: 10.1007/s00213-003-1640-6. Epub Nov. 13, 2003.

He et al., "Catalytic asymmetric difunctionalization of stable tertiary enamides with salicylaldehydes: highly efficient, enantioselective, and diastereoselective synthesis of diverse 4-chromanol derivatives", Organic Letters (2014); 16(22): 5972-5975. doi: 10.1021/015029964. Epub Oct. 30, 2014.

Herdman et al., "Development and preliminary testing of the new five-level version of EQ-5D (EQ-5D-5L)", Quality of Life Research (2011); 20(10): 1727-1736. doi: 10.1007/s11136-011-9903-x. Epub Apr. 9, 2011.

Hicks et al., "Clinical Pharmacogenetics Implementation Consortium (CPIC) guideline for CYP2D6 and CYP2C19 genotypes and dosing of selective serotonin reuptake inhibitors", Clinical Pharmacology & Therapeutics (2015); 98: 127-134. doi: 10.1002/cpt.147. Epub Jun. 29, 2015.

Hicks et al., "Clinical Pharmacogenetics Implementation Consortium guideline for CYP2D6 and CYP2C19 genotypes and dosing of tricyclic antidepressants", Clinical Pharmacology & Therapeutics (2013); 93(5): 402-408. doi: 10.1038/clpt.2013.2. Epub Jan. 16, 2013.

Hidalgo et al., "An effect-size analysis of pharmacologic treatments for generalized anxiety disorder", Journal of Psychopharmacology (2007); 21(8): 864-872. doi: 10.1177/0269881107076996.

Hintzen. "The pharmacology of LSD: a critical review", Oxford University Press: Oxford (2010); pp. 258-259. Abstract Only.

Hirst et al., "Differences in the central nervous system distribution and pharmacology of the mouse 5-hydroxytryptamine-6 receptor compared with rat and human receptors investigated by radioligand binding, site-directed mutagenesis, and molecular modeling", Molecular Pharmacology (2003); 64(6): 1295-1308. doi: 10.1124/mol.64. 6.1295.

Hoehn et al., "Experimental evaluation of the generalized vibrational theory of G protein-coupled receptor activation", Proceedings of the National Academy of Sciences (2017); 114(22): 5595-5600. doi: 10.1073/pnas.1618422114. Epub May 12, 2017.

(56) References Cited

OTHER PUBLICATIONS

Hoff et al., "Allgemeine Gesichtspunkte zur Pharmakopsychiatrie", In: Bradley PB, ed., Neuro-Psychopharmacology, Amsterdam, Elsevier (1959); pp. 61-70, 91, and 326-327; 46 pages with English translation.

Hoffer. "D-Lysergic acid diethylamide (LSD): A review of its present status", Clinical Pharmacology & Therapeutics (1965); 6: 183-255. doi: 10.1002/cpt196562183.

Hoffmann et al., "Synthesis and LSD-like discriminative stimulus properties in a series of N (6)-alkyl norlysergic acid N, N-diethylamide derivatives", Journal of Medicinal Chemistry (1985); 28(9): 1252-1255. doi: 10.1021/jm00147a022.

Hoffmann. "Synthesis and pharmacological evaluation of N (6)-alkyl norlysergic acid N, N-diethylamide derivatives", A Thesis submitted to the Faculty of Purdue University, In partial fulfillment of the Requirements for the Degree of Doctor of Philosophy (Aug. 1987); 24 pages.

Hofmann. "How LSD originated", Journal of Psychedelic Drugs (1979); 11(1-2): 53-60. doi: 10.1080/02791072.1979.10472092.

Holze. "Distinct acute effects of LSD, MDMA, and D-amphetamine in healthy subjects", Neuropsychopharmacology (2020); 45(3): 462-471. doi: 10.1038/s41386-019-0569-3. Epub Nov. 16, 2019.

Holze et al., "Safety pharmacology of acute LSD administration in healthy subjects", Psychopharmacology (2022): 1893-1905. doi: 10.1007/s00213-021-05978-6. Epub Sep. 13, 2021. Erratum in: Psychopharmacology (Berl). Feb. 2022;239(2):661. doi: 10.1007/s00213-021-05988-4.

Holze et al., "Direct comparison of the acute effects of lysergic acid diethylamide and psilocybin in a double-blind placebo-controlled study in healthy subjects", Neuropsychopharmacology (2022); 47(6): 1180-1187. doi: 10.1038/s41386-022-01297-2. Epub Feb. 25, 2022.

Holze, F., et al., "Acute dose-dependent effects of lysergic acid diethylamide in a double-blind placebo-controlled study in healthy subjects", Neuropsychopharmacology (2021); 46(3): 537-544. doi: 10.1038/s41386-020-00883-6. Epub Oct. 15, 2020.

Holze, F., et al., "Lysergic acid diethylamide-assisted therapy in patients with anxiety with and without a life-threatening illness: A randomized, double-blind, placebo-controlled phase II study", Biological Psychiatry (2023); 93(3): 215-223. doi: 10.1016/j.biopsych.2022.08.025. Epub Sep. 5, 2022.

Holze, F., et al., "Pharmacokinetics and subjective effects of a novel oral LSD formulation in healthy subjects", British Journal of Clinical Pharmacology (2019); 85(7): 1474-1483. doi: 10.1111/bcp.13918. Epub Apr. 29, 2019.

Holze et al., "Pharmacokinetics and Pharmacodynamics of Lysergic Acid Diethylamide Microdoses in Healthy Participants." Clinical Pharmacology & Therapeutics (Mar. 2021); 109(3): 658-666. doi: 10.1002/cpt.2057. Epub Oct. 18, 2020.

Houston et al., "Evaluation of genetic models for response in a randomized clinical trial of duloxetine in major depressive disorder", Psychiatry Research (2012); 200(1): 63-65. doi: 10.1016/j.psychres.2012.06.002. Epub Jun. 22, 2012.

Hu et al., "Synthesis and functional characterization of substituted isoquinolinones as MT2-selective melatoninergic ligands", Plos One (2014); 9(12): e113638; 26 pages. doi: 10.1371/journal.pone.0113638.

Huang et al., "Drug discrimination and receptor binding studies of N-isopropyl lysergamide derivatives", Pharmacology Biochemistry and Behavior (1994); 47(3): 667-673. doi: 10.1016/0091-3057(94)90172-4.

Huang et al., "Human 5-HT1A receptor C (- 1019) G polymorphism and psychopathology", International Journal of Neuropsychopharmacology (2004); 7(4): 441-451. doi: 10.1017/S1461145704004663. Epub Oct. 7, 2004.

Hutten et al., "Self-rated effectiveness of microdosing with psychedelics for mental and physical health problems among microdosers", Frontiers in Psychiatry (2019); 10: 672; 9 pages. doi: 10.3389/fpsyt.2019.00672.

Hutten et al., "Motives and side-effects of microdosing with psychedelics among users", International Journal of Neuropsychopharmacology (2019); 22(7): 426-434. doi: 10.1093/ijnp/pyz029.

Hutten et al., "P. 323 Cognitive and subjective effects of different low 'micro'doses of LSD in a placebo-controlled study", European Neuropsychopharmacology (2020); 31(S1): S63-S64.

Hutten et al., "Low doses of LSD acutely increase BDNF blood plasma levels in healthy volunteers", ACS Pharmacology & Transitional Science Journal (2021); 4(2): 461-466. doi: 10.1021/acsptsci.0c00099.

Hutten et al., "Mood and cognition after administration of low LSD doses in healthy volunteers: A placebo controlled dose-effect finding study", European Neuropsychopharmacology (Oct. 2020); 41: 81-91. doi: 10.1016/j.euroneuro.2020.10.002. Epub Oct. 17, 2020.

Hysek et al., "Duloxetine inhibits effects of MDMA ("ecstasy") in vitro and in humans in a randomized placebo-controlled laboratory study", PloS One (2012); 7(5): e36476; 15 pages. doi: 10.1371/journal.pone.0036476. Epub May 4, 2012.

Hysek et al., "Effects of a B-blocker on the cardiovascular response to MDMA (ecstasy)", Emergency Medicine Journal (2010); 27(8): 586-589. doi: 10.1136/emj.2009.079905. Epub Apr. 8, 2010.

Hysek et al., "MDMA enhances emotional empathy and prosocial behavior", Social Cognitive and Affective Neuroscience (2014); 9(11): 1645-1652. doi: 10.1093/scan/nst161. Epub Oct. 4, 2013.

Ichikawa et al., "The effect of serotonin1A receptor agonism on antipsychotic drug-induced dopamine release in rat striatum and nucleus accumbens", Brain Research (2000); 858(2): 252-263. doi: 10.1016/s0006-8993(99)02346-x.

Idanpaan-Heikkila et al., "14C-lysergide in early pregnancy", The Lancet (Jul. 26, 1969); 294(7613): 221; 1 page. doi: 10.1016/s0140-6736(69)91466-4.

Idanpaan-Heikkila et al., "Total body kinetics and placental transfer of labeled LSD in mice", Drug Dependence, Austin & London (1970); pp. 55-66; 13 pages.

Inoue et al., "Effects of inducers and/or inhibitors on metabolism of lysergic acid diethylamide in rat liver microsomes", Xenobiotica (Dec. 1980); 10(12): 913-920. doi: 10.3109/00498258009033825.

Inoue et al., "Enzymic formation of dehydrogenated and hydroxylated metabolites from lysergic acid diethylamide by rat liver microsomes", Xenobiotica (May 1980); 10(5): 343-348. doi: 10.3109/00498258009033766.

International Preliminary Report on Patentability for International Application No. PCT/IB2022/051350, by Universitatsspital Basel, mailed Aug. 31, 2023, 10 pages.

International Preliminary Report on Patentability for International Application No. PCT/IB2022/051857, by Universitatsspital Basel, mailed Sep. 21, 2023, 8 pages.

International Preliminary Report on Patentability for International Application No. PCT/US2021/014721, by Universitatsspital Basel, mailed Sep. 9, 2022, 8 pages.

International Preliminary Report on Patentability for International Application No. PCT/US2021/026426, by Universitatsspital Basel, mailed Oct. 27, 2022, 10 pages.

International Preliminary Report on Patentability for International Application No. PCT/US2022/026274, by Mind Medicine, Inc., mailed Nov. 9, 2023, 11 pages.

International Preliminary Report on Patentability for International Application No. PCT/US2022/040636, by Mind Medicine, Inc., mailed on Feb. 29, 2024, 8 pages.

International Preliminary Report on Patentability for International Application No. PCT/US2022/040653 mailed Feb. 29, 2024, 9 pages.

International Preliminary Report on Patentability for International Application No. PCT/US2023/068668, by Mind Medicine, Inc., mailed Jan. 2, 2025, 10 pages.

International Search Report and Written Opinion for International Application No. PCT/IB2022/051350, by Universitatsspital Basel, mailed May 13, 2022, 15 pages.

International Search Report and Written Opinion for International Application No. PCT/IB2022/051857, by Universitatsspital Basel, mailed May 23, 2022, 11 pages.

(56) References Cited

OTHER PUBLICATIONS

International Search Report and Written Opinion for International Application No. PCT/US2021/014721, by Universitatsspital Basel, mailed Apr. 16, 2021, 10 pages.
International Search Report and Written Opinion for International Application No. PCT/US2022/026274, by Mind Medicine, Inc., mailed Sep. 6, 2022, 14 pages.
International Search Report and Written Opinion for International Application No. PCT/US2022/040636, by Mind Medicine, Inc., mailed on Dec. 29, 2022, 10 pages.
International Search Report and Written Opinion for International Application No. PCT/US2022/040653, by Mind Medicine, Inc., mailed Dec. 19, 2022, 12 pages.
International Search Report and Written Opinion for International Application No. PCT/US2023/068668, by Mind Medicine, Inc., mailed Nov. 3, 2023, 11 pages.
International Search Report and Written Opinion for International Application No. PCT/US2024/059413, by Mind Medicine, Inc., mailed Jan. 16, 2025, 11 pages.
International Search Report and Written Opinion for PCT Application No. PCT/US2021/026426, by Universitatsspital Basel, mailed Sep. 9, 2021, 14 pages.
Invitation to Pay Additional fees for International Application No. PCT/US2022/040636, by Mind Medicine, Inc., mailed Oct. 18, 2022, 2 pages.
Invitation to Pay Additional fees for International Application No. PCT/US2022/040653, by Mind Medicine, Inc., mailed Oct. 18, 2022, 2 pages.
Irwin et al., "Chromosomal abnormalities in leukocytes from LSD-25 users", Science (1967); 157(3786): 313-314.
Isbell. "Comparison of the reactions induced by psilocybin and LSD-25 in man", Psychopharmacologia (1959); 1: 29-38. doi: 10.1007/BF00408109.
Isbell et al., "Studies on lysergic acid diethylamide (LSD-25): 1. Effects in former morphine addicts and development of tolerance during chronic intoxication", AMA Archives of Neurology & Psychiatry (1956); 76(5): 468-478.
Ishii et al., "Studies of lysergic acid diethylamide and related compounds. Part 8. Structural identification of new metabolites of lysergic acid diethylamide obtained by microbial transformation using Streptomyces roseochromogenes", Journal of the Chemical Society, Perkin Transactions 1 (1980); 4: 902-905.
Ishii et al., "Studies on lysergic acid diethylamide and related compounds. IX. Microbial transformation of amides related to lysergic acid diethylamide by Streptomyces roseochromogenes", Chemical and Pharmaceutical Bulletin (1979); 27(12): 3029-3038. doi.org/10.1248/cpb.27.3029.
Ishii et al., "Studies on lysergic acid diethylamide and related compounds. VII. Microbial transformation of lysergic acid diethylamide and related compounds", Chemical and Pharmaceutical Bulletin (1979); 27(7): 1570-1575. doi: 10.1248/cpb.27.1570.
Issakidis et al., "Pretreatment attrition and dropout in an outpatient clinic for anxiety disorders", Acta Psychiatrica Scandinavica (2004); 109(6): 426-433. doi: 10.1111/j.1600-0047.2004.00264.x.
Jagiello et al., "Mouse germ cells and LSD-25", Cytogenics (1969); 8: 136-147. doi: 10.1159/000130030.
Janga et al., "Photostability Issues in Pharmaceutical Dosage Forms and Photostabilization", AAPS PharmSciTech (2018); 19(1): 48-59. doi: 10.1208/s12249- 017-0869-z. Epub Sep. 13, 2017.
Janke. "Die Eigenschaftsworterliste", Hogrefe: Gottingen, Section A (1978); pp. 9-18; 24 pages with English machine translation.
Johansen et al., "Psychedelics not linked to mental health problems or suicidal behavior: a population study", Journal of Psychopharmacology (2015); 29(3): 270-279. doi: 10.1177/0269881114568039. Epub Mar. 5, 2015.
Johns Hopkins University, "Persisting Effects of Psilocybin" ClinicalTrials.gov ID NCT02971605 (2019) [online] https://classic.clinicaltrials.gov/ct2/show/NCT02971605?term=psilocybin&recrs=e&phase=1&draw=2&rank=13 (Retrieved from Sep. 10, 2019); 5 pages.
Johnson et al., "Emetic activity of reduced lysergamides", Journal of Medicinal Chemistry (1973); 16(5): 532-537. doi: 10.1021/jm00263a028.
Johnson et al., "Human hallucinogen research: guidelines for safety", Journal of Psychopharmacology (2008); 22(6): 603-620. doi: 10.1177/0269881108093587. Epub Jul. 1, 2008.
Johnson et al., "Potential therapeutic effects of psilocybin", Neurotherapeutics (2017); 14: 734-740. doi: 10.1007/s13311-017-0542-y.
Johnson et al., "Psilocybin dose-dependently causes delayed, transient headaches in healthy volunteers", Drug and Alcohol Dependence (2012); 123(1-3): 132-140. doi: 10.1016/j.drugalcdep.2011.10.029. Epub Nov. 29, 2011.
Johnson et al., "Long-term follow-up of psilocybin-facilitated smoking cessation", The American Journal of Drug and Alcohol Abuse (2017); 43(1): 55-60. doi: 10.3109/00952990.2016.1170135. Epub Jul. 21, 2016. Erratum in: Am J Drug Alcohol Abuse. Jan. 2017;43(1):127. doi: 10.1080/00952990.2016.1277105.
Johnson et al., "Pilot study of the 5-HT2AR agonist psilocybin in the treatment of tobacco addiction", Journal of Psychopharmacology (2014); 28(11): 983-992. doi: 10.1177/0269881114548296. Epub Sep. 11, 2014.
Johnston et al., "Monitoring the future, national survey results on drug use, 1975-2015: vol. 2. College students and adults ages 19-55", Ann Arbor: Institute for Social Research, The University of Michigan (2016) [online] http://monitoringthefuture.org/pubs.html#monographs (Access Date: Nov. 1, 2021); 453 pages.
Judd et al., "A prospective 12-year study of subsyndromal and syndromal depressive symptoms in unipolar major depressive disorders", Archives of General Psychiatry (Aug. 1998); 55: 694-700. doi: 10.1001/archpsyc.55.8.694.
Kaelen et al., "LSD modulates music-induced imagery via changes in parahippocampal connectivity", European Neuropsychopharmacology (2016); 26: 1099-1109. doi: 10.1016/j.euroneuro.2016.03.018. Epub Apr. 12, 2016.
Kaelen et al., "LSD enhances emotional response to music", Psychopharmacology (Aug. 2015); 232(19): 3607-3614. doi: 10.1007/s00213-015-4014-y. Epub Aug. 11, 2015.
Karege et al., "Decreased serum brain-derived neurotrophic factor levels in major depressed patients", Psychiatry research (2002); 109(2): 143-148. doi: 10.1016/s0165-1781(02)00005-7.
Kargbo. "Current Trends in Psychedelic Science: Integrating Modified Lysergic Acid Derivatives and Psilocybin in Modern Medicine", ACS Medicinal Chemistry Letters (2024); 15(9): 1443-1445. doi: 10.1021/acsmedchemlett.4c00414.
Kariuki-Nyuthe et al., "Anxiety and Related Disorders and Physical Illness", In: Sartorius N, Holt RIG, Maj M (eds): Comorbidity of Mental and Physical Disorders, Key Issues Ment Health, Basel, Karger (2015); 179: 81-87.
Karst et al., "The non-hallucinogen 2-bromo-lysergic acid diethylamide as preventative treatment for cluster headache: an open, non-randomized case series", Cephalalgia (2010); 30(9): 1140-1144. doi: 10.1177/0333102410363490. Epub Mar. 26, 2010.
Kast et al., "Study of lysergic acid diethylamide as an analgesic agent", Anesthesia & Analgesia (1964); 43(3): 285-291.
Kast. "LSD and the dying patient", The Chicago Medical School Quarterly (1966); 26(2): 80-87.
Kato et al., "LSD-25 and genetic damage", Diseases of the Nervous System (1969); 30: 42-46.
Kavan et al., "Generalized anxiety disorder: Practical assessment and management", American Family Physician (May 1, 2009); 79(9): 785-791.
Kessler et al., "Lifetime prevalence and age-of-onset distributions of DSM-IV disorders in the National Comorbidity Survey Replication", Archives of General Psychiatry (Jun. 2005); 62(6): 593-602. doi: 10.1001/archpsyc.62.6.593.
Kessler et al., "Prevalence, severity, and comorbidity of 12-month DSM-IV disorders in the National Comorbidity Survey Replication", Archives of General Psychiatry (2005); 62: 617-627. doi: 10.1001/archpsyc.62.6.617.
Kessler et al., "The epidemiology of generalized anxiety disorder", Psychiatric Clinics of North America (2001); 24(1): 19-39. doi: 10.1016/s0193-953x(05)70204-5.

(56) References Cited

OTHER PUBLICATIONS

Kühner et al., "Reliability and validity of the Revised Beck Depression Inventory (BDI-II) results from German samples", Der Nervenarzt (2007); 78: 651-656; 12 pages with English machine translation. doi: 10.1007/s00115-006-2098-7.

Kirchheiner et al., "CYP2D6 and CYP2C19 genotype-based dose recommendations for antidepressants: a first step towards subpopulation-specific dosages", Acta Psychiatrica Scandinavica (Sep. 2001); 104(3): 173-192. doi: 10.1034/j.1600-0447.2001.00299.x.

Klette et al., "Metabolism of Lysergic Acid Diethylamide (LSD) to 2-Oxo-3-Hydroxy Lsd (O-H-LSD) in Human Liver Microsomes and Cryopreserved Human Hepatocytes", Journal of Analytical Toxicology (2000); 24(7): 550-556. doi: 10.1093/jat/24.7.550.

Klock et al., "Coma, hyperthermia and bleeding associated with massive LSD overdose. A report of eight cases", The Western Journal of Medicine (1974); 120(3): 183-188.

Koch. "Swallowing Disorders", Diagnosis and therapy, Medical Clinics of North America (May 1993); 77(3): 571-582. doi: 10.1016/s0025-7125(16)30240-1.

Koelle. "The pharmacology of mescaline and D-lysergic acid diethylamide (LSD)", New England Journal of Medicine (1958); 258(1): 25-32. doi: 10.1056/NEJM195801022580106.

Kojima. "Aiming to improve the efficiency of product form selection in drug development", Journal of Pharmaceutical Science and Technology (Sep. 2008); 68(5): 344-349; 18 pages with English Translation.

Kometer et al., "Psilocybin biases facial recognition, goal-directed behavior, and mood state toward positive relative to negative emotions through different serotonergic subreceptors", Biological Psychiatry (2012); 72(11): 898-906. doi: 10.1016/j.biopsych.2012.04.005. Epub May 10, 2012.

Kraehenmann et al., "Dreamlike effects of LSD on waking imagery in humans depend on serotonin 2A receptor activation", Psychopharmacology (Berl) (2017); 234: 2031-2046. doi: 10.1007/s00213-017-4610-0. Epub Apr. 7, 2017.

Kraehenmann et al., "Psilocybin-induced decrease in amygdala reactivity correlates with enhanced positive mood in healthy volunteers", Biological Psychiatry (2015); 78(8): 572-581. doi: 10.1016/j.biopsych.2014.04.010. Epub Apr. 26, 2014.

Kraehenmann et al., "LSD Increases Primary Process Thinking via Serotonin 2A Receptor Activation", Frontiers in Pharmacology (2017); 8: 814; 9 pages. doi: 10.3389/fphar.2017.00814.

Krall et al., "Marked decrease of LSD-induced stimulus control in serotonin transporter knockout mice", Pharmacology Biochemistry and Behavior (2008); 88: 349-357. doi: 10.1016/j.pbb.2007.09.006. Epub Sep. 14, 2007.

Krebs et al., "Over 30 million psychedelic users in the United States", F1000 Research (2013); 2: 98; 5 pages. doi: 10.12688/f1000research.2-98.v1.

Krebs et al., "Psychedelics and mental health: a population study", PLoS One (2013); 8(8): e63972; 9 pages. doi: 10.1371/journal.pone.0063972.

Krebs et al., "Lysergic acid diethylamide (LSD) for alcoholism: meta-analysis of randomized controlled trials", Journal of Psychopharmacology (2012); 26(7): 994-1002. doi: 10.1177/0269881112439253. Epub Mar. 8, 2012.

Krebs-Thomson et al., "Effects of hallucinogens on locomotor investigatory activity and patterns: Influence of 5-HT2A and 5-HT2C receptors," Neuropsychopharmacology (1998); 18(5): 339-351. doi: 10.1016/S0893-133X(97)00164-4.

Kristensen. "LSD treatment combined with parenteral Ritalin therapy." Nord Psykiatr Tidsskr (1962); 16: 111-116; 14 pages with English machine translation.

Krus et al., "Inhibitory effects of steroids on LSD-25 action in man", Life Science (1967); 6: 691-701. doi: 10.1016/0024-3205(67)90124-5.

Krus et al., "The influence of progesterone on behavioral changes induced by lysergic acid diethylamide (LSD-25) in normal males", Psychopharmacologia (1961); 2: 177-184. doi: 10.1007/BF00407977.

Kulyashova et al., "Convenient modular construction of medicinally important 5-acylamino-4, 5-dihydroisoxazoles featuring four elements of diversity", Tetrahedron Letters (2016); 57(39): 4395-4397.

Kupferschmidt. "High hopes", Science (Jul. 4, 2014); 345(6192): 18-23. doi: 10.1126/science.345.6192.18.

Kurland et al., "Psychedelic therapy utilizing LSD in the treatment of the alcoholic patient: a preliminary report", American Journal of Psychiatry (1967); 123(10): 1202-1209. doi: 10.1176/ajp.123.10.1202.

Kuypers et al., "Microdosing psychedelics: More questions than answers? An overview and suggestions for future research", Journal of Psychopharmacology (2019); 33(9): 1039-1057. doi: 10.1177/0269881119857204. Epub Jul. 14, 2019.

Kyzar et al., "Effects of LSD on grooming behavior in serotonin transporter heterozygous (Sert+/−) mice", Behavioural Brain Research (2016); 296: 47-52. doi: 10.1016/j.bbr.2015.08.018. Epub Sep. 2015.

Laakmann et al., "Buspirone and lorazepam in the treatment of generalized anxiety disorder in outpatients", Psychopharmacology (1998); 136: 357-366. doi: 10.1007/s002130050578.

Lambe et al., "Hallucinogen-induced UP states in the brain slice of rat prefrontal cortex: role of glutamate spillover and NR2B-NMDA receptors", Neuropsychopharmacology (2006); 31: 1682-1689. doi: 10.1038/sj.npp.1300944. Epub Nov. 2, 2005.

Lanz et al., "Distribution of lysergic acid diethylamide in the organism", Helvetica Physiologica et Pharmacologica Acta (1955); 13(3): 207-216; 10 pages with English summary.

Lea et al., "Microdosing psychedelics: Motivations, subjective effects and harm reduction", International Journal of Drug Policy (2020); 75: 102600; 9 pages. doi: 10.1016/j.drugpo.2019.11.008. Epub Nov. 25, 2019.

Lea et al., "Perceived outcomes of psychedelic microdosing as self-managed therapies for mental and substance use disorders", Psychopharmacology (2020); 237: 1521-1532. doi: 10.1007/s00213-020-05477-0. Epub Feb. 11, 2020.

Lebedev et al., "LSD-induced entropic brain activity predicts subsequent personality change", Human Brain Mapping (2016); 37: 3203-3213. doi: 10.1002/hbm.23234. Epub May 6, 2016.

Lenze et al., "Efficacy and tolerability of citalopram in the treatment of late-life anxiety disorders: Results from an 8-week randomized, placebo-controlled trial", American Journal of Psychiatry (Jan. 2005); 162(1): 146-150. doi: 10.1176/appi.ajp.162.1.146.

Leonard et al., "Does getting high hurt? Characterization of cases of LSD and psilocybin-containing mushroom exposures to national poison centers between 2000 and 2016", Journal of Psychopharmacology (Dec. 2018); 32(12): 1286-1294. doi: 10.1177/0269881118793086. Epub Sep. 5, 2018.

Leuner. "Basic functions involved in psychotherapeutic effects of psychotomimetics", In J. M. Shlien (Ed.), Research in Psychotherapy, American Psychological Association, Washington (1968); 466-470. doi.org/10.1037/10546-022.

Leuner. "State of development of guided affective imagery", Zeitschrift fur Psychotherapie und medizinische Psychologie (1969); 19(5): 177-187; 22 pages with English machine translation.

Levy. "Diazepam for L.S.D. intoxication", Lancet (1971); 1: 1297; 1 page. doi: 10.1016/s0140-6736(71)91810-1.

Libanio et al., "Metabolism of lysergic acid diethylamide (LSD): an update", Drug Metabolism Reviews (2019); 51(3): 378-387. doi: 10.1080/03602532.2019.1638931. Epub Jul. 16, 2019.

Liechti. "Alterations of consciousness and mystical-type experiences after acute LSD in humans", Psychopharmacology (2017); 234: 1499-1510. doi: 10.1007/s00213-016-4453-0. Epub Oct. 7, 2016.

Liechti et al., "Gender differences in the subjective effects of MDMA", Psychopharmacology (2001); 154: 161-168. doi: 10.1007/s002130000648.

Liechti. "Modern clinical research on LSD", Neuropsychopharmacology (2017); 42(11): 2114-2127. doi: 10.1038/npp.2017.86. Epub Apr. 27, 2017.

Liester. "A review of lysergic acid diethylamide (LSD) in the treatment of addictions: historical perspectives and future pros-

(56) References Cited

OTHER PUBLICATIONS pects", Current Drug Abuse Reviews (2014); 7(3): 146-156. doi: 10.2174/1874473708666150107120522.

Llorca et al., "Efficacy and safety of hydroxyzine in the treatment of generalized anxiety disorder: A 3-month double-blind study", Journal of Clinical Psychiatry (2002); 63(11): 1020-1027. doi: 10.4088/jcp.v63n1112.

Long. "Does LSD induce chromosomal damage and malformations? A review of the literature", Teratology (1972); 6(1): 75-90. doi: 10.1002/tera.1420060110.

Lopresti et al., "Curcumin for the treatment of major depression: a randomised, double-blind, placebo controlled study", Journal of Affective Disorders (2014); 167: 368-375. doi: 10.1016/j.jad.2014.06.001. Epub Jun. 11, 2014.

Ludwig et al., "A clinical study of LSD treatment in alcoholism", American Journal of Psychiatry (1969); 126(1): 59-69. doi: 10.1176/ajp.126.1.59.

Luethi et al., "Cytochrome P450 enzymes contribute to the metabolism of LSD to nor-LSD and 2-oxo-3-hydroxy-LSD: Implications for clinical LSD use", Biochemical Pharmacology (2019); 164: 129-138. doi: 10.1016/j.bcp.2019.04.013. Epub Apr. 11, 2019.

Luethi et al., "Monoamine transporter and receptor interaction profiles in vitro predict reported human doses of novel psychoactive stimulants and psychedelics", International Journal of Neuropsychopharmacology (2018); 21(10): 926-931. doi: 10.1093/ijnp/pyy047.

Ly. "Psychedelics promote structural and functional neural plasticity", Cell Reports (2018); 23(11): 3170-3182. doi: 10.1016/j.celrep.2018.05.022.

Maastricht University, "LSD microdosing" NTR-new: NL6907, NTR-old: NTR7102, (Jan. 5, 2018), 5 pages.

MacKenzie et al., "Chromosomal abnormalities in human leukocytes exposed to LSD in culture", Mammalian Chromosome Newsletter (1968); 9: 212-213.

MacLean et al., "Factor analysis of the mystical experience questionnaire: A study of experiences occasioned by the hallucinogen psilocybin", Journal for the Scientific Study of Religion (2012); 51(4): 721-737. doi: 10.1111/j.1468-5906.2012.01685.x.

MacLean et al., "Mystical experiences occasioned by the hallucinogen psilocybin lead to increases in the personality domain of openness", Journal of Psychopharmacology (2011); 25(11): 1453-1461. doi: 10.1177/0269881111420188. Epub Sep. 28, 2011.

Madsen et al., "Correction: Psychedelic effects of psilocybin correlate with serotonin 2A receptor occupancy and plasma psilocin levels", Neuropsychopharmacology (2019); 44(7): 1328-1334. doi: 10.1038/s41386-019- 0324-9. Epub Jan. 26, 2019. Erratum in: Neuropsychopharmacology. Jun. 2019;44(7):1336-1337. doi: 10.1038/s41386-019-0360-5.

Magano. "Large-scale amidations in process chemistry: practical considerations for reagent selection and reaction execution", Organic Process Research & Development (2022); 26(6): 1562-1689.

Maier et al., "The Hamilton Anxiety Scale: Reliability, validity and sensitivity to change in anxiety and depressive disorders", Journal of Affective Disorders (1988); 14: 61-68. doi: 10.1016/0165-0327(88)90072-9.

Malhi et al., "Depression", Lancet. Seminar (Nov. 24, 2018); 392(10161): 2299-2312. doi: 10.1016/S0140-6736(18)31948-2. Epub Nov. 2, 2018.

Mangini. "Treatment of alcoholism using psychedelic drugs: a review of the program of research", Journal of Psychoactive Drugs (1998); 30(4): 381-418. doi: 10.1080/02791072.1998.10399714.

Marek et al., "LSD and the phenethylamine hallucinogen DOI are potent partial agonists at 5-HT2A receptors on interneurons in rat piriform cortex", Journal of Pharmacology and Experimental Therapeutics (1996); 278: 1373-1382.

Marona-Lewicka et al., "An animal model of schizophrenia based on chronic LSD administration: Old idea, new results", Neuropharmacology (2011); 61: 503-512. doi: 10.1016/j.neuropharm.2011.02.006. Epub Feb. 23, 2011.

Marona-Lewicka et al., "Complex stimulus properties of LSD: a drug discrimination study with α2-adrenoceptor agonists and antagonists", Psychopharmacology (1995); 120(4): 384-391. doi: 10.1007/BF02245809.

Marona-Lewicka, et al., "Distinct temporal phases in the behavioral pharmacology of LSD: dopamine D 2 receptor-mediated effects in the rat and implications for psychosis", Psychopharmacology (2005); 180: 427-435. doi: 10.1007/s00213-005-2183-9. Epub Feb. 19, 2005.

Marona-Lewicka et al., "Dopamine D4 receptor involvement in the discriminative stimulus effects in rats of LSD, but not the phenethylamine hallucinogen DOI", Psychopharmacology (2009); 203: 265-277. doi: 10.1007/s00213-008-1238-0. Epub Jul. 6, 2008.

Marona-Lewicka et al., "Further evidence that the delayed temporal dopaminergic effects of LSD are mediated by a mechanism different than the first temporal phase of action", Pharmacology, Biochemistry and Behavior (2007); 87(4): 453-461. doi: 10.1016/j.pbb.2007.06.001. Epub Jun. 14, 2007.

Martin et al., "Chronic LSD alters gene expression profiles in the mPFC relevant to schizophrenia", Neuropharmacology (2014); 83: 1-8. doi: 10.1016/j.neuropharm.2014.03.013. Epub Apr. 3, 2014.

Martin et al., "The effects of hallucinogens on gene expression", Current Topics in Behavioral Neurosciences (2017); 36: 137-158. doi: 10.1007/7854_2017_479.

McCamley et al., "Efficient N-demethylation of opiate alkaloids using a modified nonclassical Polonovski reaction", The Journal of Organic Chemistry (2003); 68(25): 9847-9850. doi: 10.1021/jo035243z.

McGahuey et al., "The Arizona Sexual Experience Scale (ASEX): reliability and validity", Journal of Sex and Marital Therapy (2000); 26(1): 25-40. doi: 10.1080/009262300278623.

Meehan et al., "LSD produces conditioned place preference in male but not female Fawn Hooded rats", Pharmacology Biochemistry and Behavior (1998); 59(1): 105-108. doi: 10.1016/s0091-3057(97)00391-2.

Meert et al., "Risperidone (R 64 766), a potent and complete LSD antagonist in drug discrimination by rats", Psychopharmacology (1989); 97(2): 206-212. doi: 10.1007/BF00442251.

Meiresonne et al., "Synthesis of 2-Fluoro-1, 4-benzoxazines and 2-Fluoro-1, 4-benzoxazepin-5-ones by Exploring the Nucleophilic Vinylic Substitution (SNV) Reaction of gem-Difluoroenamides", The Journal of Organic Chemistry (2015); 80(10): 5111-5124. doi: 10.1021/acs.joc.5b00507. Epub May 6, 2015.

Meuzelaar et al., "Synthesis of γ-Unsaturated Enamides by N-Acylation of Imines Derived from γ-Unsaturated Amines", Liebigs Annalen Recueil (1997); 1997(6): 1159-1163.

Milburn et al., "Characterization of [3H]Quipazine Binding to 5 Hydroxytryptamine3 Receptors in Rat Brain Membranes", Journal of Neurochemistry (1989); 52(6): 1787-1792.

Miller et al., "Primate trace amine receptor 1 modulation by the dopamine transporter", Journal of Pharmacology and Experimental Therapeutics (2005); 313(3): 983-994. doi: 10.1124/jpet.105.084459. Epub Mar. 11, 2005.

Mimura et al., "Trifluoroacetaldehyde: a useful industrial bulk material for the synthesis of trifluoromethylated amino compounds", Journal of Fluorine Chemistry (2010); 131(4): 477-486.

Mind Medicine, Inc., "A Dose-Finding Study of MM-120 (LSD D-Tartrate) for the Treatment of Anxiety Symptoms" ClinicalTrials.gov ID NCT05407064, version 1, Jun. 1, 2022, 12 pages.

Mind Medicine, Inc., "A Dose-Finding Study of MM-120 (LSD D-Tartrate) for the Treatment of Anxiety Symptoms" ClinicalTrials.gov ID NCT05407064, version 10, Nov. 15, 2022, 15 pages.

Mind Medicine, Inc., "A Dose-Finding Study of MM-120 (LSD D-Tartrate) for the Treatment of Anxiety Symptoms" ClinicalTrials.gov ID NCT05407064, version 11, Nov. 15, 2022, 15 pages.

Mind Medicine, Inc., "A Dose-Finding Study of MM-120 (LSD D-Tartrate) for the Treatment of Anxiety Symptoms" ClinicalTrials.gov ID NCT05407064, version 12, Nov. 17, 2022, 15 pages.

Mind Medicine, Inc., "A Dose-Finding Study of MM-120 (LSD D-Tartrate) for the Treatment of Anxiety Symptoms" ClinicalTrials.gov ID NCT05407064, version 13, Dec. 12, 2022, 16 pages.

(56) References Cited

OTHER PUBLICATIONS

Mind Medicine, Inc., "A Dose-Finding Study of MM-120 (LSD D-Tartrate) for the Treatment of Anxiety Symptoms" ClinicalTrials.gov ID NCT05407064, version 14, Jan. 20, 2023, 16 pages.
Mind Medicine, Inc., "A Dose-Finding Study of MM-120 (LSD D-Tartrate) for the Treatment of Anxiety Symptoms" ClinicalTrials.gov ID NCT05407064, version 15, Jan. 27, 2023, 16 pages.
Mind Medicine, Inc., "A Dose-Finding Study of MM-120 (LSD D-Tartrate) for the Treatment of Anxiety Symptoms" ClinicalTrials.gov ID NCT05407064, version 16, Feb. 3, 2023, 16 pages.
Mind Medicine, Inc., "A Dose-Finding Study of MM-120 (LSD D-Tartrate) for the Treatment of Anxiety Symptoms" ClinicalTrials.gov ID NCT05407064, version 17, Feb. 10, 2023, 16 pages.
Mind Medicine, Inc., "A Dose-Finding Study of MM-120 (LSD D-Tartrate) for the Treatment of Anxiety Symptoms" ClinicalTrials.gov ID NCT05407064, version 18, Mar. 15, 2023, 17 pages.
Mind Medicine, Inc., "A Dose-Finding Study of MM-120 (LSD D-Tartrate) for the Treatment of Anxiety Symptoms" ClinicalTrials.gov ID NCT05407064, version 19, Jun. 28, 2023, 17 pages.
Mind Medicine, Inc., "A Dose-Finding Study of MM-120 (LSD D-Tartrate) for the Treatment of Anxiety Symptoms" ClinicalTrials.gov ID NCT05407064, version 2, Jun. 15, 2022, 12 pages.
Mind Medicine, Inc., "A Dose-Finding Study of MM-120 (LSD D-Tartrate) for the Treatment of Anxiety Symptoms" ClinicalTrials.gov ID NCT05407064, version 20, Jul. 28, 2023, 17 pages.
Mind Medicine, Inc., "A Dose-Finding Study of MM-120 (LSD D-Tartrate) for the Treatment of Anxiety Symptoms" ClinicalTrials.gov ID NCT05407064, version 21, Oct. 1, 2023, 17 pages.
Mind Medicine, Inc., "A Dose-Finding Study of MM-120 (LSD D-Tartrate) for the Treatment of Anxiety Symptoms" ClinicalTrials.gov ID NCT05407064, version 22, Sep. 13, 2023, 13 pages.
Mind Medicine, Inc., "A Dose-Finding Study of MM-120 (LSD D-Tartrate) for the Treatment of Anxiety Symptoms" ClinicalTrials.gov ID NCT05407064, version 23, Oct. 25, 2023, 13 pages.
Mind Medicine, Inc., "A Dose-Finding Study of MM-120 (LSD D-Tartrate) for the Treatment of Anxiety Symptoms" ClinicalTrials.gov ID NCT05407064, version 24, Dec. 19, 2023, 13 pages.
Mind Medicine, Inc., "A Dose-Finding Study of MM-120 (LSD D-Tartrate) for the Treatment of Anxiety Symptoms" ClinicalTrials.gov ID NCT05407064, version 3, Aug. 4, 2022, 12 pages.
Mind Medicine, Inc., "A Dose-Finding Study of MM-120 (LSD D-Tartrate) for the Treatment of Anxiety Symptoms" ClinicalTrials.gov ID NCT05407064, version 4, Sep. 11, 2022, 13 pages.
Mind Medicine, Inc., "A Dose-Finding Study of MM-120 (LSD D-Tartrate) for the Treatment of Anxiety Symptoms" ClinicalTrials.gov ID NCT05407064, version 5, Sep. 15, 2022, 13 pages.
Mind Medicine, Inc., "A Dose-Finding Study of MM-120 (LSD D-Tartrate) for the Treatment of Anxiety Symptoms" ClinicalTrials.gov ID NCT05407064, version 6, Sep. 28, 2022, 14 pages.
Mind Medicine, Inc., "A Dose-Finding Study of MM-120 (LSD D-Tartrate) for the Treatment of Anxiety Symptoms" ClinicalTrials.gov ID NCT05407064, version 7, Oct. 21, 2022, 14 pages.
Mind Medicine, Inc., "A Dose-Finding Study of MM-120 (LSD D-Tartrate) for the Treatment of Anxiety Symptoms" ClinicalTrials.gov ID NCT05407064, version 8, Nov. 2, 2022, 15 pages.
Mind Medicine, Inc., "A Dose-Finding Study of MM-120 (LSD D-Tartrate) for the Treatment of Anxiety Symptoms" ClinicalTrials.gov ID NCT05407064, version 9, Nov. 9, 2022, 15 pages.
Mind Medicine, Inc., "A Study to Assess 18-Methoxycoronaridine (18-MC HCI) in Healthy Volunteers" ClinicalTrials.gov ID NCT04292197, version 10, Jan. 4, 2022, 11 pages.
Mind Medicine, Inc., "A Study to Assess 18-Methoxycoronaridine (18-MC HCI) in Healthy Volunteers" ClinicalTrials.gov ID NCT04292197, version 9, Oct. 3, 2021, 12 pages.
Mind Medicine, Inc., "Safety and Efficacy of Low Dose MM-120 for ADHD Proof of Concept Trial" ClinicalTrials.gov ID NCT05200936, version 1, Jan. 7, 2022, 11 pages.
Mind Medicine, Inc., "Safety and Efficacy of Low Dose MM-120 for ADHD Proof of Concept Trial" ClinicalTrials.gov ID NCT05200936, version 2, Jun. 15, 2022, 11 pages.
Mind Medicine, Inc., "Safety and Efficacy of Low Dose MM-120 for ADHD Proof of Concept Trial" ClinicalTrials.gov ID NCT05200936, version 3, Jul. 31, 2023, 11 pages.
Mind Medicine, Inc., "Safety and Efficacy of Low Dose MM-120 for ADHD Proof of Concept Trial" ClinicalTrials.gov ID NCT05200936, version 4, Oct. 24, 2023, 10 pages.
Mind Medicine, Inc., "Safety and Efficacy of Low Dose MM-120 for ADHD Proof of Concept Trial" ClinicalTrials.gov ID NCT05200936, version 5, Jan. 12, 2024, 10 pages.
Mind Medicine Inc., "MindMed Acquires Exclusive License to Eight Clinical Trials of LSD, Partners with World-Leading Psychedelic Research Laboratory at University Hospital Basel", Press Release (Apr. 1, 2020) [online] https://web.archive.org/web/20201126173949/https://mindmed.co/news/press-release/mindmed-acquires-exclusive-license-to-eight-clinical-trials-of-lsd-partners-with-world-leading-psychedelic-research-laboratory-at-university-hospital-basel/; 22 pages.
Mind Medicine, Inc., "Phase I trial: MM-120-101" May 14, 2024, 5 pages.
Mind Medicine, Inc., "Phase I trial: MM-120-102" May 17, 2024, 5 pages.
Minuzzi et al., "Interaction between LSD and dopamine D2/3 binding sites in pig brain", Synapse (2005); 56: 198-204. oi: 10.1002/syn.20141.
Moliner et al., "Psychedelics promote plasticity by directly binding to BDNF receptor TrkB", Nature Neuroscience (2023); 26(6): 1032-1041. doi: 10.1038/s41593-023-01316-5. Epub Jun. 5, 2023.
Monte et al., "Stereoselective LSD-like activity in a series of d-lysergic acid amides of (R)-and (S)-2-aminoalkanes", Journal of Medicinal Chemistry (1995); 38(6): 958-966. doi: 10.1021/jm00006a015.
Montgomery et al., "A new depression scale designed to be sensitive to change", The British Journal of Psychiatry (1979); 134: 382-389. doi: 10.1192/bjp.134.4.382.
Moravkar et al., "Application of moisture activated dry granulation (MADG) process to develop high dose immediate release (IR) formulations" Advanced Powder Technology (2017) 28:1270-1280.
Moreno et al., "Chronic treatment with LY341495 decreases 5-HT2A receptor binding and hallucinogenic effects of LSD in mice", Neuroscience Letters (2013); 536: 69-73. doi: 10.1016/j.neulet.2012.12.053. Epub Jan. 16, 2013.
Moreno et al., "Safety, tolerability, and efficacy of psilocybin in 9 patients with obsessive-compulsive disorder", Journal of Clinical Psychiatry (Nov. 2006); 67(11): 1735-1740. doi: 10.4088/jcp.v67n1110.
Mueller et al., "Acute effects of LSD on amygdala activity during processing of fearful stimuli in healthy subjects", Translational Psychiatry (2017); 7: e1084; 5 pages. doi: 10.1038/tp.2017.54.
Mueller et al., "Altered network hub connectivity after acute LSD administration", NeuroImage: Clinical (2018); 18: 694-701. doi: 10.1016/j.nicl.2018.03.005. eCollection 2018.
Mueller et al., "Increased thalamic resting-state connectivity as a core driver of LSD-induced hallucinations", Acta Psychiatrica Scandinavica (2017); 136: 648-657. doi: 10.1111/acps.12818. Epub Sep. 21, 2017.
Multidisciplinary Association for Psychedelic Studies "Lysergic Acid Diethylamide (LSD)-Assisted Psychotherapy in People With Illness-related Anxiety" ClinicalTrials.gov ID NCT00920387, version 13, Jun. 14, 2022, 27 pages.
Multidisciplinary Association for Psychedelic Studies "Lysergic Acid Diethylamide (LSD)-Assisted Psychotherapy in People With Illness-related Anxiety" ClinicalTrials.gov ID NCT00920387, version 9, Apr. 16, 2014, 14 pages.
Muneer. "Effects of LSD on human chromosomes", Mutation Research (1978); 51(3): 403-410. doi: 10.1016/0027-5107(78)90128-8.
Murakami et al., "Behavioral thermoregulation in rats during hyperthermia induced by lysergic acid diethylamide", Neuroscience Letters (1980); 20(1): 105-108. doi: 10.1016/0304-3940(80)90242-6.
Muttoni et al., "Classical psychedelics for the Treatment of depression and anxiety: A Systematic Review", Journal of Affective Disorders (2019); 258: 11-24. doi: 10.1016/j.jad.2019.07.076. Epub Jul. 30, 2019.

(56) References Cited

OTHER PUBLICATIONS

Nakahara et al., "Studies on lysergic acid diethylamide and related compounds. 3. Improvement of amidation of lysergic acid (author's transl)", Yakugaku zasshi: Journal of the Pharmaceutical Society of Japan (1974); 94(3): 407-412. doi: 10.1248/yakushi1947.94.3_407.
Nakahara et al., "Studies on Lysergic Acid Diethylamide and Related Compounds. I. Synthesis of d-N6-Demethyl-lysergic Acid Diethylamide", Chemical and Pharmaceutical Bulletin (1971); 19(11): 2337-2341.
National Institute of Mental Health. "What is Depression" OMB Approval #0925-0648 Expiration Date Jun. 30, 2024 [online] https://www.nimh.nih.gov/health/topics/depression (Access Date: May 2024); 3 pages.
National Toxicology Program. "NTP Technical Report on Toxicology and carcinogenesis studies of diethylamine (CAS No. 109-89-7) in F344/N rats and B6C3F1 mice (inhalation studies)", U.S. Department of Health and Human Services, NTP TR 566 (Oct. 2011); 1-174.
NHS, "Swallowing Difficulties in Dementia" NHS Hull University Teaching Hospitals NHS Trust, Mar. 18, 2016 [online] https://www.hey.nhs.uk/patient-leaflet/swallowing-difficulties-in-dementia; 10 pages.
Nicholas et al., "High dose psilocybin is associated with positive subjective effects in healthy volunteers", Journal of Psychopharmacology (2018); 32(7): 770-778. doi: 10.1177/0269881118780713. Epub Jun. 27, 2018.
Nichols. "Chemistry and structure-activity relationships of psychedelics", Behavioral Neurobiology of Psychedelic Drugs (2018): 1-43.
Nichols et al., "Dynamic changes in prefrontal cortex gene expression following lysergic acid diethylamide administration", Molecular Brain Research (2003); 111: 182-188. doi: 10.1016/s0169-328x(03)00029-9.
Nichols et al., "Molecular genetic responses to lysergic acid diethylamide include transcriptional activation of MAP kinase phosphatase-1, C/EBP-β and ILAD-1, a novel gene with homology to arrestins", Journal of Neurochemistry (2004); 90(3): 576-584. doi: 10.1111/j.1471-4159.2004.02515.x.
Nichols et al., "Stereoselective pharmacological effects of lysergic acid amides possessing chirality in the amide substituent", Behavioural Brain Research (1996); 73(1-2): 117-119. doi: 10.1016/0166-4328(96)00080-0.
Nichols et al., "Psychedelics as Medicines: An emerging new paradigm", Clinical Pharmacology and Therapeutics (2017); 101(2): 209-219.
Nichols. "Hallucinogens", Pharmacology & Therapeutics (2004); 101(2): 131-181. doi: 10.1016/j.pharmthera.2003.11.002.
Nichols et al., "Is LSD toxic?", Forensic Science International (2018); 284: 141-145. doi: 10.1016/j.forsciint.2018.01.006. Epub Feb. 2, 2018.
Nichols et al., "Lysergamides of isomeric 2,4-dimethylazetidines map the binding orientation of the diethylamide moiety in the potent hallucinogenic agent N,N-diethyllysergamide (LSD)", Journal of Medicinal Chemistry (2002); 45: 4344-4349. doi: 10.1021/jm020153s.
Nichols. "Psychedelics", Pharmacological Reviews (2016); 68(2): 264-355. doi: 10.1124/pr.115.011478. Erratum in: Pharmacol Rev. Apr. 2016;68(2):356. doi: 10.1124/pr.114.011478err.
Nichols, "Structure-activity relationships of serotonin 5-HT2A agonists", Wiley Interdisciplinary Reviews: Membrane Transport and Signaling (2012); 1(5): 559-579. doi/10.1002/wmts.42.
Niwaguchi. "Application of GC/MS to studies on the metabolism of dependence causing drugs. Lysergic acid diethylamide (LSD) and amphetamines", Iyo Masu Kenkyukai Koenshu (1979); 4: 75-82 with English abstract.
Niwaguchi. "Studies on enzymatic dealkylation of D-lysergic acid diethylamide (LSD)", Biochemical Pharmacology (1974); 23: 1073-1078. doi: 10.1016/0006-2952(74)90007-0.
Niwaguchi et al., "Studies on the in vitro metabolism of compounds related to lysergic acid diethylamide (LSD)", Biochemical Pharmacology (1974); 23: 3066-3067. doi: 10.1016/0006-2952(74)90282-2.
Non-Final Office Action for U.S. Appl. No. 17/156,233, by Liechti, Matthias Emanuel, et al., mailed on Jul. 6, 2022, 13 pages.
Non-Final Office Action for U.S. Appl. No. 17/156,233, by Liechti, Matthias Emanuel, et al., mailed on Jun. 27, 2023, 18 pages.
Non-Final Office Action for U.S. Appl. No. 17/156,233, by Liechti, Matthias Emanuel, et al., mailed on Jun. 6, 2024, 23 pages.
Non-Final Office Action for U.S. Appl. No. 17/225,715, by Liechti, Matthias Emanuel, et al., mailed on Sep. 23, 2022, 24 pages.
Non-Final Office Action for U.S. Appl. No. 17/672,670, by Liechti, Matthias Emanuel, et al., mailed on Apr. 18, 2024, 22 pages.
Non-Final Office Action for U.S. Appl. No. 17/672,670, by Liechti, Matthias Emanuel, et al., mailed on Mar. 3, 2023, 13 pages.
Non-Final Office Action for U.S. Appl. No. 17/672,670, by Liechti, Matthias Emanuel, et al., mailed on Sep. 8, 2023, 23 pages.
Non-Final Office Action for U.S. Appl. No. 17/869,896, by Liechti, Matthias Emanuel, et al., mailed on Mar. 22, 2024, 16 pages.
Non-Final Office Action for U.S. Appl. No. 17/890,133, by Mack, Peter et al., mailed Aug. 16, 2023, 14 pages.
Non-Final Office Action for U.S. Appl. No. 17/890,133, by Mack, Peter et al., mailed Dec. 21, 2023, 23 pages.
Non-Final Office Action for U.S. Appl. No. 18/077,085, by Mack, Peter et al., mailed Jan. 9, 2024, 39 pages.
Non-Final Office Action for U.S. Appl. No. 18/077,085, by Mack, Peter et al., mailed Sep. 21, 2023, 17 pages.
Non-Final Office Action for U.S. Appl. No. 18/077,096, by Mack, Peter et al., mailed Feb. 4, 2025, 24 pages.
Non-Final Office Action for U.S. Appl. No. 18/077,096 mailed Mar. 28, 2023, 20 pages.
Non-Final Office Action for U.S. Appl. No. 18/077,096 mailed Mar. 6, 2024, 33 pages.
Non-Final Office Action for U.S. Appl. No. 18/194,761, by Mack, Peter et al., mailed Sep. 15, 2023, 20 pages.
Non-Final Office Action for U.S. Appl. No. 18/321,159, by Liechti, Matthias Emanuel, et al., mailed on Dec. 13, 2023, 21 pages.
Non-Final Office Action for U.S. Appl. No. 18/321,159, by Liechti, Matthias Emanuel, et al., mailed on Jul. 9, 2024, 18 pages.
Non-Final Office Action for U.S. Appl. No. 18/336,724, by Liechti, Matthias Emanuel, et al., mailed Dec. 30, 2024, 26 pages.
Norman et al., "[3H] WB4101 labels the 5-HT1A serotonin receptor subtype in rat brain. Guanine nucleotide and divalent cation sensitivity", Molecular Pharmacology (1985); 28: 487-494.
North et al., "A new pragmatic design for dose escalation in phase 1 clinical trials using an adaptive continual reassessment method", BMC Cancer (2019); 19(632): 1-10. doi: 10.1186/s12885-019-5801-3.
NORTHCOTE. "Young adults' decision making surrounding heavy drinking: A multi-staged model of planned behaviour", Social Science & Medicine (2011); 72(12): 2020-2025. doi: 10.1016/j.socscimed.2011.04.020. Epub May 18, 2011.
Notice of Allowance for U.S. Appl. No. 17/225,715, by Liechti, Matthias Emanuel et al., mailed on Apr. 19, 2023, 7 pages.
Notice of Allowance for U.S. Appl. No. 17/890,133, by Mack, Peter et al., mailed Aug. 21, 2024, 10 pages.
Notice of Allowance for U.S. Appl. No. 17/890,133 mailed Dec. 24, 2024, 11 pages.
Notice of Allowance for U.S. Appl. No. 18/077,085, by Mack, Peter et al., mailed Aug. 23, 2024, 10 pages.
Notice of Allowance for U.S. Appl. No. 18/077,085, by Mack, Peter et al., mailed Dec. 24, 2024, 10 pages.
Notice of Allowance for U.S. Appl. No. 18/194,761, by Mack, Peter et al., mailed May 14, 2024, 8 pages.
Oberlender et al., "Stereoselective LSD-like activity in d-lysergic acid amides of R-and S-2-aminobutane", Journal of Medicinal Chemistry (1992); 35(2): 203-211. doi: 10.1021/jm00080a001.
Olbrich et al., "LSD and ketanserin and their impact on the human autonomic nervous system", Psychophysiology (2021); 58(6): e13822; 11 pages. doi: 10.1111/psyp.13822. Epub Mar. 27, 2021.
Pacheco et al., "A review on orally disintegrating films (ODFs) made from natural polymers such as pullulan, maltodextrin, starch,

(56) References Cited

OTHER PUBLICATIONS and others", International Journal of Biological Macromolecules (2021); 178: 504-513. doi: 10.1016/j.ijbiomac.2021.02.180. Epub Feb. 26, 2021.
Pahnke et al., "The experimental use of psychedelic (LSD) psychotherapy", Jama (1970); 212(11): 1856-1863.
Pahnke et al., "LSD-assisted psychotherapy with terminal cancer patients", Current Psychiatry Research (1969); 9: 144-152.
Pahnke et al., "Psychedelic therapy (utilizing LSD) with cancer patients", Journal of Psychedelic Drugs (1970); 3(1): 63-75.
Palhano-Fontes et al., "Rapid antidepressant effects of the psychedelic ayahuasca in treatment-resistant depression: a randomized placebo-controlled trial", Psychological Medicine (2019); 49(4): 655-663. doi: 10.1017/S0033291718001356. Epub Jun. 15, 2018.
Pande et al., "An overview on emerging trends in immediate release tablet technologies", Austin Therapeutics (2016); 3(1): 1026; 9 pages.
Papac et al., "Measurement of lysergic acid diethylamide (LSD) in human plasma by gas chromatography/negative ion chemical ionization mass spectrometry", Journal of Analytical Toxicology (1990); 14: 189-190.
Parker. "LSD produces place preference and flavor avoidance but does not produce flavor aversion in rats", Behavioral Neuroscience (1996); 110(3): 503-508. doi: 10.1037//0735-7044.110.3.503.
Partial Supplementary European Search Report for European Application No. 22796524.1, by Mind Medicine, Inc., mailed Mar. 12, 2025, 16 pages.
Passie et al., "The pharmacology of hallucinogens", Principles of Addiction Medicine, 5th ed., Philadelphia: Wolters Kluwer Lippincott Williams & Wilkins (2014): 235-255.
Passie. "The pharmacology of lysergic acid diethylamide: a review", CNS Neuroscience & Therapeutics (2008); 14(4): 295-314. doi: 10.1111/j.1755-5949.2008.00059.x.
Peroutka et al., "The clinical utility of pharmacological agents that act at serotonin receptors", Journal of Neuropsychiatry and Clinical Neurosciences (1989); 1: 253-262. doi: 10.1176/jnp.1.3.253.
Pfaff et al., "Lysergamides revisited", NIDA Research Monograph (1994); 146: 52-73.
Phan et al., "ALFA: Allele Frequency Aggregator", National Center for Biotechnology Information, US National Library of Medicine (2020) [online] https://www.ncbi.nlm.nih.gov/snp/docs/gsr/alfa/ (Access Date: Mar. 20, 2025); 5 pages.
Pierce et al., "Hallucinogenic drug interactions with neurotransmitter receptor binding sites in human cortex", Psychopharmacology (1989); 97(1): 118-122. doi: 10.1007/BF00443425.
Pinheiro et al., "Model-based dose finding under model uncertainty using general parametric models", Statistics in Medicine (2014); 33(10): 1646-1661. doi: 10.1002/sim.6052. Epub Dec. 3, 2013.
Páleníček et al., "Sex differences in the effects of N,N-diethyllysergamide (LSD) on behavioral activity and prepulse inhibition", Progress in Neuro-Psychopharmacology & Biological Psychiatry (2010); 34: 588-596. doi: 10.1016/j.pnpbp.2010.02.008. Epub Feb. 13, 2010.
Poch et al., "Detection of metabolites of lysergic acid diethylamide (LSD) in human urine specimens: 2-oxo-3-hydroxy-LSD, a prevalent metabolite of LSD", Journal of Chromatography. B Biomed Sci Appl (1999); 724(1): 23-33. doi: 10.1016/s0378-4347(98)00574-x.
Pokorny et al., "LSD acutely impairs working memory, executive functions, and cognitive flexibility, but not risk-based decision-making", Psychological Medicine (2020); 50: 2255-2264. doi: 10.1017/S0033291719002393. Epub Sep. 10, 2019.
Polesskaya et al., "Allele C-specific methylation of the 5-HT2A receptor gene: Evidence for correlation with its expression and expression of DNA methylase DNMT1", Journal of Neuroscience Research (2006); 83(3): 362-373. doi: 10.1002/jnr.20732.
Polito et al., "A systematic study of microdosing psychedelics", PloS One (2019); 14(2): e0211023; 26 pages. doi: 10.1371/journal.pone.0211023.
Pollack. "Optimizing pharmacotherapy of generalized anxiety disorder to achieve remission", Journal of Clinical Psychiatry (2001); 62: 20-25.
Posner et al., "The Columbia-Suicide Severity Rating Scale: initial validity and internal consistency findings from three multisite studies with adolescents and adults." American Journal of Psychiatry (Dec. 2011); 168(12): 1266-1277. doi: 10.1176/appi.ajp.2011.10111704.
Preissner et al., "Polymorphic cytochrome P450 enzymes (CYPs) and their role in personalized therapy", PloS One (2013); 8(12): e82562; 12 pages. doi: 10.1371/journal.pone.0082562.
Preller et al., "Changes in global and thalamic brain connectivity in LSD-induced altered states of consciousness are attributable to the 5-HT2A receptor", Elife (2018); 7: e35082; 31 pages. doi: 10.7554/eLife.35082.
Preller et al., "Effective connectivity changes in LSD-induced altered states of consciousness in humans", Proceedings of the National Academy of Sciences (2019); 116(7): 2743-2748. doi: 10.1073/pnas.1815129116. Epub Jan. 28, 2019.
Preller et al., "Role of the 5-HT2A Receptor in Self- and Other-Initiated Social Interaction in Lysergic Acid Diethylamide-Induced States: A Pharmacological fMRI Study", Journal of Neuroscience (Apr. 2018); 38(14): 3603-3611. doi: 10.1523/JNEUROSCI.1939-17.2018. Epub Mar. 19, 2018.
Preller. "The fabric of meaning and subjective effects in LSD-induced states depend on serotonin 2A receptor activation", Current Biology (2017); 27(3): 451-457. doi: 10.1016/j.cub.2016.12.030. Epub Jan. 26, 2017.
[Author Unknown] "LSD Questions Answered: Do LSD Tabs Expire and Lose Potency? (And What Can You Do About It?)", Psychedelic Experience (2021); retrieved from The Wayback Machine on Apr. 23, 2021, 6 pages.
Psychiatric University Hospital, Zurich, "The Role of 5-HT2A Receptor in the Perception of Self and Personal Meaning in Healthy Volunteers" ClinicalTrials.gov ID NCT02451072, version 3, Jan. 29, 2016, 10 pages.
R Core Team. "R: A language and environment for statistical computing", Reference Index, Version 3.6.2 (2019); 3706 pages.
Ramaekers. "A low dose of lysergic acid diethylamide decreases pain perception in healthy volunteers." J Psychopharmacol, 2021; 35: 398-405.
Rasmussen et al., "Effect of hallucinogens on spontaneous and sensory-evoked locus coeruleus unit activity in the rat: reversal by selective 5-HT2 antagonists", Brain Research (1986); 385(2): 395-400. doi: 10.1016/0006-8993(86)91090-5.
Reiff et al., "Psychedelics and psychedelic-assisted psychotherapy", American Journal of Psychiatry (2020); 177(5): 391-410. doi: 10.1176/appi.ajp.2019.19010035. Epub Feb. 26, 2020.
Reissig et al., "The 5-HT1A receptor and the stimulus effects of LSD in the rat", Psychopharmacology (2005); 182: 197-204. doi: 10.1007/s00213-005-0068-6. Epub Oct. 19, 2005.
Reitz et al., "Epidemiology of Alzheimer disease", Nature Reviews Neurology (Mar. 2011); 7(3): 137-152. doi: 10.1038/nrneurol.2011.2. Epub Feb. 8, 2011.
Requirement for Restriction/Election for U.S. Appl. No. 17/156,233, by Liechti, Matthias Emanuel, et al., mailed on Mar. 18, 2022, 10 pages.
Rickels et al., "Paroxetine treatment of generalized anxiety disorder: a double-blind, placebo-controlled study", American Journal of Psychiatry (2003); 160(4): 749-756. doi: 10.1176/appi.ajp.160.4.749.
Rickels et al., "Pregabalin for treatment of generalized anxiety disorder: A 4-week, multicenter, double-blind, placebo-controlled trial of pregabalin and alprazolam", Archives of General Psychiatry (Sep. 2005); 62: 1022-1030. doi.org/10.1001/archpsyc.62.9.1022.
Rickli et al., "Receptor interaction profiles of novel psychoactive tryptamines compared with classic hallucinogens", European Neuropsychopharmacology (2016); 26: 1327-1337. doi: 10.1016/j.euroneuro.2016.05.001. Epub May 20, 2016.
Rickli et al., "Receptor interaction profiles of novel N-2-methoxybenzyl (NBOMe) derivatives of 2,5-dimethoxy-substituted phenethylamines (2C drugs)", Neuropharmacology (2015); 99: 546-553. doi: 10.1016/j.neuropharm.2015.08.034. Epub Aug. 25, 2015.

(56) References Cited

OTHER PUBLICATIONS

Ringeisen. "Mental and Substance Use Disorders Prevalence Study (MDPS): Findings Report." RTI International, 2023 [online] https://www.rti.org/publication/mental-and-substance-use-disorders-prevalence-study/fulltext.pdf (Access Date: Apr. 4, 2024); 77 pages.
Riss et al., "A simple, rapid procedure for nucleophilic radiosynthesis of aliphatic [18 F] trifluoromethyl groups", Chemical Communications (2011); 47(43): 11873-11875. doi: 10.1039/c1cc15342k. Epub Oct. 11, 2011.
Rodriguiz et al., "LSD-stimulated behaviors in mice require B-arrestin 2 but not β-arrestin 1", Scientific Reports (2021); 11(1): 17690; 14 pages. doi: 10.1038/s41598-021-96736-3.
Romano et al., "Intrahippocampal LSD accelerates learning and desensitizes the 5-HT2A receptor in the rabbit", Psychopharmacology (2010); 212: 441-448. doi: 10.1007/s00213-010-2004-7. Epub Sep. 9, 2010.
Roseman et al., "LSD alters eyes-closed functional connectivity within the early visual cortex in a retinotopic fashion", Human Brain Mapping (2016); 37(8): 3031-3040. doi: 10.1002/hbm.23224. Epub Apr. 29, 2016.
Roseman et al., "Quality of acute psychedelic experience predicts therapeutic efficacy of psilocybin for treatment-resistant depression", Frontiers in Pharmacology (2018); 8: 974; 10 pages. doi: 10.3389/fphar.2017.00974.
Ross. "Serotonergic hallucinogens and emerging targets for addiction pharmacotherapies," Psychiatric Clinics of North America (2012); 35(2): 357-374. doi: 10.1016/j.psc.2012.04.002.
Ross et al., "Rapid and suned symptom reduction following psilocybin treatment for anxiety and depression in patients with life-threatening cancer: a randomized controlled trial", Journal of Psychopharmacology (2016); 30: 1165-1180. doi: 10.1177/0269881116675512.
Ross. "Microdosing psychedelics: Too much hype, almost No. rigorous research", Journal of Psychopharmacology (2019); 33(9): 1050-1051.
Rothlin. "Metabolism of lysergic acid diethylamide", Nature (Dec. 2, 1956); 178(4547): 1400-1401. doi: 10.1038/1781400a0.
Rothlin. "Pharmacology of LSD-25", Lysergic acid diethylamide and mescaline in experimental psychiatry, New York: Grune and Stratton (1956); pp. 1-7; 9 pages.
Roux et al., "LSD: No teratogenic action in rats, mice and hamsters", Science (1970): 169: 588-589. doi: 10.1126/science.169.3945.588.
Ruscio et al., "Cross-sectional comparison of the epidemiology of DSM-5 generalized anxiety disorder across the globe." JAMA Psychiatry (2017); 74(5): 465-475. doi: 10.1001/jamapsychiatry.2017.0056.
Rynn et al., "Efficacy and safety of duloxetine in the treatment of generalized anxiety disorder: A flexible-dose, progressive-titration, placebo-controlled trial", Depression and Anxiety (2008); 25(3): 182-189. doi: 10.1002/da.20271.
Sachse et al., "Cytochrome P450 2D6 variants in a Caucasian population: allele frequencies and phenotypic consequences", American Journal of Human Genetics (1997); 60(2): 284-295.
Sachse et al., "Functional significance of a C→ A polymorphism in intron 1 of the cytochrome P450 CYP1A2 gene tested with caffeine", British Journal of Clinical Pharmacology (1999); 47(4): 445-449. doi: 10.1046/j.1365-2125.1999.00898.x.
Sanches et al., "Antidepressant effects of a single dose of ayahuasca in patients with recurrent depression: a SPECT study", Journal of Clinical Psychopharmacology (2016); 36(1): 77-81. doi: 10.1097/JCP.0000000000000436.
Sanders-Bush et al., "Lysergic acid diethylamide and 2,5-dimethoxy-4-methylamphetamine are partial agonists at serotonin receptors linked to phosphoinositide hydrolysis," Journal of Pharmacology and Experimental Therapeutics (1988); 246(3): 924-928.
Sastry et al., "Recent technological advances in oral drug delivery—a review", Pharmaceutical Science & Technology Today (Apr. 2000); 3(4): 138-145. doi: 10.1016/s1461-5347(00)00247-9.
Sato et al., "LSD in pregnancy: chromosomal effects", Life Sciences (1971); 10(13): 773-779. doi: 10.1016/0024-3205(71)90209-8.
Savage. "Lysergic acid diethylamide (LSD-25) a clinical-psychological study", American Journal of Psychiatry (1952); 108(12): 896-900. doi: 10.1176/ajp.108.12.896.
Savage. "Residential psychedelic (LSD) therapy for the narcotic addict. A controlled study." Archives General Psychiatry, 1973; 28(6): 808-814.
Schindler. " Indoleamine Hallucinogens in Cluster Headache: Results of the Clusterbusters Medication Use Survey." Journal of Psychoactive Drugs, 2015; 47(5): 372-381.
Schlag. "Adverse effects of psychedelics: From anecdotes and misinformation to systematic science." Journal of Psychopharmacology, Mar. 2022; 36(3): 258-272.
Schmid et al., "Acute subjective effects in LSD-and MDMA-assisted psychotherapy", Journal of Psychopharmacology (2021); 35(4): 362-374. doi: 10.1177/0269881120959604. Epub Oct. 8, 2020.
Schmid et al., "CYP2D6 function moderates the pharmacokinetics and pharmacodynamics of 3, 4-methylene-dioxymethamphetamine in a controlled study in healthy individuals", Pharmacogenetics and Genomics (2016); 26(8): 397-401. doi: 10.1097/FPC.0000000000000231.
Schmid. "Long-lasting subjective effects of LSD in normal subjects", Psychopharmacology (2018); 235: 535-545. doi: 10.1007/s00213-017-4733-3. Epub Sep. 16, 2017.
Schmid, Y., et al., "Acute effects of lysergic acid diethylamide in healthy subjects", Biological Psychiatry (2015); 78(8): 544-553. doi: 10.1016/j.biopsych.2014.11.015. Epub Nov. 29, 2014.
Schmidt et al., "Acute LSD effects on response inhibition neural networks", Psychological Medicine (2018); 48(9): 1464-1473. doi: 10.1017/S0033291717002914. Epub Oct. 2, 2017.
Schmidt et al., "The NMDA antagonist ketamine and the 5-HT agonist psilocybin produce dissociable effects on structural encoding of emotional face expressions", Psychopharmacology (2013); 225: 227-239. doi: 10.1007/s00213-012-2811-0. Epub Jul. 27, 2012.
Schmitz et al., "The symptom check-list-90-R (SCL-90-R): a German validation study", Quality of Life Research (2000); 9: 185-193. doi: 10.1023/a:1008931926181.
Scully. "A Sketch of the Early History of Underground LSD Manufacturing", In Breaking Convention 2013, University of Greenwich (2013); 7 pages.
Seager, "Drug-delivery products and the Zydis fast-dissolving dosage form" J Pharm Pharmacol. (1998) Apr. 50(4):375-382.
Seaich. "The Far-Off Land: An Experience with LSD (exp88502)", Erowid.org, erowid.org/exp/88502 (Apr. 4, 2018) [online] https://www.erowid.org/experiences/exp.php?ID=88502 (Access Date: Feb. 13, 2025); 8 pages.
Seeman. "Dopamine D2High receptors stimulated by phencyclidines, lysergic acid diethylamide, salvinorin A, and modafinil." Synapse, 2009; 63: 698-704.
Seeman. "Dopamine receptor contribution to the action of PCP, LSD and ketamine psychotomimetics." Molecular Psychiatry, 2005; 10(9): 877-883.
Sessa. "The pharmacology of LSD: A critical review." British J Psych, 2011; 199(3); 258-259. Abstract Only.
Sewell et al., "Response of cluster headache to psilocybin and LSD", Neurology (2006); 66(12): 1920-1922. doi: 10.1212/01.wnl.0000219761.05466.43.
Shahid et al., "State-Trait Anxiety Inventory (STAI)", STOP, THAT and One Hundred Other Sleep Scales (2012); p. 367-368; 11 pages.
Sharma et al., "Review on Moisture activated Dry Granulation Process," PharmaTutor (2017) 5(12):58-67.
Shear. "Reliability and validity of a structured interview guide for the Hamilton Anxiety Rating Scale (SIGH-A)." Depress Anxiety, 2001; 13(4): 166-78.
Sheehan. "Assessing treatment effects in clinical trials with the Discan metric of the Sheehan Disability Scale." International Clinical Psychopharmacology, 2008; 23(2): 70-83.
Sheehan. "The Mini-International Neuropsychiatric Interview (M.I.N.I.): the development and validation of a structured diagnostic psychiatric interview for DSM-IV and ICD-10." J Clin Psychiatry, 1998; 59(Suppl 20): 22-33.

(56) References Cited

OTHER PUBLICATIONS

Shulgin et al.; "Pihkal: A Chemical Love Story," Transform Press, Berkeley, CA; 1991:453-923.
Siddik. "The fate of lysergic acid di[14C]ethylamide ([14C]LSD) in the rat." Biochem Soc Trans. 1975; 3(2): 290-292.
Siddik. "The fate of lysergic acid di[14C]ethylamide ([14C]LSD) in the rat, guinea pig and rhesus monkey and of [14C]iso-LSD in rat." Biochemical Pharmacology, 1979; 28(20): 3093-3101.
Siddik. "The metabolism of lysergic acid DI[14C]-ethylamide ([14C]LSD) in the isolated perfused rat liver." Biochemical Pharmacology, 1979; 28(20): 3081-3091.
Singh. "Chromosomal aberrations induced in barley by LSD." Science, Jul. 31, 1970; 169: 491-492.
Skakkebaek. "Studies on meiotic chromosomes and spermatozoan heads in mice treated with LSD." J Reprod Fertil, 1970; 22: 141-144.
Smith et al., "141. The alkaloids of ergot. Part V. The nature of ergine", Journal of the Chemical Society (Resumed) (1934): 674-675.
Smith et al., "311. The alkaloids of ergot. Part VII. iso Ergine and iso lysergic acids", Journal of the Chemical Society (Resumed) (1936): 1440-1444.
Smith. "LSD" in "Psychedelic Chemistry", Loompanics Unlimited, Port Townsend, Washington (1981); 216 pages.
Snyder. "Regional Localization of lysergic acid diethylamide in monkey brain." Nature, 1966; 209(5028): 1093-1095.
Speth et al., "Decreased mental time travel to the past correlates with default-mode network disintegration under lysergic acid diethylamide", Journal of Psychopharmacology (2016); 30(4): 344-353. doi: 10.1177/0269881116628430.
Spieß et al., "Direct synthesis of enamides via electrophilic activation of amides", Journal of the American Chemical Society (2021); 143(28): 10524-10529. doi: 10.1021/jacs.1c04363. Epub Jul. 7, 2021.
Spielberger et al., "Development of the Spanish edition of the state-trait anxiety inventory", Interamerican Journal of Psychology (1971); 5(3-4): 145-158.
Spielberger et al., "Manual for the state-trait anxiety inventory", State-Trait Anxiety Inventory (Form Y), Palo Alto, CA: Consulting Psychologists (1983); 4 pages.
Spielberger. "State-Trait Anxiety Inventory for Adults", Mind Garden, Inc. (2018); 1 page.
Spravato (esketamine) nasal spray, CIII , Nasal Spray: 28 mg of esketamine per device. Each nasal spray device delivers two sprays containing a total of 28 mg of esketamine; Highlights of Prescribing Information, Medication Guide approved by the U.S. Food and Drug Administration; Revised: Jul. 2020 (Jul. 2020), Initial U.S. Approval: 1970 (ketamine), Reference ID: 4649523, Manufactured for: Janssen Pharmaceuticals, Inc., Titusville, NJ 08560; 44 pages.
Stachulski et al., "Stereochemical and NMR Reassignment of 6-Norlysergic Acid Diethylamide and 6-Nor-6-allyllysergic Acid Diethylamide", Journal of Chemical Research (1996); S1: 30-31.
Stein. "Etifoxine versus alprazolam for the treatment of adjustment disorder with anxiety: a randomized controlled trial." Adv Ther, 2015; 32(1): 57-68.
Stein. "Pharmacotherapy of adjustment disorder: A review." World Journal of Biological Psychiatry, 2018; 19(sup1): S46-S52.
Steuer. "Development and validation of an ultra-fast and sensitive microflow liquid chromatography-tandem mass spectrometry (MFLC-MS/MS) method for quantification of LSD and its metabolites in plasma and application to a controlled LSD administration study in humans." Drug Test Analysis, 2017; 9(5): 788-797.
Stocco. "The Molecular Control of Corpus Luteum Formation, Function, and Regression." Endocrine Reviews, Feb. 2007, 28(1): 117-149.
Stoll. "Über die Stereochemie der Lysergsäuren und der Dihydrolysergsäuren. 37. Mitteilung über Mutterkornalkaloide." Helv Chim Acta, 1954; 37(7): 2039-2057; 19 pages with English summary.
Stoll. "Distribution and fate of14C-labeled lysergic acid diethylamide (LSD 25) in the animal body." Experientia, 1955; 11(10): 396-397.
Stoll et al., "Amide der stereoisomeren Lysergsäuren und Dihydrolysergsäuren. 38. Mitteilung über Mutterkornalkaloide", Helvetica Chimica Acta (1955); 38(2): 421-433; 26 pages with English machine translation.
Stoll et al., "Partialsynthese von alkaloiden vom typus des ergobasins. (6. Mitteilung über Mutterkornalkaloide)", Helvetica Chimica Acta (1943); 26(3): 944-965; 48 pages with English machine translation.
Stoll. "Uber die Synthese von 14C-Diathylamin und 14C-Lysergsaure-diathylamid." Helv Chim Acta, 1954; 37: 820-824; 10 pages with English Machine Translation.
Strajhar. "Acute effects of lysergic acid diethylamide on circulating steroid levels in healthy subjects." J Neuroendocrino, 2016; 28: 12374; 13 pages.
Strassman. "Adverse reactions to psychedelic drugs. A review of the literature", The Journal of Nervous and Mental Disease (1984); 172(10): 577-595. doi: 10.1097/00005053-198410000-00001.
Strassman. "Human Hallucinogen Interactions with Drugs Affecting Serotonergic", Neuropsychopharmacology (1992); 7(3): 241-243.
Studerus et al., "Acute, subacute and long-term subjective effects of psilocybin in healthy humans: a pooled analysis of experimental studies", Journal of Psychopharmacology (2011); 25(11): 1434-1452. doi: 10.1177/0269881110382466. Epub Sep. 20, 2010.
Studerus et al., "Prediction of psilocybin response in healthy volunteers", PloS One (2012); 7(2): e30800; 12 pages. doi: 10.1371/journal.pone.0030800. Epub Feb. 17, 2012.
Studerus. "Psychometric & evaluation of the altered states of consciousness rating scale (OAV)", PloS One (2010); 5(8): e12412; 19 pages. doi: 10.1371/journal.pone.0012412.
Sturelid. "Lysergic acid diethylamide and chromosome breakage." Hereditas, 1969; 62: 259-262.
Tagliazucchi. "Increased global functional connectivity correlates with LSD-induced ego dissolution." Curr Biol, 2016; 26: 1043-1050.
Takada et al., "API form screening and selection in drug discovery stage", Pharm Stage (Jan. 15, 2007); 6(10): 20-25; 9 pages with English Translation.
Takasaki et al., "Importance of Excipient Wettability on Tablet Characteristics Prepared by Moisture Activated Dry Granulation (MADG)," International Journal of Pharmaceutics (2013) 456:58-64.
Taniguchi et al., "7-endo selective aryl radical cyclization onto enamides leading to 3-benzazepines: concise construction of a cephalotaxine skeleton", The Journal of Organic Chemistry (2005); 70(5): 1922-1925. doi: 10.1021/jo040264u.
Terhune. "A placebo-controlled investigation of synaesthesia-like experiences under LSD." Neuropsychologia 2016; 88: 28-34.
Titeler. "Radioligand binding evidence implicates the brain 5 HT2 receptor as a site of action for LSD and phenylisopropylamine hallucinogens." Psychopharmacol, 1988; 94: 213-216.
Trulson. "Dissociations between the effects of hallucinogenic drugs on behavior and raphe unit activity in freely moving cats." Brain Research, 1981; 215: 275-293.
Uhle. "Amino Derivatives of 5-KETO-1, 3, 4, 5-Tetrahydrobenz [cd] INDOLE1", Journal of the American Chemical Society (1951); 73(5): 2402-2403.
Ullah et al., "Moisture-Activated Dry Granulation—Part I: A Guide to Excipient and Equipment Selection and Formulation Development" Pharmaceutical Technology (2009) vol. 33, Issue 11, 6 pages.
University Hospital, Basel, Switzerland, "Acute Dose-dependent Effects of DMT in Healthy Subjects (DMT DR)" ClinicalTrials.gov ID NCT05384678, version 1, May 17, 2022, 13 pages.
University Hospital, Basel, Switzerland, "Comparative Acute Effects of LSD, Psilocybin and Mescaline (LPM)" ClinicalTrials.gov ID NCT04227756, version 4, Aug. 17, 2021, 13 pages.
University Hospital, Basel, Switzerland, "Comparative Acute Effects of LSD, Psilocybin and Mescaline (LPM)" ClinicalTrials.gov ID NCT04227756, version 6, Mar. 30, 2022, 12 pages.

(56) References Cited

OTHER PUBLICATIONS

University Hospital, Basel, Switzerland, "Direct Comparison of Altered States of Consciousness Induced by LSD and Psilocybin (LSD-psilo)" ClinicalTrials.gov ID NCT03604744, version 8, Apr. 26, 2021, 11 pages.
University Hospital, Basel, Switzerland, "Effect of Ketanserin After LSD Administration (L-Ket)" ClinicalTrials.gov ID NCT04558294, version 2, Oct. 26, 2020, 13 pages.
University Hospital, Basel, Switzerland, "Effect of Ketanserin After LSD Administration (L-Ket)" ClinicalTrials.gov ID NCT04558294, version 3, Oct. 20, 2021, 13 pages.
University Hospital, Basel, Switzerland, "Effects of MDMA Co-administration on the Response to LSD in Healthy Subjects (LSD-MDMA)" ClinicalTrials.gov ID NCT04516902, version 2, Jan. 25, 2021, 13 pages.
University Hospital, Basel, Switzerland, "Effects of MDMA Co administration on the Response to LSD in Healthy Subjects (LSD-MDMA)" ClinicalTrials.gov ID NCT04516902, version 3, Sep. 6, 2021, 13 pages.
University Hospital, Basel, Switzerland, "Effects of SERT Inhibition on the Subjective Response to LSD in Healthy Subjects (SERT-LSD)" ClinicalTrials.gov ID NCT05175430, version 1, Dec. 14, 2021, 13 pages.
University Hospital, Basel, Switzerland, "LSD Base and LSD Tartrate Bioequivalence and Bioavailability in Healthy Subjects (LSD-Bio)" ClinicalTrials.gov ID NCT04865653, version 1, Apr. 26, 2021, 14 pages.
University Hospital, Basel, Switzerland, "LSD Base and LSD Tartrate Bioequivalence and Bioavailability in Healthy Subjects (LSD-Bio)" ClinicalTrials.gov ID NCT04865653, version 3, Mar. 30, 2022, 14 pages.
University Hospital, Basel, Switzerland, "LSD Therapy for Persons Suffering From Major Depression (LAD)" ClinicalTrials.gov ID NCT03866252, version 10, May 24, 2022, 14 pages.
University Hospital, Basel, Switzerland, "LSD Therapy for Persons Suffering From Major Depression (LAD)" ClinicalTrials.gov ID NCT03866252, version 8, Feb. 8, 2021, 14 pages.
University Hospital, Basel, Switzerland, "LSD Treatment in Persons Suffering From Anxiety Symptoms in Severe Somatic Diseases or in Psychiatric Anxiety Disorders (LSD-assist)" ClinicalTrials.gov ID NCT03153579, version 7, Dec. 21, 2021, 12 pages.
University Hospital, Basel, Switzerland, "LSD Treatment in Persons Suffering From Anxiety Symptoms in Severe Somatic Diseases or in Psychiatric Anxiety Disorders (LSD-assist)" ClinicalTrials.gov ID NCT03153579, version 9, Mar. 12, 2020, 11 pages.
University Hospital, Basel, Switzerland, "Lysergic Acid Diethylamide (LSD) as Treatment for Cluster Headache (LCH)" ClinicalTrials.gov ID NCT03781128, version 4, Apr. 19, 2021, 14 pages.
University Hospital, Basel, Switzerland, "Lysergic Acid Diethylamide (LSD) as Treatment for Cluster Headache (LCH)" ClinicalTrials.gov ID NCT03781128, version 5, May 4, 2022, 14 pages.
University Hospital, Basel, Switzerland, "Neuronal Correlates of Altered States of Consciousness (5HT2A-fMRI)" ClinicalTrials.gov ID NCT02308969, version 4, Sep. 24, 2015, 9 pages.
University Hospital, Basel, Switzerland, "Psychological, Physiological, Endocrine, and Pharmacokinetic Effects of LSD in a Controlled Study" ClinicalTrials.gov ID NCT01878942, version 7, Jan. 20, 2016, 10 pages.
University Hospital, Basel, Switzerland, "Role of Dopamine, Serotonin and 5-HT2A Receptors in Emotion Processing (LAM)" ClinicalTrials.gov ID NCT03019822, version 6,Oct. 12, 2018, 12 pages.
University Hospital, Basel, Switzerland, "Role of the Serotonin 5-HT2A Receptor in LSD-induced Altered States of Consciousness (LDR-Study) (LDR)" ClinicalTrials.gov ID NCT03321136, version 9, Aug. 26, 2019, 15 pages.
University Hospital, Basel, Switzerland, "Role of the Serotonin 5-HT2A Receptor in Mescaline-induced Altered States of Consciousness (MDR)" ClinicalTrials.gov ID NCT04849013, version 3, Aug. 17, 2021, 15 pages.
University of Chicago, "Mood Effects of Serotonin Agonists" ClinicalTrials.gov ID NCT03790358, version 1, Dec. 28, 2018, 9 pages.
U'Prichard. "Binding characteristics of a radiolabeled agonist and antagonist at central nervous system alpha noradrenergic receptors." Molecular Pharmacology, 1977; 13(3): 454-473.
U.S. Department of Health and Human Services, Food and Drug Administration, Center for Drug Evaluation and Research (CDER), Pharmacology and Toxicology, "Guidance for Industry Estimating the Maximum Safe Starting Dose in Initial Clinical Trials for Therapeutics in Adult Healthy Volunteers," Jul. 2005, 30 pages.
U.S. Appl. No. 19/020,135, filed Jan. 14, 2025, by Liechti et al.
U.S. Appl. No. 18/750,991, filed Jun. 21, 2024, by Trachsel et al.
Valle et al., "Inhibition of alpha oscillations through serotonin-2A receptor activation underlies the visual effects of ayahuasca in humans", European Neuropsychopharmacology (2016); 26(7): 1161-1175. doi: 10.1016/j.euroneuro.2016.03.012. Epub Mar. 25, 2016.
Van Went. "Mutagenicity testing of 3 hallucinogens: LSD, psilocybin and‡ 9-THC using the micronucleus test", Experientia (1978); 34(3): 324-325. doi: 10.1007/BF01923013.
Verstraete. "2-oxo-3-hydroxy-LSD: An important LSD metabolite?" Acta Clinica Belgica, 1999; 53(Suppl1): 94-96.
Vippagunta et al., "Crystalline solids", Advanced Drug Delivery Reviews (2001); 48(1): 3-26. doi: 10.1016/s0169-409x(01)00097-7.
Vizeli et al., "Pharmacogenetics of ecstasy: CYP1A2, CYP2C19, and CYP2B6 polymorphisms moderate pharmacokinetics of MDMA in healthy subjects", European Neuropsychopharmacology (2017); 27(3): 232-238. doi: 10.1016/j.euroneuro.2017.01.008. Epub Jan. 20, 2017.
Vizeli et al., "Role of serotonin transporter and receptor gene variations in the acute effects of MDMA in healthy subjects", ACS Chemical Neuroscience (2018); 10(7): 3120-3131. doi: 10.1021/acschemneuro.8b00590. Epub Jan. 10, 2019.
Vizeli. "Genetic influence of CYP2D6 on pharmacokinetics and acute subjective effects of LSD in a pooled analysis." Sci Rep, 2021; 11(1): 10851; 9 pages.
Vollenweider et al., "5-HT modulation of dopamine release in basal ganglia in psilocybin-induced psychosis in man—a PET study with [11C] raclopride", Neuropsychopharmacology (1999); 20(5): 424-433. doi: 10.1016/S0893-133X(98)00108-0.
Vollenweider et al., "Psilocybin induces schizophrenia-like psychosis in humans via a serotonin-2 agonist action", Neuroreport (1998); 9(17): 3897-3902. doi: 10.1097/00001756-199812010-00024.
Vollenweider et al., "Psychedelic drugs: neurobiology and potential for treatment of psychiatric disorders", Nature Reviews Neuroscience (2020); 21(11): 611-624. doi: 10.1038/s41583-020-0367-2. Epub Sep. 14, 2020.
Waghorn. "Disability, employment and work performance among people with ICD-10 anxiety disorders." Australian & New Zealand Journal of Psychiatry, 2005; 39(1-2): 55-66.
Wagmann et al., "In vitro metabolic fate of nine LSD-based new psychoactive substances and their analytical detectability in different urinary screening procedures", Analytical and Bioanalytical Chemistry (2019); 411: 4751-4763. doi: 10.1007/s00216-018-1558-9. Epub Jan. 7, 2019.
Wan. "Estimation of symptom-free days in generalized anxiety disorder." Current Medical Research and Opinion, 2006; 22(3): 587-591.
Warkany. "Lysergic acid diethylamide (LSD): No teratogenicity in rats." Science, 1968; 159: 731-732.
Watts. "LSD and structural analogs: pharmacological evaluation at D1 dopamine receptors." Psychopharmacology (Berl), 1995; 118: 401-409.
Werk et al., "Functional gene variants of CYP3A4", Clinical Pharmacology & Therapeutics (2014); 96(3): 340-348. doi: 10.1038/clpt.2014.129. Epub Jun. 13, 2014.
Weston et al., "Historic psychedelic drug trials and the treatment of anxiety disorders", Depression and Anxiety (2020); 37(12): 1261-1279. doi: 10.1002/da.23065. Epub Jul. 5, 2020.
White et al., "Personality and the subjective effects of acute amphetamine in healthy volunteers", Neuropsychopharmacology (2006); 31(5): 1064-1074. doi: 10.1038/sj.npp.1300939.

(56) References Cited

OTHER PUBLICATIONS

William. "Tramatic Brain Injury Cured With Time and This Substance: An Experience with LSD (exp110850)", Erowid.org, erowid.org/exp/110850 (May 30, 2018) [online] https://www.erowid.org/experiences/exp.php?ID=110850 (Access Date: Feb. 13, 2025); 2 pages.
Wing. "5HT-2 mediation of acute behavioral effects of hallucinogens in rats." Psychopharmacology, 1990; 100: 417-425.
Winter. "Tolerance to a behavioral effect of lysergic acid diethylamide and cross-tolerance to mescaline in the rat: Absence of a metabolic component." J Pharmacol Exp Ther, 1971; 178: 625-630.
World Health Organization. "Anxiety Disorders." Sep. 27, 2023 [online] https://www.who.int/news-room/fact-sheets/detail/anxiety-disorders (Access Date: Jun. 20, 2024); 5 pages.
Xu et al., "A convenient synthesis of N-vinyl enamides via the lithiation and ring-opening reaction of 2-phenyl-2-oxazolines", Tetrahedron Letters (2017); 58(18): 1788-1791.
Yadav et al., "Co-crystals: a novel approach to modify physicochemical properties of active pharmaceutical ingredients", Indian Journal of Pharmaceutical Sciences (2009); 71(4): 359-370. doi: 10.4103/0250-474X.57283.
Yanakieva, S., et al., "The effects of microdose LSD on time perception: a randomised, double-blind, placebo-controlled trial", Psychopharmacology (Nov. 2018); 236: 1159-1170. doi: 10.1007/s00213-018-5119-x. Epub Nov. 26, 2018. Erratum in: Psychopharmacology (Berl). Dec. 2020;237(12):3803. doi: 10.1007/s00213-020-05682-x.
Yoshida et al., "Decreased serum levels of mature brain-derived neurotrophic factor (BDNF), but not its precursor proBDNF, in patients with major depressive disorder", PLoS One (2012); 7(8): e42676; 6 pages. doi: 10.1371/journal.pone.0042676. Epub Aug. 3, 2012. Erratum in: PLoS One. 2013;8(2). doi: 10.1371/annotation/85a3fa48-980b-4f95-bb43-b33b1c3e0ac6.
Zeiger. "Salmonella Mutagenicity tests: III. Results from the testing of 255 chemicals." Molec Mutagen, 1987; 9(S9): 1-109.
Mind Medicine, Inc., "A Study to Assess 18-Methoxycoronaridine (18-MC HCl) in Healthy Volunteers" ClinicalTrials.gov ID NCT04292197, version 7, Mar. 11, 2021, 12 pages.
University Hospital, Basel, Switzerland, "Comparative Acute Effects of LSD, Psilocybin and Mescaline (LPM)" ClinicalTrials.gov ID NCT04227756, version 3, May 27, 2020 12 pages.
University Hospital, Basel, Switzerland, "Role of the Serotonin 5-HT2A Receptor in Mescaline-induced Altered States of Consciousness (MDR)" ClinicalTrials.gov ID NCT04849013, version 2, Apr. 19, 2021, 15 pages.
Abramson et al., "Lysergic acid diethylamide (LSD-25): I. Physiological and perceptual responses." The Journal of Psychology. Jan. 1955 ;39(1):3-60.
[Author Unknown, Date Unknown] Fragebogen zur Selbstheschreibung, STAI-G Form X 1, STAI-G Form X 2; 8 pages with English Translation.
[Author Unknown] "How to Microdose: A Step by Step Guide—Microdosing information, research, community, coaching and more." Microdosing Institute (2021) [online] https://web.archive.org/web/20210430131601/https://microdosinginstitute.com/how-to/how-to-microdose/; 9 pages.
[Author Unknown] "What are Medication Blister Packs?", Drug Package LLC (Nov. 30, 2022) [online] https://web.archive.org/web/20221130004940/https://drugpackage.com/whats-new/ [Access Date: Feb. 1, 2023); 4 pages.
Caffrey et al., "The art and science of drug titration." Therapeutic Advances in Drug Safety. Sep. 2020; 11:1-14.
Canal CE. "Serotonergic psychedelics: experimental approaches for assessing mechanisms of action." In New Psychoactive Substances: Pharmacology, Clinical, Forensic and Analytical Toxicology, Springer International Publishing. Mar. 13, 2018; 227-260.
Dissanayaka et al., "Anxiety rating scales in Parkinson's disease: a critical review updating recent literature", International Psychogeriatrics (2015); 27(11): 1777-1784. doi: 10.1017/S1041610215000885. Epub Jun. 23, 2015.
Donzuso et al., "The neuroanatomical correlates of anxiety in a healthy population: differences between the State-Trait Anxiety Inventory and the Hamilton Anxiety Rating Scale", Brain and Behavior (2014); 4(4): 504-514. doi: 10.1002/brb3.232. Epub Jun. 18, 2014.
Ereshefsky et al., "Antidepressant Drug Interactions and the Cytochrome P450 System", Clinical Pharmacokinetics (1995); 29(Suppl 1): 10-19. doi: 10.2165/00003088-199500291-00004.
Extended European Search Report for European Application No. 22796524.1, by Mind Medicine, Inc., mailed Jun. 13, 2025, 17 pages.
Franke. "Symptom-Checkliste von LR Derogatis: SCL-90-R; deutsche Version: Beltz Test", (2002); 680 pages with English machine translation.
Isbell et al., "Cross Tolerance Between LSD and Psilocybin." Psychopharmacologia. May 1961;2(3):147-59.
Karlin et al., "MM120 (Lysergide) for GAD: Results From Mindmed's Phase 2 Trial", 2024 ASCP Annual Meeting, Innovations in Clinical Research: Broadening Clinical Trial Methods, Endpoints and Goals, Abstract Book, Miami Beach, Florida (May 28-31, 2024); pp. 42-43; 3 total pages.
Keks et al., "Switching and stopping antidepressants", Australian Prescriber, Australian Government—Publishing Service, Canberra, AU (Jun. 2016); 39(3): 76-83. doi: 10.18773/austprescr.2016.039. Epub Jun. 1, 2016.
Kim et al., "Structure of a hallucinogen-activated Gq-coupled 5-HT2A serotonin receptor", Cell (2020); 182(6): 1574-1588. doi: 10.1016/j.cell.2020.08.024.
Kuypers KP, "The therapeutic potential of microdosing psychedelics in depression." Therapeutic Advances in Psychopharmacology. Aug. 2020; 10: 1-15.
López-Giménez et al., "Hallucinogens and serotonin 5-HT 2A receptor-mediated signaling pathways." Curr Top Behav Neurosci. Jan. 1, 2018;36:45-73.
Niwaguchi et al., "Studies on Screening Test for Lysergic Acid Diethylamide by Test Paper." Proceedings of the Japan Academy. 1970;46(6):583-586.
Rigsbee et al., "Polymorph Investigation of Lysergic Acid Diethylamide (LSD) D-Tartrate", Triclinic Labs Scientific Report (Dec. 28, 2021); 43 pages.
Rosenberg et al., "Observations on direct and cross tolerance with LSD and d-amphetamine in man." Psychopharmacologia. Jan. 1963;5(1):1-5.
Rosenberg et al., "The effect of N, N-dimethyltryptamine in human subjects tolerant to lysergic acid diethylamide." Psychopharmacologia. May 1964;5(3):217-227.
Schell. "Defying Industry Setbacks, MindMed Advances Psychedelic to Phase 0001", Clinical Leader (Jul. 17, 2024) [online] https://www.clinicalleader.com/doc/defying-industry-setbacks-mindmed-advances-psychedelic-to-phase-0001; 2 pages.
Shulgin et al., "TIHKAL: The Continuation", Transform Press, Berkeley, CA (1997); pp. 159-191, 346-383, 592-611, 728-773; 152 total pages.
Stoll WA, "Lysergsaure-diathylamid, ein Phantastikum aus der Mutterkorngruppe . . . " Schweize Arch Neurol Psychair (Swiss Archives of Neurology and Psychiatry). 1947; 60:279-323; 48 pages with English Abstract.
Ungerleider J. Thomas "Chapter IV The acute side effects from LSD." in The Problems and Prospects of LSD. 1968: 61-68; 10 total pages.
U.S. Appl. No. 19/276,575, by Mack, Peter et al., filed Jul. 22, 2024.
Wolbach et al., "Cross tolerance between mescaline and LSD-25 with a comparison of the mescaline and LSD reactions." Psychopharmacologia. Jan. 1962;3(1):1-4.
Jacobsen et al. "Rapid and Durable Response to a Single Dose of MM120 (Lysergide) in Generalized Anxiety Disorder: A Dose Optimization Study." [poster] Interdisciplinary Conference on Psychedelic Research, Jun. 6-8, 2024, Haarlem, Netherlands; 1 page.

* cited by examiner

Fig. 1 – XRPD diffractogram of D-LSD Naphthalene-2-sulfonic acid salt

Fig. 2 – XRPD diffractogram of D-LSD tartaric acid (+ L) hemi-salt

Fig. 3 – XRPD diffractogram of D-LSD maleic acid salt form A

Fig. 4 – XRPD diffractogram of D-LSD maleic acid salt form B

Fig. 5 – XRPD diffractogram of D-LSD xinafoic acid salt form A

Fig. 6 – XRPD diffractogram of D-LSD xinafoic acid salt form A'

Fig. 7 – XRPD diffractogram of D-LSD phosphoric acid salt form A

Fig. 8 – XRPD diffractogram of D-LSD naphthalene-1,5-disulfonic acid hemi-salt

Fig. 9 – XRPD diffractogram of D-LSD oxalic acid salt form A

Fig. 10 – XRPD diffractogram of D-LSD benzoic acid salt form A

Fig. 11 – XRPD diffractogram of D-LSD benzoic acid salt form B

Fig. 12 – XRPD diffractogram of D-LSD fumaric acid salt

Fig. 13 – XRPD diffractogram of D-LSD fumaric acid salt hemi-salt

Fig. 14 – XRPD diffractogram of D-LSD ascorbic acid (L) salt form A

Fig. 15 – XRPD diffractogram of D-LSD ascorbic acid (L) salt form B

Fig. 16 – XRPD diffractogram of D-LSD tartaric acid (D) salt

Fig. 17 – XRPD diffractogram of D-LSD hydrochloric acid salt form A

Fig. 18 – XRPD diffractogram of D-LSD hydrochloric acid salt form A'

Fig. 19 – XRPD diffractogram of D-LSD hydrochloric acid salt form B

Fig. 20 – XRPD diffractogram of D-LSD hydrochloric acid salt form C

Fig. 21 – XRPD diffractogram of D-LSD hydrochloric acid salt form D

Fig. 22 – XRPD diffractogram of D-LSD hydrochloric acid salt form E

Fig. 23 – XRPD diffractograms of D-LSD free-base form A (bottom) and form B (top)

FIGURE 24 - the molecular structure of D-LSD

FIGURE 27 - NMR of D-LSD free base form B

FIGURE 29-DSC and TGA thermographs of D-LSD phosphoric acid salt form B

FIGURE 30- ¹H NMR of NMR of D-LSD phosphoric acid salt form B

FIGURE 31- ¹H NMR of NMR of D-LSD D-tartaric acid salt

FIGURE 32 - DSC and TGA thermographs of D-LSD Phosphoric acid salt form A

FIGURE 33 – DSC and TGA thermographs of D-LSD Maleate salt form A

FIGURE 34 - DSC and TGA thermographs of D-LSD Maleate salts form A and form B

FIGURE 36 – DSC thermogram of D-LSD phosphoric acid salt Pattern C

FIGURE 58 - D-LSD Phosphate salt Pattern A (bottom), Pattern B (second), Pattern C (third), Pattern D (fourth), and Pattern E (top)

FIGURE 61 - XRPD pattern for D-LSD sulphate amorphous salt

FIGURE 67 - ¹H NMR overlap between D-LSD Free Base (bottom) and D-LSD Hydrobromic salt (top)

FIGURE 70 XRPD patterns of D-LSD oxalate Pattern B after storage at 40°C/75% RH, (top), versus initial (bottom)

FIGURE 71 - XRPD patterns of D-LSD phosphate Pattern C after storage at 40°C/75% RH (top) versus initial (bottom)

FIGURE 76-DSC/TGA thermograms of D-LSD HBr Pattern B

FIGURE 77 - ¹H NMR of D-LSD HBr Pattern B

FIGURE 78 - DSC/TGA thermograms of D-LSD sulphate salt

FIGURE 79 - DSC/TGA thermograms of D-LSD HBr amorphous salt

FIGURE 81 - ¹H NMR spectrum of D-LSD sulphate Pattern A

LSD SALT CRYSTAL FORMS

BACKGROUND OF THE INVENTION

1. Technical Field

The present invention relates to compositions lysergic acid diethyl amide (LSD) in salt crystal forms.

2. Background Art

Lysergic acid diethyl amide (LSD) is a hallucinogenic drug that was synthesized in 1938 by Albert Hofmann. LSD has the effects in users of altered thoughts, feelings, and awareness of one's surroundings, generally thought to be due to alterations in the serotonin system. LSD can affect 5-HT1A, 5-HT2A, 5-HT2B, 5-HT2c, 5-HT5A, and 5-HT6 receptors, and it may increase glutamate release in the cerebral cortex. LSD can be produced in a crystal form, but then is converted to liquid or formed in tablets, capsules, gelatin squares, or absorbed in paper.

LSD is increasingly used as a therapeutic treatment in a safe setting for anxiety and depression and overcoming addiction. This treatment can be helpful in improving individual's mental health and allowing them to see a bigger picture beyond their own problems. For example, one study has found that LSD can change entrenched patterns of thought and enhanced individuals' feelings of openness, optimism, and mood.

The crystal structure of LSD bound to 5-HT2B was recently discovered. Wacker, et al. (Cell, Jan. 26, 2018) showed that there were conformational rearrangements in the receptor to accommodate LSD and that there is conformational selectivity for LSD's key diethylamide moiety.

In some cases, single pharmaceutical agents can exist in one or more of several unique crystal forms (polymorphs). Specific crystal forms of drugs can be desired in order to provide stability and better handling during processing. Vippangunta, et al. (Adv Drug Deliv Rev. 2001 May 16; 48(1):3-26.) state that phase transitions such as polymorph interconversion, desolvation of solvate, formation of hydrate and conversion of crystalline to amorphous form may occur during various pharmaceutical processes, which may alter the dissolution rate and transport characteristics of the drug. Specifically, the various polymorphic forms of pharmaceutical agents may have varying properties related to, for example, particle size, filtration rates, hygroscopicity, ability to micronize, stability, dissolution rates, dispersibility in powders and bioavailability. Polymorph screening can facilitate identification of the polymorphic of a drug with the most favorable solid state and pharmacological profiles. This is particularly important as polymorphic form profiles may differ from free-base to various solid crystalline salt forms. Furthermore, crystalline forms can affect ex vivo and in vivo stability, targeting, solubility, dissolution rate, and bioavailability. Selection of an optimal polymorph can improve performance in the body for compounds that have intrinsic barriers to drug delivery, such as low aqueous solubility, slow dissolution in gastrointestinal media, low permeability, and first-pass metabolism (Yadav, et al. Indian J Pharm Sci, 2009, 71 (4): 359-370).

Because LSD is gaining momentum as a useful therapeutic agent for treatment of mental health indications, various formulations are under development for indication-appropriate administration. Because the various polymorphic forms of LSD salt forms have not been evaluated, formulations currently in development may not be optimal for their intended usages. Therefore, there remains a need for the identification and characterization of LSD polymorphic forms and for the identification of the polymorphic forms of crystalline salt forms of LSD.

SUMMARY OF THE INVENTION

The present invention provides for polymorphic forms of lysergic acid diethyl amide (LSD) in crystalline salt forms.

The present invention also provides for a pharmaceutical formulation of polymorphic forms of LSD in crystalline salt forms including pharmaceutically acceptable excipients.

In one embodiment, the present invention provides for polymorphic forms of LSD free-base.

In one embodiment, the present invention provides for polymorphic forms of a salt form of LSD.

In one embodiment, the salt form of LSD comprises LSD and an acid selected from 1-hydroxy-2-naphthoic acid, 2,2-dichloroacetic acid, 2-hydroxyethanesulfonic acid, 2-oxoglutaric acid, 4-acetamidobenzoic acid, 4-aminosalicylic acid, acetic acid, adipic acid, L-ascorbic acid, D-ascorbic acid, L-aspartic acid, D-aspartic acid, benzenesulfonic acid, benzoic acid, (+)-camphoric acid, (−)-camphoric acid, (+)-camphor-10-sulfonic acid, (−)-camphor-10-sulfonic acid, capric acid (decanoic acid), caproic acid (hexanoic acid), caprylic acid (octanoic acid), carbonic acid, cinnamic acid, citric acid, cyclamic acid, dodecylsulfuric acid, ethane-1,2-disulfonic acid, ethanesulfonic acid, formic acid, fumaric acid, galactaric acid, gentisic acid, D-glucoheptonic acid, L-glucoheptonic acid, D-gluconic acid, L-gluconic acid, D-glucuronic acid, L-glucuronic acid, L-glutamic acid, D-glutamic acid, glutaric acid, glycerophosphoric acid, glycolic acid, hippuric acid, hydrobromic acid, hydrochloric acid, isobutyric acid, D,L-lactic acid, D-lactic acid, L-lactic acid, lactobionic acid, lauric acid, maleic acid, L-malic acid, D-malic acid, malonic acid, D,L-mandelic acid, D-mandelic acid, L-mandelic acid, methanesulfonic acid, naphthalene-1,5-disulfonic acid, naphthalene-2-sulfonic acid, nicotinic acid, nitric acid, oleic acid, oxalic acid, palmitic acid, pamoic acid, phosphoric acid, proprionic acid, L-pyroglutamic acid, D-pyroglutamic acid, salicylic acid, sebacic acid, stearic acid, succinic acid, sulfuric acid, L-tartaric acid, D-tartaric acid, meso-tartaric acid, thiocyanic acid, para-toluenesulfonic acid, undecylenic acid and xinafoic acid.

DESCRIPTION OF THE DRAWINGS

Other advantages of the present invention are readily appreciated as the same becomes better understood by reference to the following detailed description when considered in connection with the accompanying drawings wherein.

DETAILED DESCRIPTION OF THE INVENTION

Figure 1:
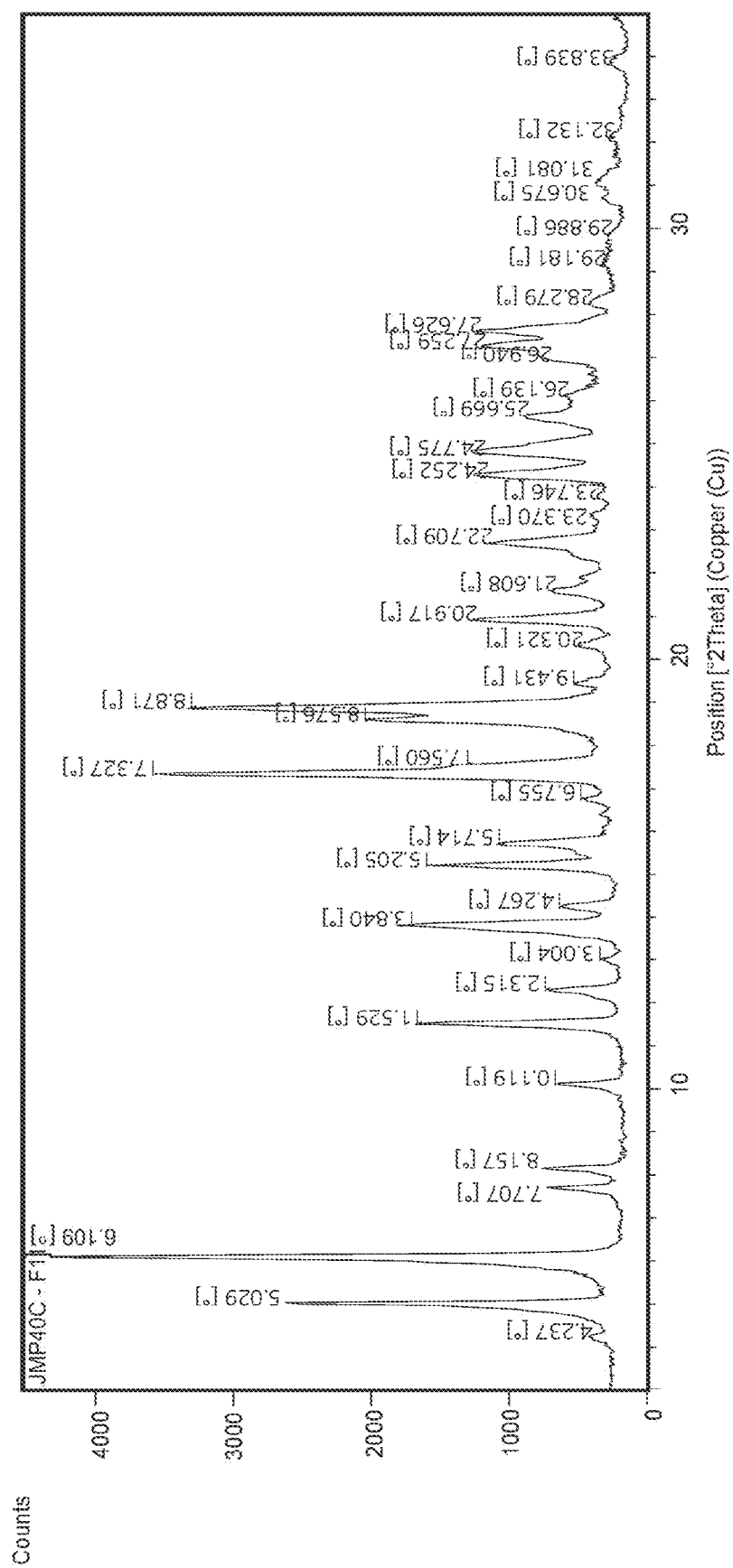
FIG. 1 is an XPRD diffractogram of D-LSD Naphthalene-2-sulfonic acid salt.

The present invention provides for polymorphic forms of lysergic acid diethyl amide (LSD) in crystalline salt forms.

The crystalline salt forms include free-base LSD, which is a basic amine, optionally along with an acid.

The crystalline forms can be an anhydrate, a hydrate, or a solvate. A hydrate can have a molecular ratio of water to LSD of about 0.25 to about 10. The solvate can include an organic solvent such as methanol, ethanol, isopropanol, tetrahydrofuran, dioxane, ethyl acetate, hexane, benzene, toluene, xylene, tert-butyl methyl ether, diethyl ether, dibutyl ether, acetone, anisole, isopropyl acetate, methylethyl ketone, 1-propanol, or tert-butylmethyl ether. The form can also be amorphous.

The acid can be, but is not limited to, 1-hydroxy-2-naphthoic acid, 2,2-dichloroacetic acid, 2-hydroxyethanesulfonic acid, 2-oxoglutaric acid, 4-acetamidobenzoic acid, 4-aminosalicylic acid, acetic acid, adipic acid, L-ascorbic acid, D-ascorbic acid, L-aspartic acid, D-aspartic acid, benzenesulfonic acid, benzoic acid, (+)-camphoric acid, (−)-camphoric acid, (+)-camphor-10-sulfonic acid, (−)-camphor-10-sulfonic acid, capric acid (decanoic acid), caproic acid (hexanoic acid), caprylic acid (octanoic acid), carbonic acid, cinnamic acid, citric acid, cyclamic acid, dodecylsulfuric acid, ethane-1,2-disulfonic acid, ethanesulfonic acid, formic acid, fumaric acid, galactaric acid, gentisic acid, D-glucoheptonic acid, L-glucoheptonic acid, D-gluconic acid, L-gluconic acid, D-glucuronic acid, L-glucuronic acid, L-glutamic acid, D-glutamic acid, glutaric acid, glycerophosphoric acid, glycolic acid, hippuric acid, hydrobromic acid, hydrochloric acid, isobutyric acid, D,L-lactic acid, D-lactic acid, L-lactic acid, lactobionic acid, lauric acid, maleic acid, L-malic acid, D-malic acid, malonic acid, D,L-mandelic acid, D-mandelic acid, L-mandelic acid, methanesulfonic acid, naphthalene-1,5-disulfonic acid, naphthalene-2-sulfonic acid, nicotinic acid, nitric acid, oleic acid, oxalic acid, palmitic acid, pamoic acid, phosphoric acid, proprionic acid, L-pyroglutamic acid, D-pyroglutamic acid, salicylic acid, sebacic acid, stearic acid, succinic acid, sulfuric acid, L-tartaric acid, D-tartaric acid, meso-tartaric acid, thiocyanic acid, para-toluenesulfonic acid, undecylenic acid and xinafoic acid. Any stereoisomers of the acids can also be used, i.e. (L) or (D) or (D,L), (+) or (−), or (meso) where appropriate. Salt stoichiometry can be used for acids such as tartaric acid or citric acid or other di- or tri-carboxylic acids, di- or tri-sulfonic acids or others generally known to one skilled in the art (LSD:acid of 1:0.5, 1:1, 2:1, 3:1, etc.).

It is understood by one skilled in the art that other acids are useful for the preparation of salt forms of LSD. It is further understood by one skilled in the art that said salt forms of LSD may exist in multiple polymorphic forms.

It is understood by one skilled in the art that salt forms of LSD may exist as anhydrates, hydrates, solvates and co-crystals. It is further understood by one skilled in the art that said hydrates, solvates and co-crystals may exist in multiple polymorphic forms. The salt can have a molecular ratio of an acid to LSD of from about 0.25 to about 3.

It is understood by one skilled in the art that salt forms of LSD may exist with varying stoichiometric ratios between the LSD free-base and the acid component of an LSD salt form. One skilled in the art will recognize that this property is not necessarily dependent upon the number of acidic residues present on the acid unit. For example, a mono-acid may form a mono-salt a hemi-salt or an alternate free-base/acid combination. Likewise, a di-acid may form a hemi-salt, a mono-salt, or an alternate free-base/acid combination. It is further understood by one skilled in the art that salt forms with differing stoichiometric ratios between the free-base and the acid components are unique salt forms and may exist in different polymorphic forms.

The LSD crystalline salt forms can be characterized and identified by X-ray powder diffraction (XPRD) signals, melting points, differential scanning calorimetry (DSC), thermogravimetric analysis (TGA), infrared spectroscopy (IR), or other methods known to one skilled in the art.

The LSD crystalline salt forms can be made by various methods such as, but not limited to, slurry at room temperature, solid vapor diffusion (diffusion of a vapor of a volatile solvent, in which the LSD is not soluble, into a solvent containing the sample to be crystallized), temperature cycling (successive heating-cooling cycles for dissolution and recrystallization), slow evaporation at different temperatures, liquid vapor diffusion, polymer induced crystallization, anti-solvent addition (adding a liquid miscible with a solvent that reduces LSD solubility in the new mixed solvent), grinding, or other methods known to one skilled in the art.

In one embodiment, the present invention provides for polymorphic forms of lysergic acid diethyl amide (LSD) in crystalline salt forms. In some embodiments, said polymorphic forms of LSD may be LSD free-base, a hydrate of LSD free-base or a solvate of LSD free-base. In some embodiments, the polymorphic form of LSD is a hydrate of LSD. In some embodiments, the polymorphic form of LSD is a solvate of LSD. In some embodiments, the polymorphic form of LSD is the free-base of LSD.

In one embodiment, the present invention provides for polymorphic forms of a salt form of LSD. In some embodiments, said polymorphic forms of a salt form of LSD may be a salt form of LSD, a hydrate of a salt form of LSD, a solvate of a salt form of LSD or a co-crystal of LSD comprising LSD free-base and an acid. In some embodiments, the polymorphic form of a salt form of LSD is a hydrate of a salt form of LSD. In some embodiments, the polymorphic form of a salt form of LSD is a solvate of a salt form of LSD. In some embodiments, the polymorphic form of LSD is a co-crystal of LSD comprising LSD free-base and an acid.

The EXAMPLES below show several different polymorphs. D-LSD phosphate salt can be pattern A, pattern B, pattern C, pattern D, pattern E, pattern F, or pattern G. D-LSD oxalate salt can be pattern A, pattern B, pattern C, pattern D, pattern E, pattern F, pattern G, or pattern H. D-LSD sulfate salt can be pattern A. D-LSD HBr salt can be pattern A, pattern B, or pattern C.

In one embodiment, the salt form of LSD comprises LSD and an acid selected from 1-hydroxy-2-naphthoic acid, 2,2-dichloroacetic acid, 2-hydroxyethanesulfonic acid, 2-oxoglutaric acid, 4-acetamidobenzoic acid, 4-aminosalicylic acid, acetic acid, adipic acid, L-ascorbic acid, D-ascorbic acid, L-aspartic acid, D-aspartic acid, benzenesulfonic acid, benzoic acid, (+)-camphoric acid, (−)-camphoric acid, (+)-camphor-10-sulfonic acid, (−)-camphor-10-sulfonic acid, capric acid (decanoic acid), caproic acid (hexanoic acid), caprylic acid (octanoic acid), carbonic acid, cinnamic acid, citric acid, cyclamic acid, dodecylsulfuric acid, ethane-1,2-disulfonic acid, ethanesulfonic acid, formic acid, fumaric acid, galactaric acid, gentisic acid, D-glucoheptonic acid, L-glucoheptonic acid, D-gluconic acid, L-gluconic acid, D-glucuronic acid, L-glucuronic acid, L-glutamic acid, D-glutamic acid, glutaric acid, glycerophosphoric acid, glycolic acid, hippuric acid, hydrobromic acid, hydrochloric acid, isobutyric acid, D,L-lactic acid, D-lactic acid, L-lactic acid, lactobionic acid, lauric acid, maleic acid, L-malic acid, D-malic acid, malonic acid, D,L-mandelic acid, D-mandelic acid, L-mandelic acid, methanesulfonic acid, naphthalene-1,5-disulfonic acid, naphthalene-2-sulfonic acid, nicotinic acid, nitric acid, oleic acid, oxalic acid, palmitic acid, pamoic acid, phosphoric acid, proprionic acid, L-pyroglutamic acid, D-pyroglutamic acid, salicylic acid, sebacic acid, stearic acid, succinic acid, sulfuric acid, L-tartaric acid, D-tartaric acid, meso-tartaric acid, thiocyanic acid, para-toluenesulfonic acid, undecylenic acid and xinafoic acid.

In a preferred embodiment, the salt form of LSD comprises LSD and an acid selected from acetic acid, hydrochloric acid, methanesulfonic acid, maleic acid, L-malic acid, D-malic acid, meso-tartaric acid, L-tartaric acid, D-tartaric acid, citric acid, succinic acid, para-toluenesulfonic acid, sulfuric acid, phosphoric acid, benzenesulfonic acid, xinafoic acid, hydrobromic acid, oxalic acid, L-aspartic acid, D-aspartic acid, naphthalene-1,5-disulfonic acid, L-glutamic acid, D-glutamic acid, malonic acid, fumaric acid, D-glucuronic acid, D-gluconic acid, glycolic acid, L-ascorbic acid, naphthalene-2-sulfonic acid, benzoic acid and ethane-1,2-disulfonic acid.

In a more preferred embodiment, the salt form of LSD comprises LSD and an acid selected from hydrochloric acid, methanesulfonic acid, maleic acid, meso-tartaric acid, L-tartaric acid, D-tartaric acid, phosphoric acid, benzenesulfonic acid, xinafoic acid, hydrobromic acid, oxalic acid, naphthalene-1,5-disulfonic acid, fumaric acid, L-ascorbic acid, naphthalene-2-sulfonic acid, benzoic acid, L-malic acid, citric acid, malonic acid and sulfuric acid.

In a most preferred embodiment, the salt form of LSD comprises LSD and an acid selected from maleic acid, L-tartaric acid, D-tartaric acid, phosphoric acid, xinafoic acid, oxalic acid, naphthalene-1,5-disulfonic acid, naphthalene-2-sulfonic acid, L-ascorbic acid, fumaric acid and benzoic acid. In some embodiments, the salt form of LSD comprises LSD and L-tartaric acid. In some embodiments, the salt form of LSD comprises LSD and D-tartaric acid. In some embodiments, the salt form of LSD comprises LSD and phosphoric acid. In some embodiments, the salt form of LSD comprises LSD and xinafoic acid. In some embodiments, the salt form of LSD comprises LSD and oxalic acid.

In some embodiments, the salt form of LSD comprises LSD and naphthalene-1,5-disulfonic acid. In some embodiments, the salt form of LSD comprises LSD and fumaric acid. In some embodiments, the salt form of LSD comprises LSD and naphthalene-2-sulfonic acid. In some embodiments, the salt form of LSD comprises LSD and L-ascorbic acid. In some embodiments, the salt form of LSD comprises LSD and benzoic acid.

The naphthalene-2-sulfonic acid salt of D-LSD is characterized by an x-ray powder diffraction pattern obtained by irradiation with Cu Kα x-rays having peaks expressed as 2θ at about 5.0, about 6.1, about 11.5, about 17.3 and about 18.9 (FIG. 1).

Figure 2:
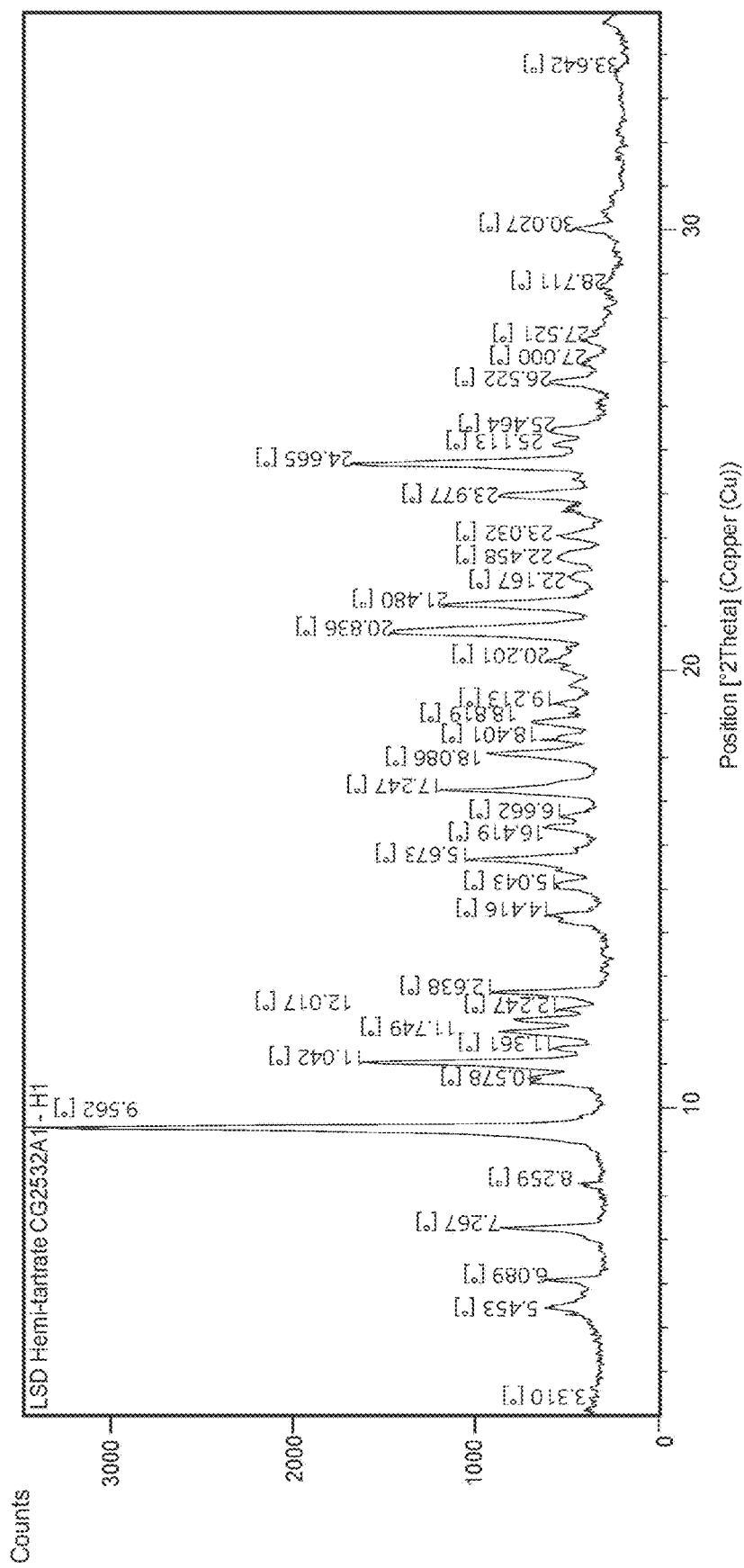
FIG. 2 is an XRPD diffractogram of D-LSD tartaric acid (+L) hem i-salt.

The L-tartaric acid hemi-salt of D-LSD is characterized by an x-ray powder diffraction pattern obtained by irradiation with Cu Kα x-rays having peaks expressed as 2θ at about 9.6, about 11, about 20.8 and about 24.7 (FIG. 2).

Figure 3:
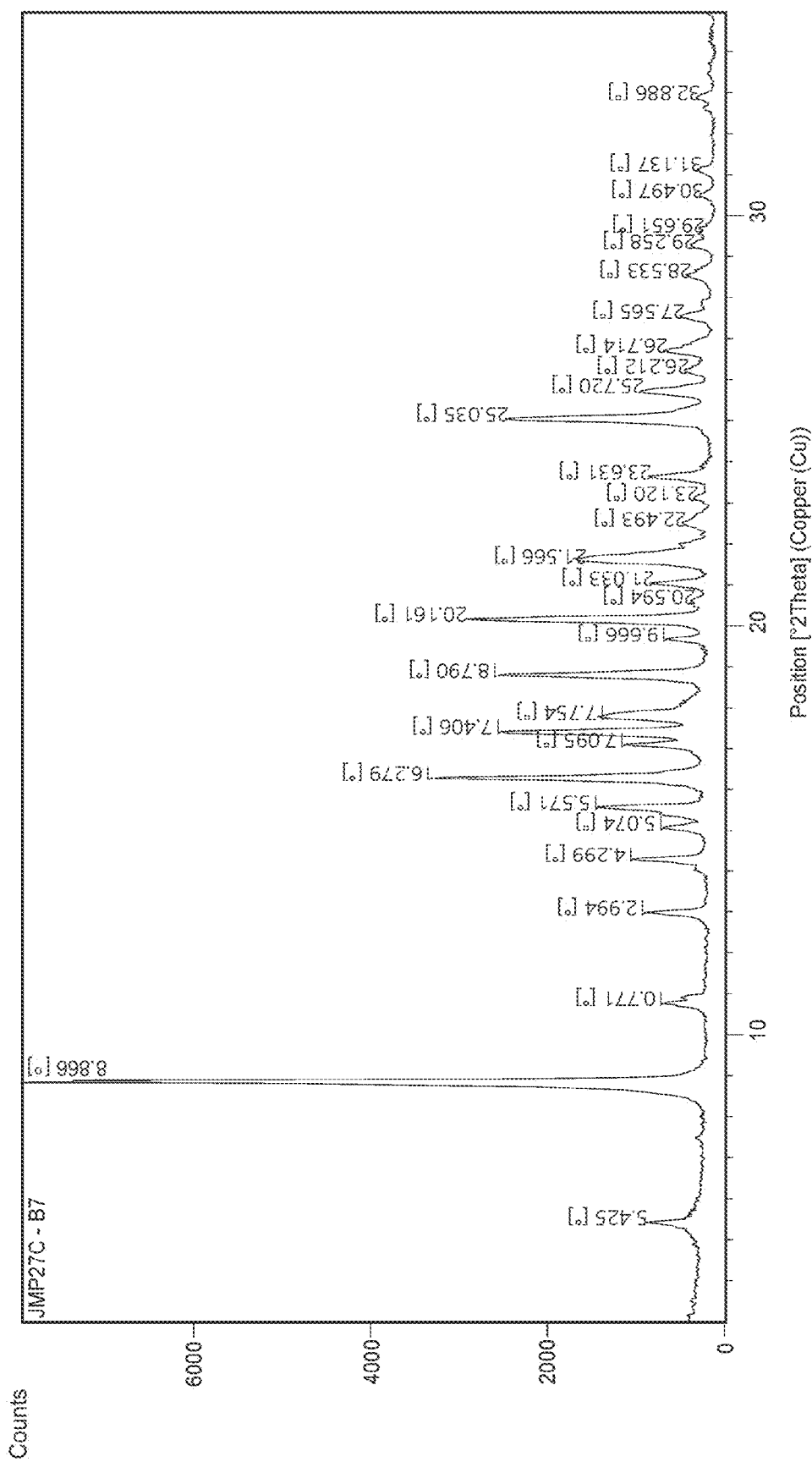
FIG. 3 is an XRPD diffractogram of D-LSD maleic acid salt form A.

The maleic acid salt form A of D-LSD is characterized by an x-ray powder diffraction pattern obtained by irradiation with Cu Kα x-rays having peaks expressed as 2θ at about 8.8, about 16.2, about 17.4, about 18.8, about 20.1 and about 25.0 (FIG. 3).

Figure 4:
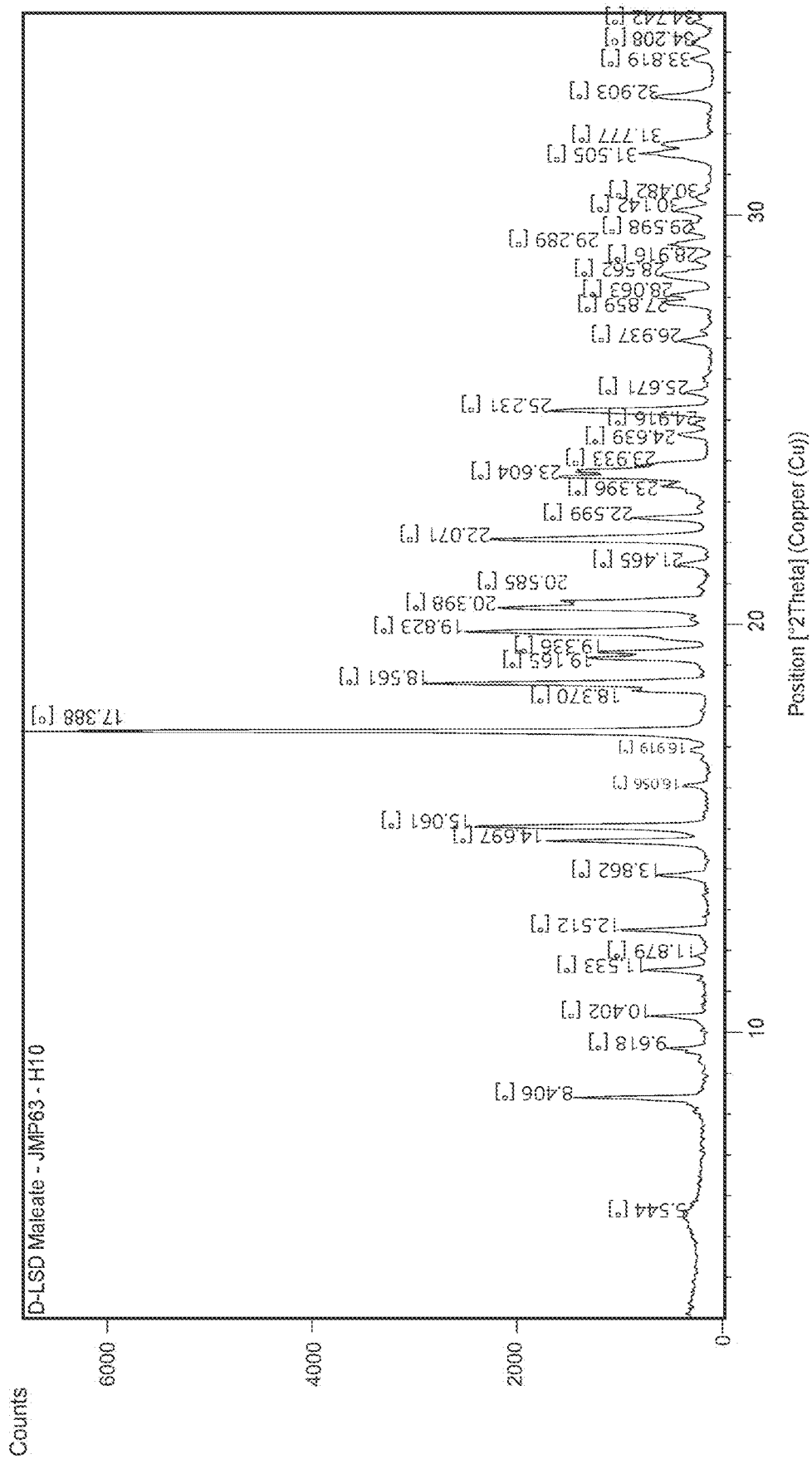
FIG. 4 is an XRPD diffractogram of D-LSD maleic acid salt form B.

The maleic acid salt form B of D-LSD is characterized by an x-ray powder diffraction pattern obtained by irradiation with Cu Kα x-rays having peaks expressed as 2θ at about 8.4, about 14.7, about 15.1, about 17.4 and about 22.1 (FIG. 4).

Figure 5:
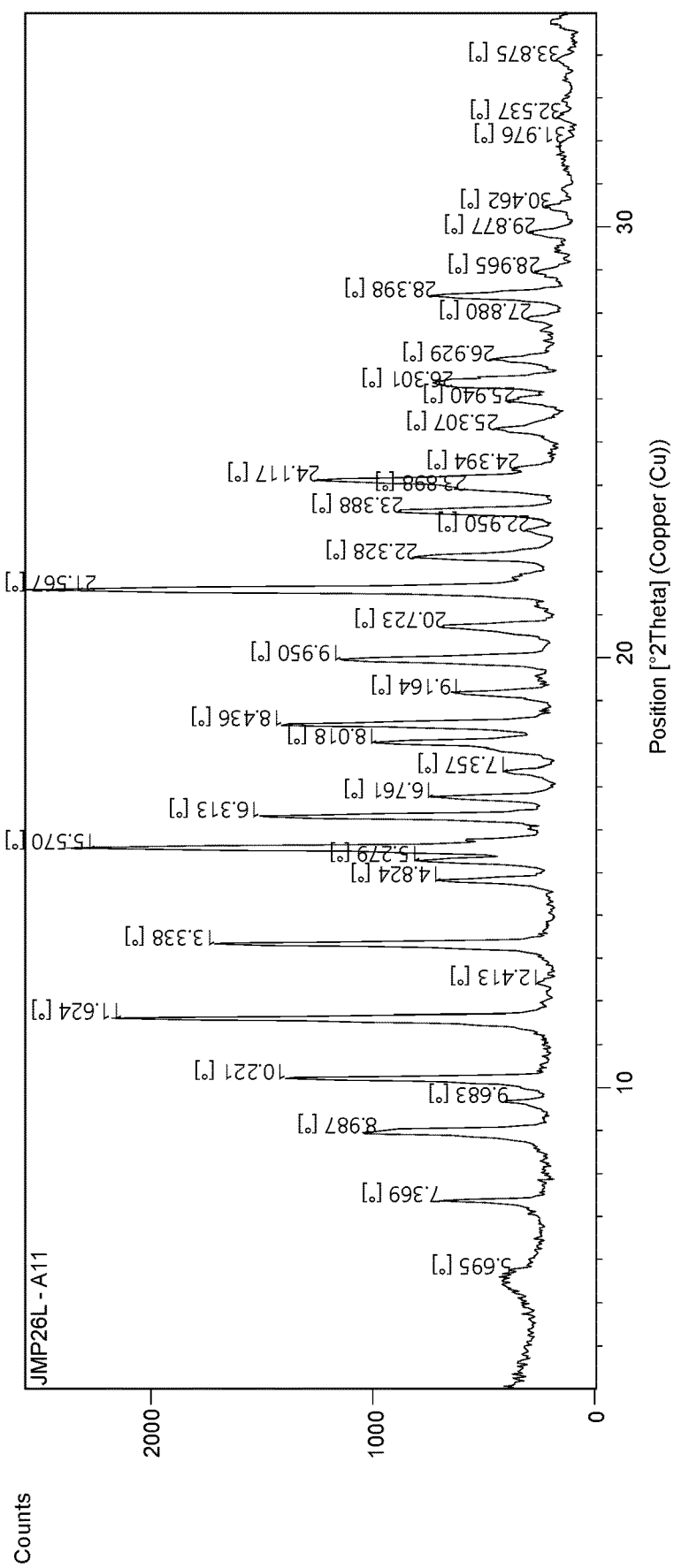
FIG. 5 is an XRPD diffractogram of D-LSD xinafoic acid salt form A.

The xinafoic acid salt form A of D-LSD is characterized by an x-ray powder diffraction pattern obtained by irradiation with Cu Kα x-rays having peaks expressed as 2θ at about 10.2, about 11.6, about 13.3, about 15.6 and about 21.6 (FIG. 5).

Figure 6:
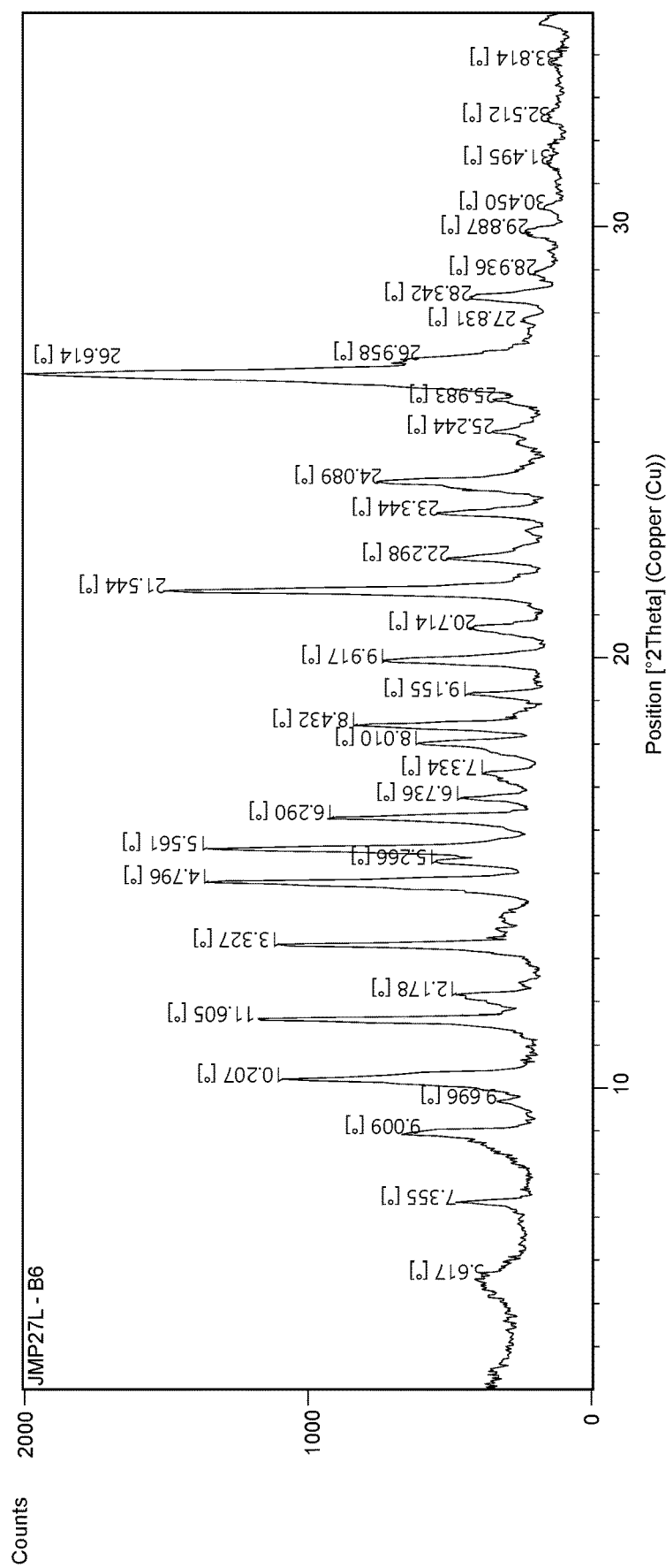
FIG. 6 is an XRPD diffractogram of D-LSD xinafoic acid salt form A'.

The xinafoic acid salt form A' of D-LSD is characterized by an x-ray powder diffraction pattern obtained by irradiation with Cu Kα x-rays having peaks expressed as 2θ at about 14.7, about 15.6, about 21.5 and about 26.6 (FIG. 6).

Figure 7:
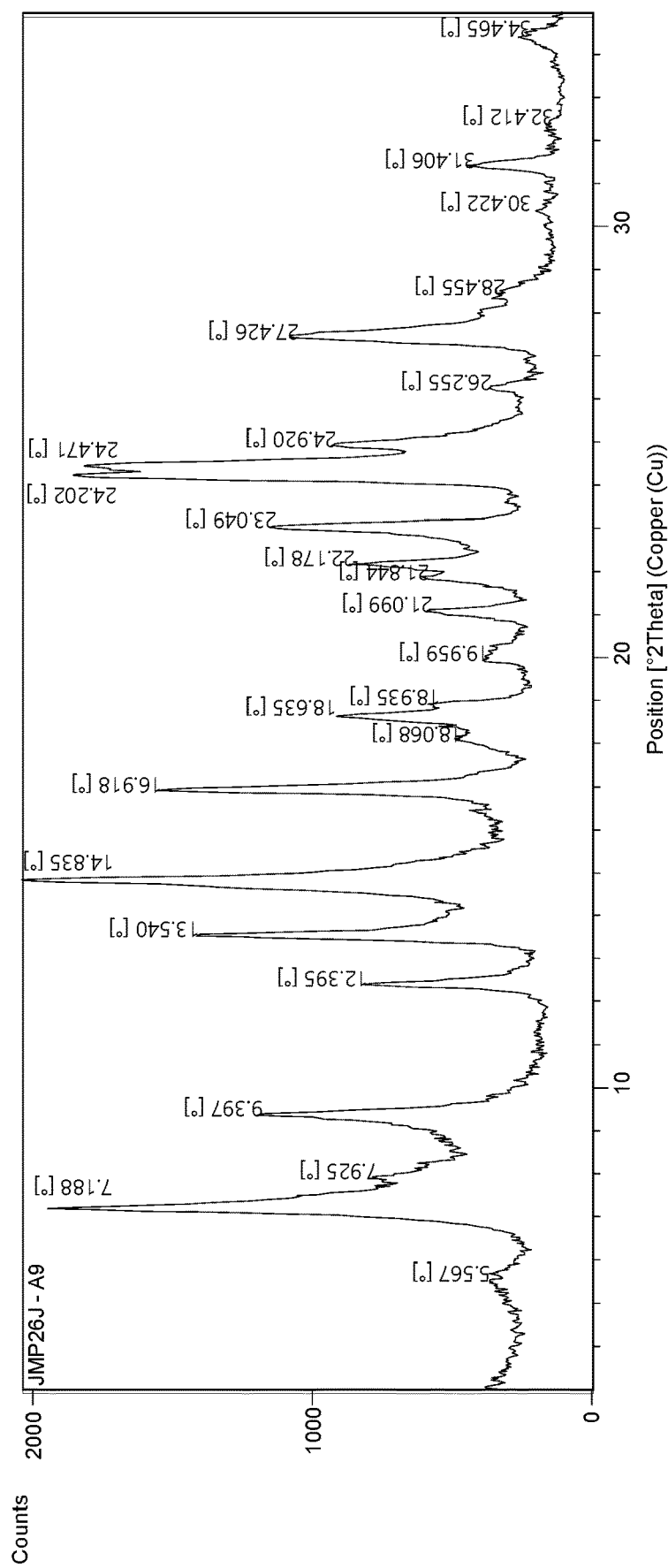
FIG. 7 is an XRPD diffractogram of D-LSD phosphoric acid salt form A.

The phosphoric acid salt form A of D-LSD is characterized by an x-ray powder diffraction pattern obtained by irradiation with Cu Kα x-rays having peaks expressed as 2θ at about 7.2, about 13.5, about 16.9, about 23.0 and about 24.5 (FIG. 7).

Figure 8:
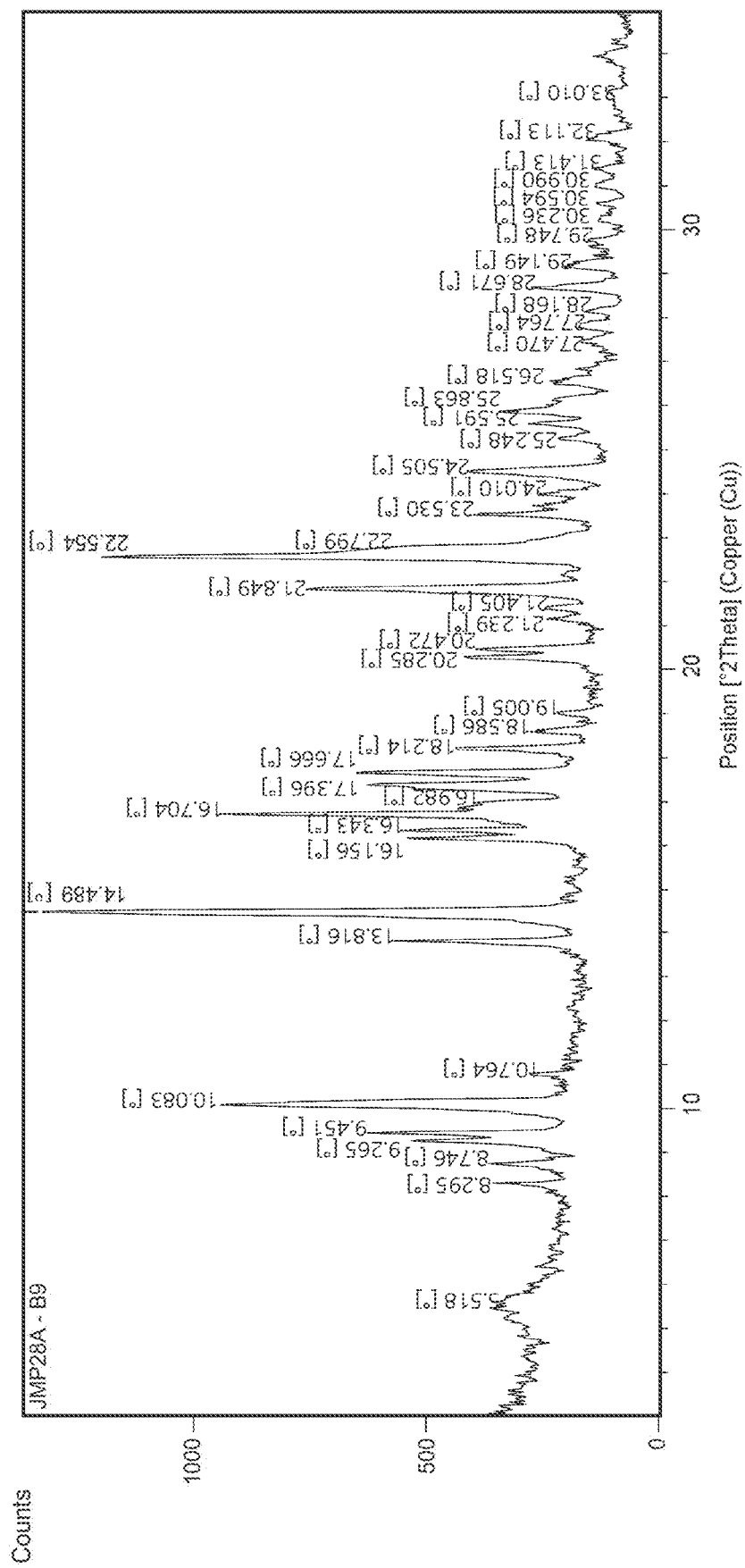
FIG. 8 is an XRPD diffractogram of D-LSD naphthalene-1,5-disulfonic acid hemi-salt.

The naphthalene-1,5-disulfonic acid hemi-salt of D-LSD is characterized by an x-ray powder diffraction pattern obtained by irradiation with Cu Kα x-rays having peaks expressed as 2θ at about 10.1, about 14.4, about 16.7, about 23.5, about 24.5, about 21.9 and about 22.6 (FIG. 8).

Figure 9:
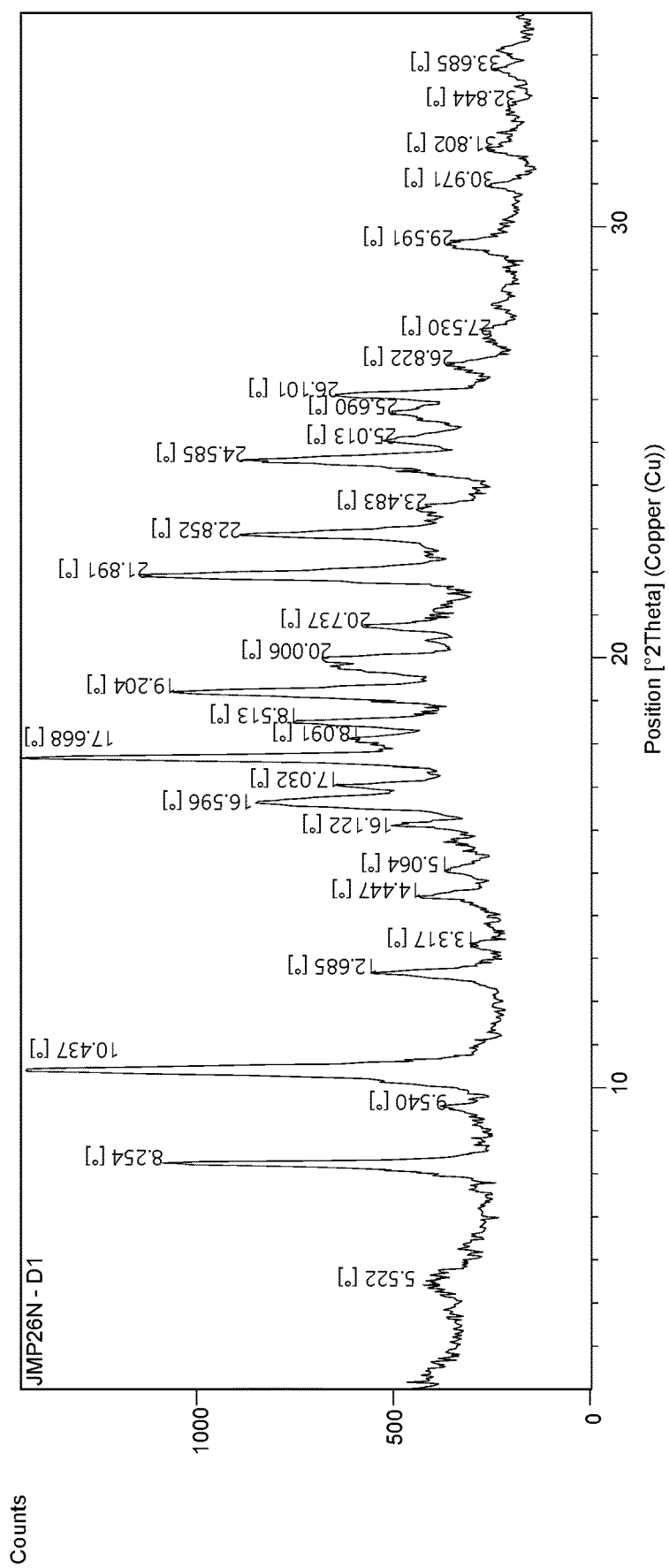
FIG. 9 is an XRPD diffractogram of D-LSD oxalic acid salt form A.

The oxalic acid salt form A of D-LSD is characterized by an x-ray powder diffraction pattern obtained by irradiation with Cu Kα x-rays having peaks expressed as 2θ at about 8.2, about 10.4, about 17.7, about 19.2 and about 21.9 (FIG. 9).

Figure 10:
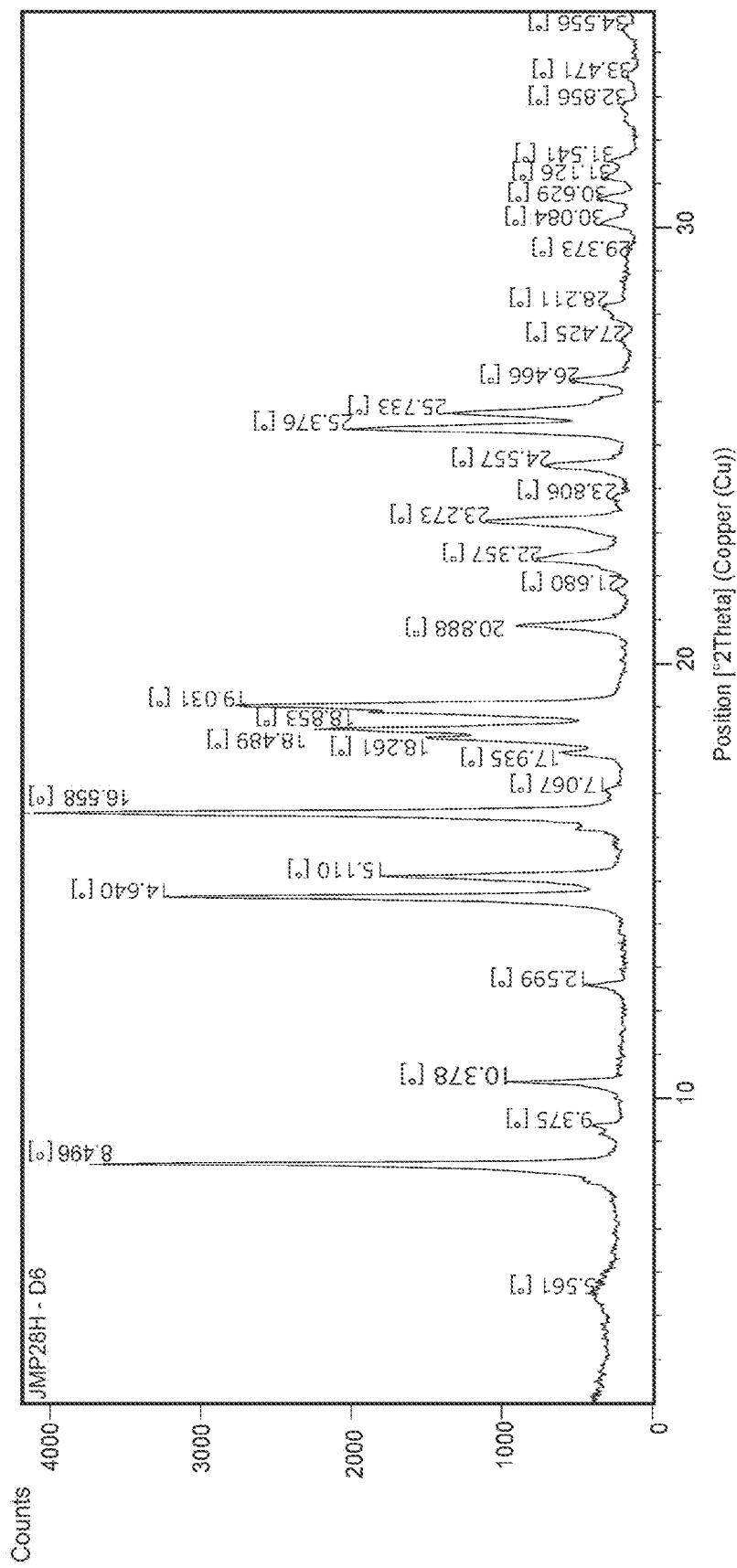
FIG. 10 is an XRPD diffractogram of D-LSD benzoic acid salt form A.

The benzoic acid salt form A of D-LSD is characterized by an x-ray powder diffraction pattern obtained by irradiation with Cu Kα x-rays having peaks expressed as 2θ at about 8.5, about 14.6, about 16.6, about 18.5 and about 19.0 (FIG. 10).

Figure 11:
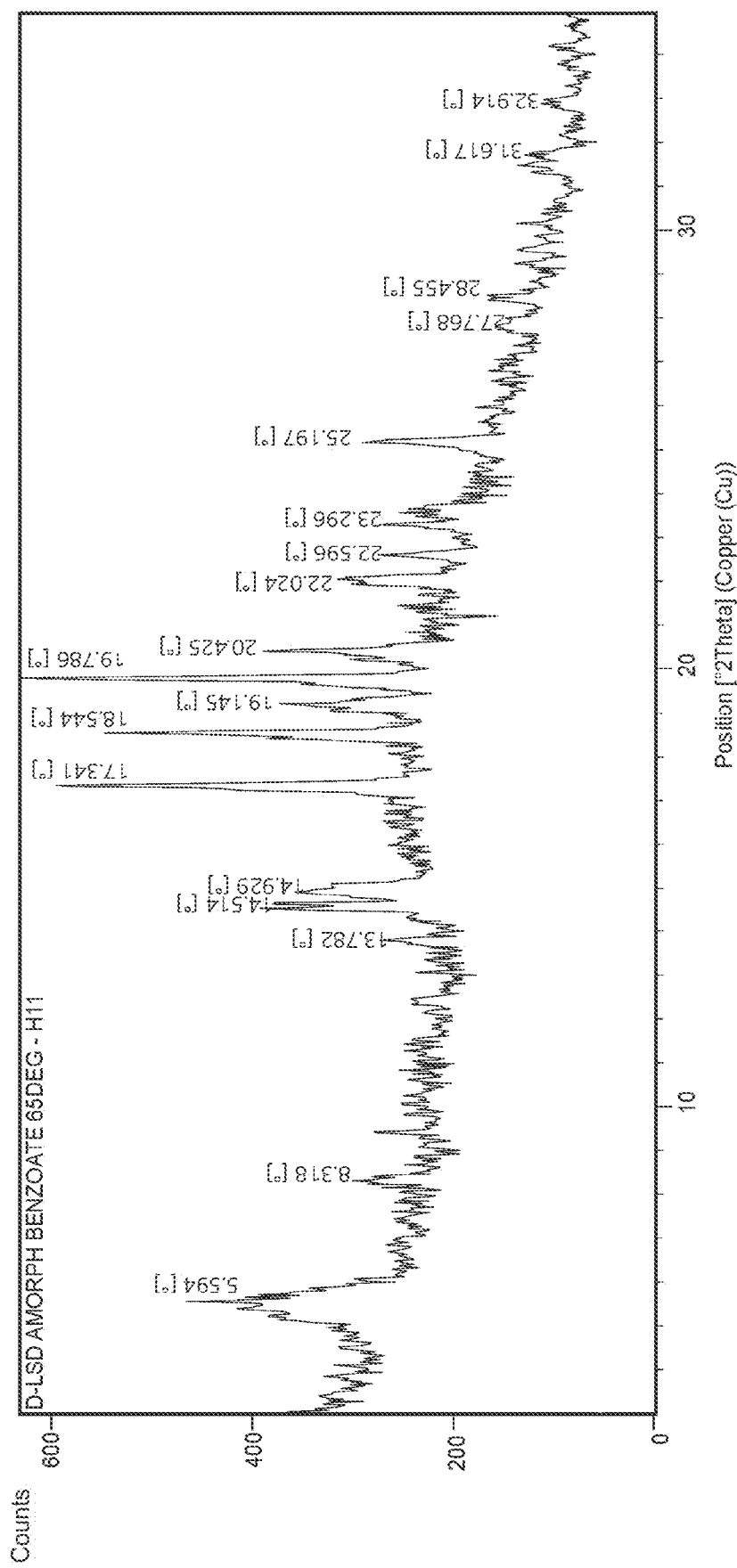
FIG. 11 is an XRPD diffractogram of D-LSD benzoic acid salt form B.

The benzoic acid salt form B of D-LSD is characterized by an x-ray powder diffraction pattern obtained by irradiation with Cu Kα x-rays having peaks expressed as 2θ at about 17.3, about 19.8, about 20.4 and about 25.2 (FIG. 11).

Figure 12:
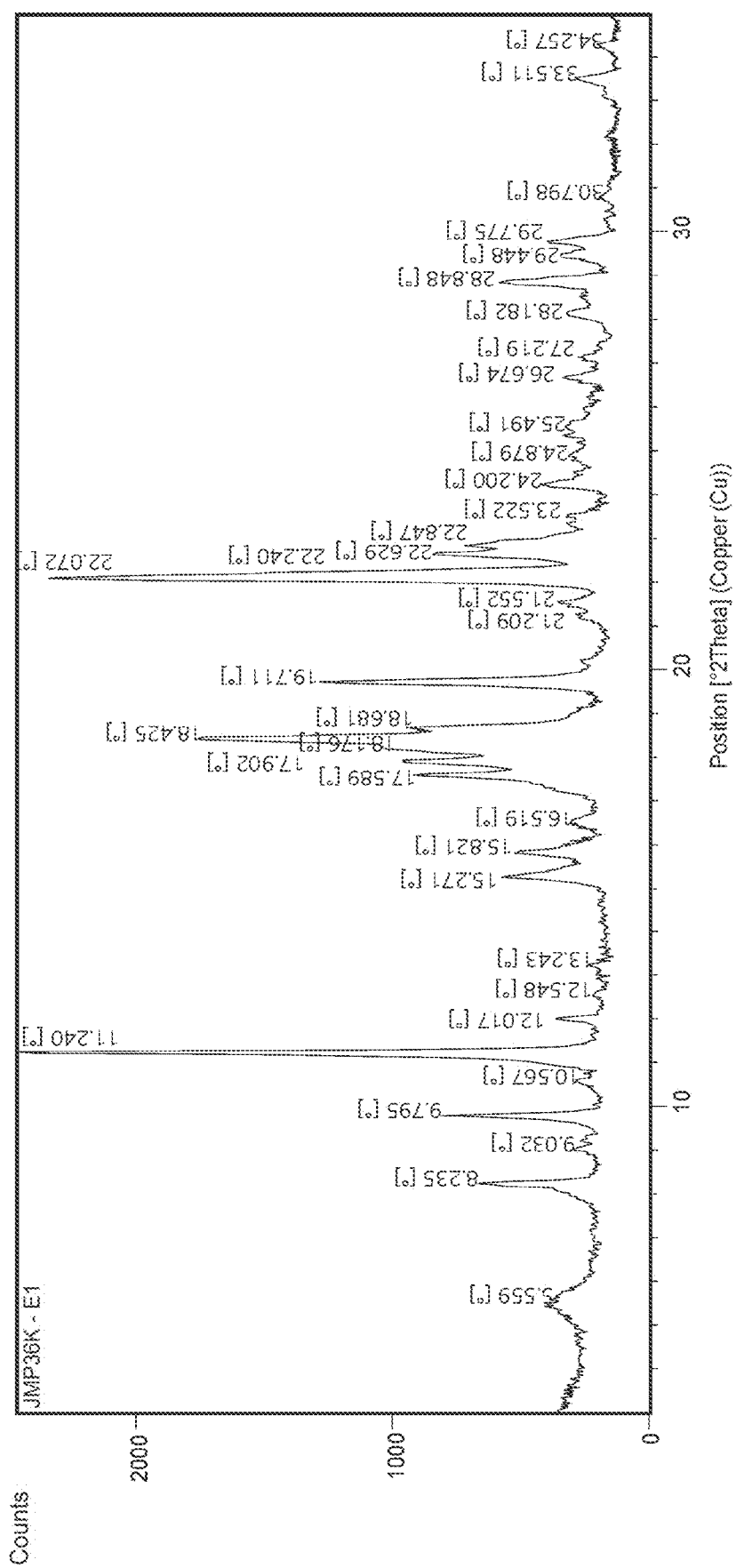
FIG. 12 is an XRPD diffractogram of D-LSD fumaric acid salt.

The fumaric acid salt of D-LSD is characterized by an x-ray powder diffraction pattern obtained by irradiation with Cu Kα x-rays having peaks expressed as 2θ at about 11.2, about 18.4, about 19.7 and about 22.1 (FIG. 12).

Figure 13:
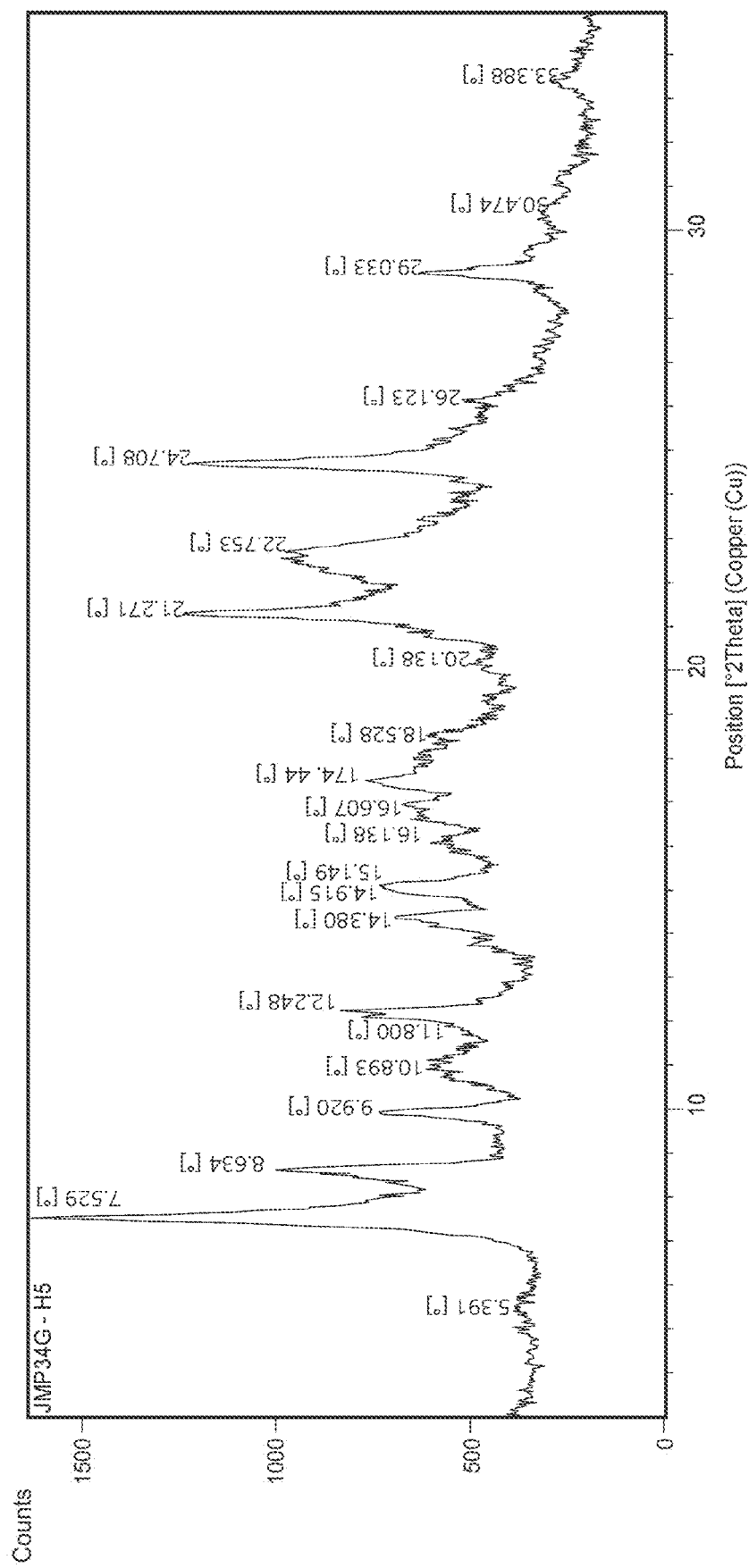
FIG. 13 is an XRPD diffractogram of D-LSD fumaric acid salt hemi-salt.

The fumaric acid hemi-salt of D-LSD is characterized by an x-ray powder diffraction pattern obtained by irradiation with Cu Kα x-rays having peaks expressed as 2θ at about 7.5, about 21.3, about 22.7 and about 24.7 (FIG. 13).

Figure 14:
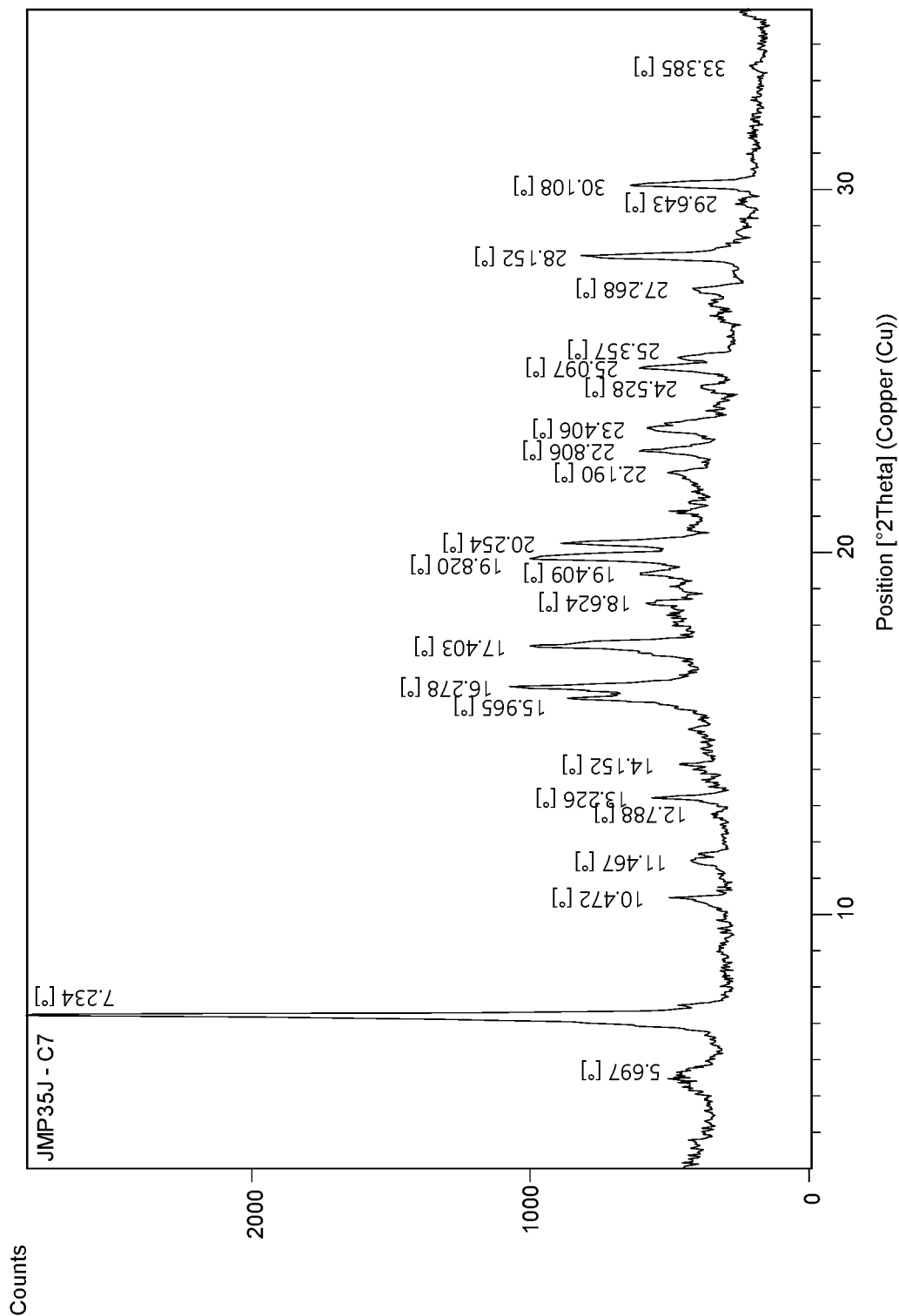
FIG. 14 is an XRPD diffractogram of D-LSD ascorbic acid (L) salt form A.

The L-ascorbic acid salt form A of D-LSD is characterized by an x-ray powder diffraction pattern obtained by irradiation with Cu Kα x-rays having peaks expressed as 2θ at about 7.2, about 16.3, about 19.8 and about 28.2 (FIG. 14).

Figure 15:
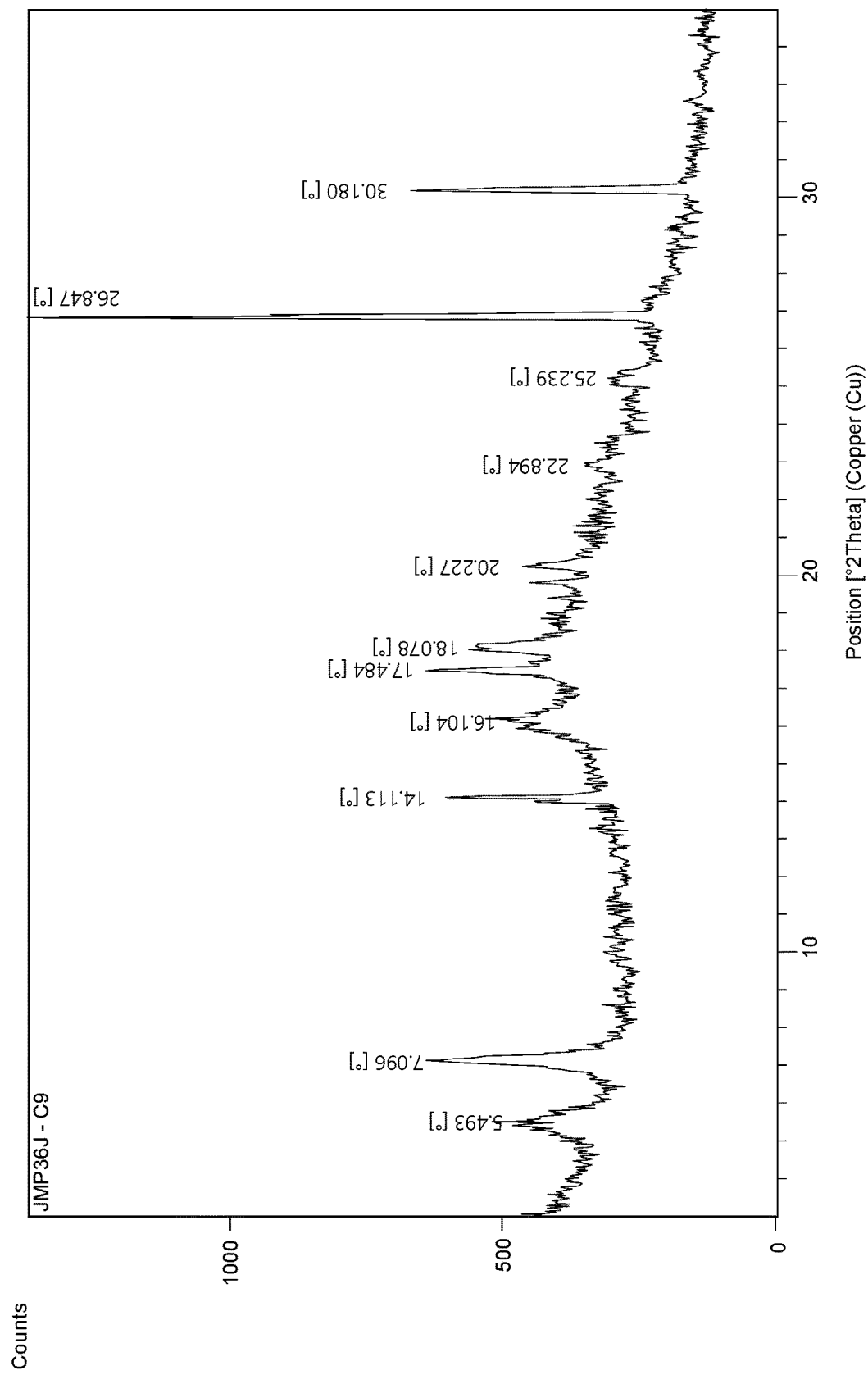
FIG. 15 is an XRPD diffractogram of D-LSD ascorbic acid (L) salt form B.

The L-ascorbic acid salt form B of D-LSD is characterized by an x-ray powder diffraction pattern obtained by irradiation with Cu Kα x-rays having peaks expressed as 2θ at about 7.1, about 17.5, about 26.8 and about 30.2 (FIG. 15).

Figure 16:
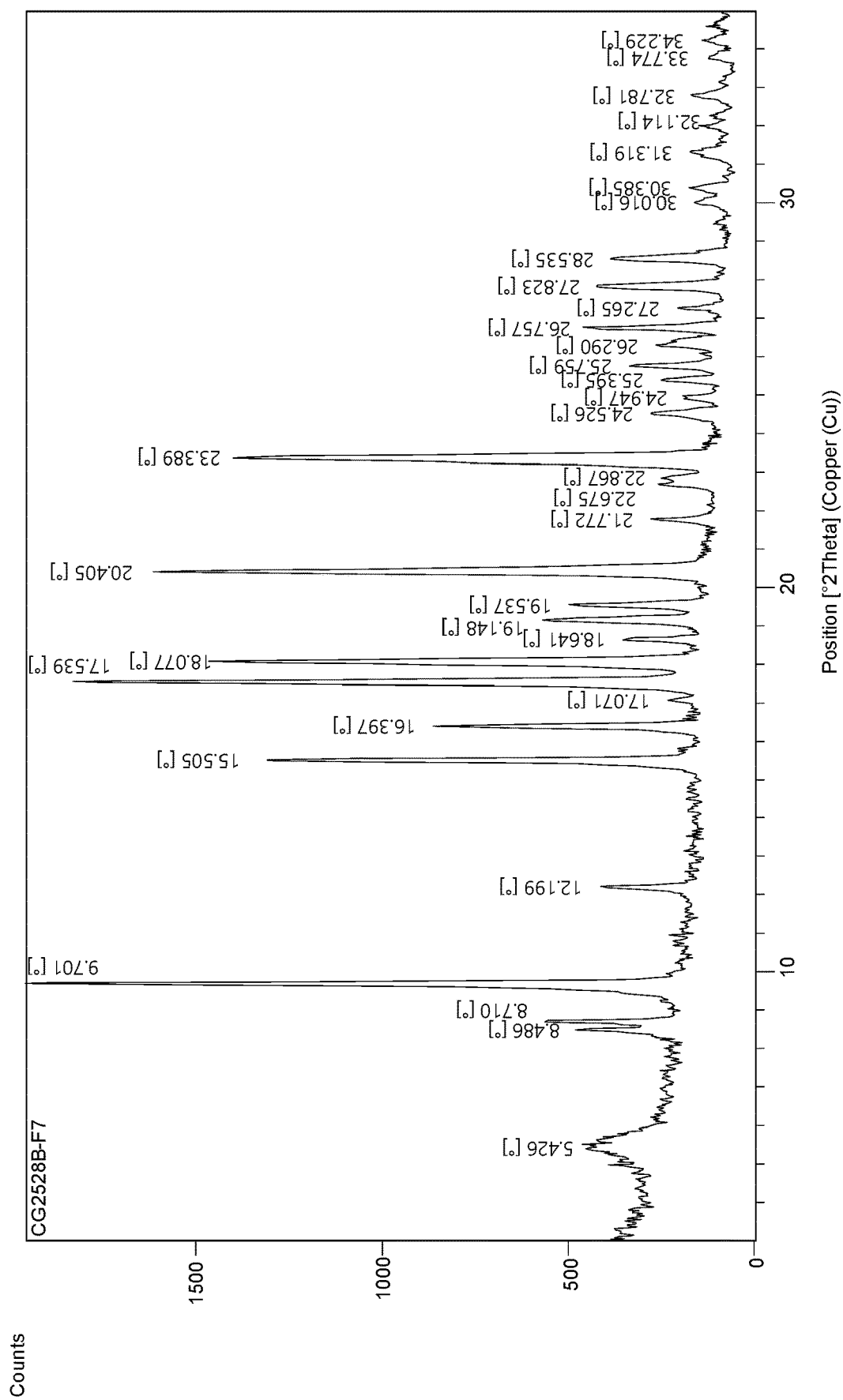
FIG. 16 is an XRPD diffractogram of D-LSD D-tartaric acid salt.

The D-tartaric acid salt of D-LSD is characterized by an x-ray powder diffraction pattern obtained by irradiation with Cu Kα x-rays having peaks expressed as 2θ at about 9.7, about 15.5, about 17.5, about 20.4 and about 23.4 (FIG. 16).

Figure 17:
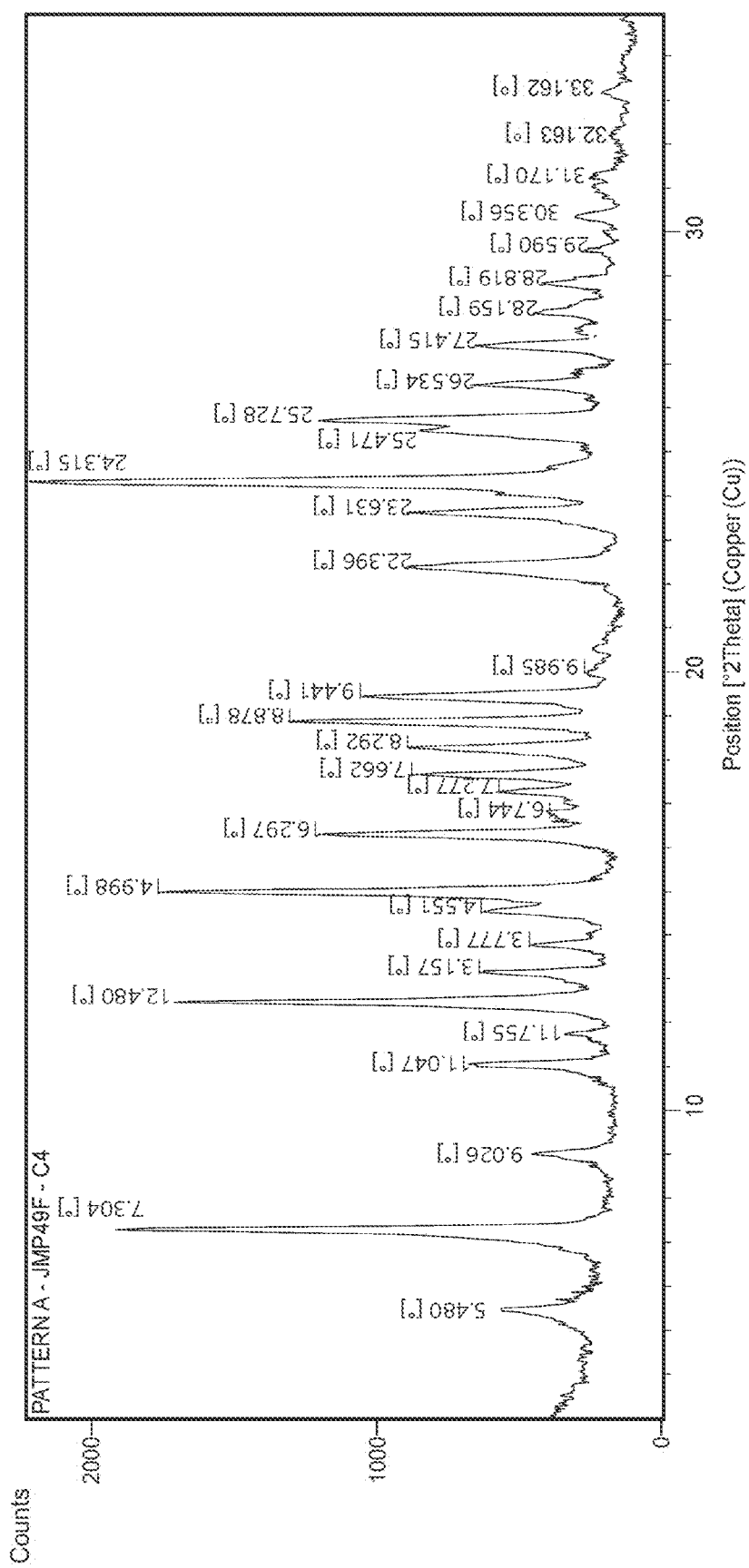
FIG. 17 is an XRPD diffractogram of D-LSD hydrochloric acid salt form A.

The hydrochloric acid salt form A of D-LSD is characterized by an x-ray powder diffraction pattern obtained by irradiation with Cu Kα x-rays having peaks expressed as 2θ at about 7.3, about 12.5, about 15.0, about 16.3 and about 24.3 (FIG. 17).

Figure 18:
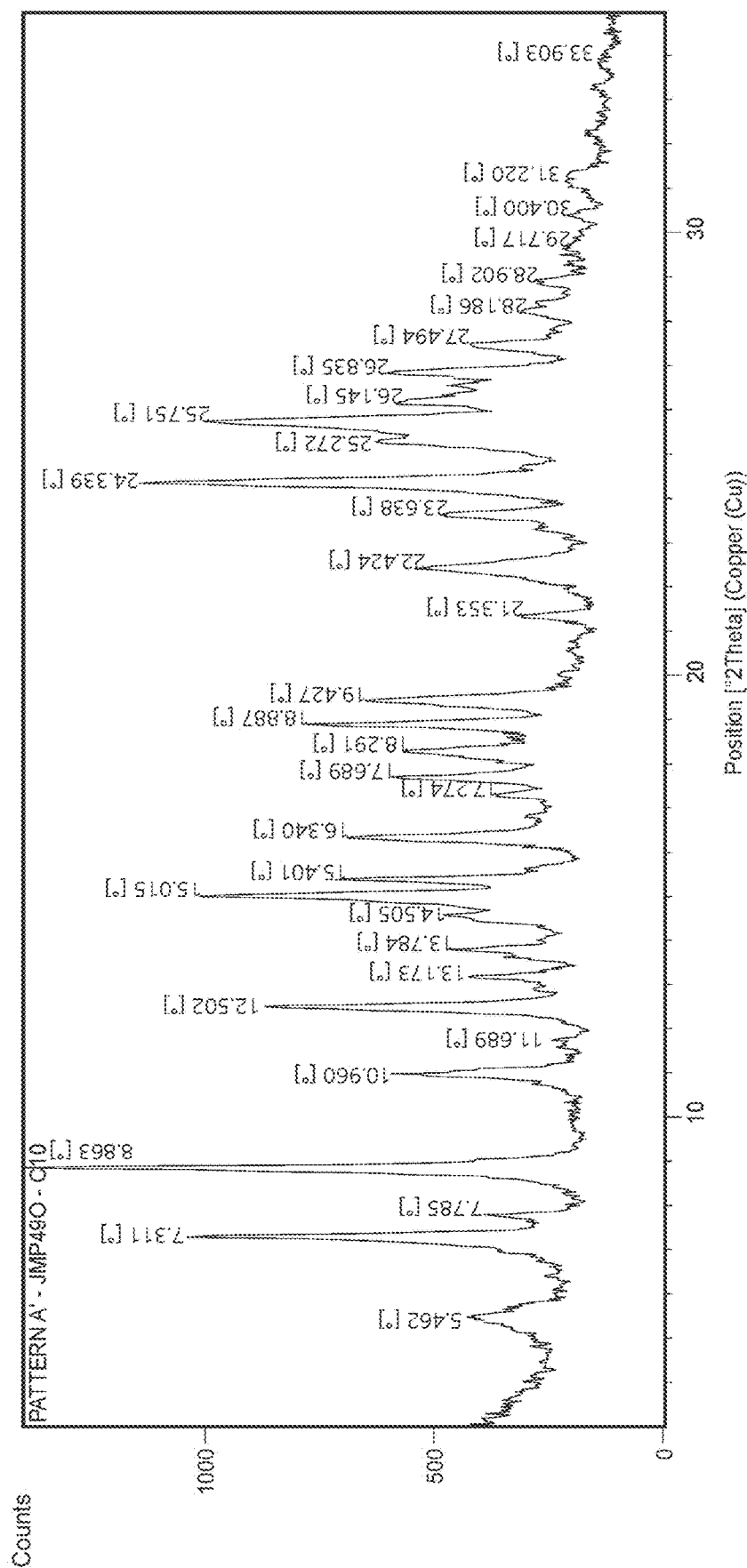
FIG. 18 is an XRPD diffractogram of D-LSD hydrochloric acid salt form A'.

The hydrochloric acid salt form A' of D-LSD is characterized by an x-ray powder diffraction pattern obtained by irradiation with Cu Kα x-rays having peaks expressed as 2θ at about 7.3, about 8.9, about 12.5, about 15.0 and about 24.3 (FIG. 18).

Figure 19:
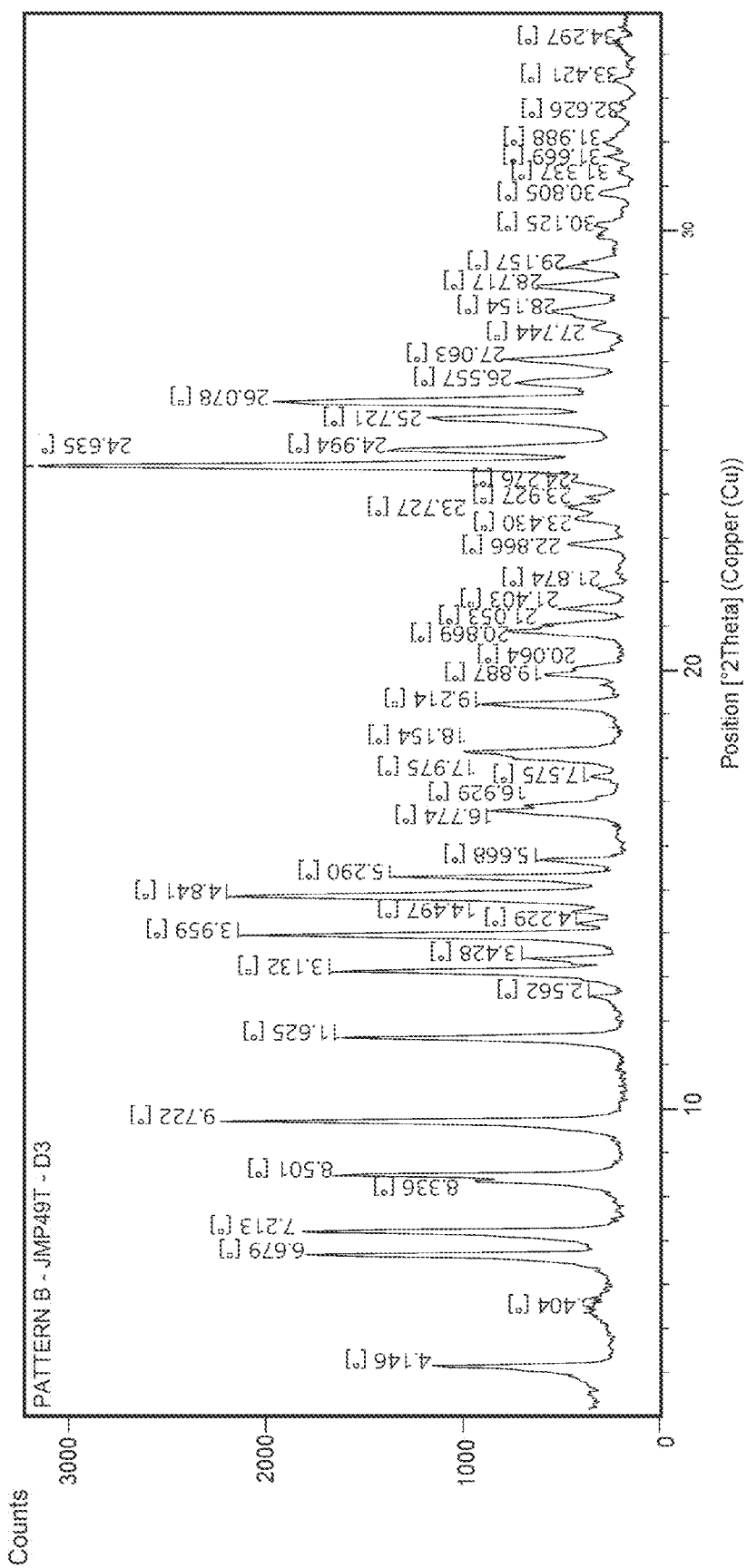
FIG. 19 is an XRPD diffractogram of D-LSD hydrochloric acid salt form B.

The hydrochloric acid salt form B of D-LSD is characterized by an x-ray powder diffraction pattern obtained by irradiation with Cu Kα x-rays having peaks expressed as 2θ at about 6.7, about 7.2, about 9.7, about 14.8 and about 24.6 (FIG. 19).

Figure 20:
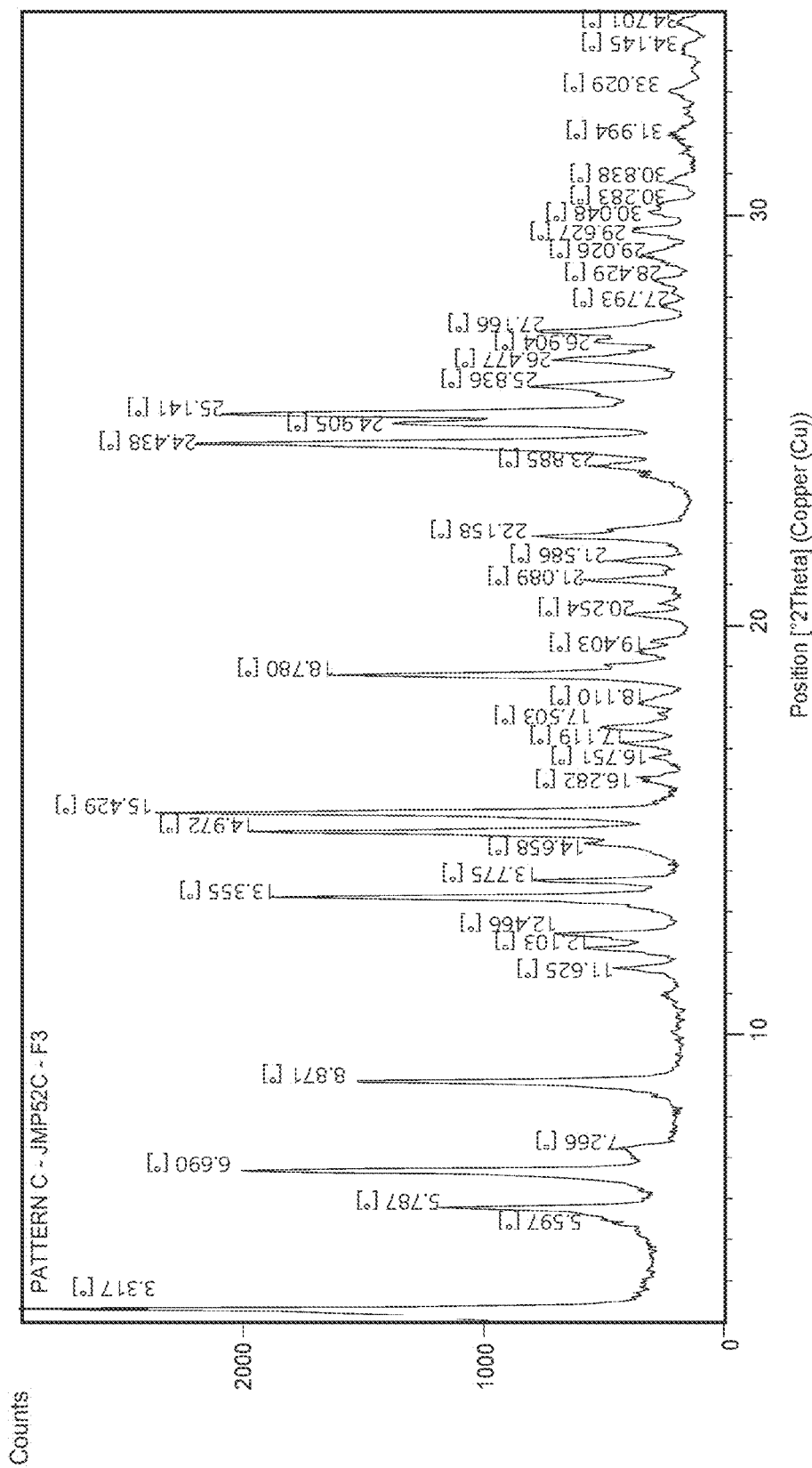
FIG. 20 is an XRPD diffractogram of D-LSD hydrochloric acid salt form C.

The hydrochloric acid salt form C of D-LSD is characterized by an x-ray powder diffraction pattern obtained by irradiation with Cu Kα x-rays having peaks expressed as 2θ at about 5.8, about 6.7, about 15.4, about 18.8 and about 24.4 (FIG. 20).

Figure 21:
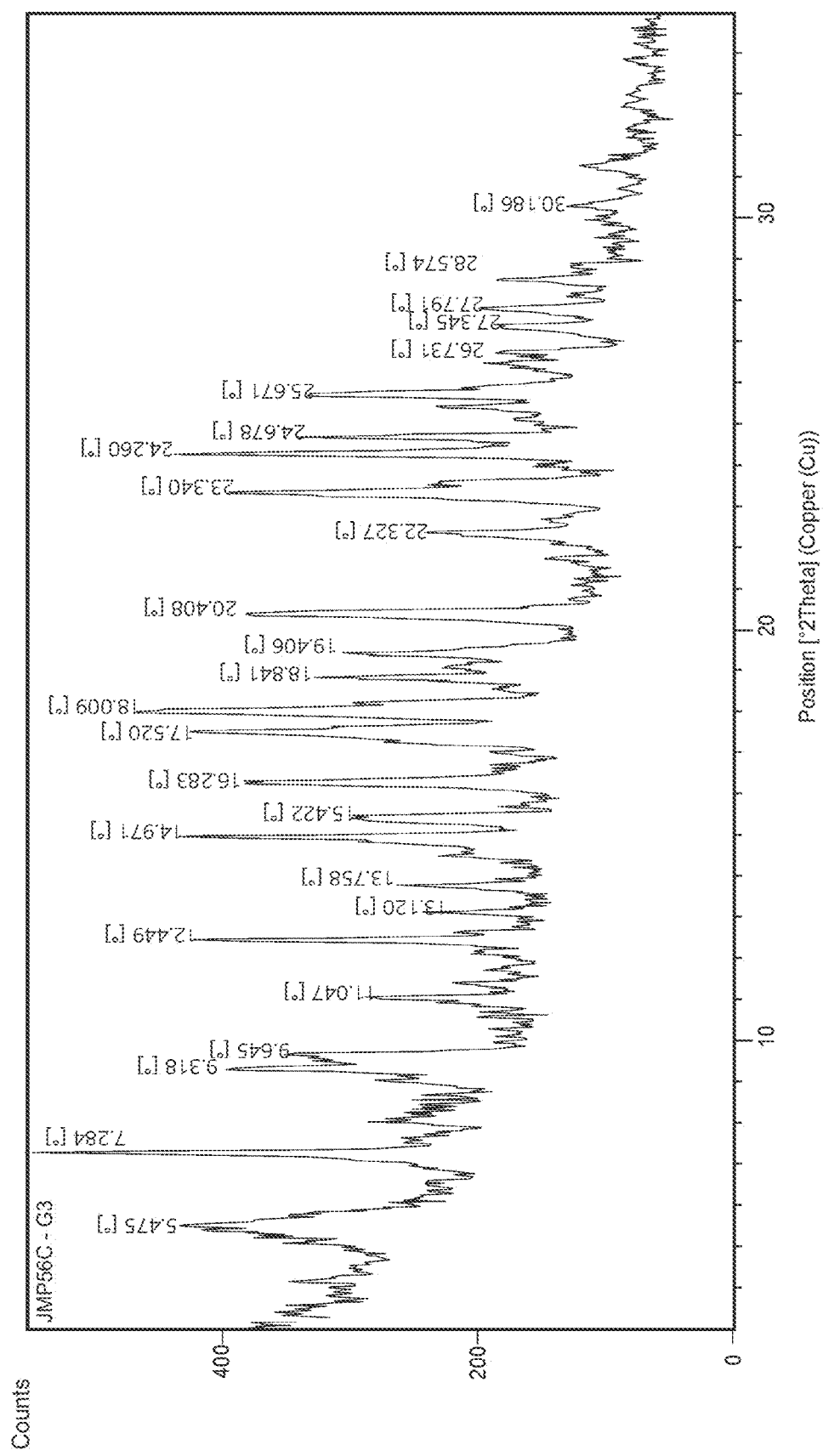
FIG. 21 is an XRPD diffractogram of D-LSD hydrochloric acid salt form D.

The hydrochloric acid salt form D of D-LSD is characterized by an x-ray powder diffraction pattern obtained by irradiation with Cu Kα x-rays having peaks expressed as 2θ at about 7.3, about 12.4, about 15.0, about 18.0 and about 24.2 (FIG. 21).

Figure 22:
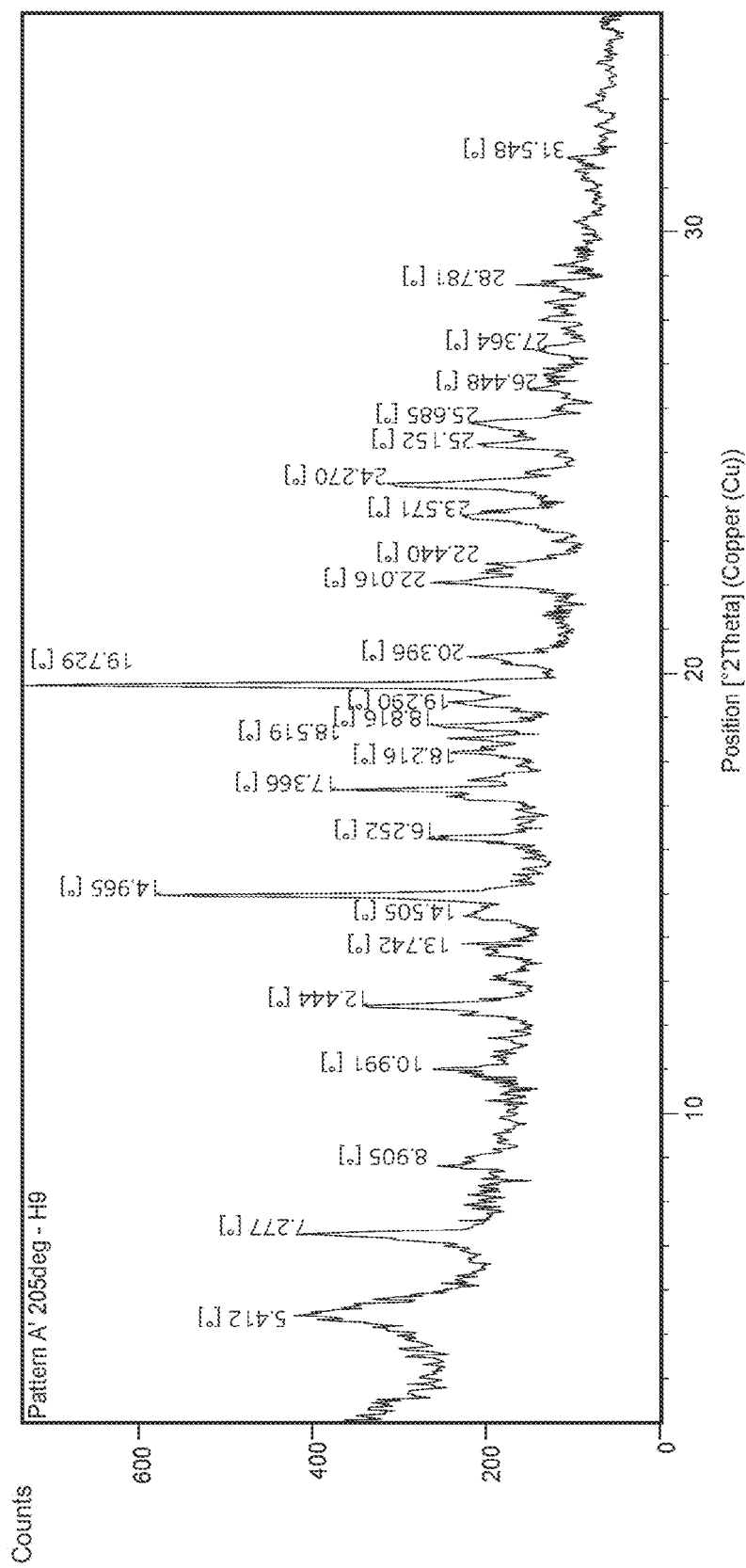
FIG. 22 is an XRPD diffractogram of D-LSD hydrochloric acid salt form E.

The hydrochloric acid salt form E of D-LSD is characterized by an x-ray powder diffraction pattern obtained by irradiation with Cu Kα x-rays having peaks expressed as 2θ at about 7.3, about 12.4, about 15.0, about 19.7 and about 24.3 (FIG. 22).

The LSD crystalline salt forms can be stored as is or prepared in a pharmaceutical formulation as a liquid, gel, or solid. Therefore, the present invention provides for a pharmaceutical formulation of the LSD salt crystal form including one or more pharmaceutically acceptable excipients.

The LSD crystalline forms and the LSD crystalline salt forms can have different levels of stability and dissolution rates depending on the acid used in the formulation. This can impact the quality of active pharmaceutical ingredients, conversion to desired formulations, and performance/absorption rates when delivered orally.

In one embodiment, the polymorphic form of LSD is formulated as a pharmaceutical composition for oral, iv, sublingual, topical, transdermal, subcutaneous, intramuscular, intranasal, or rectal administration. In some embodiments, the polymorphic form of LSD is formulated for oral administration. In some embodiments, the polymorphic form of LSD is formulated for iv administration. In some embodiments, the polymorphic form of LSD is formulated for sublingual administration. In some embodiments, the polymorphic form of LSD is formulated for topical administration. In some embodiments, the polymorphic form of LSD is formulated for transdermal administration. In some embodiments, the polymorphic form of LSD is formulated for subcutaneous administration. In some embodiments, the polymorphic form of LSD is formulated for intramuscular administration. In some embodiments, the polymorphic form of LSD is formulated for rectal administration.

In one embodiment, the polymorphic form of a salt form of LSD is formulated as a pharmaceutical composition for oral, iv, sublingual, topical, transdermal, subcutaneous, intramuscular, or rectal administration. In some embodiments, the polymorphic form of a salt form of LSD is formulated for oral administration. In some embodiments, the polymorphic form of a salt form of LSD is formulated for iv administration. In some embodiments, the polymorphic form of a salt form of LSD is formulated for sublingual administration. In some embodiments, the polymorphic form of a salt form of LSD is formulated for topical administration. In some embodiments, the polymorphic form of a salt form of LSD is formulated for transdermal administration. In some embodiments, the polymorphic form of a salt form of LSD is formulated for subcutaneous administration. In some embodiments, the polymorphic form of a salt form of LSD is formulated for intramuscular administration. In some embodiments, the polymorphic form of a salt form of LSD is formulated for rectal administration.

The compositions of the present invention are administered and dosed in accordance with good medical practice, taking into account the clinical condition of the individual patient, the site and method of administration, scheduling of administration, patient age, sex, body weight and other factors known to medical practitioners. The pharmaceutically "effective amount" for purposes herein is thus determined by such considerations as are known in the art. The amount must be effective to achieve improvement including but not limited to improved survival rate or more rapid recovery, or improvement or elimination of symptoms and other indicators as are selected as appropriate measures by those skilled in the art.

In one embodiment, the compositions of the present invention are administered to deliver from about 1 ug to about 1 mg of LSD free-base equivalent per dosage to a subject in need of treatment. In some embodiments, the compositions of the present invention are administered to deliver from about 1 ug to about 10 ug of LSD free-base equivalent per dosage to a subject in need of treatment. In some embodiments, the compositions of the present invention are administered to deliver from about 3 ug to about 6 ug of LSD free-base equivalent per dosage to a subject in need of treatment. In some embodiments, the compositions of the present invention are administered to deliver from about 5 ug to about 20 ug of LSD free-base equivalent per dosage to a subject in need of treatment. In some embodiments, the compositions of the present invention are administered to deliver from about 15 ug to about 50 ug of LSD free-base equivalent per dosage to a subject in need of treatment. In some embodiments, the compositions of the present invention are administered to deliver from about 40 ug to about 100 ug of LSD free-base equivalent per dosage to a subject in need of treatment. In some embodiments, the compositions of the present invention are administered to deliver from about 100 ug to about 1 mg of LSD free-base equivalent per dosage to a subject in need of treatment. In the method of the present invention, the compounds of the present invention can be administered in various ways. It should be noted that it can be administered as the compound and can be administered alone or as an active ingredient in combination with pharmaceutically acceptable carriers, diluents, adjuvants, and vehicles. The compounds can be administered orally, subcutaneously, or parenterally including intravenous, intraarterial, intramuscular, intraperitoneally, intratonsillar, and intranasal administration as well as intrathecal and infusion techniques. Implants of the compounds are also useful. The patient being treated is a warm-blooded animal and, in particular, mammals including man. The pharmaceutically acceptable carriers, diluents, adjuvants, and vehicles as well as implant carriers generally refer to inert, non-toxic solid or liquid fillers, diluents or encapsulating material not reacting with the active ingredients of the invention.

The doses can be single doses or multiple doses over a period of several days. The treatment generally has a length proportional to the length of the disease process and drug effectiveness and the patient species being treated.

In one embodiment, the compositions of the present invention are administered to a human subject from one to four times per day. In some embodiments, the compositions of the present invention are administered to a human subject once per day. In some embodiments, the compositions of the present invention are administered to a human subject twice per day. In some embodiments, the compositions of the present invention are administered to a human subject three times per day. In some embodiments, the compositions of the present invention are administered to a human subject four times per day.

In one embodiment, the duration of treating a human subject is daily, daily for 7 days, daily for 14 days or daily for 30 days. In some embodiments, the duration of treating a human subject is daily. In some embodiments, the duration of treating a human subject is daily for 7 days. In some embodiments, the duration of treating a human subject is daily for 14 days. In some embodiments, the duration of treating a human subject is daily for 30 days.

When administering a composition of the present invention orally, it will generally be formulated in a unit dosage form selected from the list comprising solution, suspension, emulsion, tablet, and capsule.

When administering a composition of the present invention sublingually, it will generally be formulated in a unit dosage form selected from the list comprising tablet and strip wherein said tablet and strip are rapidly dissolving.

When administering a composition of the present invention topically, it will generally be formulated in a unit dosage form selected from the list comprising cream and ointment.

When administering a composition of the present invention transdermally, it will generally be formulated in a unit dosage form comprising a patch.

When administering a composition of the present invention rectally, it will generally be formulated in a unit dosage form selected from the list comprising a suppository.

When administering a composition of the present invention intranasally, it will generally be formulated in a dosage form selected from the list comprising a dry powder, a solution, and an emulsion. One skilled in the art will recognize that intranasal administration generally requires a delivery device calibrated for delivery of a specify dosage per use.

When administering a composition of the present invention by injection (iv, subcutaneous, intramuscular), it will generally be formulated in a unit dosage form selected from the list comprising solution, suspension, and emulsion. The pharmaceutical formulations suitable for injection include sterile aqueous solutions or dispersions and sterile powders for reconstitution into sterile injectable solutions or dispersions. The carrier can be a solvent or dispersing medium containing, for example, water, ethanol, polyol (for example, glycerol, propylene glycol, liquid polyethylene glycol, and the like), suitable mixtures thereof, and vegetable oils.

Sterile injectable solutions can be prepared by incorporating the compositions utilized in practicing the present invention in the required amount of the appropriate solvent with various of the other ingredients, as desired.

The invention is further described in detail by reference to the following experimental examples. These examples are provided for the purpose of illustration only, and are not intended to be limiting unless otherwise specified. Thus, the invention should in no way be construed as being limited to the following examples, but rather, should be construed to encompass any and all variations which become evident as a result of the teaching provided herein.

Example 1—General Preparation of D-LSD Salt Forms

A solution of an acid dissolved in ethanol was combined with a solution of D-LSD free-base in tetrahydrofuran. Precipitated materials were collected by filtration and subsequently subjected to crystallization studies to generate crystalline forms. If solid forms were not isolated, alternate solvents including dichloromethane, ethyl acetate, acetone and acetonitrile were evaluated.

Example 2—General Preparation of D-LSD Salt Form Crystal Forms

Solid salt forms of D-LSD were subjected to standard crystallization methods including solvent-mediated equilibration, antisolvent-mediated crystallization, mixed-solvent recrystallization, solvent-vapor diffusion crystallization, compression and grinding of solid salt forms. Isolated solid salt forms were evaluated by DVS, DSC, TGA, and XRPD to characterize the crystalline forms.

Example 3—Naphthalene-2-Sulfonate Salt

A crystalline form of a D-LSD salt with naphthalene-2-sulfonic acid was prepared as described according to Example 1 and Example 2. The crystalline form was characterized by an x-ray powder diffraction pattern obtained by irradiation with Cu Kα x-rays having peaks expressed as 2θ at about 5.0, about 6.1, about 11.5, about 17.3 and about 18.9.

Example 4—L-Tartarate Hemi-Salt

A crystalline form of a D-LSD hemi-salt with L-tartaric acid was prepared as described according to Example 1 and Example 2. The crystalline form was characterized by an x-ray powder diffraction pattern obtained by irradiation with Cu Kα x-rays having peaks expressed as 2θ at about 9.6, about 11, about 20.8 and about 24.7.

Example 5—Maleate Salt Form A

A crystalline form of a D-LSD salt with maleic acid was prepared as described according to Example 1 and Example 2. The crystalline form was characterized by an x-ray powder diffraction pattern obtained by irradiation with Cu Kα x-rays having peaks expressed as 2θ at about 8.8, about 16.2, about 17.4, about 18.8, about 20.1 and about 25.0

Figure 33:
FIG. 33 shows DSC and TGA thermographs of D-LSD maleic acid salt form A.

(FIG. 3). The crystalline form was characterized by DSC and TGA (FIG. 33) The DSC thermograph of the solid shows a main melt endotherm at 145° C.

Example 6—Maleate Salt Form B

Figure 34:
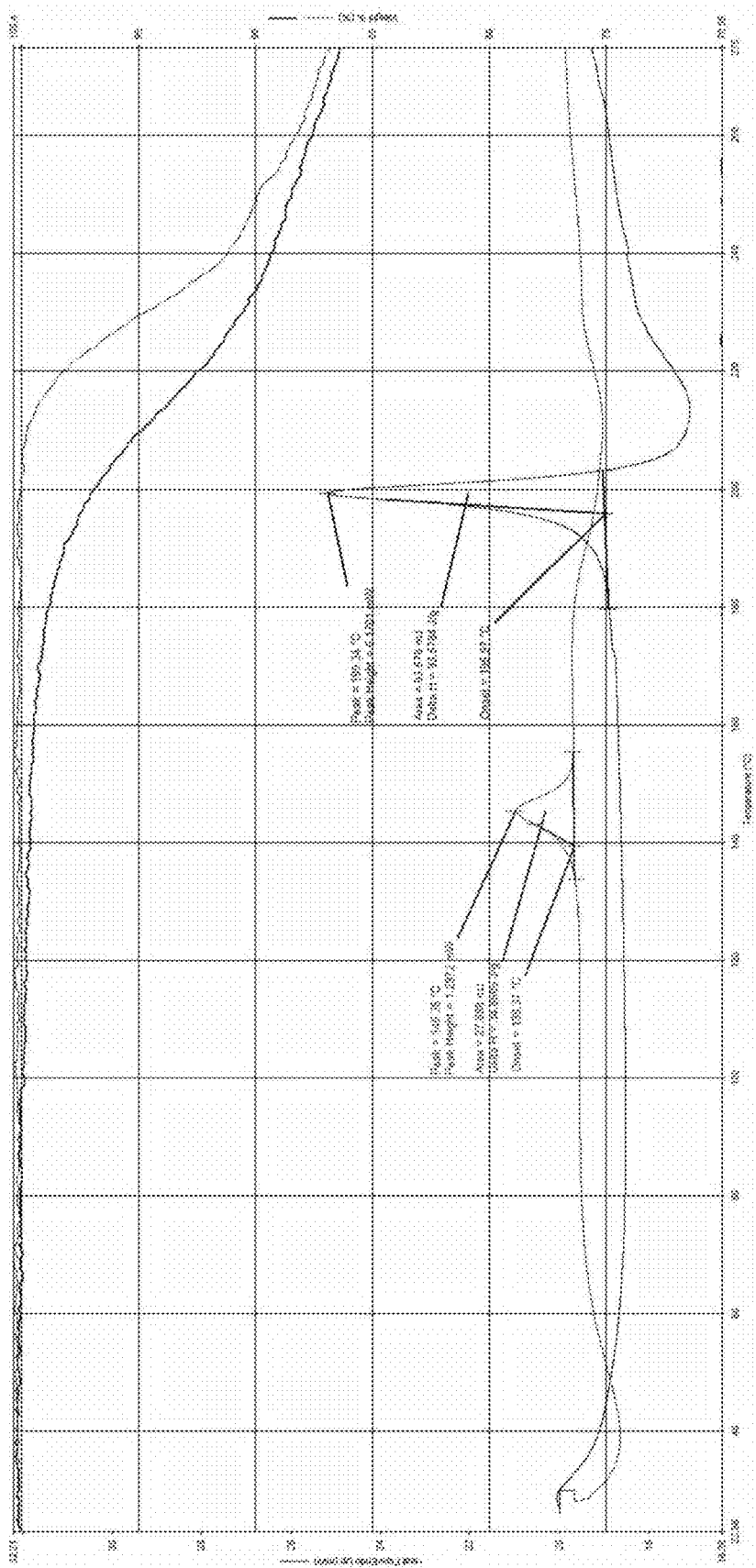
FIG. 34 shows DSC and TGA thermographs of D-LSD maleic acid salt form A (peak at 145° C.) and form B (peak at 199° C.)

A crystalline form of a D-LSD salt with maleic acid was prepared as described according to Example 1 and Example 2. The crystalline form was characterized by an x-ray powder diffraction pattern obtained by irradiation with Cu Kα x-rays having peaks expressed as 2θ at about 8.4, about 14.7, about 15.1, about 17.4 and about 22.1 (FIG. 4). The crystalline form was characterized by DSC and TGA (FIG. 34). The DSC thermograph of the solid shows a main melt endotherm at 199° C. This is the preferred maleate.

Example 7—Xinafoate Salt Form A

A crystalline form of LSD was prepared as described by methods above. The acid was xinafoic acid, and the crystalline form was characterized by an x-ray powder diffraction pattern obtained by irradiation with Cu Kα x-rays having peaks expressed as 2θ at about 10.2, about 11.6, about 13.3, about 15.6 and about 21.6.

Example 8—Xinafoate Salt Form A'

A crystalline form of LSD was prepared as described by methods above. The acid was xinafoic acid, and the crystalline form was characterized by an x-ray powder diffraction pattern obtained by irradiation with Cu Kα x-rays having peaks expressed as 2θ at about 14.8, about 15.6, about 21.5 and about 26.6.

Example 9—Phosphate Salt Form A

Figure 32:
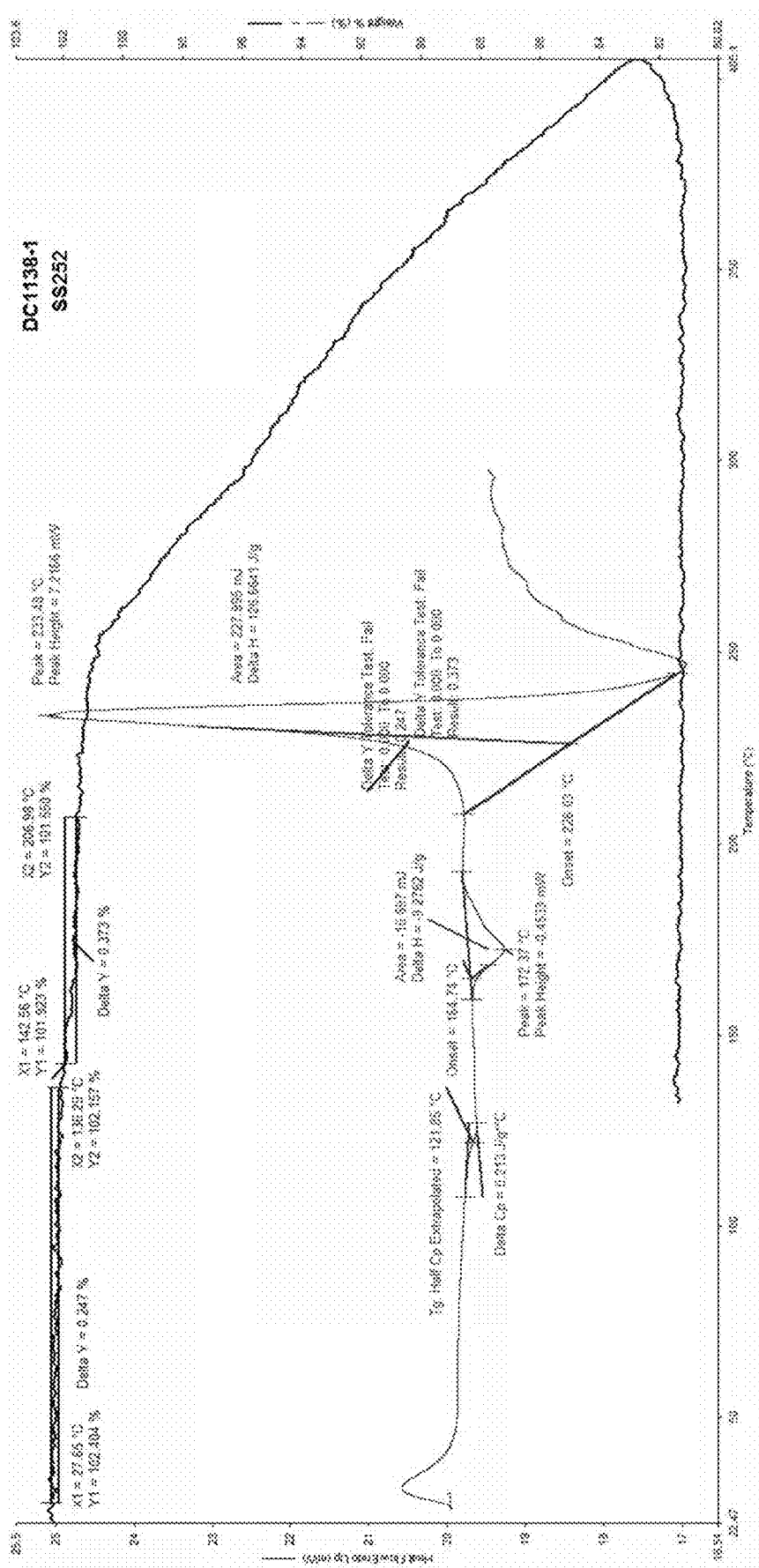
FIG. 32 shows DSC and TGA thermographs of D-LSD phosphoric acid salt form A.

A crystalline form of LSD was prepared as described by methods above. The acid was phosphoric acid, and the crystalline form was characterized by an x-ray powder diffraction pattern obtained by irradiation with Cu Kα x-rays having peaks expressed as 2θ at about 7.2, about 13.5, about 14.8, about 16.9, about 24.2 and about 24.5. FIG. 7 is an XRPD Pattern of LSD phosphate Pattern A. The material was characterized by DSC and TGA (FIG. 32). DSC/TGA analysis showed the Tg at 122° C. (half Cp) followed by an exothermic event at 165° C. and the melting endotherm at 233° C. A weight loss of 0.2% w/w was observed between 27-136° C., followed by a second minimal weight loss of 0.37% w/w.

Example 10—Naphthalene-1,5-Disulfonate Hemi-Salt

A crystalline form of LSD was prepared as described by methods above. The acid was naphthalene-1,5-disulfonic acid, and the crystalline form was characterized by an x-ray powder diffraction pattern obtained by irradiation with Cu Kα x-rays having peaks expressed as 2θ at about 10.1, about 14.4, about 16.7, about 23.5, about 24.5, about 21.9 and about 22.6.

Example 11—Oxalate Salt Form A

A crystalline form of LSD was prepared as described by methods above. The acid was oxalic acid, and the crystalline form was characterized by an x-ray powder diffraction pattern obtained by irradiation with Cu Kα x-rays having peaks expressed as 2θ at about 8.2, about 10.4, about 17.7, about 19.2 and about 21.9.

Example 12—Benzoate Salt Form A

Figure 25:
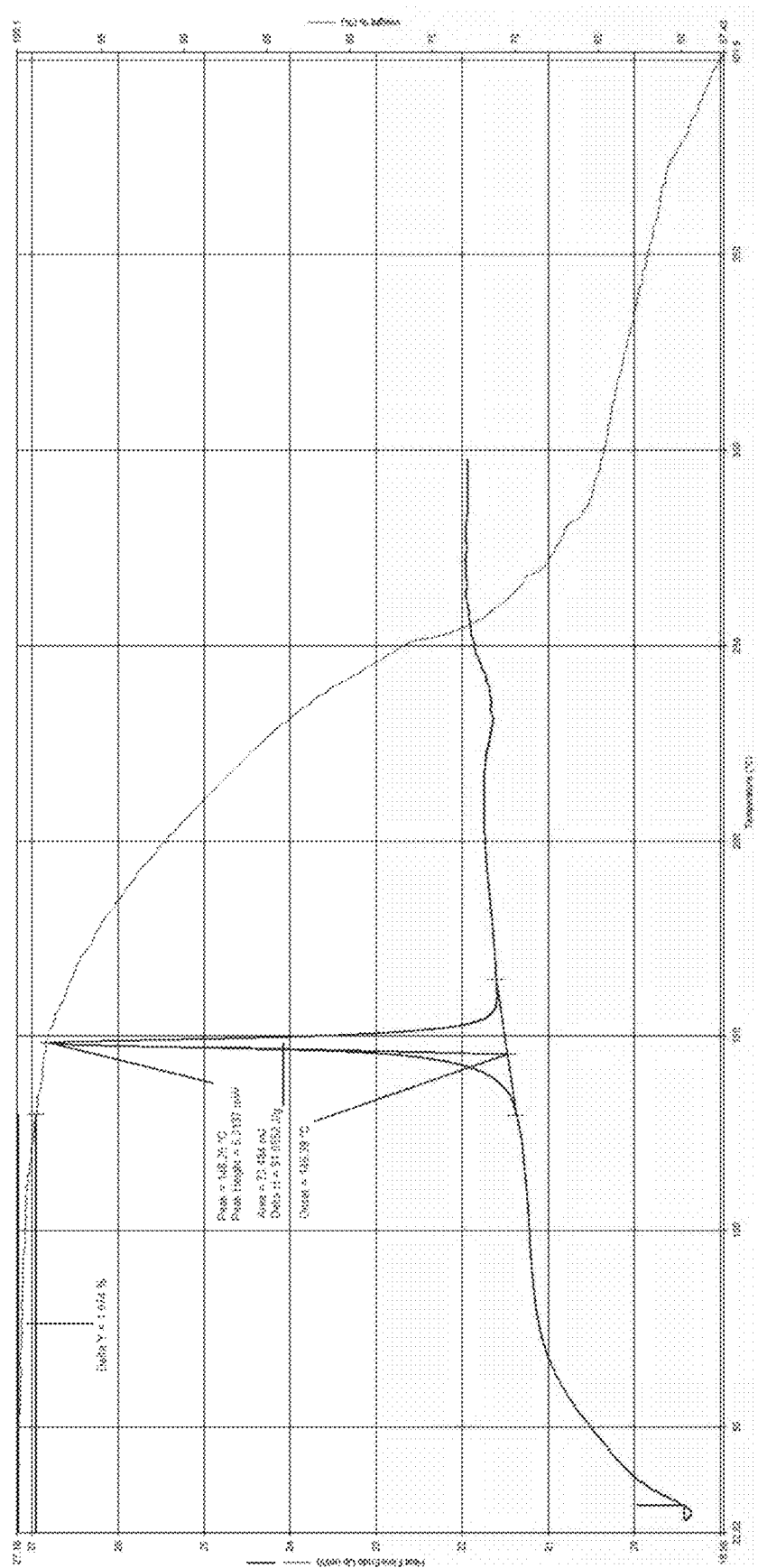
FIG. 25 shows DSC and TGA thermographs of D-LSD benzoate salt pattern A.

A crystalline form of a D-LSD salt with benzoic acid was prepared as described according to Example 1 and Example 2. The crystalline form was characterized by an x-ray powder diffraction pattern obtained by irradiation with Cu Kα x-rays having peaks expressed as 2θ at about 8.5, about 14.6, about 16.6, about 18.5 and about 19.0 (FIG. 10). The material was characterized by DSC and TGA (FIG. 25). DSC showed an endothermic peak at 148° C. TGA showed a 1.0% loss of mass between 25° C. and 130° C. This is the preferred benzoate form.

Example 13—Benzoate Salt Form B

Figure 26:
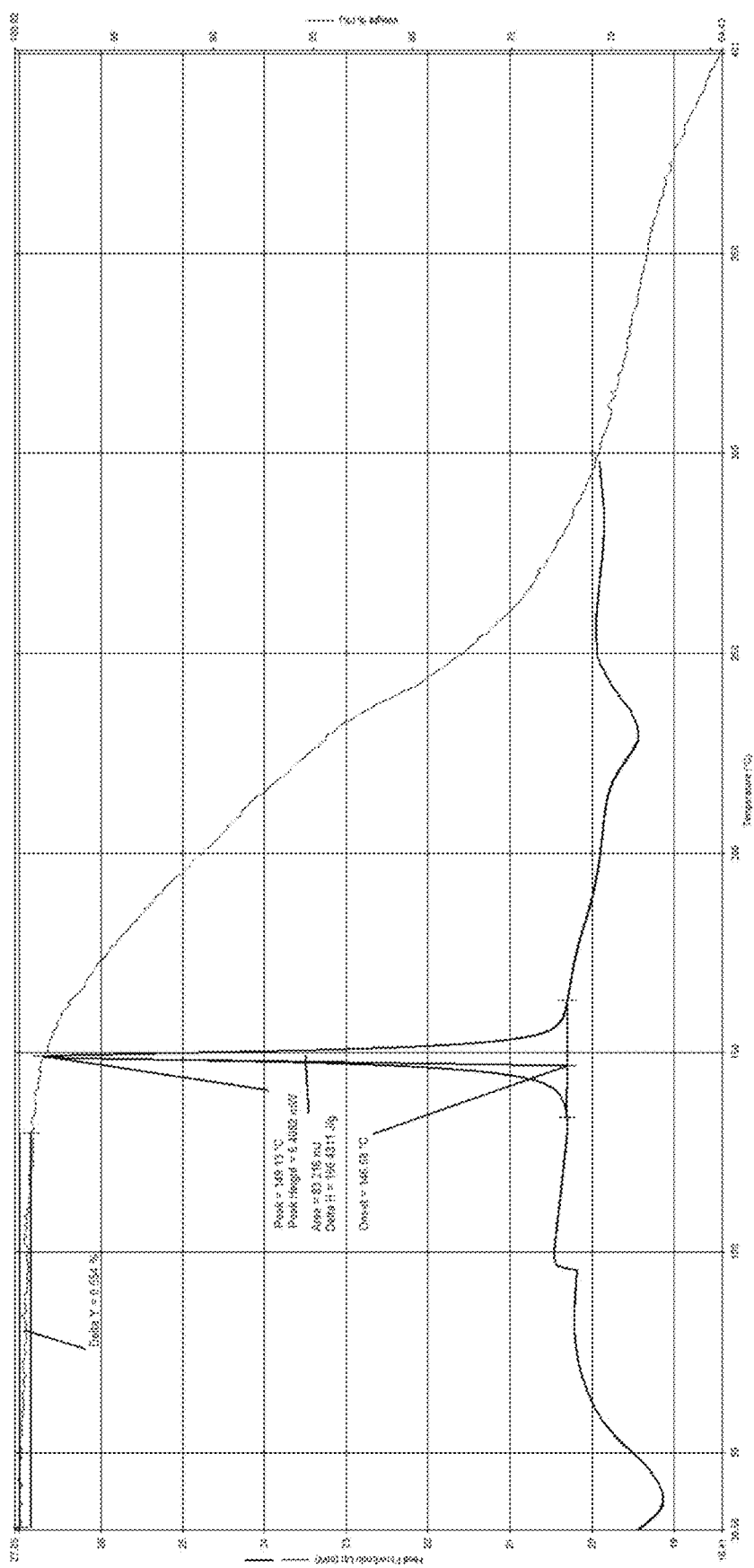
FIG. 26 shows DSC and TGA thermographs of D-LSD benzoate salt pattern A'.
Figure 27:
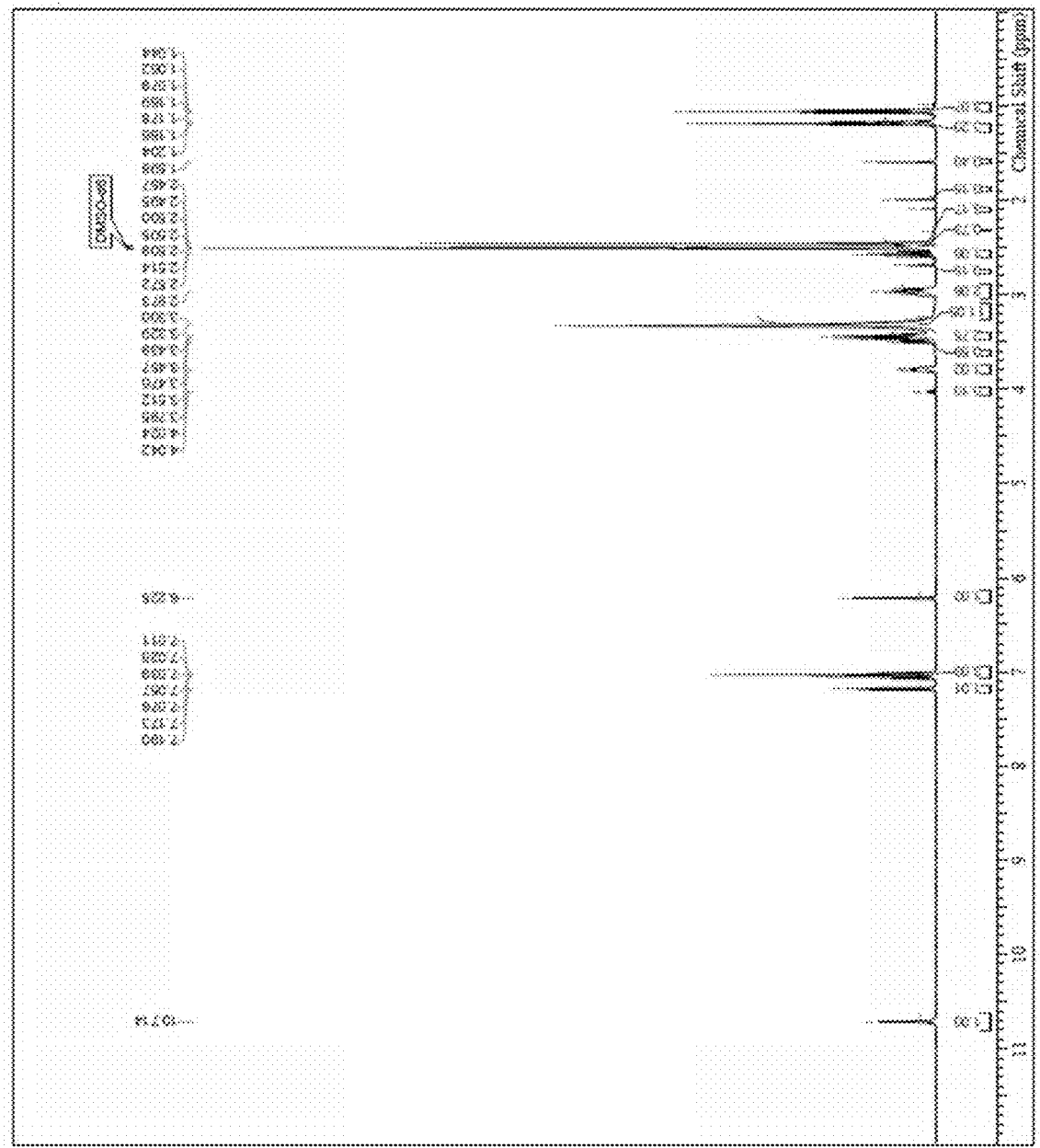
FIG. 27 is an NMR of D-LSD free base form B.

A crystalline form of a D-LSD salt with benzoic acid was prepared as described according to Example 1 and Example 2. The crystalline form was characterized by an x-ray powder diffraction pattern obtained by irradiation with Cu Kα x-rays having peaks expressed as 2θ at about 17.3, about 19.8, about 20.4 and about 25.2 (FIG. 11). The material was characterized by DSC and TGA (FIG. 26). DSC showed an endothermic peak at 149° C. TGA showed a 0.6% loss of mass between 25° C. and 130° C.

Example 14—Fumarate Salt

A crystalline form of LSD was prepared as described by methods above. The acid was fumaric acid, and the crystalline form was characterized by an x-ray powder diffraction pattern obtained by irradiation with Cu Kα x-rays having peaks expressed as 2θ at about 11.2, about 18.4, about 19.7 and about 22.1 (FIG. 12).

Example 15—Fumarate Hemi-Salt

A crystalline form of LSD was prepared as described by methods above. The acid was fumaric acid, and the crystalline form was characterized by an x-ray powder diffraction pattern obtained by irradiation with Cu Kα x-rays having peaks expressed as 2θ at about 7.5, about 21.3, about 22.7 and about 24.7 (FIG. 12).

Example 16—L-Ascorbate Salt Form A

A crystalline form of LSD was prepared as described by methods above. The acid was L-ascorbic acid, and the crystalline form was characterized by an x-ray powder diffraction pattern obtained by irradiation with Cu Kα x-rays having peaks expressed as 2θ at about 7.2, about 16.3, about 19.8 and about 28.2 (FIG. 14).

Example 17—L-Ascorbate Salt Form B

A crystalline form of LSD was prepared as described by methods above. The acid was L-ascorbic acid, and the crystalline form was characterized by an x-ray powder diffraction pattern obtained by irradiation with Cu Kα x-rays having peaks expressed as 2θ at about 7.1, about 17.5, about 26.8 and about 30.2 (FIG. 15).

Example 18—D-Tartrate Salt

Figure 28:
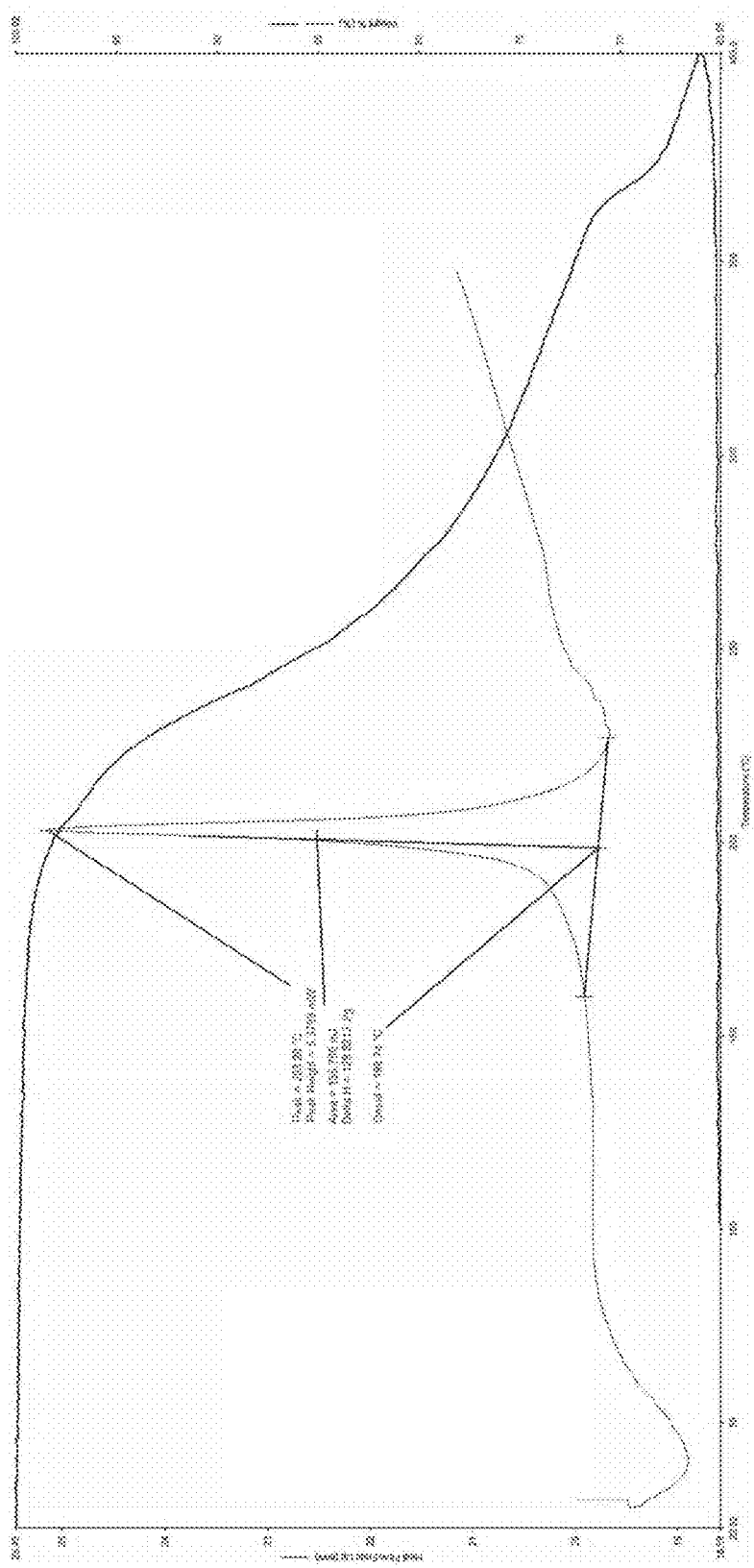
FIG. 28 is DSC and TGA thermographs of D-LSD tartrate salt.
Figure 35:
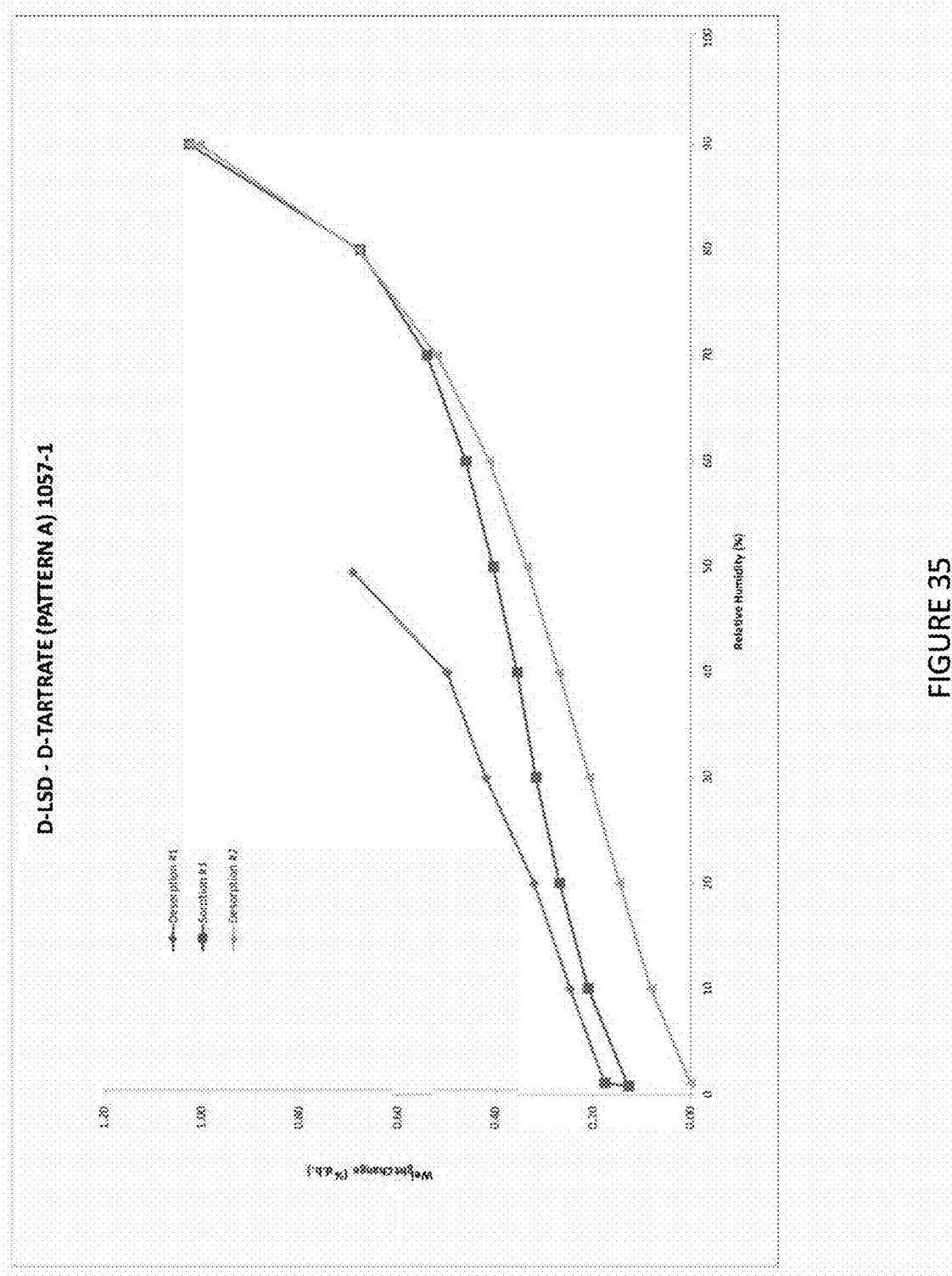
FIG. 35 is a DVS profile of D-LSD D-tartaric acid salt.

A crystalline form of a D-LSD salt with D-tartaric acid was prepared as described according to Example 1 and Example 2. The crystalline form was characterized by XRPD, DSC, TGA, and DVS. The x-ray powder diffraction pattern obtained by irradiation with Cu Kα x-rays having peaks expressed as 2θ at about 9.7, about 15.5, about 17.5, about 20.4 and about 23.4 (FIG. 16). The material was characterized by DSC and TGA (FIG. 28). The DSC thermograph contains a main melt endotherm at 203° C. and the corresponding TGA thermograph shows no weight reduction until decomposition. The $^1$H NMR spectrum (FIG. 31) confirms mono stoichiometry of the salt with a tartrate peak at 4.2 ppm (2H). The DVS profile of D-LSD D-tartrate Pattern A is shown in FIG. 35. During the initial desorption cycle the solid lost 0.6 wt % from 50% RH to 0% RH and did not achieve an anhydrous state. During the subsequent sorption cycle the solid absorbed 0.65% of water up to 80% RH. This increased to 1% at 90% RH. The DVS profile confirms that this water uptake is reversible as relative humidity decreases with only minor hysteresis indicated. Solvent exclusion is suggested as the cycle progressed, leading to a dry solid upon completion of the final desorption.

Example 19—Hydrochloride Salt Form A

A crystalline form of a D-LSD salt with hydrochloric acid was prepared as described according to Example 1 and Example 2. The crystalline form was characterized by an x-ray powder diffraction pattern obtained by irradiation with Cu Kα x-rays having peaks expressed as 2θ at about 7.3, about 12.5, about 15.0, about 16.3 and about 24.3 (FIG. 17).

Example 20—Hydrochloride Salt Form A'

A crystalline form of a D-LSD salt with hydrochloric acid was prepared as described according to Example 1 and Example 2. The crystalline form was characterized by an x-ray powder diffraction pattern obtained by irradiation with Cu Kα x-rays having peaks expressed as 2θ at about 7.3, about 8.9, about 12.5, about 15.0 and about 24.3 (FIG. 18).

Example 21—Hydrochloride Salt Form B

A crystalline form of a D-LSD salt with hydrochloric acid was prepared as described according to Example 1 and Example 2. The crystalline form was characterized by an x-ray powder diffraction pattern obtained by irradiation with Cu Kα x-rays having peaks expressed as 2θ at about 6.7, about 7.2, about 9.7, about 14.8 and about 24.6 (FIG. 19).

Example 22—Hydrochloride Salt Form C

A crystalline form of a D-LSD salt with hydrochloric acid was prepared as described according to Example 1 and Example 2. The crystalline form was characterized by an x-ray powder diffraction pattern obtained by irradiation with Cu Kα x-rays having peaks expressed as 2θ at about 5.8, about 6.7, about 15.4, about 18.8 and about 24.4 (FIG. 20).

Example 23—Hydrochloride Salt Form D

A crystalline form of a D-LSD salt with hydrochloric acid was prepared as described according to Example 1 and Example 2. The crystalline form was characterized by an x-ray powder diffraction pattern obtained by irradiation with Cu Kα x-rays having peaks expressed as 2θ at about 7.3, about 12.4, about 15.0, about 18.0 and about 24.2 (FIG. 21).

Example 24—Hydrochloride Salt Form E

A crystalline form of a D-LSD salt with hydrochloric acid was prepared as described according to Example 1 and Example 2. The crystalline form was characterized by an x-ray powder diffraction pattern obtained by irradiation with Cu Kα x-rays having peaks expressed as 2θ at about 7.3, about 12.4, about 15.0, about 19.7 and about 24.3 (FIG. 22).

Example 25—Free-Base Form A

Figure 23:
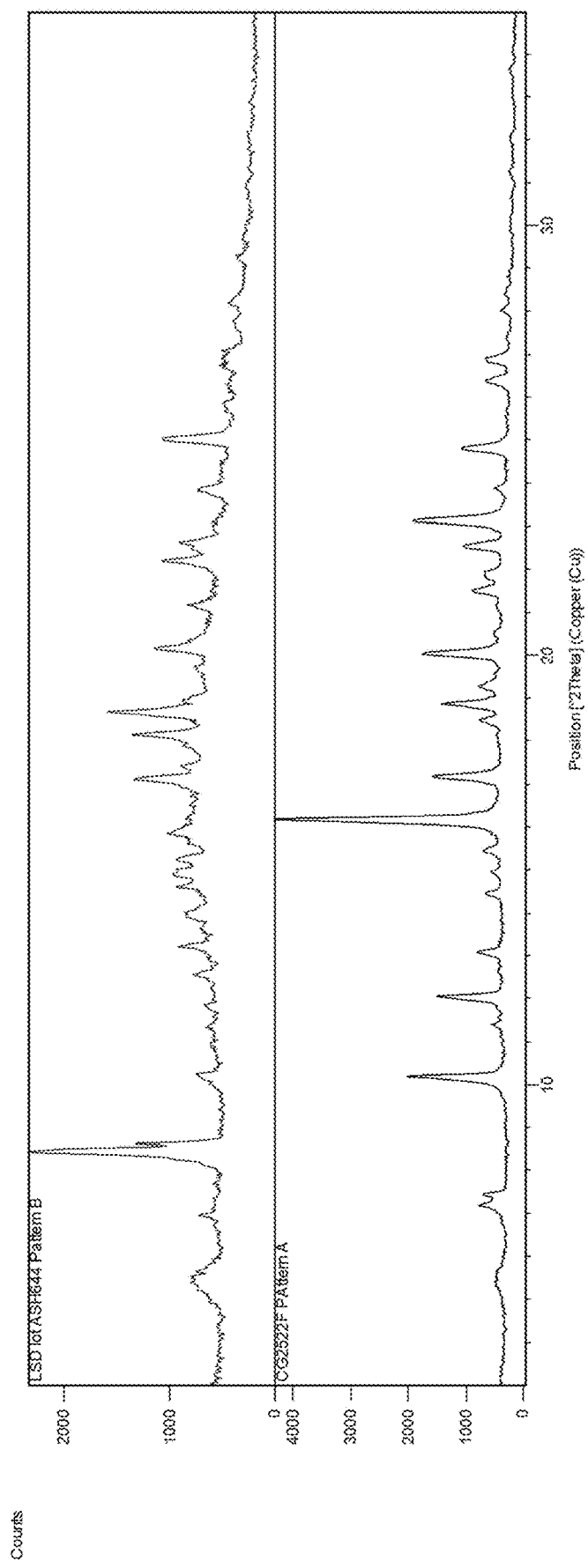
FIG. 23 is the XRPD diffractograms of D-LSD free-base form A (bottom) and form B (top)
Figure 24:
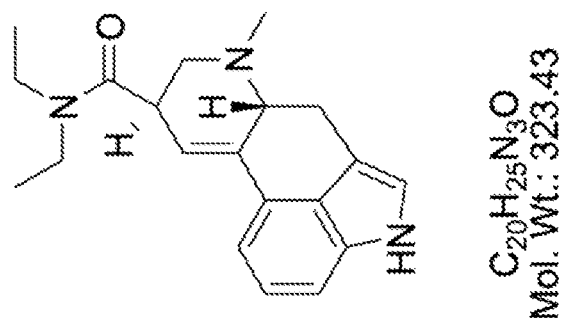
FIG. 24 is the molecular structure of D-LSD (free base)

A crystalline form of D-LSD free-base was prepared by crystallization from ethyl acetate. The crystalline form was characterized by an x-ray powder diffraction pattern obtained by irradiation with Cu Kα x-rays having peaks expressed as 2θ at about 10.2, about 12.0, about 16.2, about 17.2, about 20.0 and about 23.1 (FIG. 23, bottom).

Example 26—Free-Base Form B

A crystalline form of D-LSD free-base was prepared by a workup that incorporated a 1M NaOH wash. The crystalline form was characterized by an x-ray powder diffraction pattern obtained by irradiation with Cu Kα x-rays having peaks expressed as 2θ at about 8.5, about 8.6, about 17.1, about 18.1, about 18.7 and about 25.0. Thermal analysis was collected for the Pattern B solid. The DSC thermograph contains a first endotherm with an onset at 71° C. and a second endotherm at 108° C. The corresponding TGA thermograph showed a weight loss of 4.12% w/w between 32-222° C. (FIG. 23, top).

Example 27—Phosphate Form B

Figure 29:
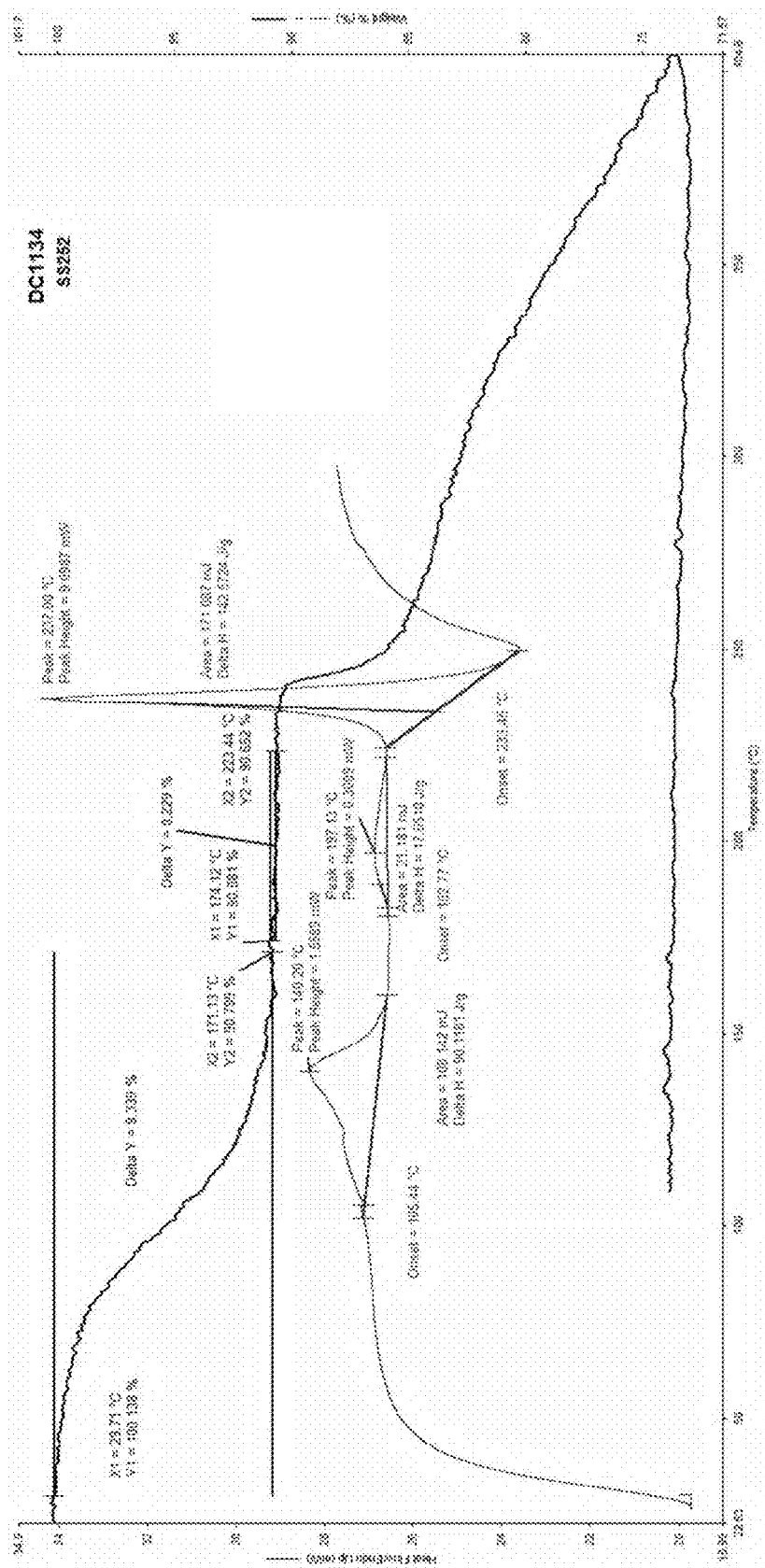
FIG. 29 is DSC and TGA thermographs of D-LSD phosphate salt form B.
Figure 30:
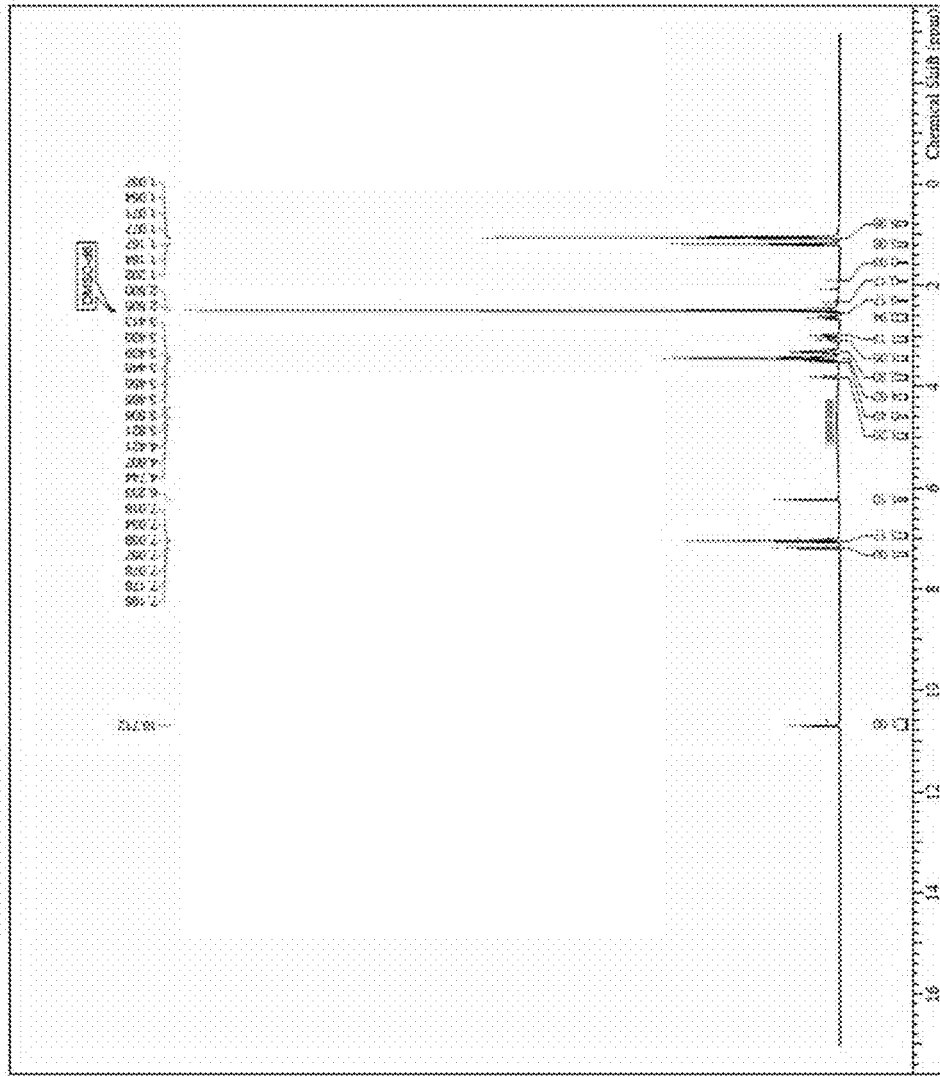
FIG. 30 is an $^1$H NMR of D-LSD phosphoric acid salt form B.
Figure 58:
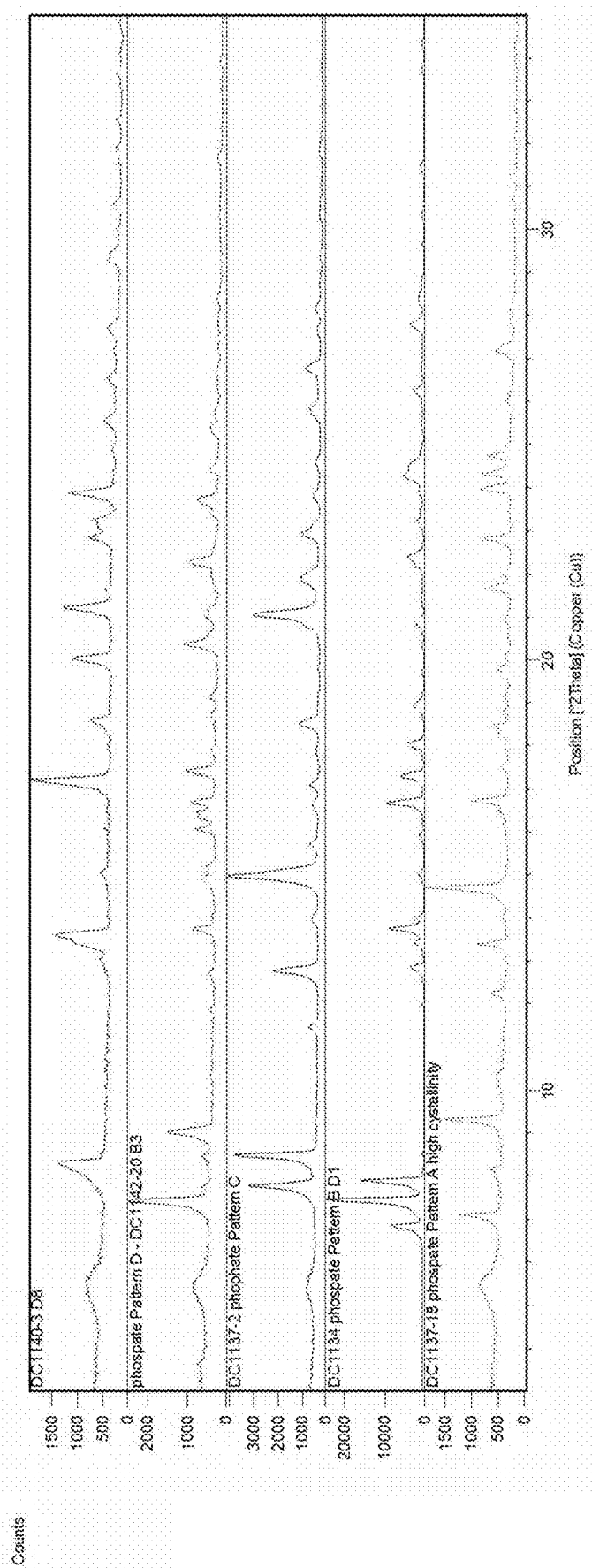
FIG. 58 is an XRPD overlay D-LSD Phosphate salt Pattern A (bottom), Pattern B (second), Pattern C (third), Pattern D (fourth), and Pattern E (top)

D-LSD Free Base (Pattern A, 2.02 g) was placed in a round bottom flask (V=50 mL) and dissolved in EtOH (10 V). The solution was heated to 50° C., at 300 rpm for 30 minutes. Then, a stock solution of phosphoric acid prepared in EtOH (1 M, 6.25 mL) was slowly added. The system was equilibrated for 15 minutes, and the temperature was decreased to 25° C. overnight. A suspension was observed and was filtered to isolate the solid. The recovered solid was placed in a vacuum oven at 45° C. for 48 hours. Yield 82%. The material was analyzed by XRPD, DSC/TGA and proton NMR. The crystalline form was characterized by an x-ray powder diffraction pattern obtained by irradiation with Cu Kα x-rays having peaks expressed as about 6.8, about 7.5, about 7.9, about 13.8, about 16.7 and about 17.3 (FIG. 58, second from bottom). Pattern B form of D-LSD phosphate salt was characterized by DSC/TGA as a crystalline mono ethanol solvate solid with a melt temperature of 223° C. (FIG. 29). DSC/TGA thermograms showed a first endo onset at 105° C., a second endo at 182° C. followed by the melting endo at 233° C. This main melt corresponded with that of Pattern A. A weight loss of 9.4% w/w (~1 mol eq. of EtOH) between 29-171° C. was present in the TGA thermogram. This was by followed a small weight loss of 0.3% w/w between 174-223° C.

Example 28—Phosphate Form C

An alternate crystalline form of LSD phosphate was prepared via heat cycled maturation from LSD phosphate form B as shown in TABLE 1.

TABLE 1

| | | Form fate by XRPD | | Solubility 25° C. |
|---|---|---|---|---|
| ID | Solvent | 25° C. | 45° C./70° C. | (mg/ml) |
| 1 | EtOH | Pattern A + Pattern C | Pattern C | 2.36 |
| 2 | MeOH | Pattern C | Pattern C | — |
| 3 | TBME | Pattern C + peaks | Pattern C | — |
| 4 | THF | Pattern C | Pattern C | 2.01 |
| 5 | Me—THF | Pattern C | Pattern C | 0.35 |
| 6 | CPME | Pattern C | Pattern C | — |
| 7 | 1,4-dioxane | Pattern C | Pattern C | 4.57 |
| 8 | EtOAc | Pattern C | Pattern C | 0.11 |
| 9 | IPAC | Pattern C | Pattern C | 0.05 |
| 10 | acetone | Pattern C | Pattern C | — |
| 11 | MEK | Pattern C | Pattern C | 0.2 |
| 12 | MIBK | Pattern C | Pattern C | 0.20 |
| 13 | Anisole | Pattern C | Pattern C | — |

TABLE 1-continued

| ID | Solvent | Form fate by XRPD 25° C. | Form fate by XRPD 45° C./70° C. | Solubility 25° C. (mg/ml) |
|---|---|---|---|---|
| 14 | toluene | Pattern C | Pattern C + peaks | 1.83 |
| 15 | Chlorobenzene | Pattern C | Amorphous + peaks | — |
| 16 | MeCN | Pattern C | Pattern C | 0.24 |
| 17 | Benzotrifluoride | Pattern C | Pattern C | 0.15 |
| 18 | heptane | Pattern A | Pattern A – high intensity peaks | — |
| 19 | cyclohexane | Pattern A | amorphous + Pattern C | — |
| 20 | nitromethane | Pattern C | Pattern C | 0.34 |
| 21 | DCM | Pattern C | Pattern C | — |
| 22 | THF:water (95:5) | Pattern C | Pattern C | 5.66 |
| 23 | iPrOAc:water (98:2) | Pattern C | Pattern C | 0.11 |
| 24 | IPA:water (95:5) | Pattern B + peaks | Pattern B + peaks | 0.40 |

Figure 36:
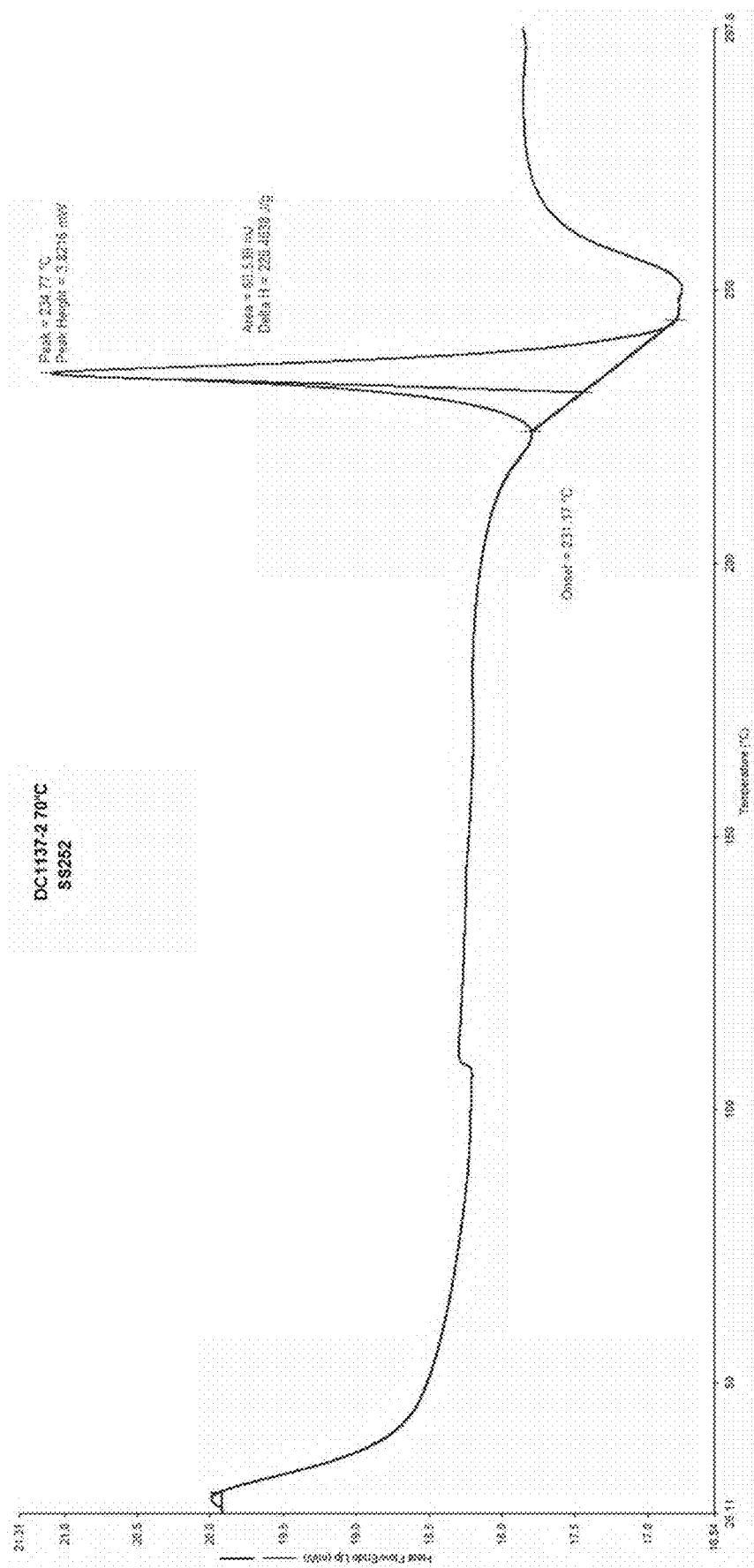
FIG. 36 is a DSC thermogram of D-LSD phosphoric acid salt Pattern C.
Figure 37:
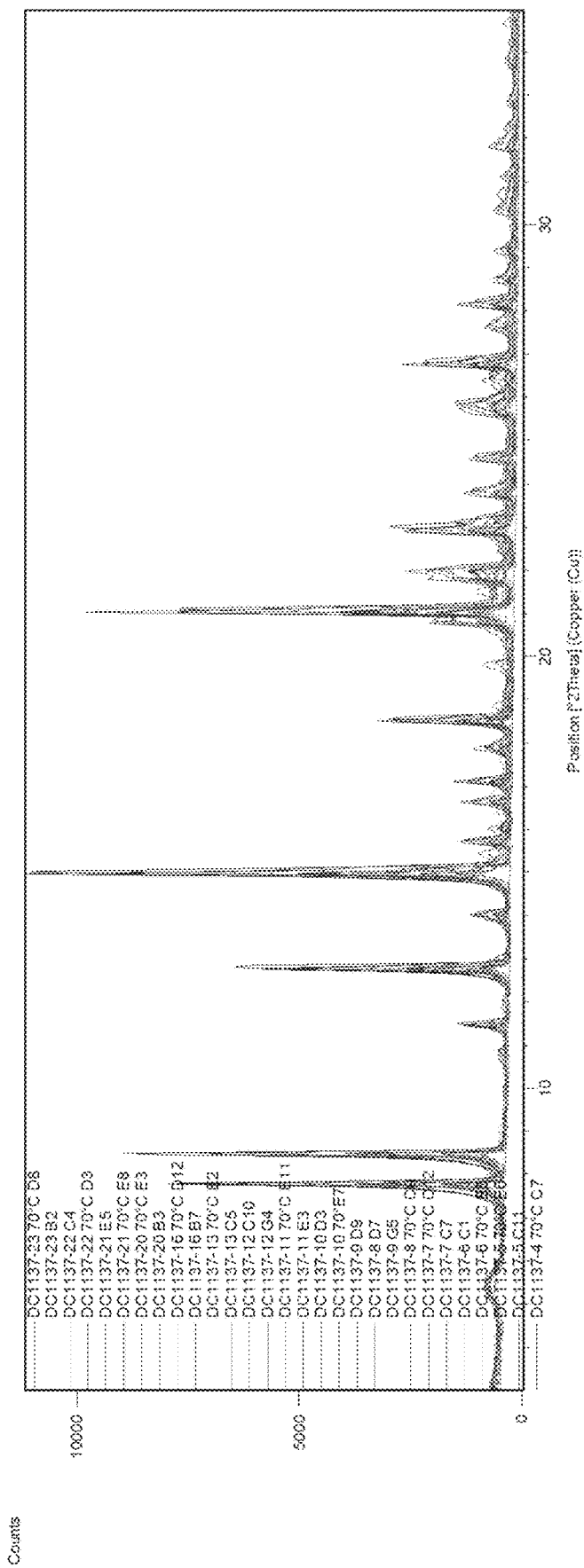
FIG. 37 is an overlay of XRPD Pattern of D-LSD phosphate salt Pattern C.

The crystalline form was characterized by an x-ray powder diffraction pattern obtained by irradiation with Cu Kα x-rays having peaks expressed as about 7.8, about 8.5, about 12.8, about 15.0, about 15.1 and about 21.1. This is the preferred phosphate form. FIG. 36 is a DSC thermogram of LSD phosphate Pattern C. FIG. 37 is an XRPD Pattern of LSD phosphate Pattern C.

Example 29—Oxalate Form B

A crystalline form of LSD was prepared as described by methods above. The acid was phosphoric acid, and the crystalline form was characterized by an x-ray powder diffraction pattern obtained by irradiation with Cu Kα x-rays having peaks expressed as about 13.0, about 15.4, about 17.9, about 19.8, about 21.5 and about 23.1. This is the preferred oxalate form.

Example 30—Hydrobromide Form A

Figure 57:
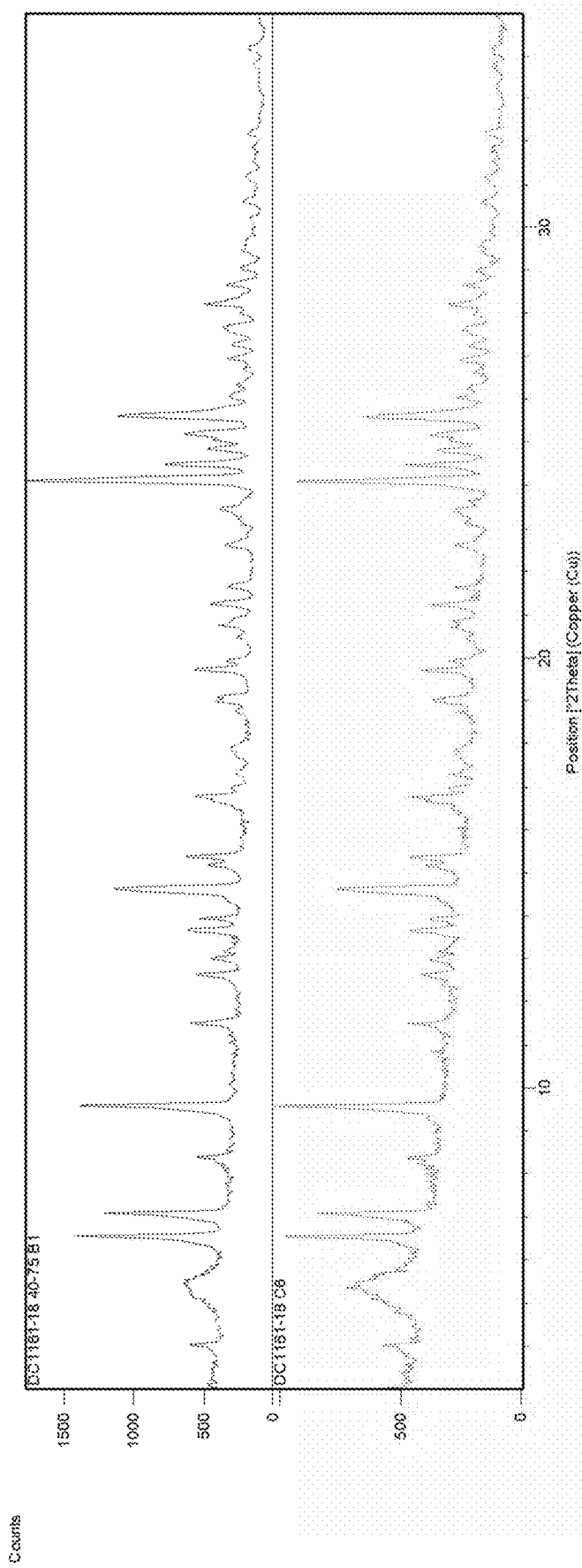
FIG. 57 is an XRPD pattern of D-LSD Hydrobromide salt Pattern A starting material (bottom) and after stress at 40° C./75 RH (top)

A crystalline form of LSD was prepared as described by methods above. The acid was hydrobromic acid, and the crystalline form was characterized by an x-ray powder diffraction pattern obtained by irradiation with Cu Kα x-rays having peaks expressed as about 6.6, about 9.6, about 14.7, about 24.2, about 24.5 and about 25.6. FIG. 57 is an XRPD pattern of D-LSD Hydrobromide salt Pattern A starting material (bottom) and after stress at 40° C./75 RH (top).

Example 31—Amorphous Oxalate Salt

D-LSD Free Base (Pattern A, 1.97 g) was placed in a round bottom flask (V=50 mL) and dissolved in EtOH (10 V). The solution was heated to 50° C., at 300 rpm for 30 min. Then, a stock solution of oxalic acid prepared in EtOH (1 M, 6.03 mL) was slowly added. The system was equilibrated for 15 minutes, and the temperature was decreased to 25° C. overnight. A solution was observed and was dried under vacuum using a rotavapor. The material was weighed, and the yield was 98%.

The powder recovered was analyzed by XRPD, DSC/TGA and proton NMR.

Figure 38:
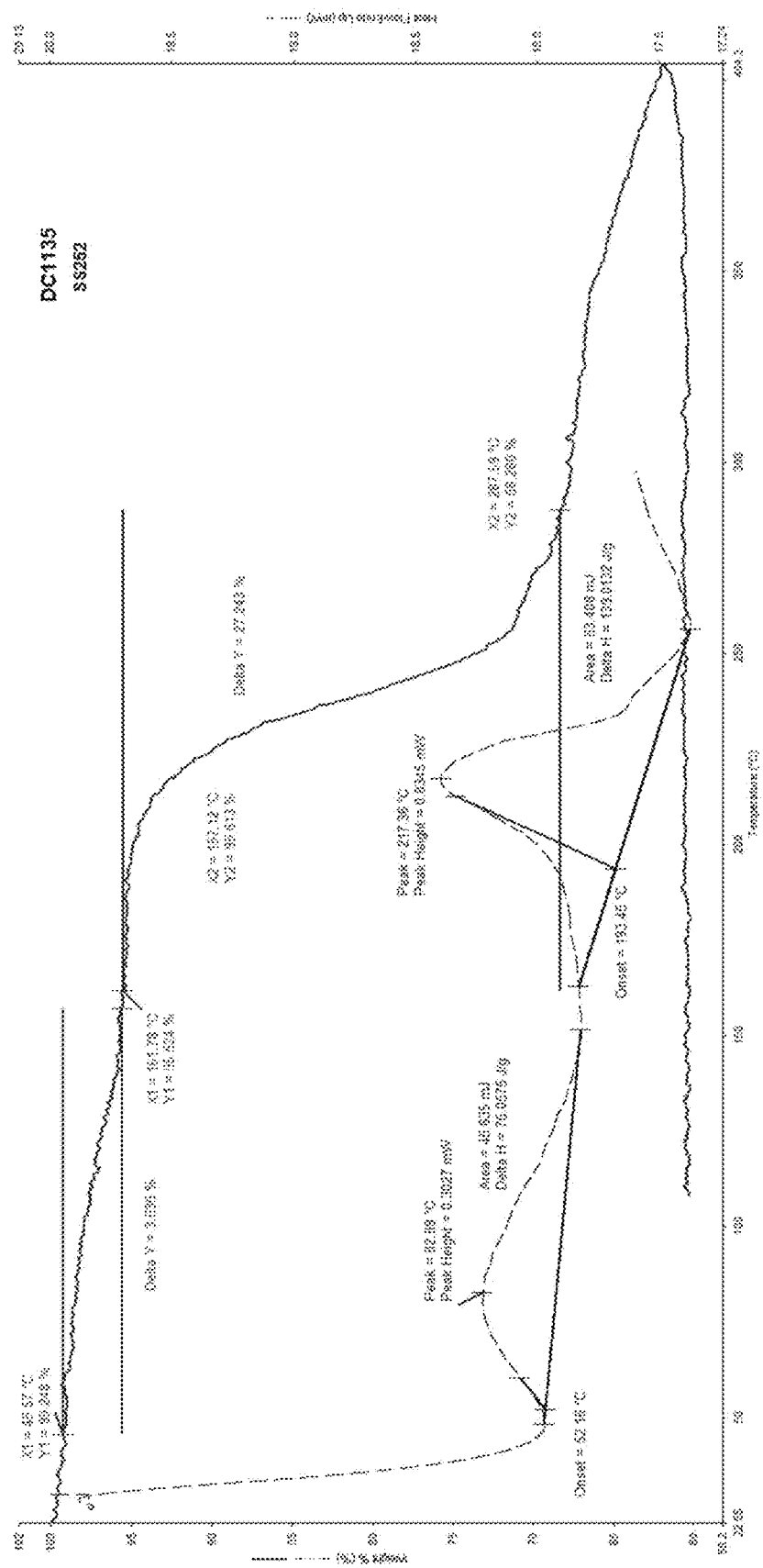
FIG. 38 shows DSC and TGA thermographs of amorphous D-LSD oxalate salt.

XRPD analysis showed the formation of D-LSD oxalate salt as an amorphous solid. DSC/TGA thermograms showed a first endo onset at 52° C., followed by the melting endo at 193° C. This melting temperature was lower than that of the crystalline version of the oxalate salt identified during salt screening which had a melt temperature of 213° C. A weight loss of 3.6% w/w (0.83 mol eq. of water) was observed from 45-161° C. NMR analysis suggests that this relates to the loss of entrapped ethanol although the level is insufficient for a formal mono solvate. The NMR spectrum of the proton conformed to the molecular structure. FIG. 38 shows DSC and TGA thermographs of D-LSD oxalate amorphous material.

Compression

Figure 39:
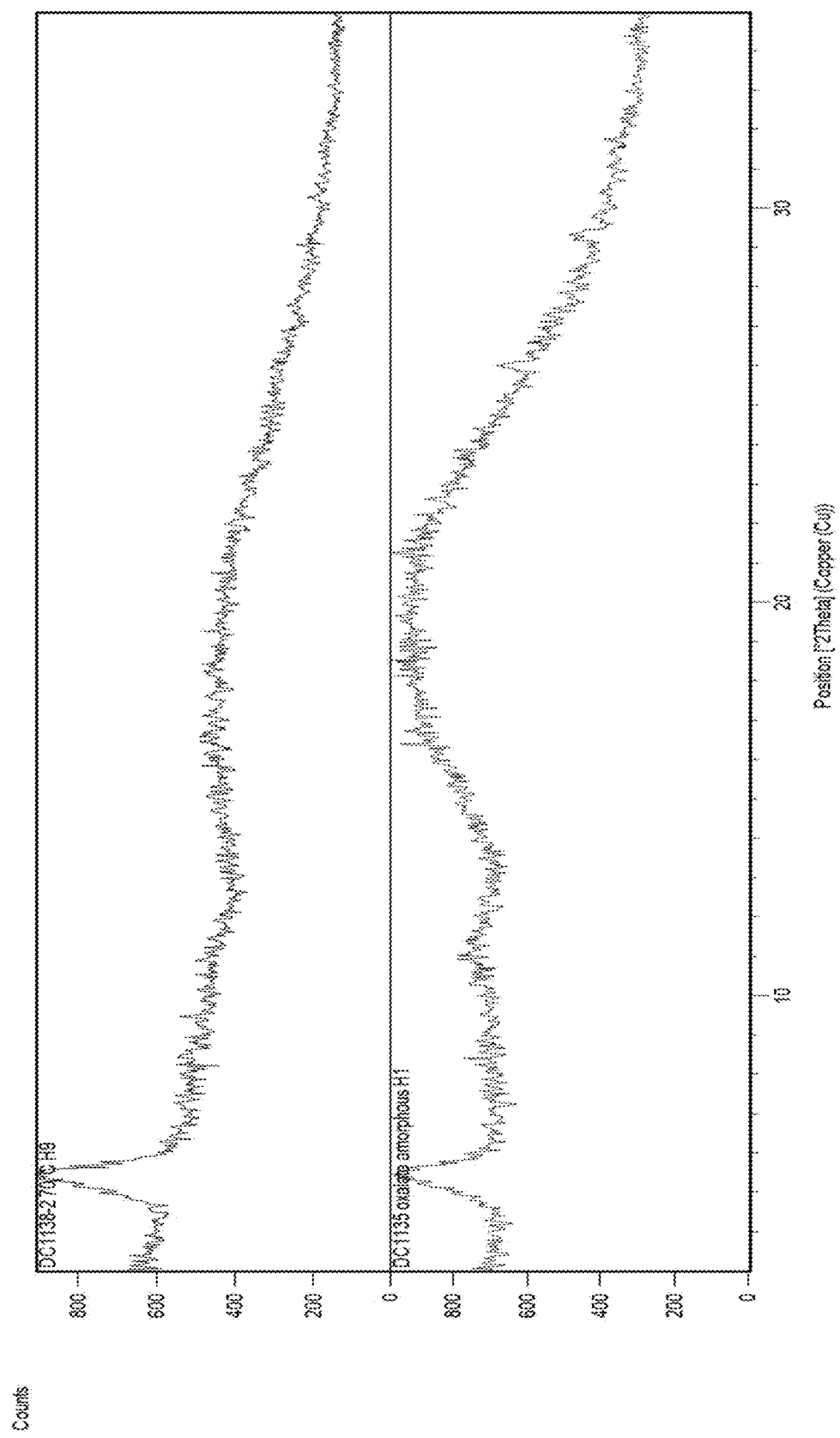
FIG. 39 shows XRPD patterns of amorphous D-LSD oxalate salt.

Experimental: D-LSD amorphous oxalate (Lot: DC1134, ~50 mg) was pressed with a force of $10^5$N for approximately 24 hours. The solids were then removed from the press for analysis by XRPD. After the compression experiment, LSD amorphous oxalate salt remained as an amorphous solid. FIG. 39 shows XRPD patterns of solids isolated following compression, D-LSD amorphous oxalate salt reference (bottom) and LSD amorphous oxalate salt isolated after the compression experiment (top).

Example 32—Heat Cycled Maturation of D-LSD Oxalate Salt (DC1108)

The amorphous oxalate salt was subjected to heat cycled maturation in a range of solvents.

Experimental: Amorphous D-LSD oxalate (lot: DC1135; 24×50 mg) was weighed into crystallization tubes, solvent (various vol charges) was added, and the mixtures equilibrated at 25° C. for ca. 15 minutes. Solvent was then added, and temperature increased to assess for dissolution and to provide a series of maturations/recrystallizations, increasing systematically up to 70° C. and 20 volumes.

The mixtures were thermally cycled between 70 and 25° C. over 48 hours with a minimum of 5 hours at temperature during heating phases. Solids were isolated at two temperatures, at 25° C. during the last cycle and also at elevated temperature.

Lower boiling solvents were equilibrated up to 45° C. Any solutions were clarified to clean, hot tubes to deliver unbiased recrystallizations and isolated either following cooling or via slow evaporation.

All solids were analysed by filtration and liquors were analysed by HPLC to obtain solubility measurements versus a standard of known concentration. Solids were selected for purity assessment to inform of impurity rejection and/or potential stability issues.

All solids were dried at 45° C. in vacuo ahead of analysis.

The form fate of the solids following equilibration is presented in TABLE 2.

TABLE 2

| ID | Solvent | Form fate by XRPD 25° C. | Form fate by XRPD 45° C./70° C. | Solubility 25° C. (mg/ml) |
|---|---|---|---|---|
| 3 | TBME | Pattern B | Pattern B | — |
| 5 | Me—THF | amorphous + peaks | amorphous + peaks | 6.14 |
| 6 | CPME | amorphous + peaks | Insuff. material | — |
| 7 | 1,4-dioxane | Pattern C | Pattern C | 9.20 |
| 8 | EtOAc | amorphous + Pattern B peaks | amorphous + peaks | 3.42 |
| 9 | IP AC | Pattern B | Pattern B | 4.63 |
| 10 | acetone | Pattern B | Pattern F | — |
| 11 | MEK | Pattern B | Pattern C | 2.61 |
| 12 | MIBK | Pattern B | Pattern B | 1.60 |
| 13 | Anisole | Pattern F | Pattern B | — |
| 14 | toluene | Amorphous + Pattern C | Pattern C | — |
| 15 | Chlorobenzene | Pattern A | Pattern A | 2.30 |
| 16 | MeCN | Pattern B | Pattern B | 5.49 |
| 18 | heptane | Pattern B | Pattern B | — |
| 20 | nitromethane | Pattern G | Pattern D | 6.49 |

TABLE 2-continued

| ID | Solvent | Form fate by XRPD | | Solubility 25° C. (mg/ml) |
|---|---|---|---|---|
| | | 25° C. | 45° C./70° C. | |
| 21 | DCM | Pattern E | Pattern E | — |
| 22 | THF:water (95:5) | Pattern B | Insuff. material | 8.67 |
| 23 | iPrOAc:water (98:2) | Pattern B + Pattern C | Insuff. material | — |

The API was shown to have excellent solubility of >200 mg/ml at 25° C. in the following solvents and solvent mixtures: EtOH and MeOH.

The majority of the solids isolated from the screen at both 25° C. and at elevated temperatures corresponded to a new pattern designated as Pattern B. Pattern A was isolated following maturation in chlorobenzene. Pattern E was isolated once following maturation in DCM. Pattern D material was isolated from maturation in nitromethane as a solvent at 70° C. and the powder converted to Pattern G using the same solvent at 25° C.

A representative sample of Pattern B (Lot: DC1136-18) was analysed by DSC. The thermogram showed endo onset at 176 and 204° C., respectively.

D-LSD oxalate Pattern C (Lot: DC1136-11) was characterized by DSC and TGA. DSC thermogram illustrated a first broad endo onset at 41° C., a second endo onset at 137° C. and a third endo onset at 200°. The TGA showed a weight loss of 0.6% w/w between 25-75° C. which corresponded with the first endotherm in the DSC and a second weight loss of 0.6% w/w between 75-210° C.

D-LSD oxalate Pattern E material was characterized by DSC and TGA. DSC thermogram showed a poor thermal profile with 2 endo onsets at 44 and 207° C. The corresponding TGA illustrated a weight loss of 2.4% w/w between 80-150° C.

D-LSD oxalate Pattern G material was characterized by DSC and TGA. DSC thermogram showed a first endo onset at 119° C. followed by the melting endo at 204° C. The TGA showed a weight loss of 1.38% w/w between 80-160° C.

Figure 40:
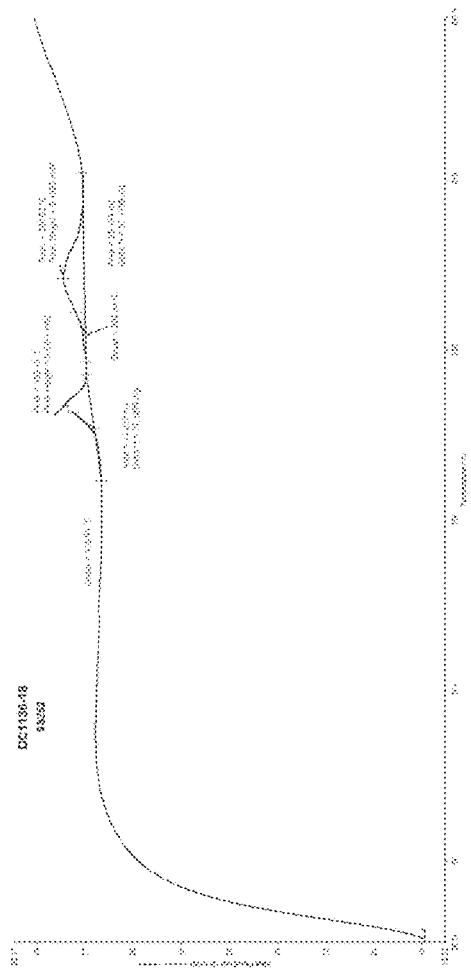
FIG. 40 is a DSC thermogram of D-LSD oxalate Pattern B.
Figure 41:
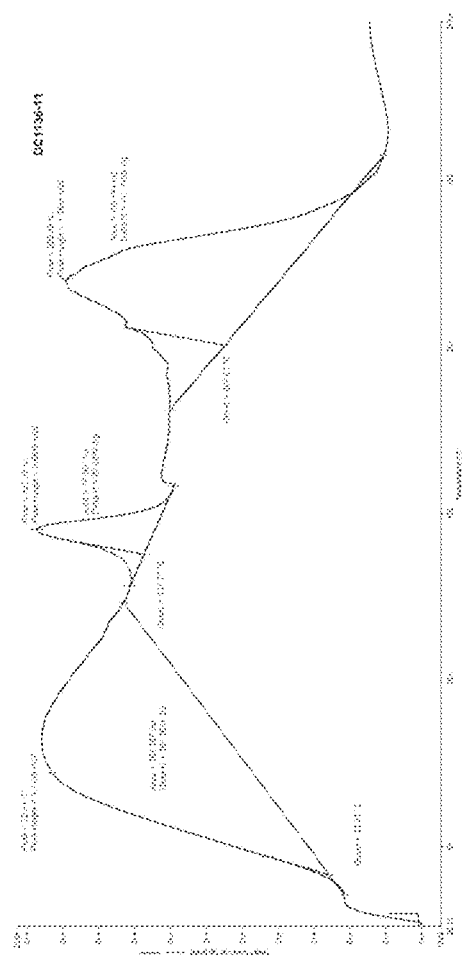
FIG. 41 is a DSC thermogram of D-LSD oxalate Pattern C.
Figure 42:
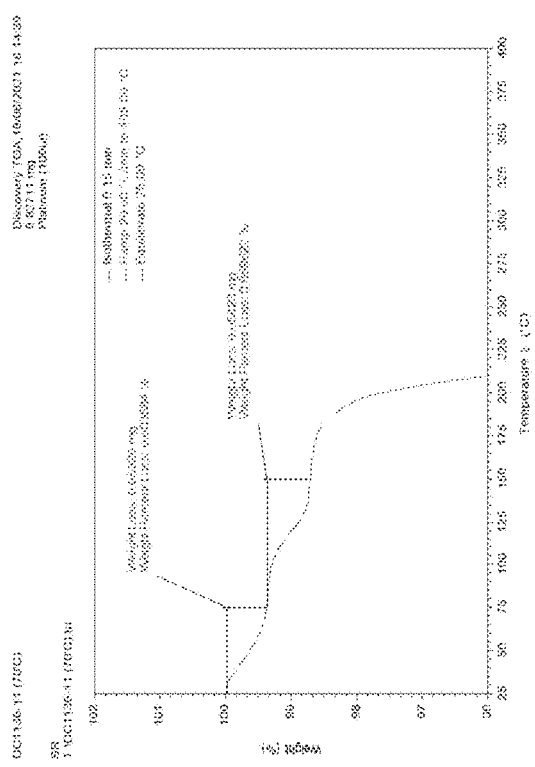
FIG. 42 is a TGA thermogram of D-LSD oxalate Pattern C.
Figure 43:
FIG. 43 is a DSC thermogram of D-LSD oxalate Pattern E.
Figure 44:
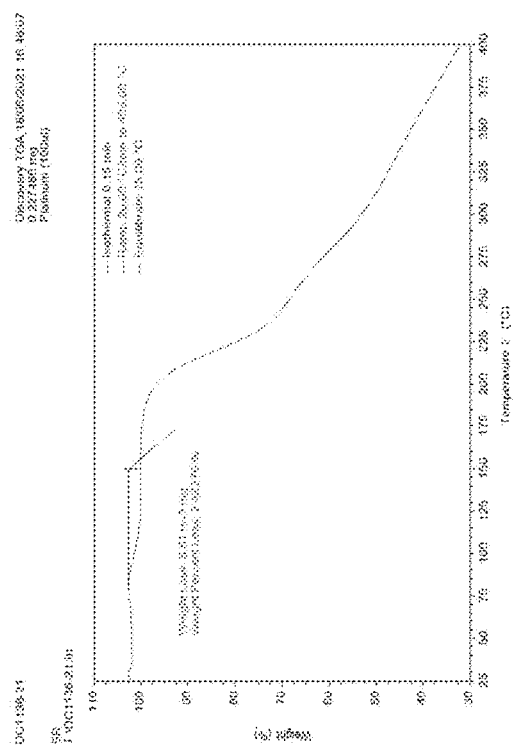
FIG. 44 is a TGA thermogram of D-LSD oxalate Pattern E.
Figure 45:
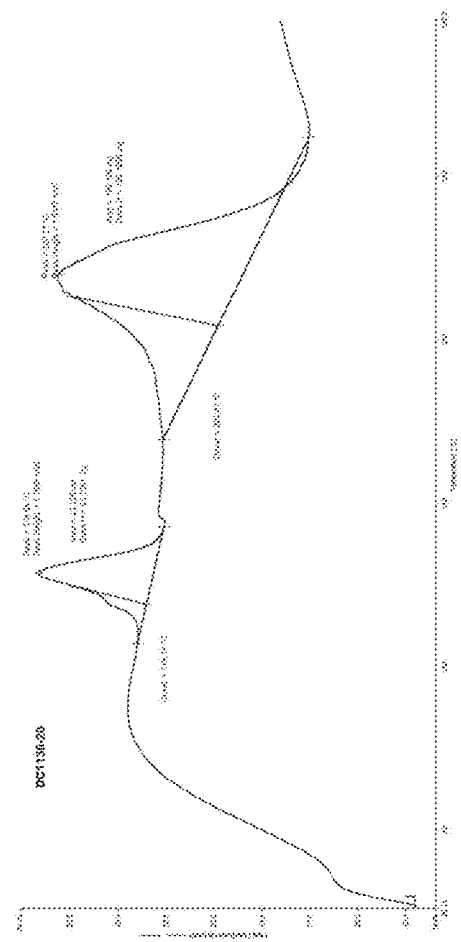
FIG. 45 is a DSC thermogram of D-LSD oxalate Pattern G.
Figure 46:
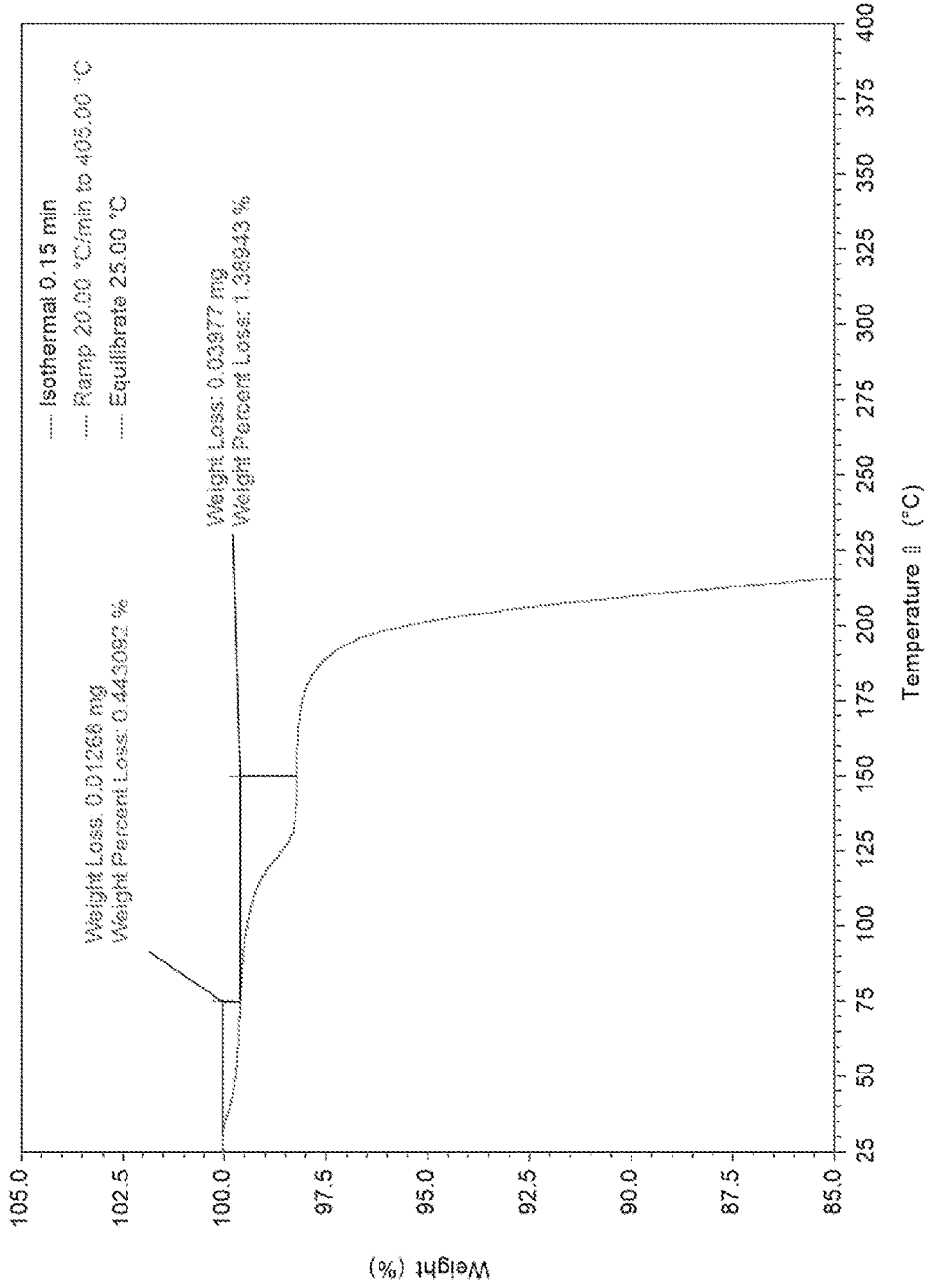
FIG. 46 is a TGA thermogram of D-LSD oxalate Pattern G.
Figure 47:
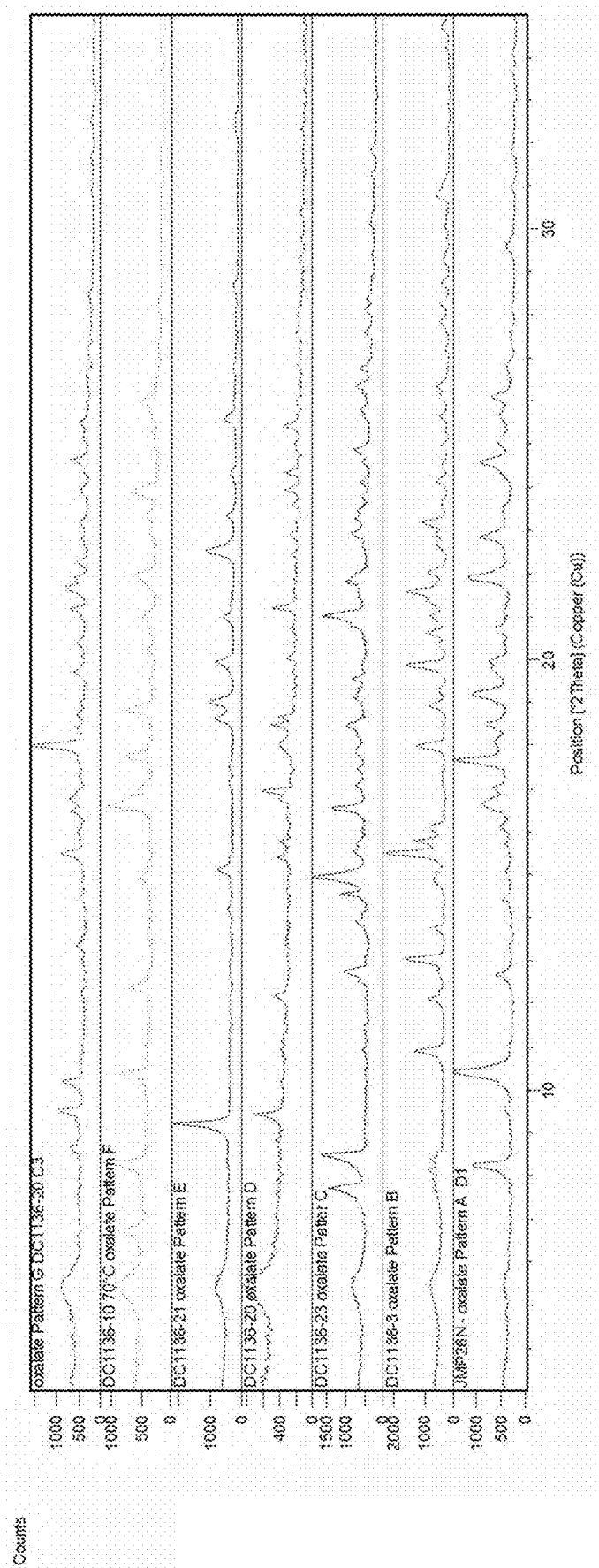
FIG. 47 shows XRPD patterns of D-LSD oxalate salt Pattern A (bottom), Pattern B, Pattern C, Pattern D, Pattern E, Pattern F and Pattern G (top)

FIG. 40 shows a DSC thermogram of D-LSD oxalate Pattern B. FIG. 41 shows a DSC thermogram of D-LSD oxalate Pattern C. FIG. 42 shows a TGA thermogram of D-LSD oxalate Pattern C. FIG. 43 shows a DSC thermogram of D-LSD oxalate Pattern E. FIG. 44 shows a TGA thermogram of D-LSD oxalate Pattern E. FIG. 45 shows a DSC thermogram of D-LSD oxalate Pattern G. FIG. 46 shows a TGA thermogram of D-LSD oxalate Pattern G. FIG. 47 shows XRPD patterns overlap of the Pattern A (bottom), Pattern B, Pattern C, Pattern D, Pattern E, Pattern F and Pattern G (top) isolated after the maturation experiments.

Example 33—Amorphous Phosphate Salt

Preparation of Amorphous Phosphate Salt

Accessing the amorphous phase of a solid is very useful in polymorph screening as it is a metastable, high-energy phase which will often readily reorganise into more thermodynamically stable crystalline forms.

Generation of amorphous D-LSD phosphate salt was attempted using a freeze-drying method from water.

Figure 48:
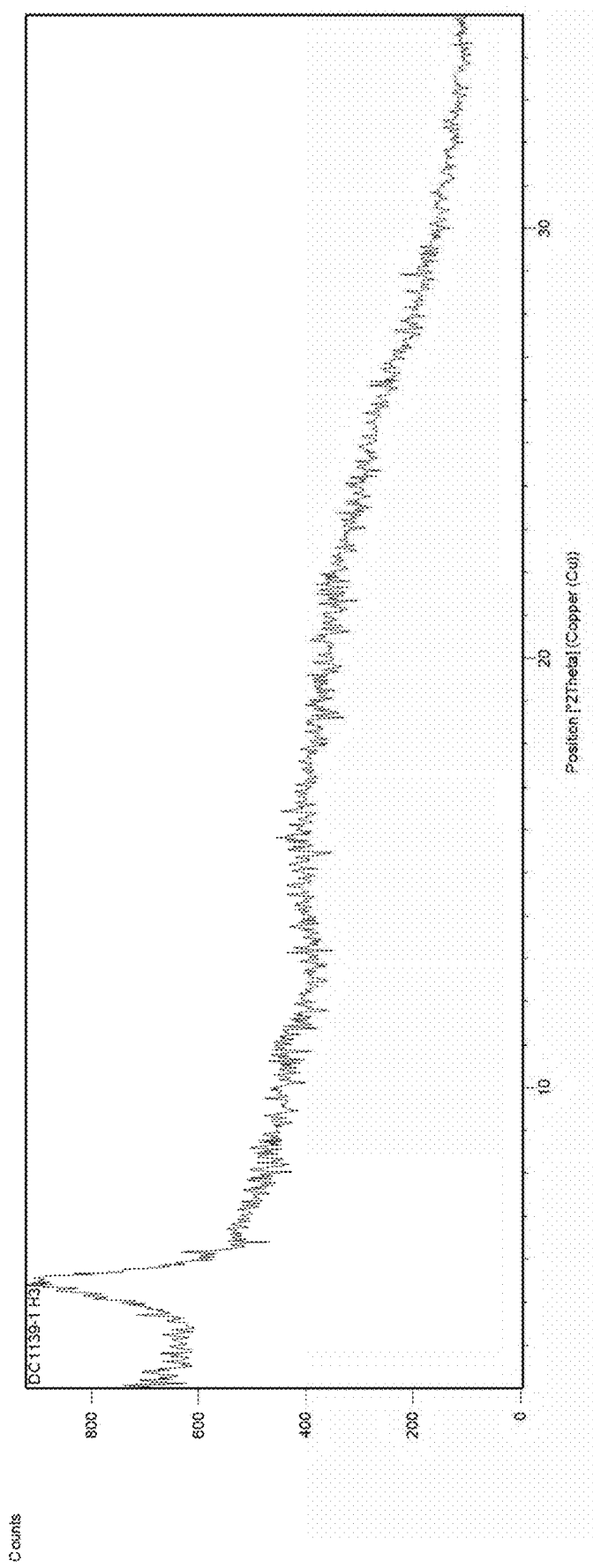
FIG. 48 is an XRPD Pattern of amorphous D-LSD phosphate salt.
Figure 49:
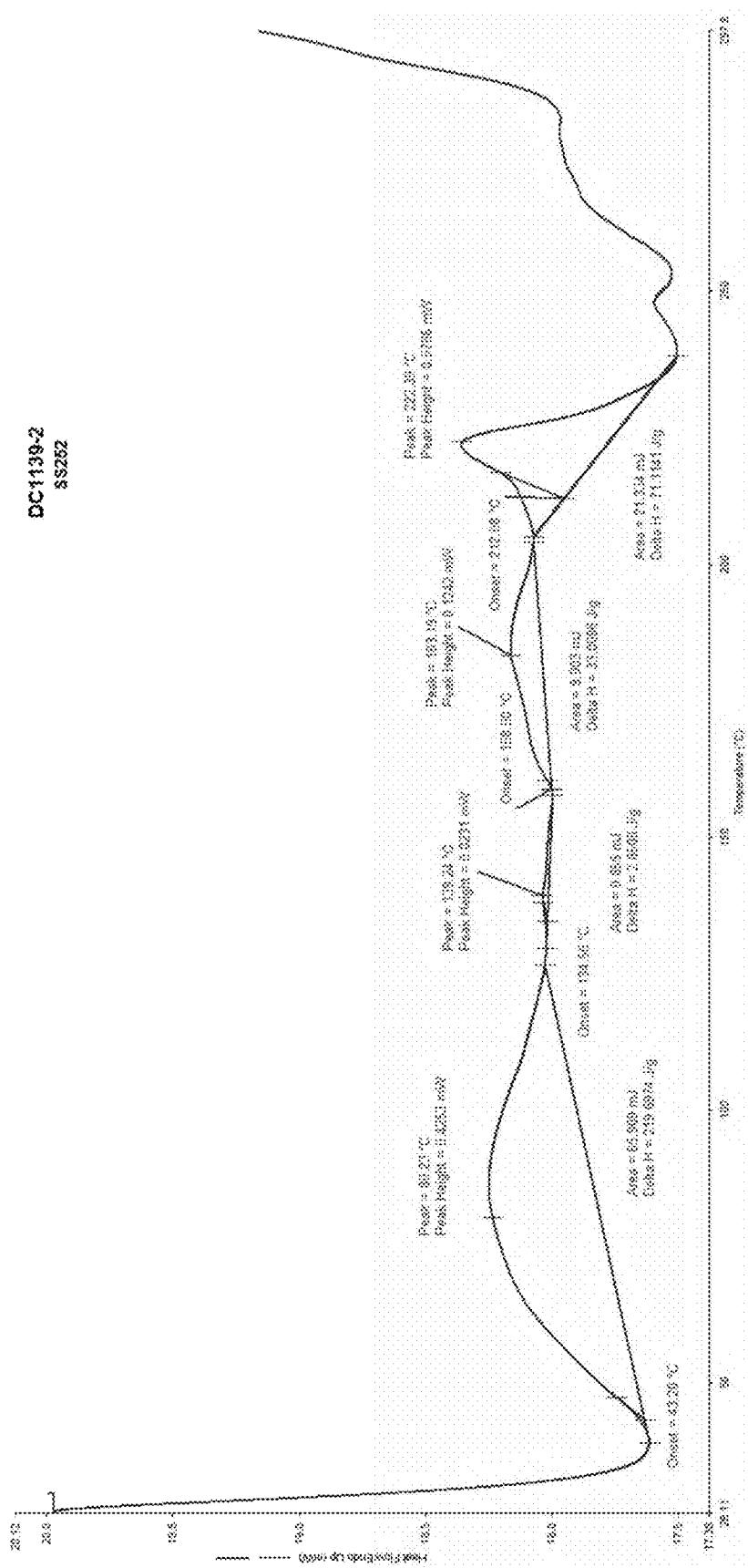
FIG. 49 is a DSC thermogram of amorphous D-LSD phosphate salt.

The material recovered was analyzed by XRPD and DSC. The amorphous phase was successfully generated in FIG. 48. Thermal analysis showed a relatively complicated thermal profile (FIG. 49). The profile was typical of an amorphous solid with poorly defined thermal events with four corresponding endotherms observed by DSC at 43, 134, 158 and 212° C.

Example 34

Polymorph Screen for D-LSD Phosphate Salt
Solvent Maturation of Amorphous D-LSD Phosphate Salt (DC1139)

A series of solvent mediated equilibrations with temperature oscillation of the amorphous phase of D-LSD phosphate were conducted.

Experimental: Amorphous D-LSD phosphate (DC1139-2) (20×30 mg) was weighed into crystalliation tubes, solvent (20 vol) was charged, and the mixtures equilibrated at 25° C. for ca. 15 minutes. The mixtures were thermally cycled between 50 and 25° C. over 48 hours. Solids were isolated at 50° C. and 25° C. by filtration and dried in vacuo at 45° C. for 18 hours prior to data collection.

The recovered solids were analysed by XRPD and Pattern C was mainly isolated.

Figure 50:
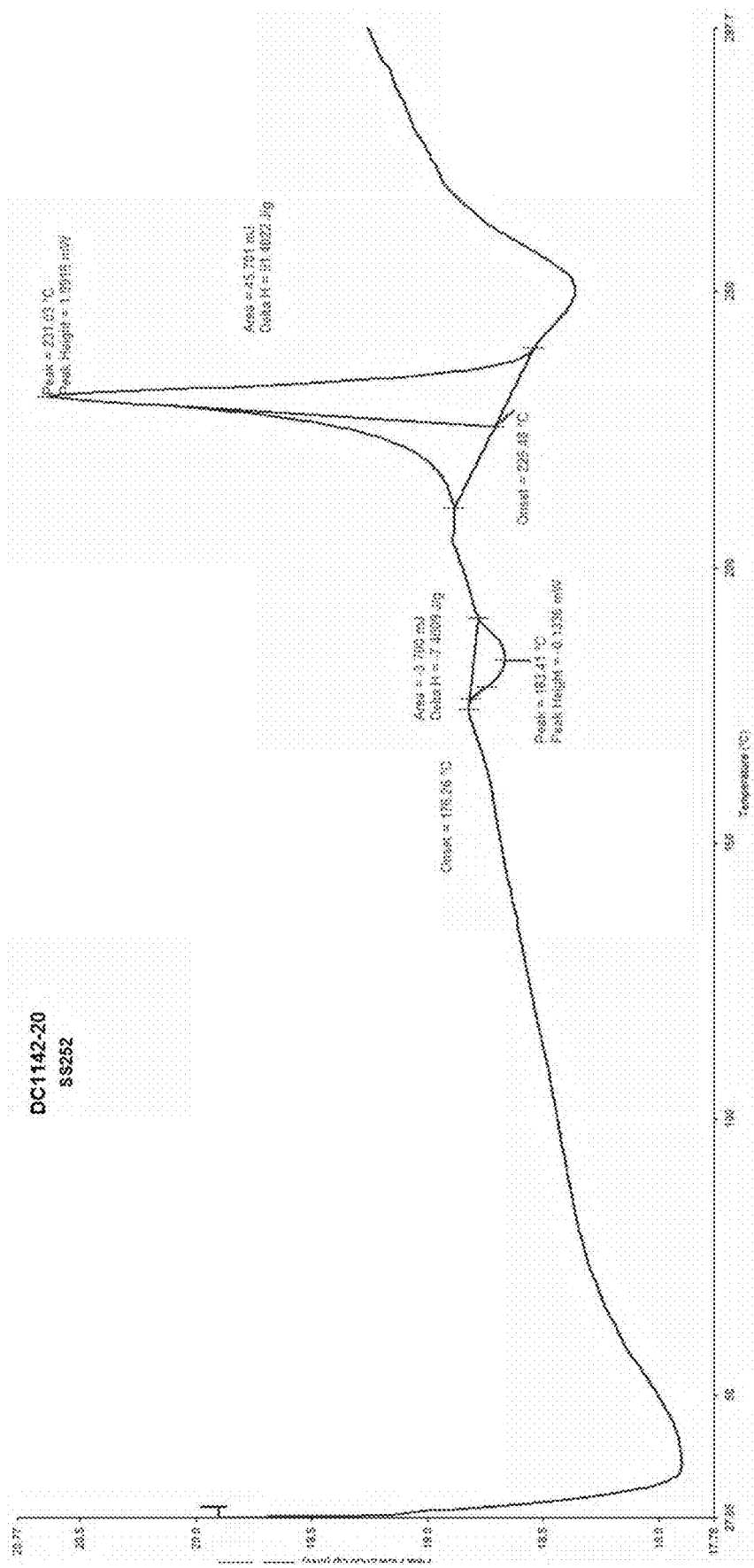
FIG. 50 is a DSC thermogram of D-LSD Phosphate Salt Pattern D.
Figure 51:
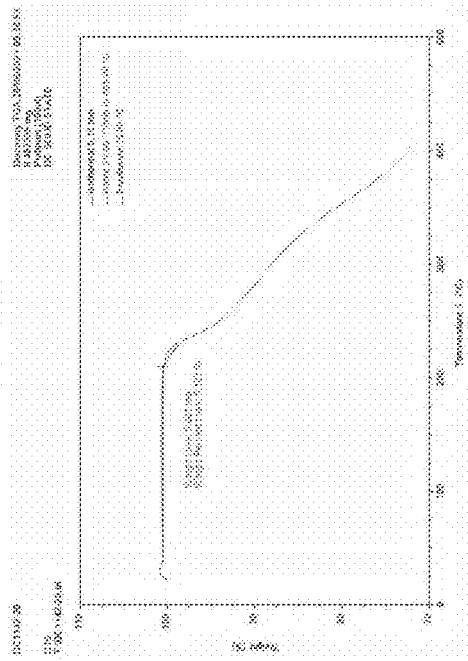
FIG. 51 is a TGA thermogram of D-LSD Phosphate Salt Pattern D.

A new pattern, Pattern D, was isolated from nitromethane at both 50° and 25° C. Thermal analysis of Pattern D (FIG. 50) showed an exo onset at ~176° C. followed by the melting onset at 225° C. Analysis by TGA (FIG. 51) showed a minimal weight loss (0.12% w/w) between 40-210° C. $^1$H NMR spectrum conformed to the molecular structure and no residual solvent was observed. FIG. 5 shows Pattern A reference (bottom first trace); Pattern B reference (second trace); Pattern C reference (third trace); Pattern D isolated after maturation in nitromethane at 50° C. (fourth trace); Pattern D isolated after maturation in nitromethane at 25° C. (fifth trace).

Figure 52:
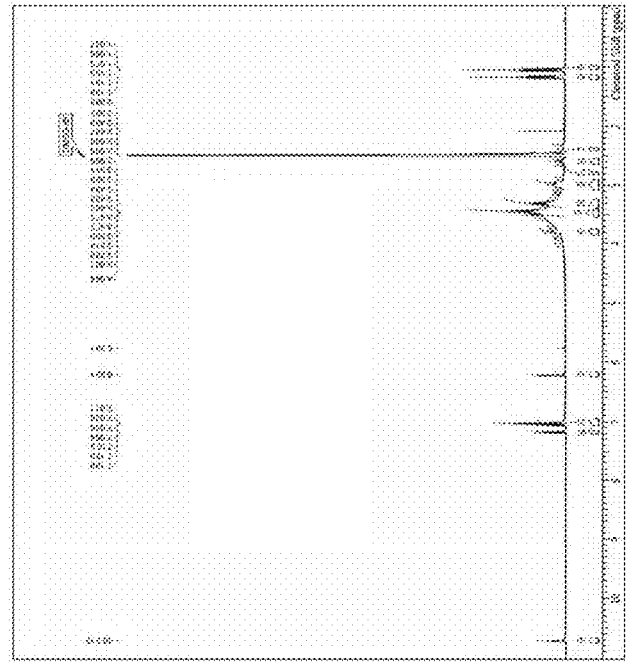
FIG. 52 is a $^1$H NMR spectrum of D-LSD Phosphate Salt Pattern D)

Pattern D represents an anhydrous phase that likely recrystallizes to Pattern C as shown in the DSC thermogram of the solid. FIG. 52 is a $^1$H NMR spectrum of Pattern D.
Anti-Solvent Mediated Crystallization of D-LSD Phosphate Salt (DC1145)

Anti-solvent mediated crystallization is a useful method for identifying new forms or versions of a solid as once dissolved, the API has no form memory and can recrystallize without bias. Solubility assessment of the API during the initial solvent maturation experiment had identified several solvents and anti-solvents to be used.

Experimental: D-LSD phosphate salt stock solutions were prepared by dissolving the material (200 mg, DC1134) in the minimum amount of water and DMSO. The stock solutions were then clarified into clean sample vials. Aliquots (25 mg API) of the stock solutions were placed into 16 crystallization tubes, pre-heated to 50° C. (30° C. for DCM). Anti-solvents, pre-heated to 50° C. were then added in 2 volume charges until a hazy solution was seen or until 20 volumes of anti-solvent were added. The solutions were then cooled and equilibrated at 25° C. for 24 hours.

Results and observations are presented in TABLE 3.

XRPD analysis showed that Pattern C was mainly isolated, and Pattern B was obtained from water and nitromethane. Pattern B had previously been obtained from a reactive crystallization of the salt in ethanol and was isolated following equilibration of Pattern B in IPA/water. The solutions obtained were placed in a fridge and will be observed after one week.

TABLE 3

| ID | Solvent | Anti-solvent | Volume added | Observations at 50° C./ 30° C. | Observations at ambient temperature | Form by XRPD |
|---|---|---|---|---|---|---|
| DC1145-1 | water | acetone | 20 | Solution | Solution | — |
| DC1145-2 | (10 vol) | MeCN | 20 | Solution | Solution | — |
| DC1145-3 | | 1,4-dioxane | 20 | Solution | Solution | — |
| DC1145-4 | | EtOH | 20 | Solution | Solution | — |
| DC1145-5 | | MeOH | 20 | Solution | Solution | — |
| DC1145-6 | | THF | 20 | Solution | Solution | — |
| DC1145-7 | | DMF | 20 | Solution | Solution | — |
| DC1145-8 | | IPA | 20 | Suspension | Suspension | Pattern B |
| DC1145-9 | DMSO | acetone | 20 | Small transparent crystals | Suspension | Pattern C |
| DC1145-10 | (10 vol) | MTBE | 15 | Solution | Solution | — |
| DC1145-11 | | 1,4-dioxane | 20 | Solution | Solution | — |
| DC1145-12 | | EtOH | 20 | Suspension | Suspension | Pattern C |
| DC1145-13 | | MeOH | 20 | Solution | Solution | — |
| DC1145-14 | | THF | 20 | Solution | Solution | — |
| DC1145-15 | | DMF | 20 | Suspension | Suspension | Pattern C |
| DC1145-16 | | MEK | 20 | Suspension | Suspension | Pattern C |

Pattern B material was analysed by XRPD, DSC and proton NMR.

The XRPD pattern of Pattern B isolated from IPA/water was similar to the Pattern B isolated after the scale up in EtOH. The phases are isostructural solvates. The Pattern B isolated after the scale up was an ethanol solvate, whereas the Pattern B isolated from IPA/water was an IPA solvate.

Figure 53:
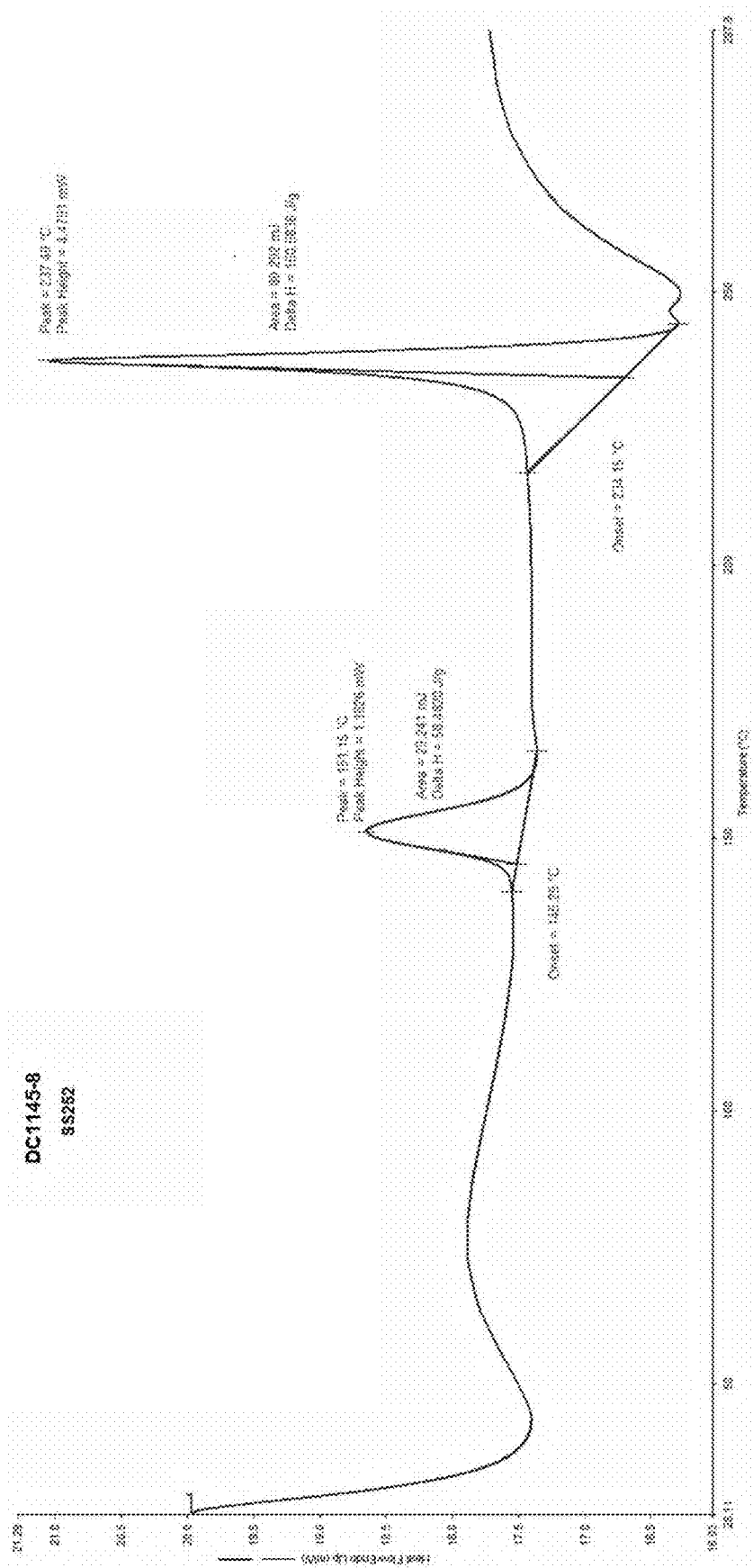
FIG. 53 is a DSC thermogram of D-LSD Phosphate Salt Pattern B.

Thermal analysis of Pattern B isolated from water/IPA showed a first endo onset at 145° C., followed by the melting endo onset at 234° C. (FIG. 53). The proton NMR spectrum corresponded to the molecular structure and the presence of IPA was confirmed (~0.5 mol eq.).

Solvent Vapour Diffusion of Amorphous D-LSD Phosphate (DC1140)

An investigation of the propensity of amorphous D-LSD phosphate to polymorphism was conducted using the solvent vapour diffusion technique with amorphous input. This technique uses a less forcing system and allows an API to order itself from surface interaction of solvent to induce crystallization.

Experimental: Solvent vapour chambers were prepared by dosing solvent (3 ml, TABLE 4) into a glass vial. Into this vapour chamber was placed a smaller glass vial containing amorphous API (30 mg, DC1134). The chamber was sealed and allowed to equilibrate without disturbance for 2 weeks ahead of observation and XRPD analysis. Results and observations are shown in TABLE 4.

Figure 59:
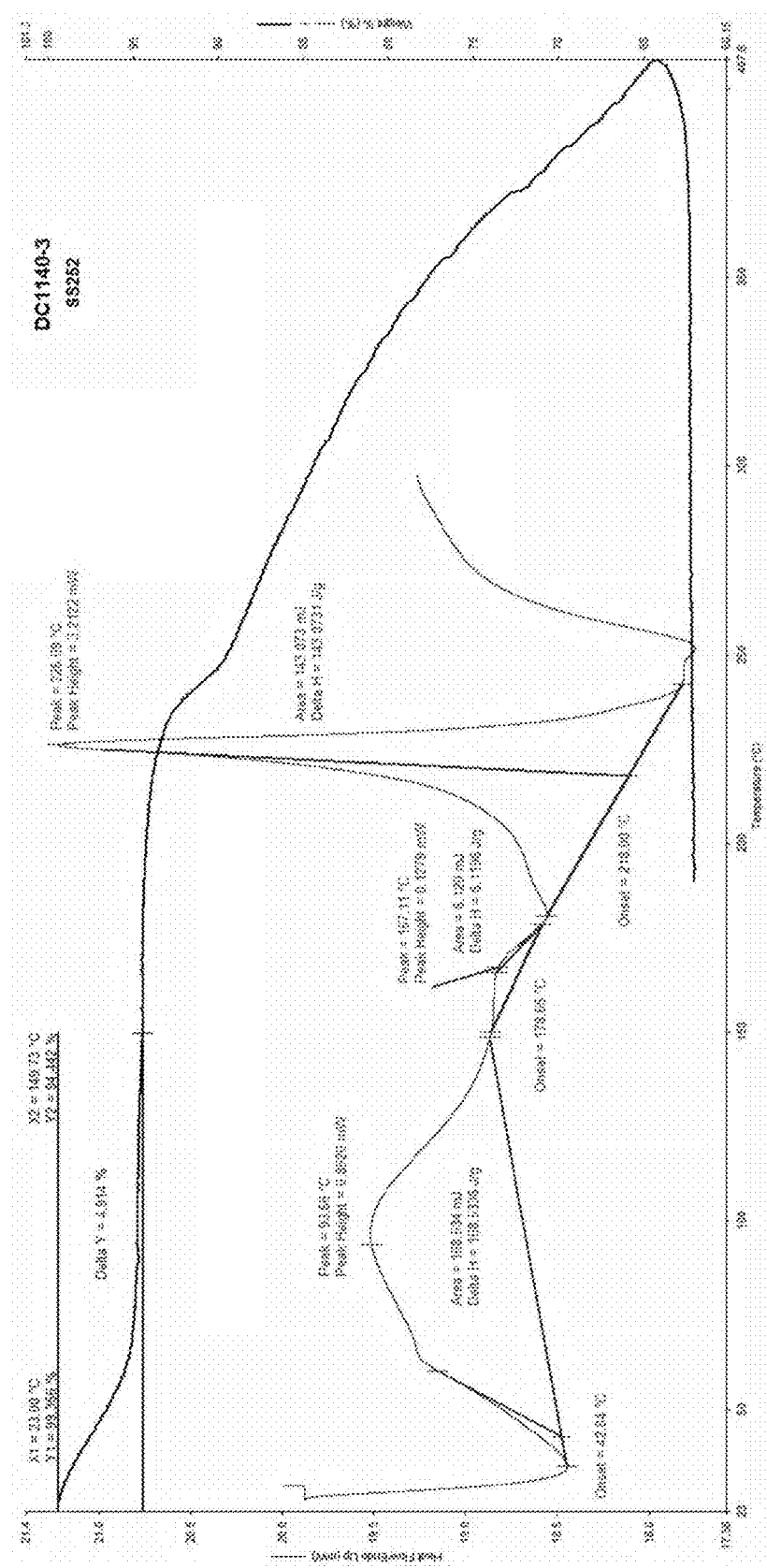
FIG. 59 shows DSC/TGA thermograms for D-LSD phosphate salt Pattern E.
Figure 60:
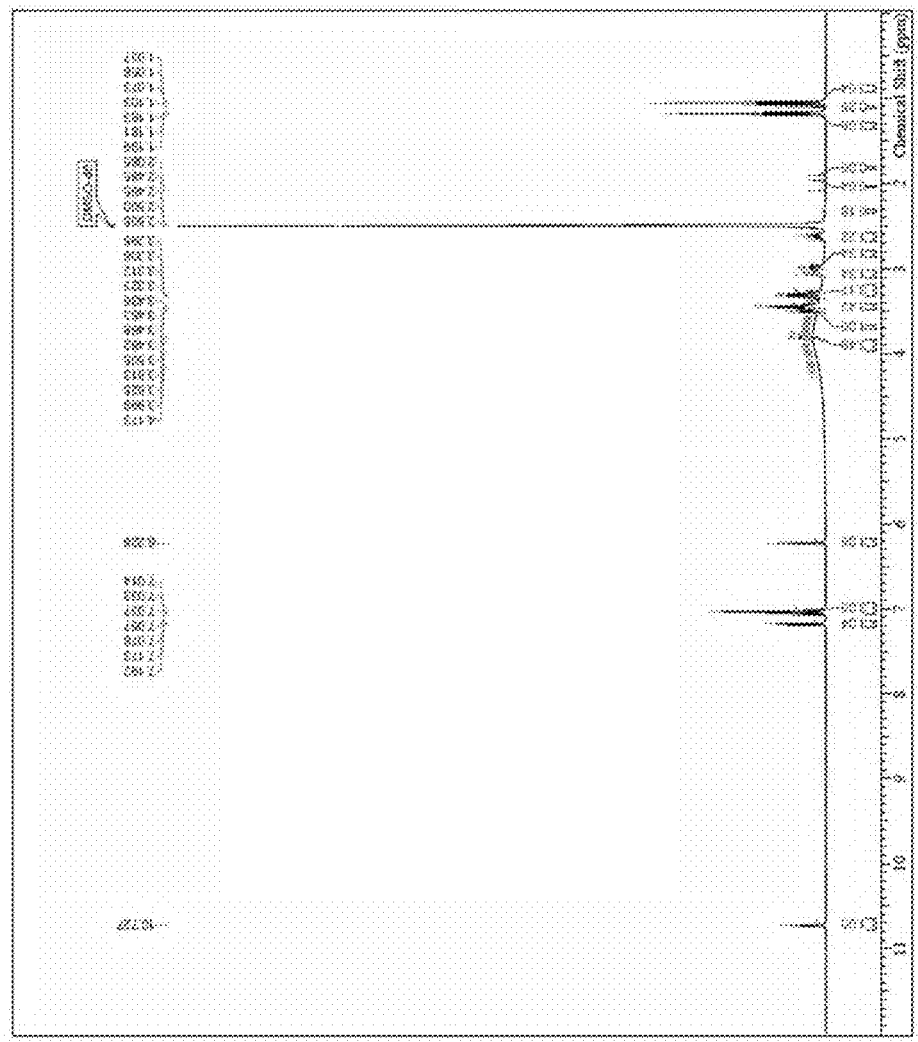
FIG. 60 is a $^1$H NMR spectrum of D-LSD phosphate Pattern E.

D-LSD phosphate Pattern C salt was mainly recovered, but a new pattern named Pattern E was isolated. This material was characterized by XRPD (FIG. 58), DSC, TGA and proton NMR. DSC thermogram (FIG. 59) showed a first endo onset at 42° C., a second endo onset at 178° C., followed of the endo melting onset at 218° C. TGA analysis showed a weight loss of 4.9% (0.25 mol eq. of MTBE) between 29-149° C. $^1$H NMR spectrum conformed to the molecular structure and the presence of MTBE was observed (~0.1 mol eq.). FIG. 60 is a $^1$H NMR spectrum of D-LSD phosphate Pattern E.

TABLE 4

| Sample ID | Solvent | Observation at 1 week | XRPD at 1 week | XRPD at 2 weeks |
|---|---|---|---|---|
| DC1140-1 | EtOH | beige solid | beige solid | Pattern B |
| DC1140-2 | MeOH | brown solid | brown solid | Pattern C |
| DC1140-3 | TBME | beige solid | beige solid | Pattern E |
| DC1140-4 | THF | beige solid | beige solid | Pattern C |
| DC1140-5 | 1,4-dioxane | beige solid | beige solid | Pattern C |
| DC1140-6 | EtOAc | beige solid | beige solid | Pattern C |
| DC1140-7 | acetone | brown solid | brown solid | Pattern C |
| DC1140-8 | Cl-benzene | beige solid | beige solid | peaks |
| DC1140-9 | MeCN | brown solid | brown solid | Pattern C |
| DC1140-10 | heptane | beige solid | beige solid | amorphous + peaks |
| DC1140-11 | nitromethane | beige solid | beige solid | Pattern C |
| DC1140-12 | DCM | brown solid | brown solid | Pattern D |

Mixed Solvent Cooling Crystallization of D-LSD Phosphate Salt (DC1149)

Investigations identified a range of solvents and anti-solvents of the API which can be exploited to provide a variety of modes of crystallization. The form fate of D-LSD oxalate salt was further assessed by a series of mixed solvent cooling crystallizations.

Experimental: Amorphous D-LSD phosphate salt (DC1135, 8×25 mg) was weighed into crystallization tubes and suspended in the relevant anti-solvent (detailed in TABLE 5) (10 vol). Temperature was increased to 50° C. and solvent was added in aliquots until a solution was achieved. Solutions were cooled and equilibrated at room temperature for 16 hours. Solids were isolated by filtration and dried in vacuo at 40° C. for 18 hours prior to data collection.

Results and observations shown in TABLE 5.

The suspension recovered were filtered and analysed by XRPD. Pattern B was isolated from EtOH/water. Pattern C was isolated from MeOH/water, 1,4-dioxane/water and MeCN/ water. The solutions obtained were slow evaporated and gel samples were recovered.

TABLE 5

| Entry | Anti-Solvent | Solvent | Volume of solvent added | Obs 50° C. | Obs RT cool | XRPD |
|---|---|---|---|---|---|---|
| DC1149-1 | EtOH | water | 4 | Suspension | Suspension | Pattern B |
| DC1149-2 | MeOH | | 2 | Suspension | Suspension | Pattern C |
| DC1149-3 | THF | | 2 | Solution | Solution | gel |
| DC1149-4 | Acetone | | 4 | Suspension | Suspension | Amorphous + peaks |
| DC1149-5 | 1,4-dioxane | | 4 | Suspension | Suspension | Pattern C |
| DC1149-6 | IPA | | 10 | Solution | Solution | gel |
| DC1149-7 | MeCN | | 4 | Solution | Solution | Pattern C |
| DC1149-8 | butanol | | 4 | Solution | Solution | gel |

Example 35—Polymorph Screen for D-LSD Oxalate Salt

Mixed Solvent Cooling Crystallizations of D-LSD Oxalate Salt (DC1143)

Investigations conducted during the programme of works identified a range of solvents and anti-solvents of the API which can be exploited to provide a variety of modes of crystallization. The form fate of D-LSD oxalate salt was further assessed by a series of mixed solvent cooling crystallizations.

Experimental: Amorphous D-LSD oxalate salt (DC1135, 8×25 mg) was weighed into crystallization tubes and suspended in the relevant anti-solvent (detailed in TABLE 6) (10 vol). Temperature was increased to 50° C. and solvent was added in aliquots until a solution was achieved. Solutions were cooled and equilibrated at room temperature for 16 hours. Solids were isolated by filtration and dried in vacuo at 40° C. for 18 hours prior to data collection.

Results and observations shown in TABLE 6.

TABLE 6

| Entry | Anti-Solvent | Solvent | Volume of solvent added | Obs 50° C. | Obs RT cool | Slow evaporation | XRPD |
|---|---|---|---|---|---|---|---|
| DC1143-9 | heptane | MeOH | 36 | Solution - precipitated quickly | Suspension | — | Pattern B |
| DC1143-10 | TBME | | 36 | Solution - precipitated quickly | Suspension | — | Pattern B |
| DC1143-11 | THF | | 15 | Solution | Solution | Gel | — |
| DC1143-12 | toluene | | 15 | Solution | Solution | Solid | Pattern B |
| DC1143-13 | MeCN | | 9 | Solution | Suspension | — | Pattern B |
| DC1143-14 | Ethyl acetate | | 10 | Solution | Solution | Solid | Pattern B |
| DC1143-15 | 1,4-dioxane | | 10 | Solution | Solution | Gel | — |
| DC1143-16 | acetone | | 15 | Solution | Suspension | — | Pattern B |

Example 36

Polymorph Screen for D-LSD Sulfate Salt
Slurry Experiments (DC1162)

Sufficient D-LSD sulfate salt (lot: DC1151) was added to a given solvent until undissolved solids remained at the desired temperature (25° C.). The crystallization tube was sealed, and the slurry was maintained at the selected temperature and agitated by magnetic stirring for 3 days. Solids were isolated by filtration through a 0.45 μm PTFE filter prior to analysis by XRPD. The results are shown in TABLE 7. Gel samples were mainly obtained.

TABLE 7

| Sample | Solvent | Result | XRPD |
|---|---|---|---|
| DC1162-1 | cyclohexane | gel | — |
| DC1162-2 | heptane | gel | — |
| DC1162-3 | MIBK | gel | — |
| DC1162-4 | TBME | gel | — |
| DC1162-5 | THF | gel | — |
| DC1162-6 | acetone | gel | — |
| DC1162-7 | DCM | gel | — |
| DC1162-8 | EtOH | solid | amorphous |
| DC1165-1 | EtOH/water 98:2 | gel | — |

Example 37

Polymorph Screen for D-LSD HBr Salt
Slurry Experiments

Sufficient D-LSD HBr salt (lot: DC1152) was added to a given solvent until undissolved solids remained at the desired temperature (25° C.). The crystallization tube was sealed, and the slurry was maintained at the selected temperature and agitated by magnetic stirring for 3 days. Solids were isolated by filtration through a 0.45 μm PTFE filter prior to analysis by XRPD. The results are shown in TABLE 8. A new pattern named D-LSD HBr Pattern C was isolated and was characterized by DSC, TGA and $^1$H NMR.

Figure 54:
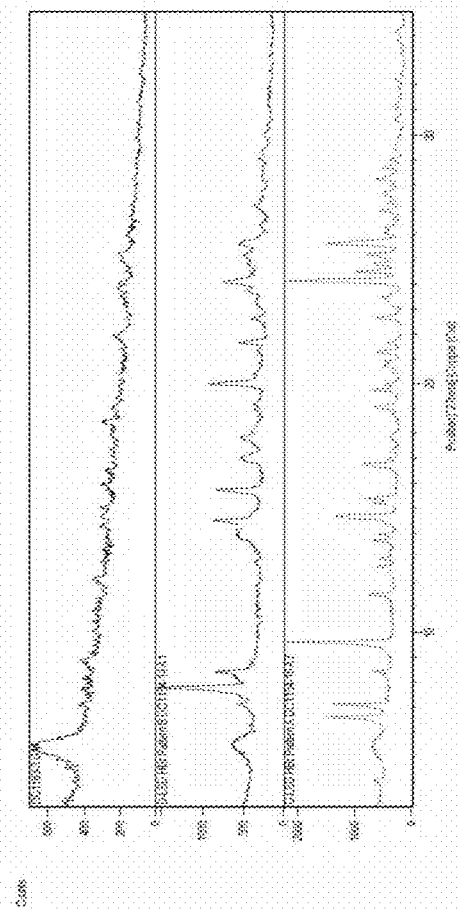
FIG. 54 shows XRPD patterns of D-LSD HBr Pattern A (bottom); D-LSD HBr Pattern B (middle); D-LSD HBr Pattern C (top)
Figure 55:
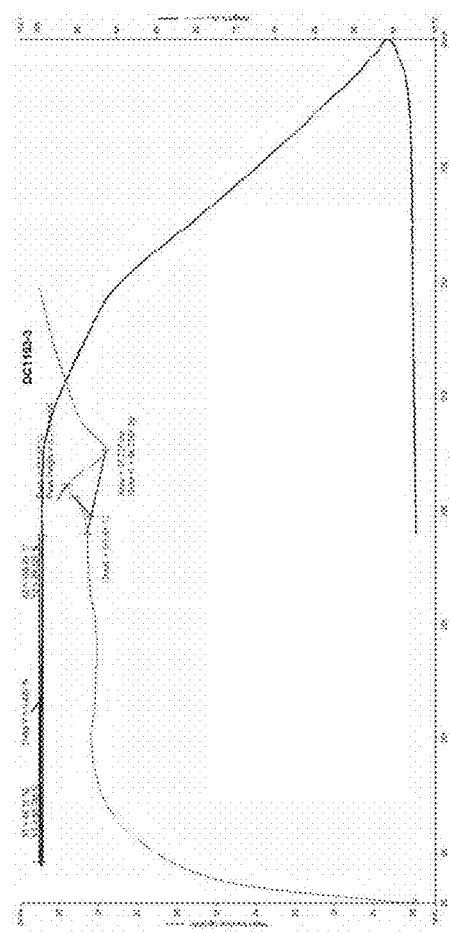
FIG. 55 is a DSC/TGA thermogram of D-LSD HBr salt Pattern C.
Figure 56:
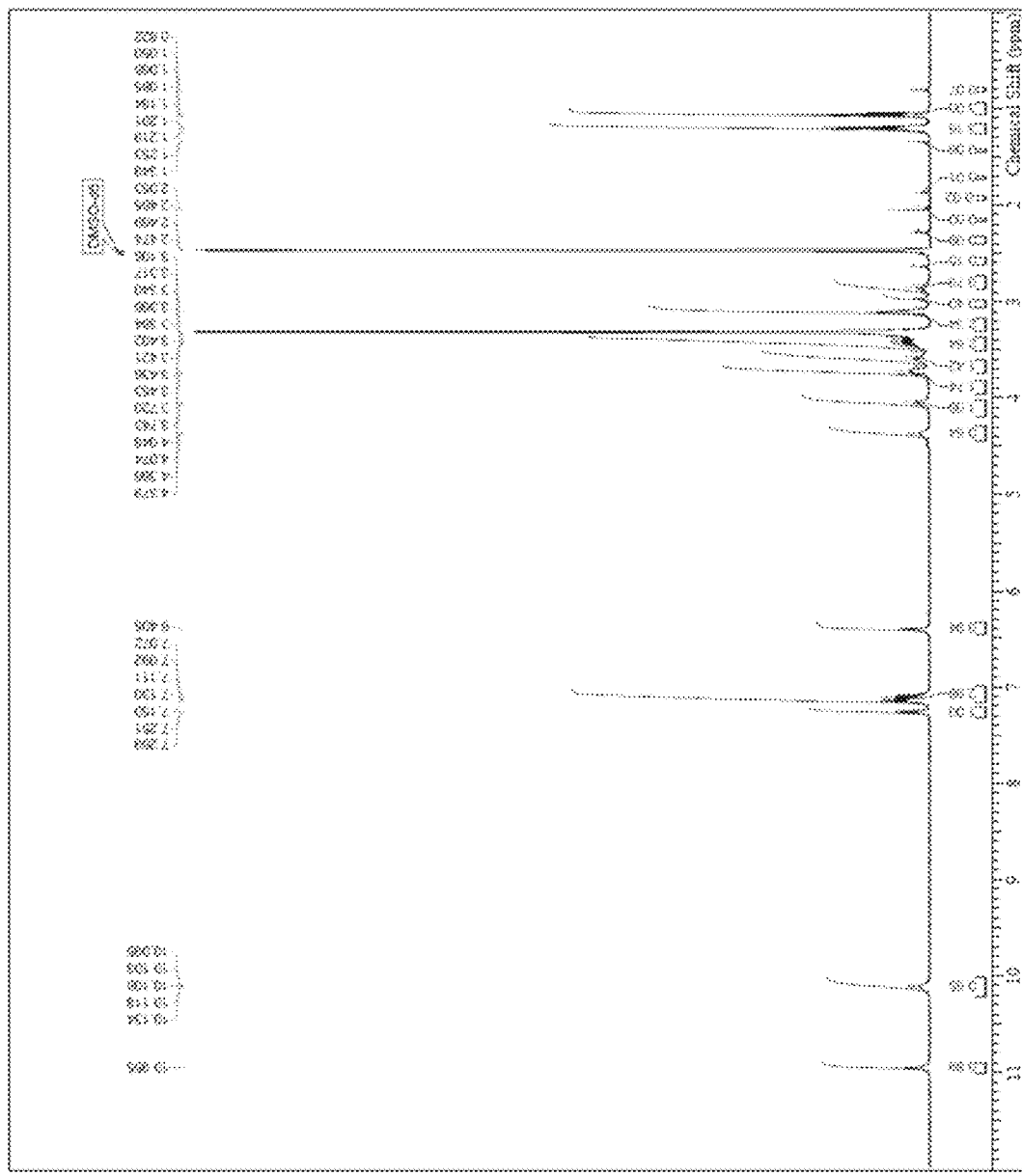
FIG. 56 is a $^1$H NMR spectrum for D-LSD HBr salt Pattern C.

The XRPD results showed that the material exhibited low crystallinity (FIG. 54). The DSC and TGA analyses illustrated a weight loss of 0.42% (w/w) between 46-189° C. and a melting onset at ~197° C. (FIG. 55). The $^1$H NMR spectrum conformed to the molecular structure and traces of impurities were detected (FIG. 56).

TABLE 8

| Sample | Solvent | Result | XRPD |
|---|---|---|---|
| DC1163-1 | MeCN | solid | Pattern A |
| DC1163-2 | heptane | solid | amorphous + Pattern A |
| DC1163-3 | MIBK | solid | Pattern C |
| DC1163-4 | TBME | solid | amorphous |
| DC1163-5 | IPAC | solid | Pattern A |
| DC1163-6 | EtOH | solid | amorphous |
| DC1163-6 | EtOAc:water (98:2 v/v) | solid | Pattern A |

Water Mixture Solvent Cooling Crystallization (DC1164)

The form fate of D-LSD HBr salt (lot: DC1152) was further assessed by a series of water mixed solvent cooling crystallizations.

Experimental: D-LSD HBr salt (lot: DC1152, 6x~25 mg) was charged to crystallization tubes and suspended in 5-10 vols of the appropriate anti-solvent. The mixtures were heated to 50° C. and stirred and equilibrated at 50° C. for ca. 30 minutes and then cooled to 25° C. and equilibrated for ca. 20 hours. The mixtures that returned a suspension at RT were isolated in vacuo and the solids dried at 45° C. for 20 hours ahead of characterization.

Results are summarized in TABLE 9. D-LSD HBr Pattern A was mainly recovered.

TABLE 9

| Sample | Solvent | Volume added | Result | XRPD |
|---|---|---|---|---|
| DC1164-2 | EtOAc: water 95:5 | 10 | solid | Pattern A |
| DC1164-3 | EtOAc:water 90:10 | 5 | gel | — |
| DC1164-4 | EtOAc:water 85:15 | 5 | solid | Pattern A |
| DC1164-6 | ACN:water 95:5 | 5 | solid | Pattern A |
| DC1164-7 | ACN:water 90:10 | 5 | solid | Pattern A |
| DC1164-8 | ACN:water 85:15 | 5 | solid | Pattern A |

Crash Precipitation of D-LSD HBr Salt (DC1167)

The crash precipitation of a solution of API into various anti-solvents is a way to assess any potential metastable forms of a crystalline solid.

Experimental: D-LSD HBr salt (DC1152) was weighed into a COC vial and dissolved in the appropriate solvent (EtOH, 10 vol at 50° C.). The solutions were then clarified into clean tubes in order to have a clear solution, free of any visible particulates. The solutions were then split into 8 aliquots per solvent in order to have ca. 25 mg of material in each aliquot. The aliquots were then transferred as one single charge into crystallization tubes charged of 10 vols of the appropriate anti-solvent and pre-cooled to 0° C. The mixtures were equilibrated for a maximum of 30 minutes at 0° C. Those entries that afforded a suspension were isolated and the solids dried at 45° C. for ca. 20 hours ahead of characterization. Amorphous materials were mainly recovered, and Pattern A was isolated from EtOH/heptane (TABLE 10).

TABLE 10

| Sample | Solvent | Antisolvent | Suspension achieved (✓/X) | XRPD |
|---|---|---|---|---|
| DC1167-1 | EtOH | toluene | ✓ | amorphous |
| DC1167-2 | | heptane | ✓ | Pattern A |
| DC1167-3 | | pentane | ✓ | amorphous |
| DC1167-4 | | MIBK | ✓ | amorphous |
| DC1167-5 | | MEK | ✓ | amorphous |
| DC1167-6 | | cyclohexane | ✓ | amorphous |

TABLE 10-continued

| Sample | Solvent | Antisolvent | Suspension achieved (✓/X) | XRPD |
|---|---|---|---|---|
| DC1167-7 | | TBME | ✓ | amorphous |
| DC1167-8 | | water | X (gel) | — |

Example 38

Preparation and Characterization of Amorphous D-LSD Sulfate Salt

D-LSD Free Base (Pattern A, 5.01 g) was placed in a round bottom flask (V=200 mL) and dissolved in EtOH (10 V). The solution was stirred at 300 rpm, at 25° C. for 30 min. Then, a stock solution of sulphuric acid in EtOH (1 M, 15.49 mL) was slowly added. The reaction was carried out at 25° C. overnight. A solution was observed and was reduced in vacuo to deliver a solid. The material recovered was analysed by XRPD, DSC, TGA and $^1$H NMR.

Yield=97.5% (6.35 g)

Figure 61:
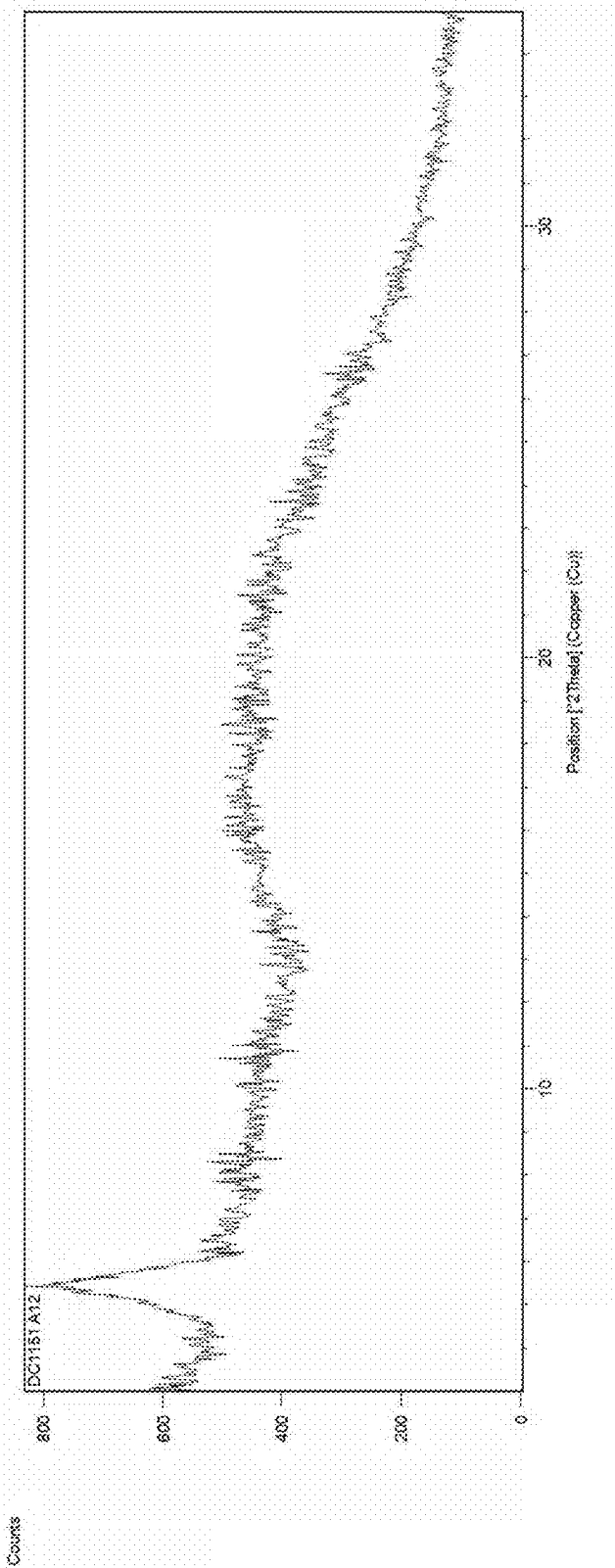
FIG. 61 is an XRPD pattern for D-LSD sulfate amorphous salt.
Figure 62:
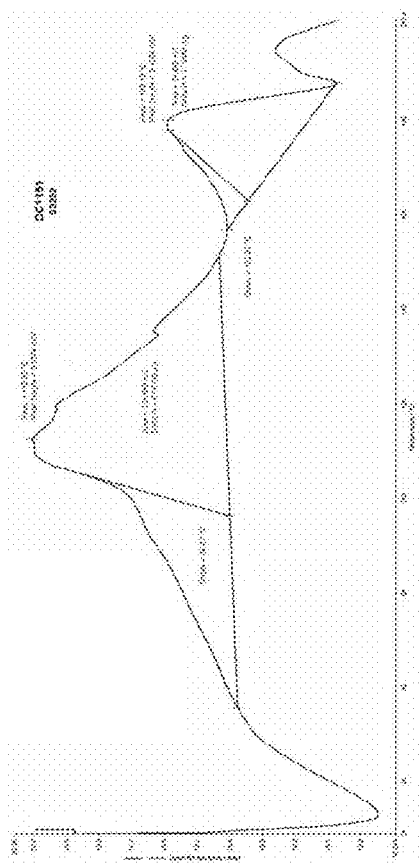
FIG. 62 is a DSC thermogram for D-LSD sulfate amorphous salt.

XRPD analysis showed the formation of D-LSD sulfate amorphous salt (FIG. 61). FIG. 62 is a DSC thermogram for D-LSD sulfate amorphous salt.

Figure 78:
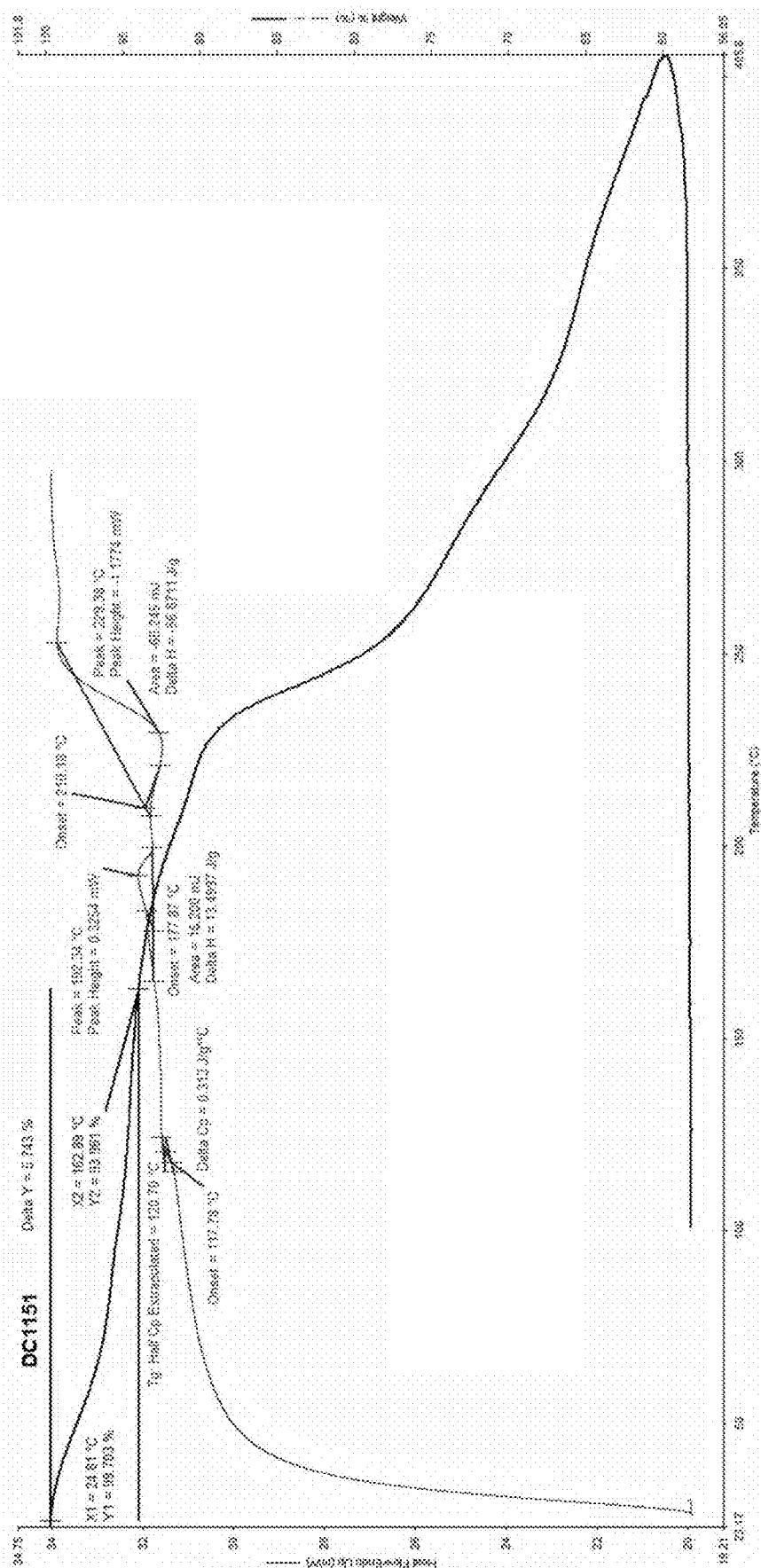
FIG. 78 shows DSC/TGA thermograms of D-LSD sulfate salt.

The amorphous D-LSD sulfate salt (lot: DC1151) was characterized by DSC and TGA. DSC analysis showed a possible glass transition at 120° C. (Half Cp) followed by an endo onset at 177° C. and an exo onset at 210° C. TGA analysis showed a weight loss of 5.7% (w/w) between 24-163° C. FIG. 78 shows DSC/TGA thermograms of D-LSD sulfate salt.

Figure 63:
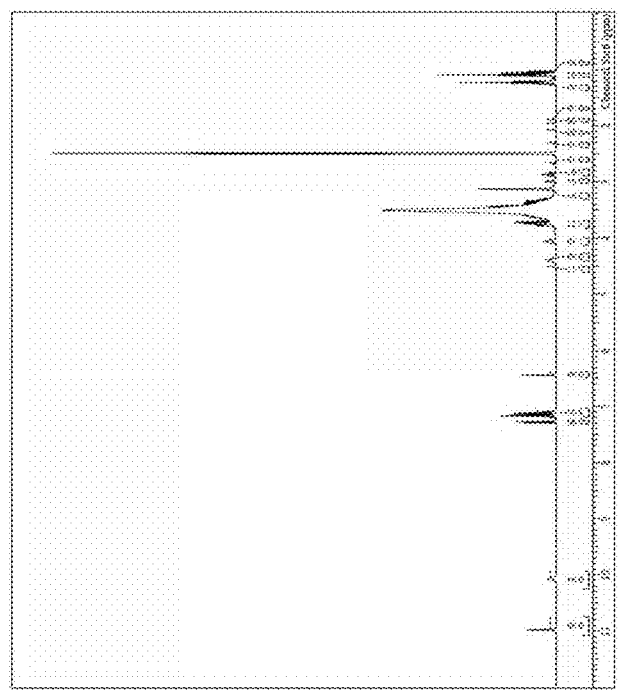
FIG. 63 is a $^1$H NMR spectrum of D-LSD sulfate salt.
Figure 64:
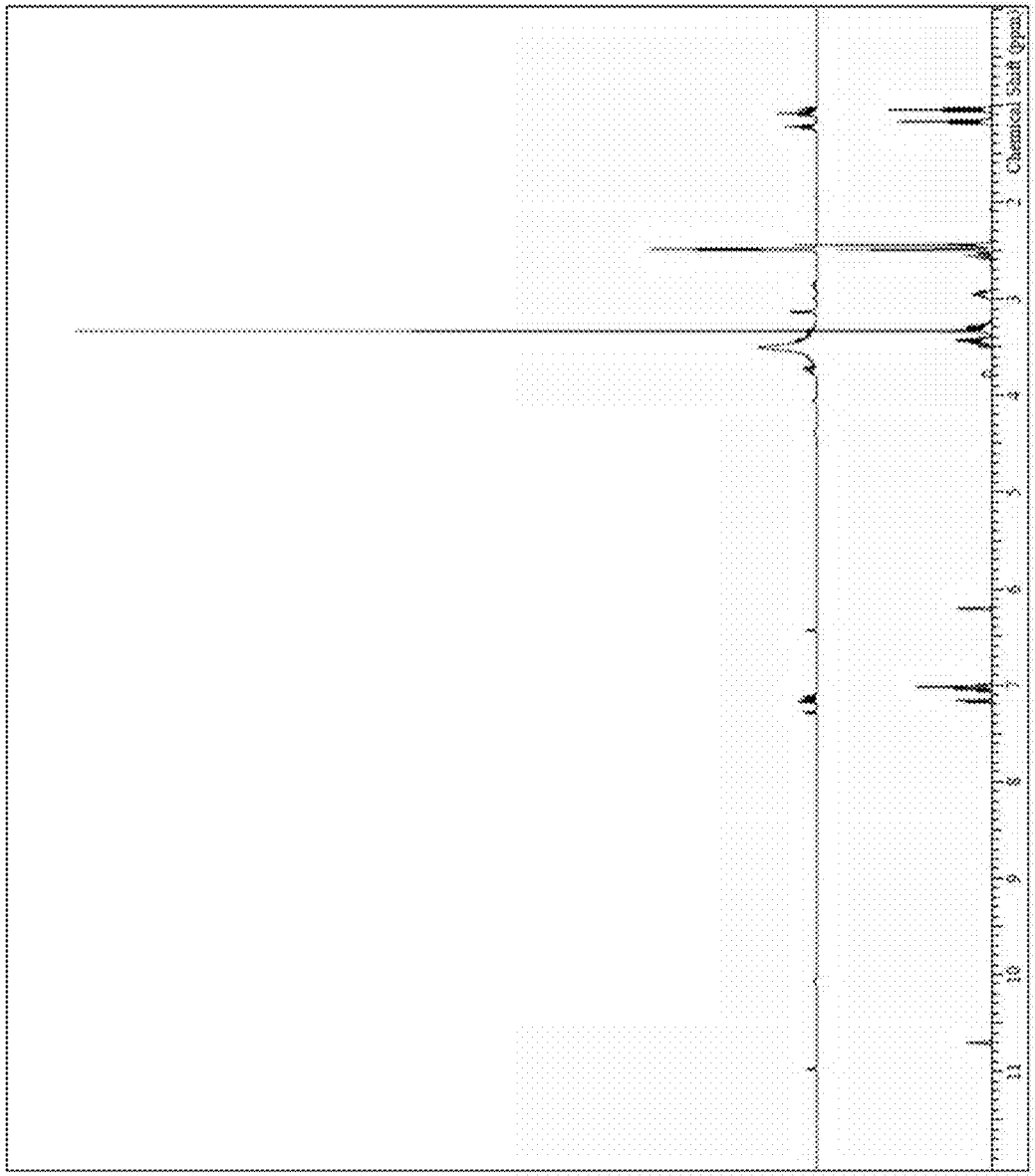
FIG. 64 is a $^1$H NMR overlap between D-LSD Free Base (bottom) and D-LSD sulfate salt (top)

$^1$H NMR spectrum of D-LSD sulfate salt conformed to the molecular structure and indicated traces of impurities along with solvent content fitting for the DSC profile collected (FIG. 63). $^1$H NMR spectrum overlap between D-LSD Free Base and D-LSD sulfate salt showed the anticipated shifts illustrative of salt formation (FIG. 64).

Example 39

Preparation of D-LSD Hydrobromic Amorphous Salt

D-LSD Free Base (Pattern A, 2.53 g) was placed in a round bottom flask (V=100 mL) and dissolved in EtOH (10 V). The solution was stirred at 300 rpm, at 25° C. for 30 minutes and a stock solution of HBr (48%) in EtOH (1 M, 7.8 mL) was slowly added. The reaction was carried out at 25° C. overnight. A solution was observed and was reduced in vacuo to deliver a solid. The material recovered was analysed by XRPD, DSC and $^1$H NMR.

Yield=93% (2.95 g)

Figure 65:
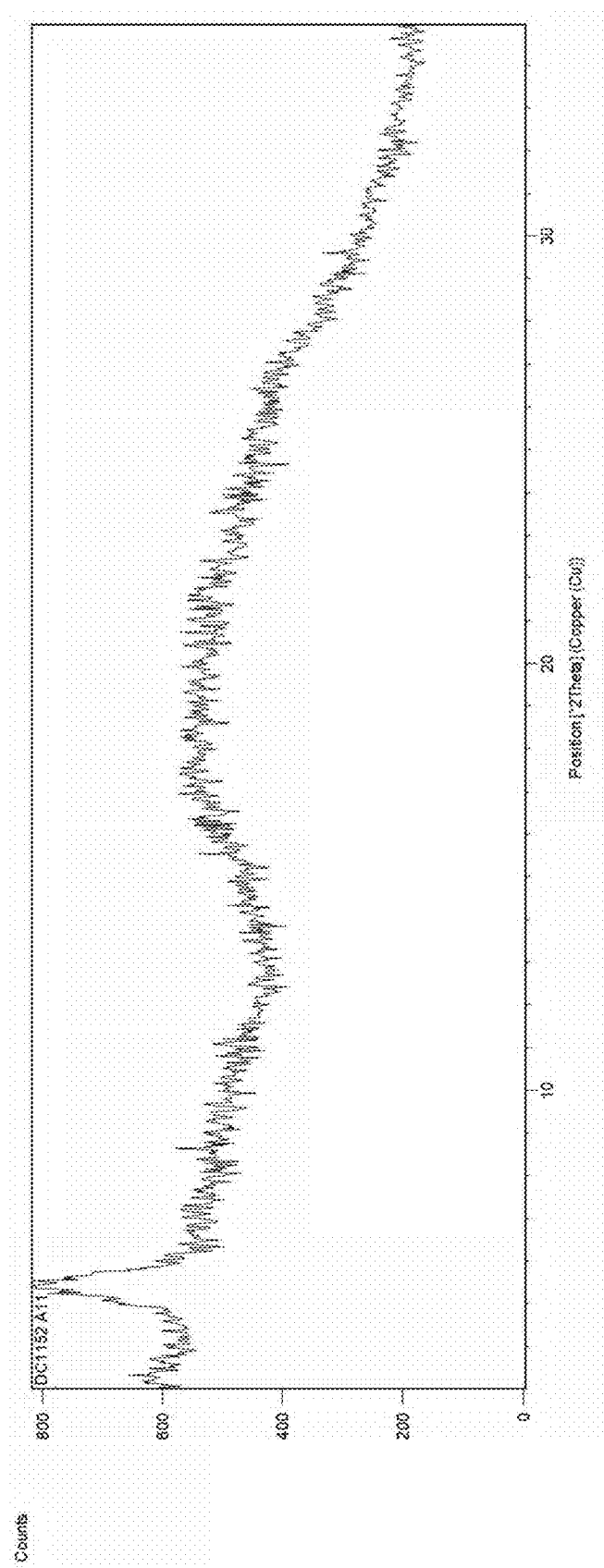
FIG. 65 is an XRPD pattern of D-LSD hydrobromide amorphous salt.

XRPD analysis showed the formation of D-LSD hydrobromic amorphous salt (FIG. 65).

Figure 66:
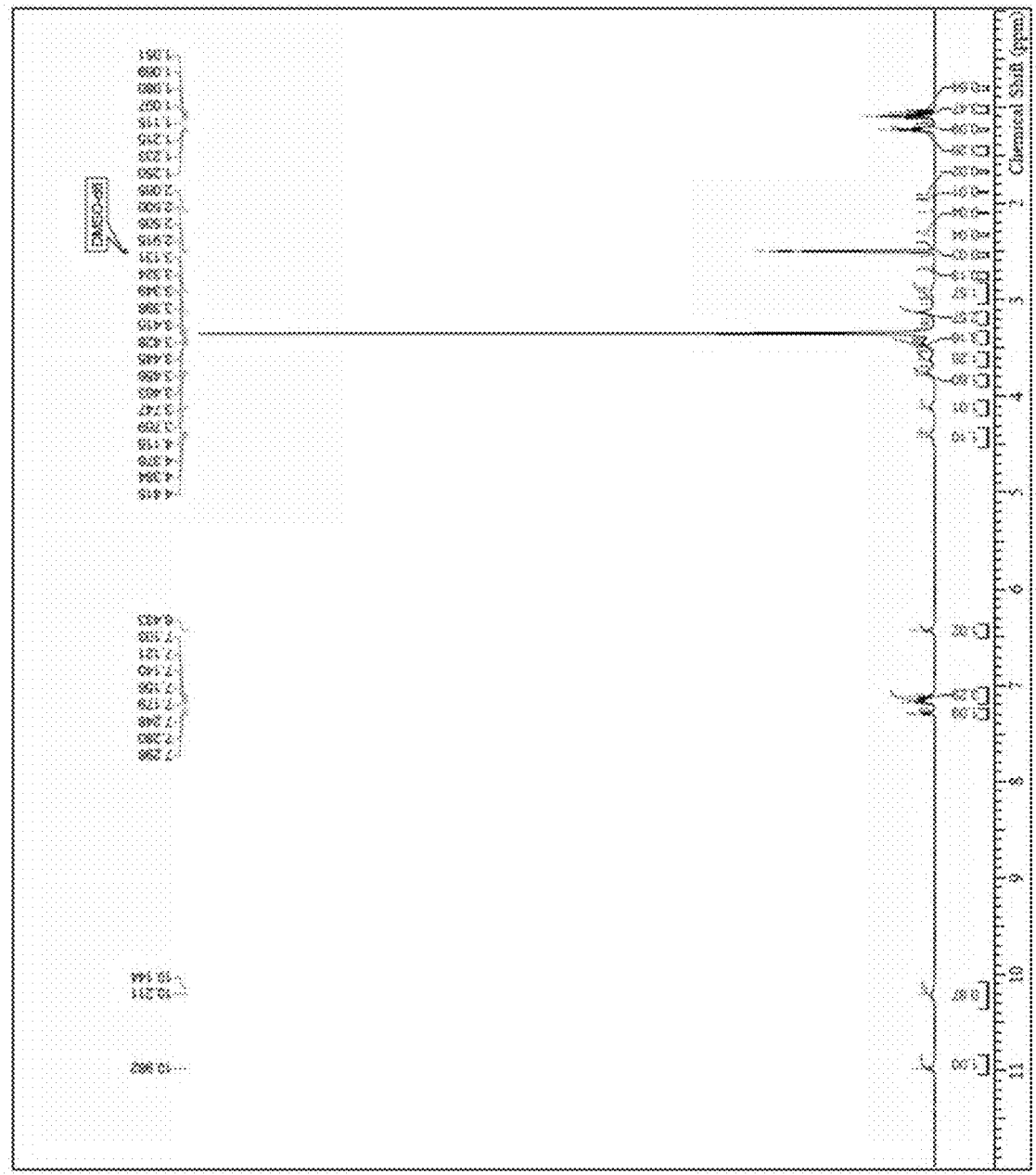
FIG. 66 is a $^1$H NMR spectrum of D-LSD hydrobromide salt.
Figure 67:
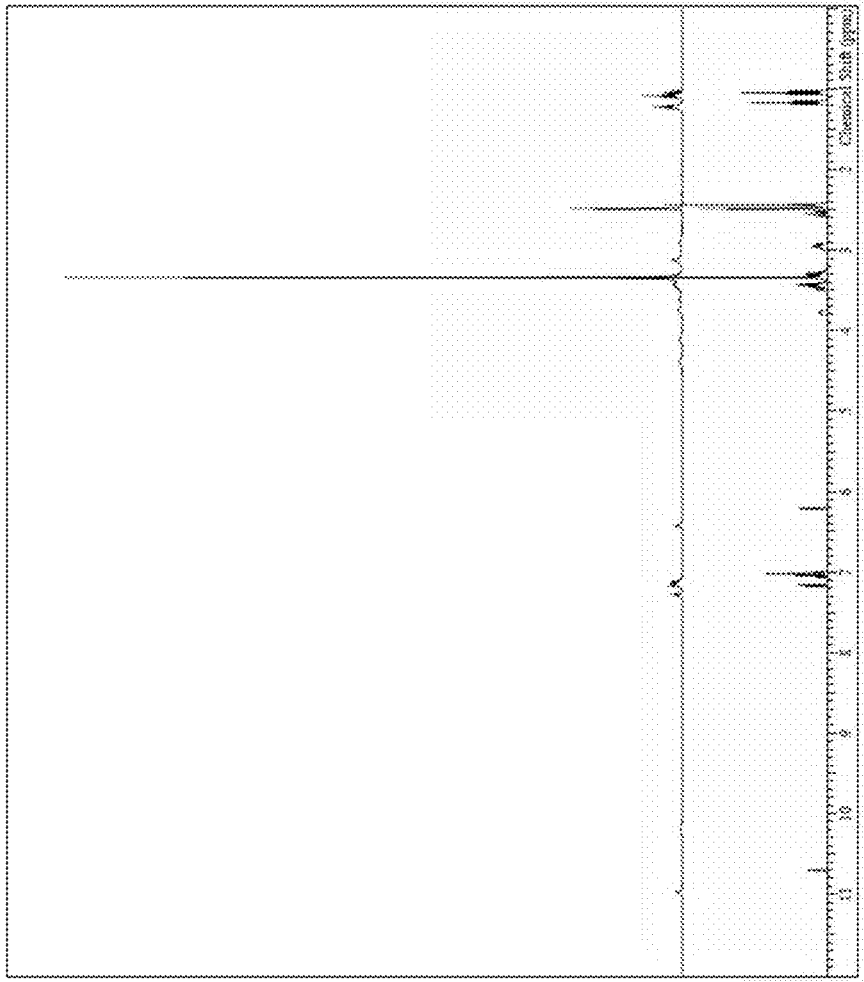
FIG. 67 is a $^1$H NMR overlap between D-LSD Free Base (bottom) and D-LSD Hydrobromic salt (top)

$^1$H NMR spectrum of D-LSD HBr salt conformed to the molecular structure with trace levels of solvent present (approximately 2 wt % EtOH, FIG. 66).$^1$H NMR spectrum overlap between D-LSD (lot; ASH657) and D-LSD HBr salt illustrated the anticipated shifts induced by salt formation with a strong acid (FIG. 67).

Example 40

Hierarchical Investigation between D-LSD Phosphate Pattern A, C and D (DC1150)

To further elucidate the relationship between the three anhydrous forms of the API; Patterns A, Pattern C and Pattern D, and to identify the thermodynamically preferred version of D-LSD phosphate salt, hierarchical studies were conducted. Equal amounts of Patterns A, Pattern C and Pattern D were competitively equilibrated in three different solvents and a solvent mixture at 25° C. After 7 days, the solids were isolated and examined by XRPD to assess their form.

Experimental: D-LSD phosphate Pattern A (lot: DC1137-19), D-LSD phosphate Pattern C (lot: DC1137-23) and D-LSD phosphate Pattern D (lot: DC1140-12) were weighed (10 mg each, 1:1:1) into crystallization tubes, solvent (detailed in TABLE 11) charged, samples agitated (25° C., 7 days). Samples dried in vacuo (40° C., 20 hours) ahead of data analysis.

Results shown in TABLE 11.

A complete conversion to Pattern C was observed in THF:water (95:5 v/v), 1,4-dioxane and THF. Instead, a mixture of Pattern A and Pattern C was observed in EtOH.

TABLE 11

| ID | Solvent | Form fate by XRPD |
|---|---|---|
| DC1150-1 | THF:water (95:5 v/v) | Pattern C |
| DC1150-2 | 1,4-dioxane | Pattern C |
| DC1150-3 | THF | Pattern C |
| DC1150-4 | EtOH | Pattern A + Pattern C |

Example 41

Accelerated Storage of D-LSD Phosphate Pattern C and D-LSD Oxalate Pattern B

Figure 68:
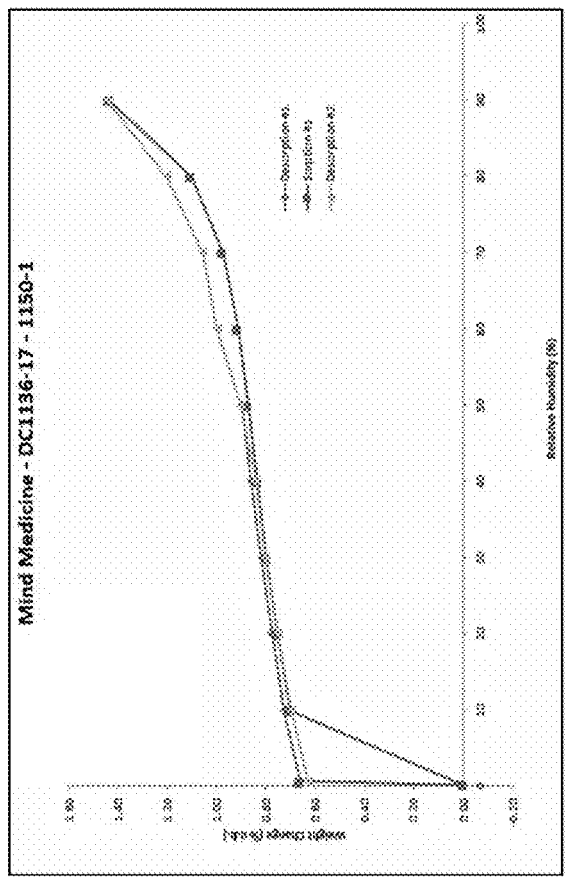
FIG. 68 is a DVS profile of D-LSD oxalate Pattern B.
Figure 69:
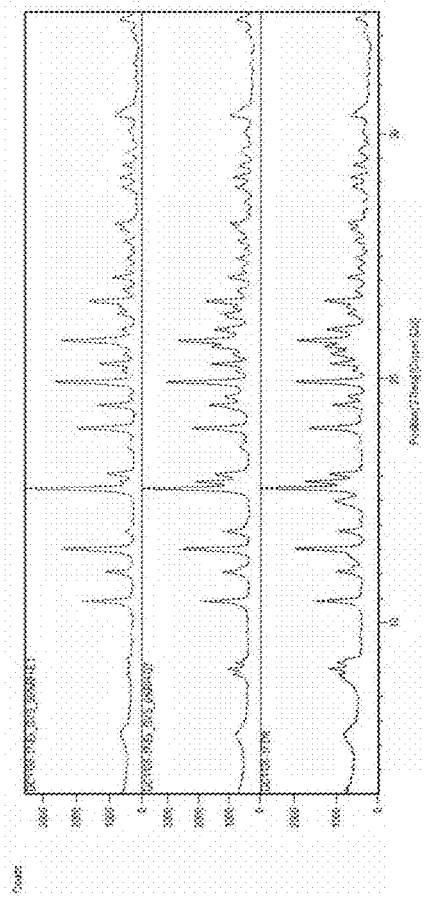
FIG. 69 is XRPD patterns of D-LSD oxalate Pattern B ex. DVS post equilibration at 0% RH (middle trace) and 90% RH (top trace) compared to Pattern B reference (bottom trace)

D-LSD phosphate Pattern C (lot: DC1137-9) and D-LSD oxalate Pattern B (lot: DC1144-4) were placed in unsealed vials in a cabinet under controlled conditions at 40° C./75% RH for 14 days. Samples were visually observed for signs of deliquescence and analysed by XRPD post stressing for physical stability and HPLC for chemical stability. FIG. 68 is a DVS profile of D-LSD oxalate Pattern B. FIG. 69 is XRPD patterns of D-LSD oxalate Pattern B ex. DVS post equilibration at 0% RH (middle trace) and 90% RH (top trace) compared to Pattern B reference (bottom trace).

TABLE 12 summarizes the XRPD and HPLC data collected for each solid.

Figure 70:
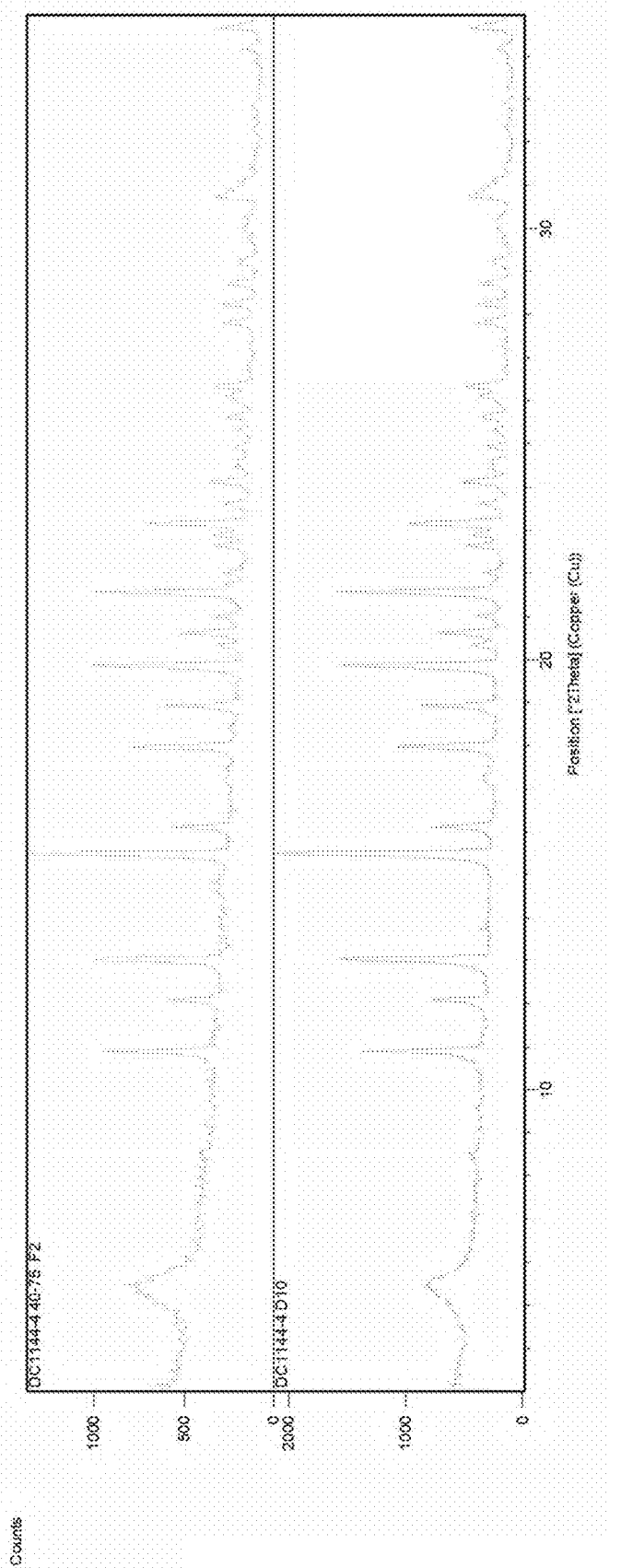
FIG. 70 shows XRPD patterns of D-LSD oxalate Pattern B after storage at 40° C./75% RH, (top), versus initial (bottom)
Figure 71:
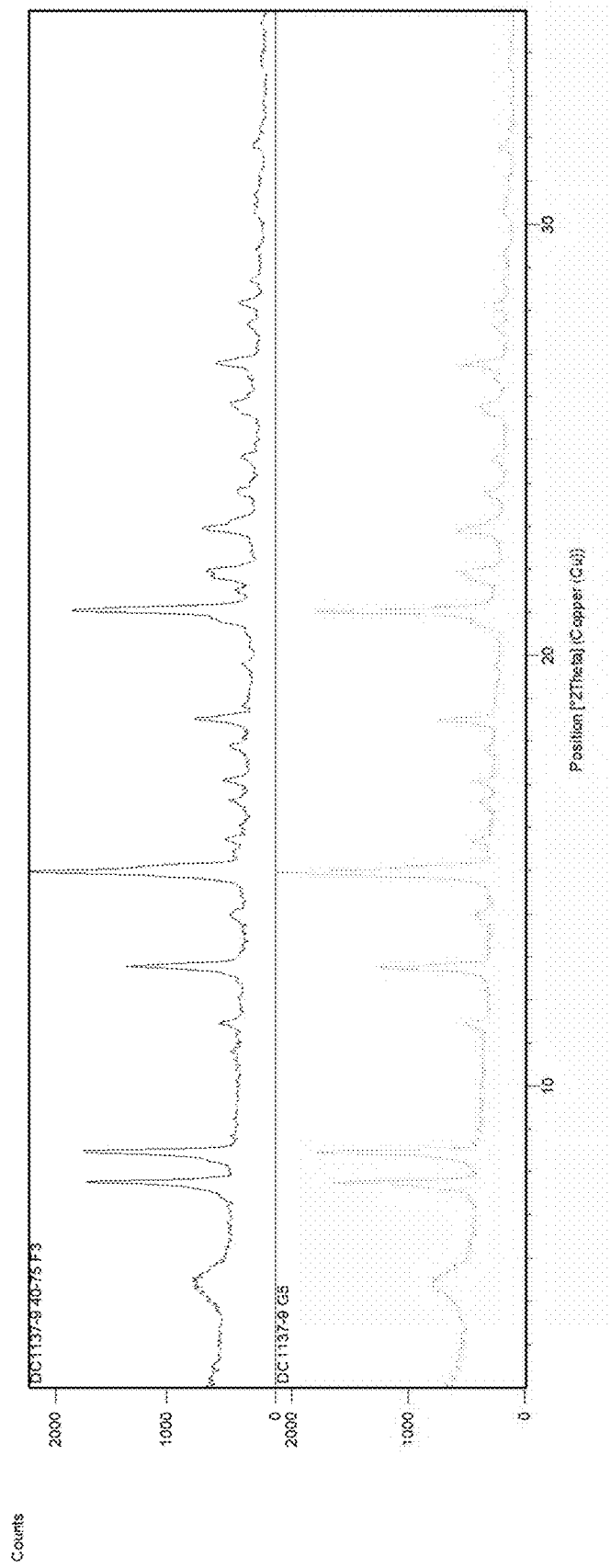
FIG. 71 shows XRPD patterns of D-LSD phosphate Pattern C after storage at 40° C./75% RH (top) versus initial (bottom)

D-LSD oxalate Pattern B and D-LSD phosphate Pattern C after stress at 40° C./75 RH did not show a change in form (FIG. 70 and FIG. 71).

TABLE 12

| Sample No. | XRPD of Input | Nature of solid | XRPD of Output |
|---|---|---|---|
| DC1144-4 40-75 | oxalate Pattern B | solid | oxalate Pattern B |
| DC1137-9 40-75 | phosphate Pattern C | solid | phosphate Pattern C |

Example 42

Heat Cycled Maturation of D-LSD Sulfate Amorphous Salt and Initial Solubility Assessment (DC1153)

Experimental: D-LSD sulfate salt (lot: DC151; 24×25 mg) was weighed into crystallization tubes, solvent (various vol charges) was added, and the mixtures equilibrated at 25° C. for ca. 15 minutes. Solvent was then added, and temperature increased to assess for dissolution and to provide a series of maturations/recrystallizations, increasing systematically up to 70° C. and 30 volumes.

The mixtures were thermally cycled between 70 and 25° C. over 48 hours with a minimum of 5 hours at temperature during heating phases. Solids were isolated at two temperatures, at 25° C. during the last cycle and also at elevated temperature.

Lower boiling solvents were equilibrated up to 45° C.

Any solutions were clarified to clean, hot tubes to deliver unbiased recrystallizations and isolated either following cooling or via slow evaporation.

Most of the samples observed at room temperature were gels.

Figure 72:
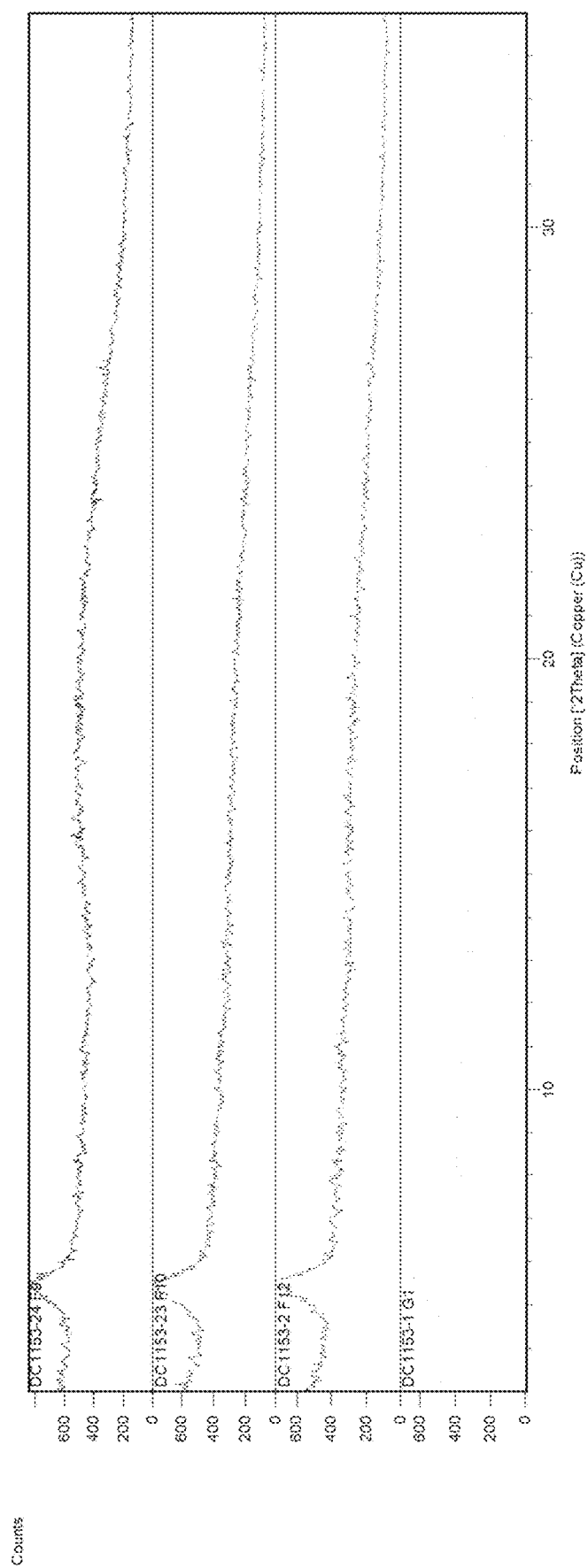
FIG. 72 shows XRPD patterns of amorphous D-LSD sulfate salt

The solids recovered from the solutions by slow evaporation were analysed by XRPD and amorphous material were observed (FIG. 72).

The API had a solubility of >200 mg/mL at 25° C. in MeOH, a solubility of >100 mg/mL at 25° C. in EtOH, and a solubility of >100 mg/mL at 40° C. in iPrOAc/water (98:2) and IPA/water (95:5).

Example 43

Thermal Characterization of Amorphous D-LSD HBr Salt

DSC thermogram of amorphous D-LSD HBr salt (lot: DC1152) showed an exo onset at 220° C.

Figure 73:
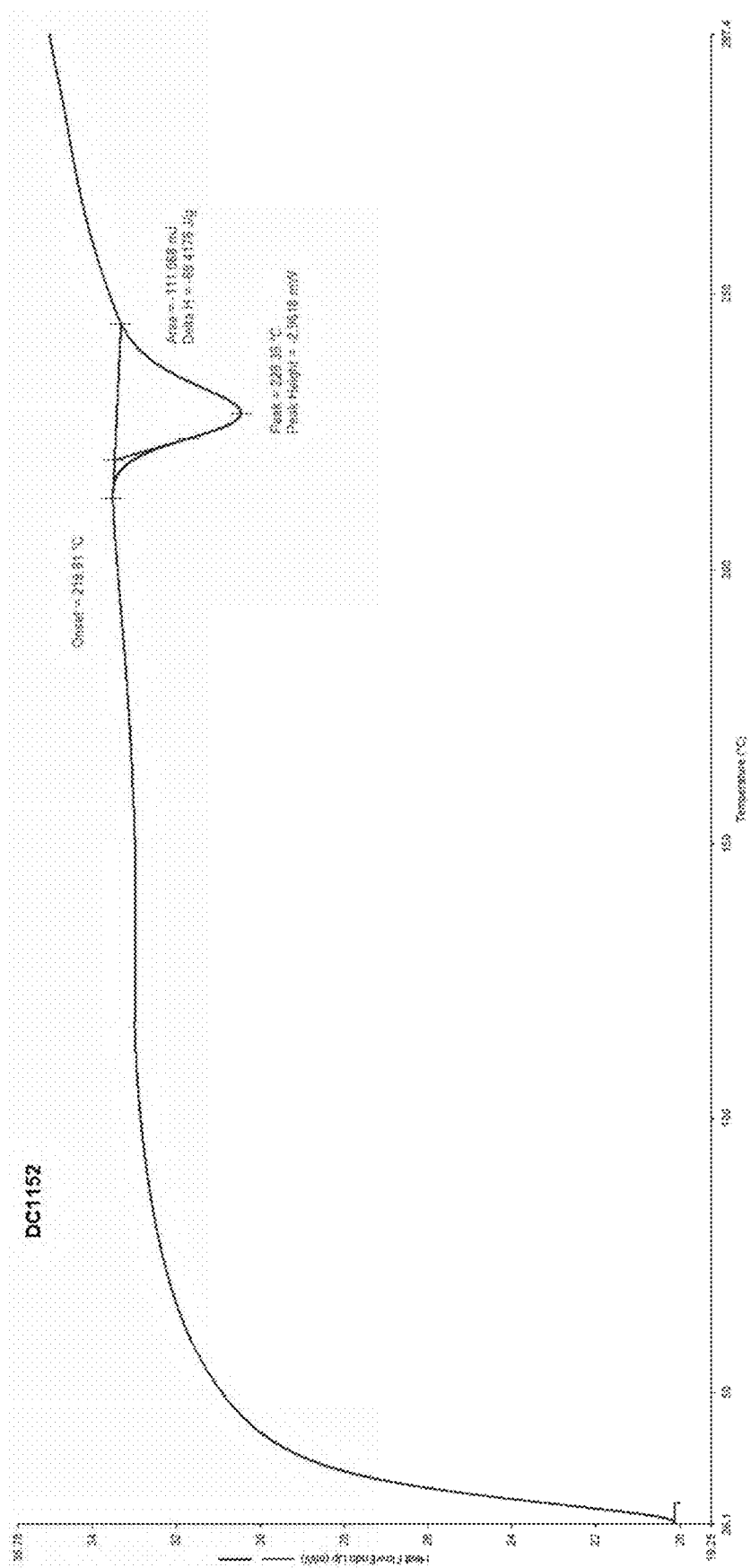
FIG. 73 is a DSC thermogram of D-LSD HBr salt.

A thermal cycling experiment for the amorphous D-LSD HBr salt was carried out. A small sample (approximately 5 mg) of this material was placed in a TGA pan and heated at 40° C./minute to 190° C., then the sample was cooled to −20° C. The cycle was repeated twice. The thermogram did not reveal any exo or endo event. FIG. 73 shows a DSC thermogram of D-LSD HBr salt.

Example 44

Heat Cycled Maturation of D-LSD HBr Amorphous Salt and Initial Solubility Assessment (DC1154)

Heat cycled maturation is a pragmatic method for the assessment of material behaviour across a wide range of solvent chemotypes and mixed solvents. Such experimental modulation illustrates solvent vs anti-solvent and temperature-solubility effects and also informs of potential form changes induced from the input based on solvent type. Whilst a significant seed bed may be maintained from the input form, any solutions obtained via clarification provide a non-biased recrystallization with the potential to deliver new phases for assessment.

Experimental: D-LSD HBr salt (lot: DC1152; 24×25 mg) was weighed into crystallization tubes, solvent (various vol charges) was added, and the mixtures equilibrated at 25° C. for ca. 15 minutes. Solvent was then added, and temperature increased to assess for dissolution and to provide a series of maturations/recrystallizations, increasing systematically up to 70° C. and 30 volumes.

The mixtures were thermally cycled between 70 and 25° C. over 48 hours with a minimum of 5 hours at temperature during heating phases. Solids were isolated at two temperatures, at 25° C. during the last cycle and also at elevated temperature.

Lower boiling solvents were equilibrated up to 45° C.

Any solutions were clarified to clean, hot tubes to deliver unbiased recrystallizations and isolated either following cooling or via slow evaporation.

All solids were isolated by filtration and liquors were analysed by HPLC to obtain solubility measurements versus a standard of known concentration. Solids were selected for purity assessment to inform of impurity rejection and/or potential stability issues.

All solids were dried at 45° C. in vacuo ahead of analysis.

The API had a solubility of >200 mg/mL at 25° C. in: MeOH, THF/water (95:5 v/v).

A solubility of >100 mg/mL at 25° C. in: EtOH, MEK, nitromethane.

A solubility of >100 mg/mL at 40° C. in:1,4-dioxane, iPrOAc/water (98:2 v/v), IPA/water (95:5 v/v).

TABLE 13 shows Form fate, and solubility summary of D-LSD amorphous HBr following equilibration in various solvents with thermal modulation.

TABLE 13

| | | Form fate by XRPD | | | Solubility |
|---|---|---|---|---|---|
| ID | Solvent | 25° C. | 45° C./70° C. | Slow evaporation | 25° C. (mg/ml) |
| 1 | EtOH | — | — | amorphous | — |
| 2 | MeOH* | — | — | amorphous | — |
| 3 | TBME* | amorphous | Insuff. material | — | 9.84 |
| 4 | THF | — | — | amorphous + peaks | — |
| 5 | water | amorphous + peaks | amorphous + peaks | — | 25.1 |
| 6 | 2-Me—THF | — | — | amorphous + peaks | — |
| 7 | 1,4-dioxane | — | — | amorphous | — |
| 8 | EtOAc | Pattern A | Pattern A | — | 2.63 |
| 9 | IPAC* | amorphous | amorphous | — | 4.19 |
| 10 | acetone* | — | — | amorphous | — |
| 11 | MEK | — | — | amorphous | — |
| 12 | MIBK | — | — | amorphous | 16.4 |
| 13 | Anisole | — | — | amorphous | — |
| 14 | toluene | Pattern B | Pattern B | — | 3.91 |
| 15 | chlorobenzene | amorphous | Insuff. material | — | 3.12 |
| 16 | MeCN | Pattern A | Pattern A | — | 8.68 |
| 17 | propionitrile | — | — | amorphous | — |
| 18 | heptane | amorphous + peaks | amorphous | — | 0.05 |
| 19 | cyclohexane | amorphous + peaks | amorphous + peaks | — | — |
| 20 | nitromethane | — | — | amorphous | — |
| 21 | DCM* | — | — | amorphous | — |
| 22 | THF:water (95:5) | — | — | amorphous | — |
| 23 | iPrOAc:water (98:2) | — | — | amorphous | — |
| 24 | IPA:water (95:5) | — | — | amorphous | — |

The majority of the solids isolated from the screen were amorphous materials. A new pattern designated Pattern A was isolated from EtOAc and MeCN. Pattern B was isolated once following maturation in toluene.

Figure 74:
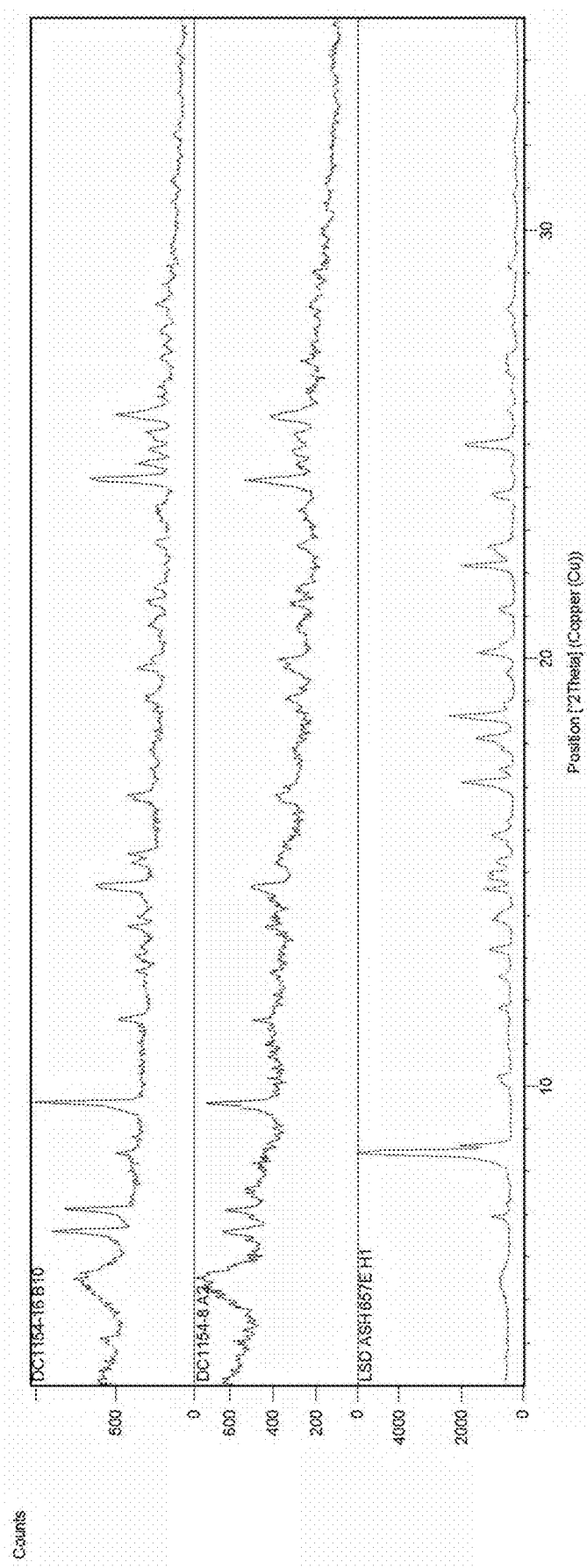
FIG. 74 shows XRPD patterns of D-LSD HBr Pattern A versus D-LSD Free Base (bottom)

A sample of D-LSD HBr Pattern A was characterized by XRPD (FIG. 74, top).

Figure 82:
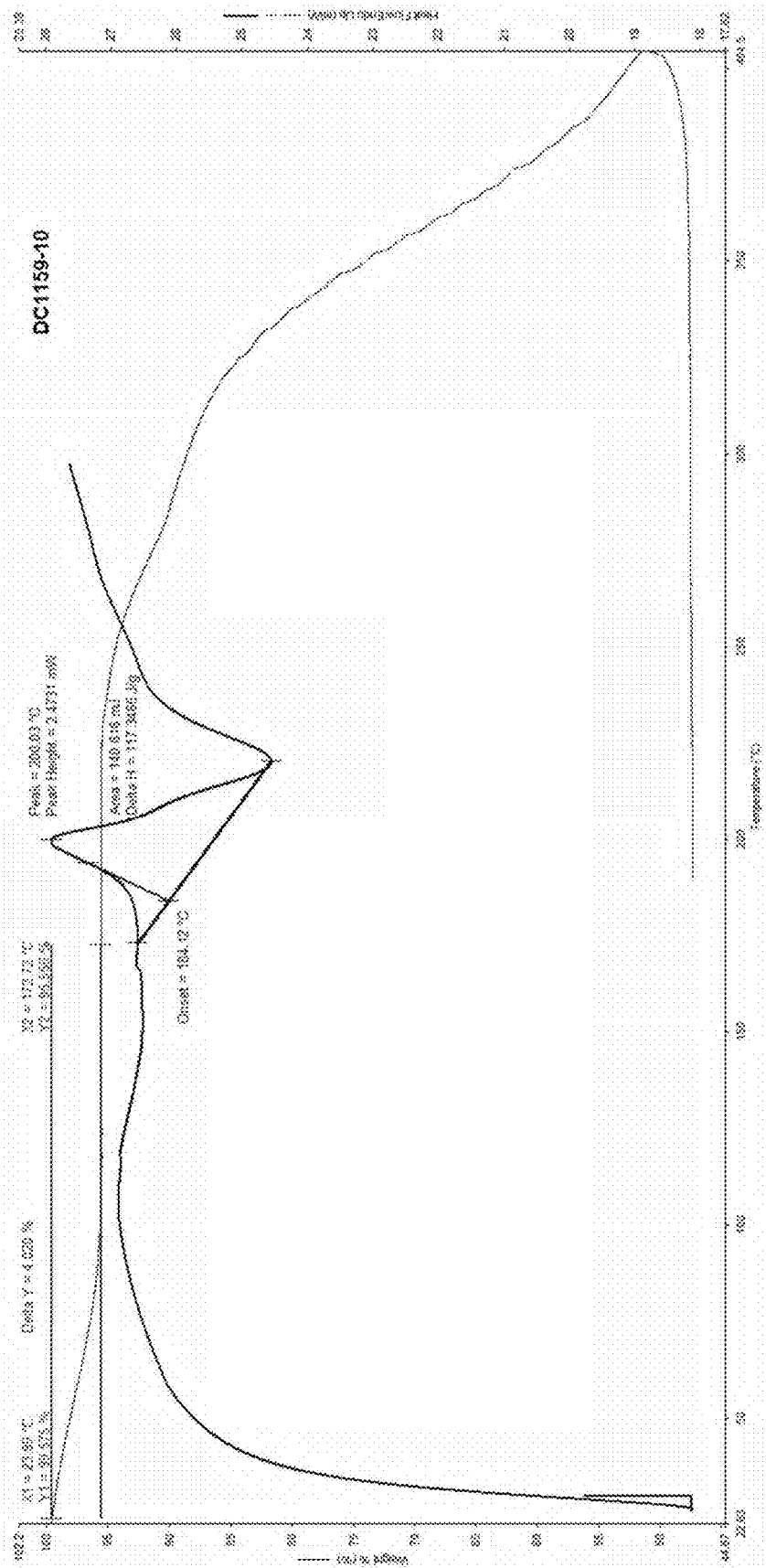
FIG. 82 shows DSC/TGA thermograms of D-LSD HBr Pattern A salt.

A sample of D-LSD HBr Pattern A salt (lot: DC1159-10) isolated by antisolvent cooling crystallisation from MeOH/MTBE was characterized by DSC and TGA (FIG. 82). DSC analysis showed a melting onset at 184° C. TGA thermogram illustrated a weight loss of 4% (w/w) between 23-172° C. indicating that the material was a monohydrate salt.

Figure 75:
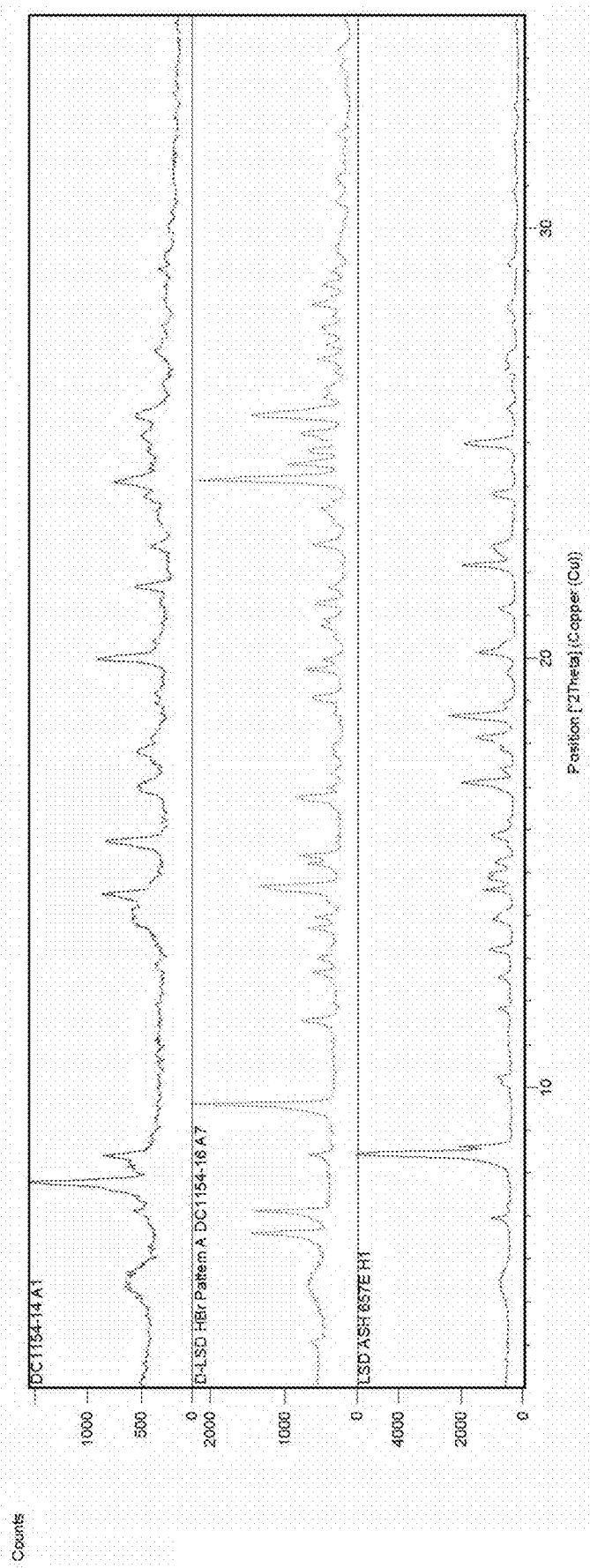
FIG. 75 shows an XRPD pattern of D-LSD Free Base Pattern B (bottom), D-LSD HBr Pattern A (middle), and D-LSD HBr Pattern B isolated from toluene (top)
Figure 76:
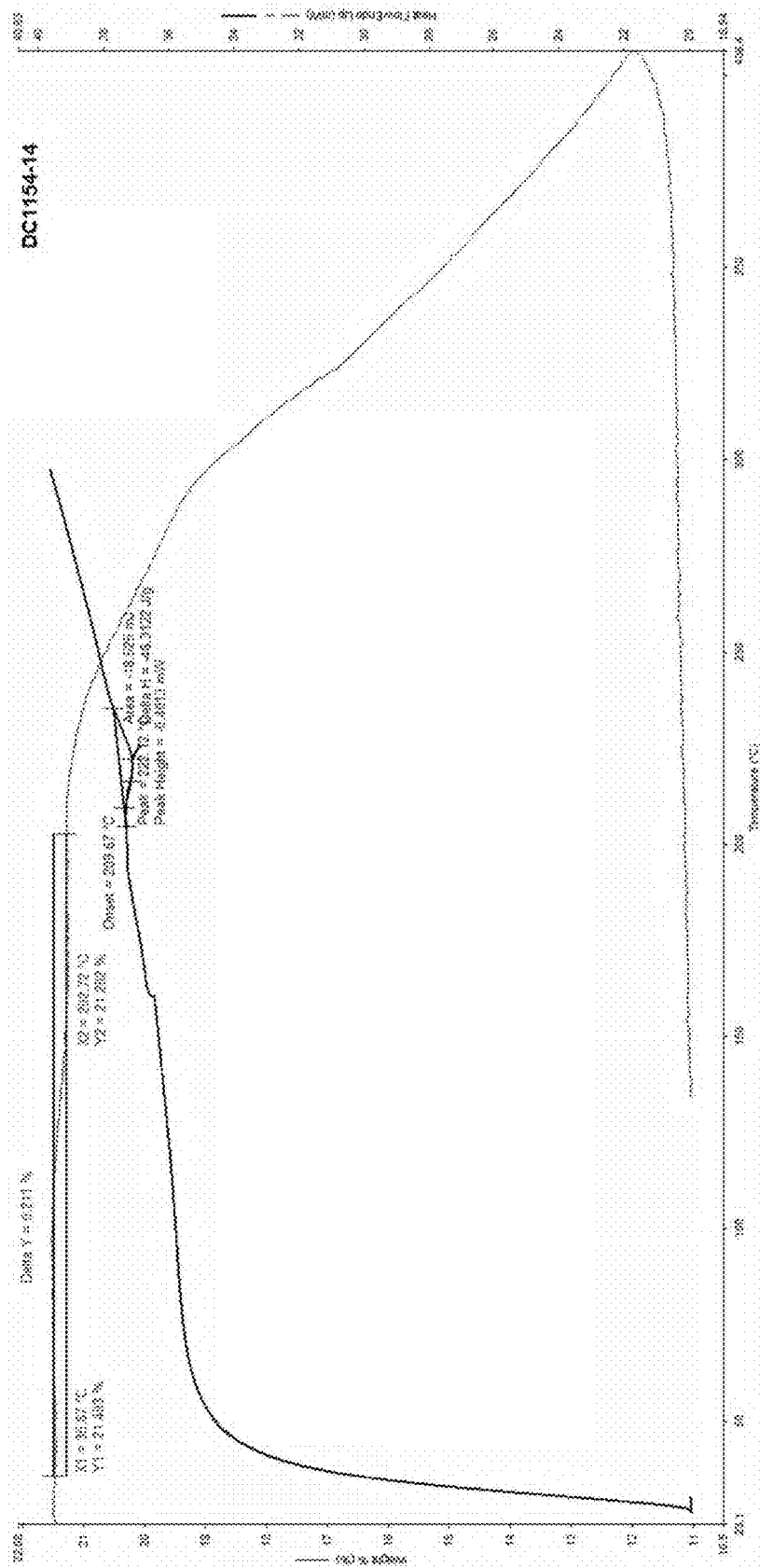
FIG. 76 shows DSC/TGA thermograms of D-LSD HBr Pattern B.
Figure 77:
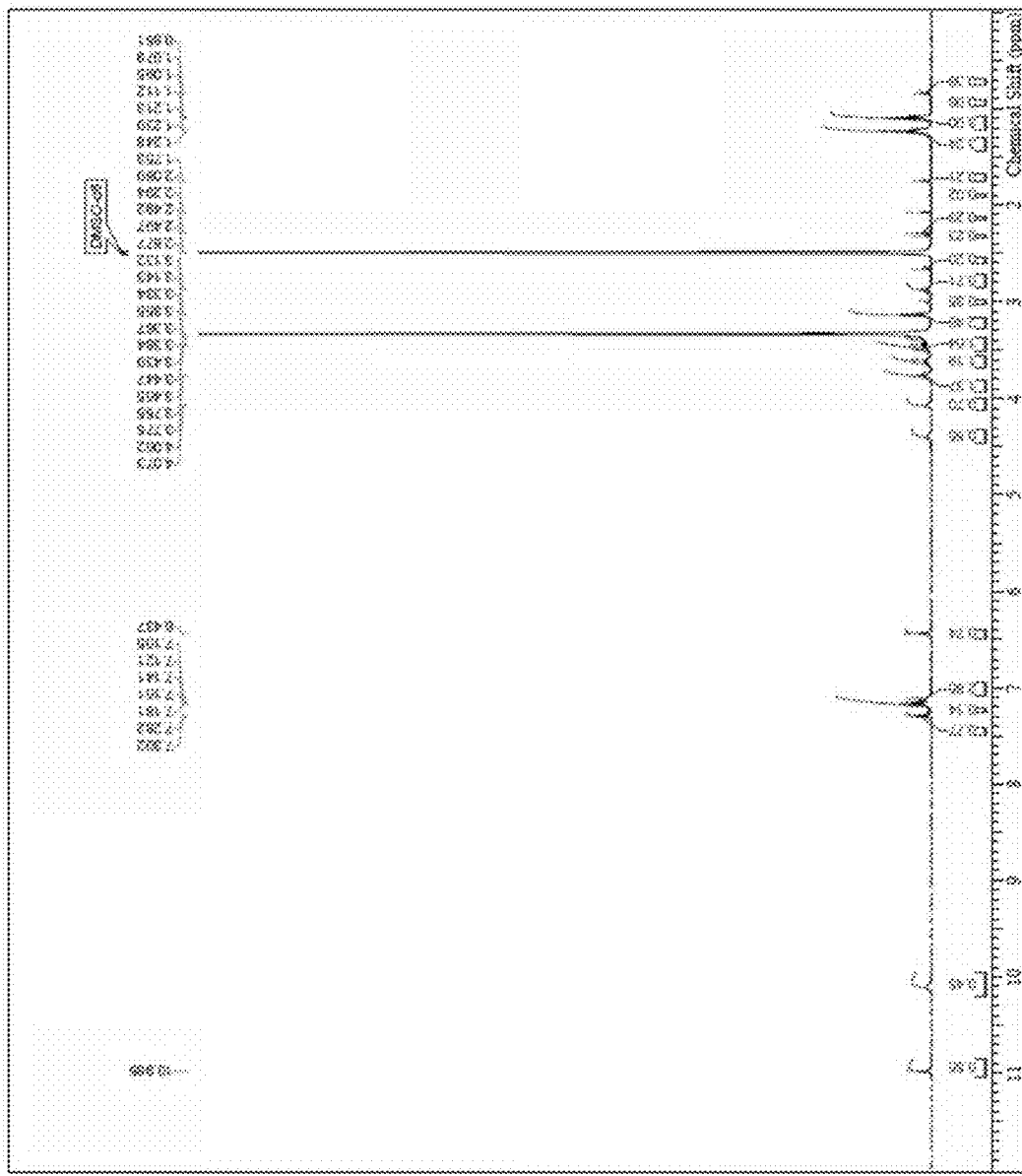
FIG. 77 shows a $^1$H NMR of D-LSD HBr Pattern B.

D-LSD HBr Pattern B was characterized by XRPD (FIG. 75) and DSC/TGA (FIG. 76). DSC analysis illustrated an exothoermic peak at 210° C. and a small bump due to an instrumental defect is shown at ~160° C. The thermogram is unusual because no endo events were observed. TGA thermogram showed a minimal weight loss of 0.21% (w/w) between 35-202° C. The lack of significant energetics for this salt version may relate to degree of crystallinity or other content that is imparting such behavior. The $^1$H NMR spectrum (FIG. 77) conformed to the molecular structure and traces of impurities/solvents were detected.

Example 45

Characterization of D-LSD HBr Amorphous Salt

Figure 79:
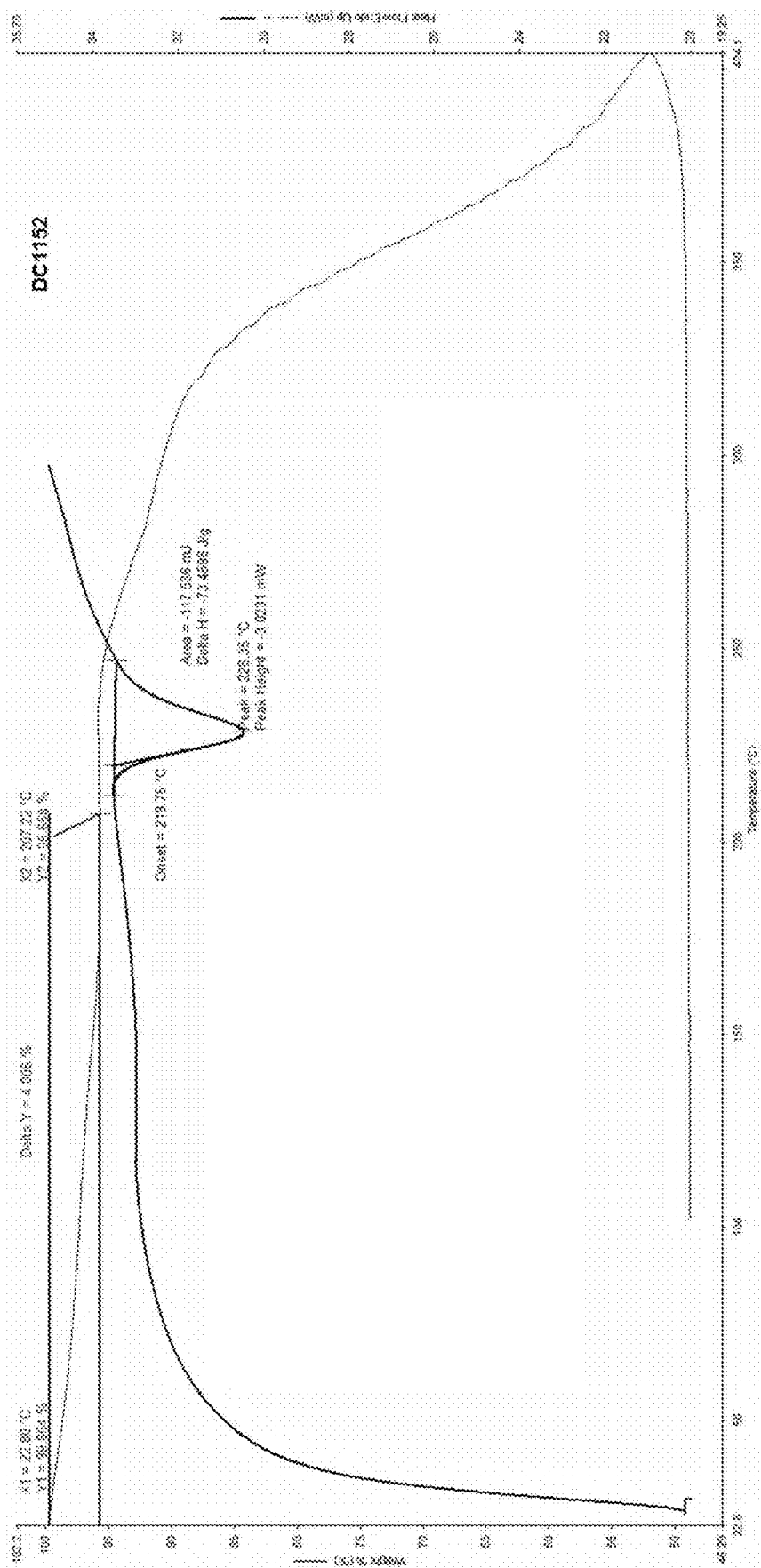
FIG. 79 shows DSC/TGA thermograms of D-LSD HBr amorphous salt.

The amorphous D-LSD HBr salt (lot: DC1152) was characterized by DSC and TGA. DSC analysis showed an exotherm onset at 220° C. TGA analysis showed a weight loss of 4.0% (w/w) between 22-207° C. FIG. 79 shows DSC/TGA thermograms of D-LSD HBr salt.

Example 46

Solvent Vapour Diffusion of Amorphous D-LSD Sulfate (DC1155)

An investigation of the propensity of amorphous D-LSD sulfate to polymorphism was conducted using the solvent vapour diffusion technique with amorphous input. This technique uses a less forcing system and allows an API to order itself from surface interaction of solvent to induce crystallisation.

Experimental: Solvent vapour chambers were prepared by dosing solvent (3 ml, TABLE 14) into a glass vial. Into this vapour chamber was placed a smaller glass vial containing amorphous API (30 mg, DC1151). The chamber was sealed and allowed to equilibrate without disturbance for 2 weeks ahead of observation and XRPD analysis.

Results and observations are shown in TABLE 14 and most of the materials recovered were gels. D-LSD sulfate Pattern A was isolated once from cyclohexane (lot: DC1155-16). This material was characterized by XRPD, DSC, TGA and $^1$H NMR.

Figure 80:
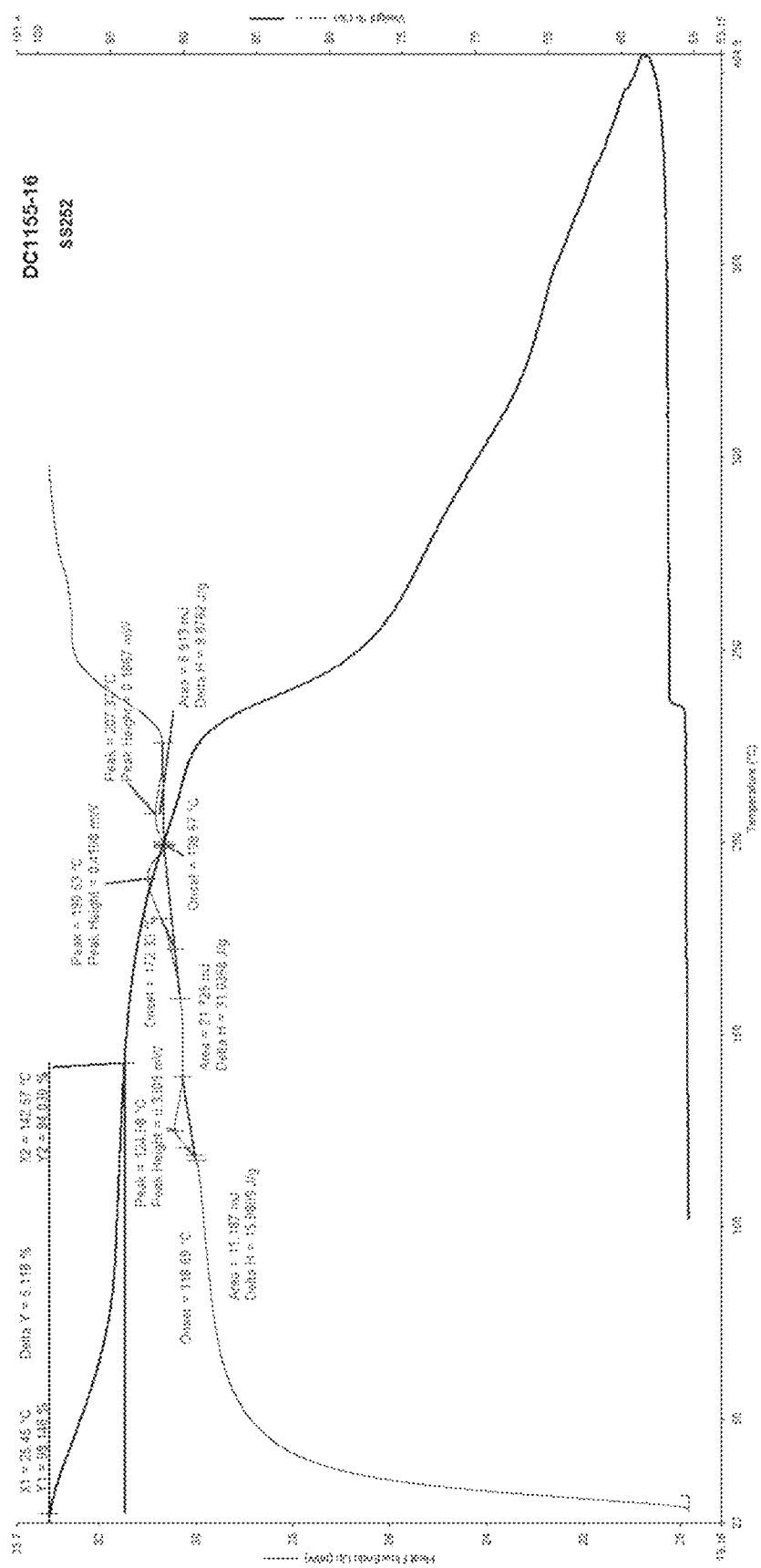
FIG. 80 is a DSC/TGA thermograms of D-LSD sulfate Pattern A.
Figure 81:
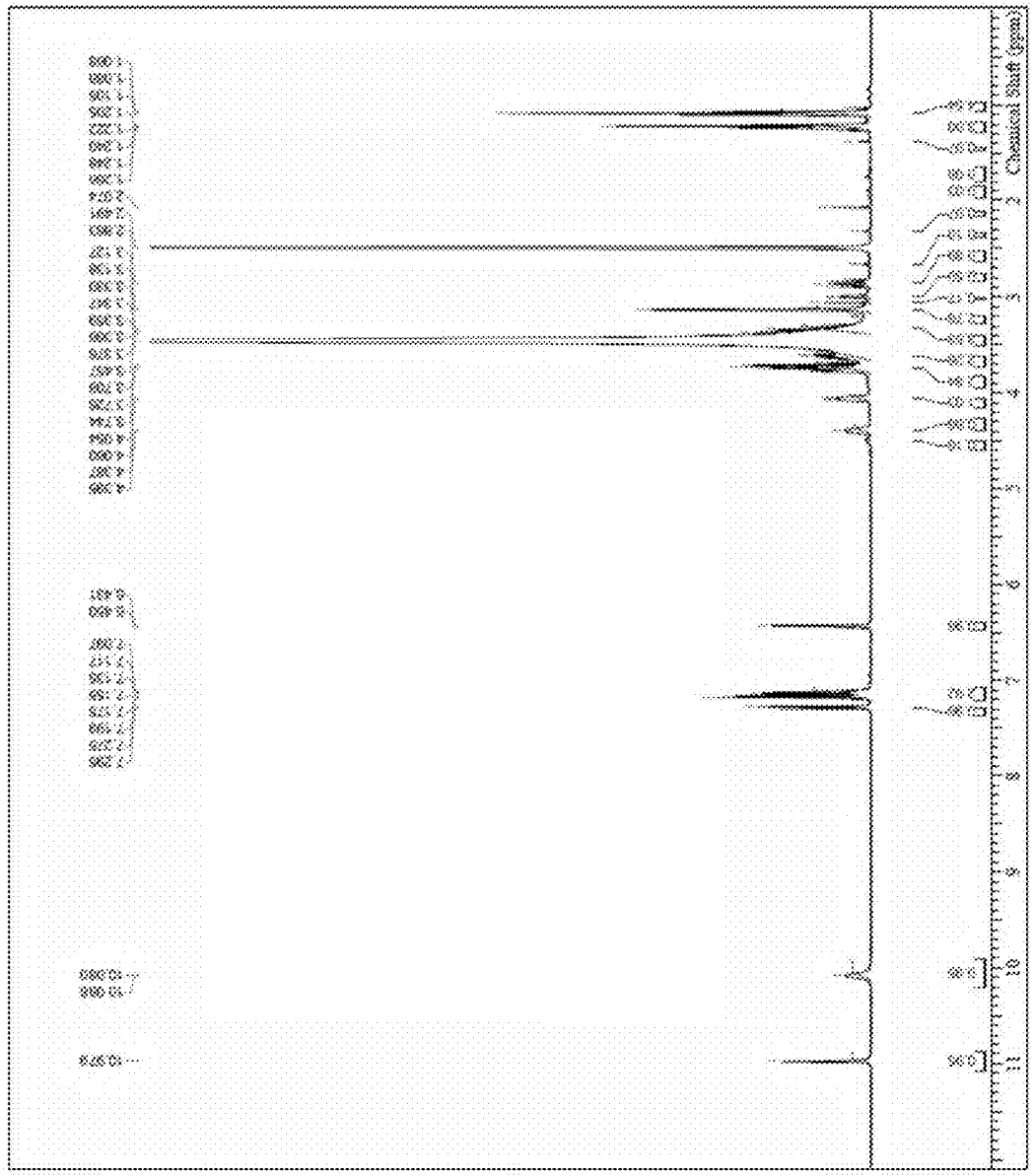
FIG. 81 is a $^1$H NMR spectrum of D-LSD sulfate Pattern A.

DSC analysis showed and endo onset at ~118° C. followed by two other endo onsets at 172 and 199° C. The TGA thermogram illustrated a weight loss of 5.1% (w/w) between 25-142° C. Stoichiometrically 1 mol eq. of water corresponded to 4.1% w/w, indicating a monohydrate salt. The $^1$H NMR spectrum (FIG. 81) conformed to the molecular structure and traces of heptane were detected (0.006 mol eq.). FIG. 80 shows DSC/TGA thermograms of D-LSD sulfate Pattern A.

TABLE 14

| Sample ID | Solvent | Observation at 1 week | Observation at 2 weeks | XRPD at 2 weeks |
|---|---|---|---|---|
| DC1155-1 | TBME | solid | solid | amorphous |
| DC1155-2 | THF | gel | gel | gel |
| DC1155-3 | 2-Me—THF | gel | gel | gel |
| DC1155-4 | 1,4-dioxane | gel | gel | gel |
| DC1155-5 | EtOAc | gel | gel | gel |
| DC1155-6 | IPAC | gel | gel | gel |
| DC1155-7 | acetone | gel | gel | gel |
| DC1155-8 | MEK | gel | gel | gel |
| DC1155-9 | MIBK | gel | gel | gel |
| DC1155-10 | anisole | gel | gel | gel |
| DC1155-11 | toluene | gel | gel | gel |
| DC1155-12 | chlorobenzene | gel | gel | gel |
| DC1155-13 | MeCN | gel | gel | gel |
| DC1155-14 | propionitrile | gel | gel | gel |
| DC1155-15 | heptane | gel | gel | gel |
| DC1155-16 | cyclohexane | solid | solid | sulfate Pattern A |
| DC1155-17 | nitromethane | gel | gel | gel |
| DC1155-18 | DCM | gel | gel | gel |

Anti-Solvent Mediated Crystallization of D-LSD Sulfate Salt (DC1158)

Experimental: D-LSD sulfate salt stock solutions were prepared by dissolving the material (200 mg, DC1151) in the minimum amount of MeOH and EtOH. The stock solutions were then clarified into clean sample vials. Aliquots (25 mg API) of the stock solutions were placed into 14 crystallisation tubes, pre-heated to 50° C. (30° C. for DCM). Anti-solvents, pre-heated to 50° C. were then added in 2 volume charges until a hazy solution was seen or until 20 volumes of anti-solvent were added. The solutions were then cooled and equilibrated at 25° C. for 24 hours.

Results and observations are presented in TABLE 15. Solutions and amorphous materials were recovered. The solutions were evaporated under ambient conditions and gels were mainly isolated.

Polymorph Screen for D-LSD HBr Salt
Solvent Vapour Diffusion of Amorphous D-LSD HBr Salt (DC1156)

An investigation of the propensity of amorphous D-LSD hydrobromide to polymorphism was conducted using the solvent vapour diffusion technique with amorphous input. This technique uses a less forcing system and allows an API to order itself from surface interaction of solvent to induce crystallization.

Experimental: Solvent vapour chambers were prepared by dosing solvent (3 ml, TABLE 16) into a glass vial. Into this vapour chamber was placed a smaller glass vial containing amorphous API (30 mg, DC1152). The chamber was sealed and allowed to equilibrate without disturbance for 2 weeks ahead of observation and XRPD analysis.

Results and observations are shown in TABLE 16. The amorphous materials were mainly recovered, and D-LSD HBr Pattern A was isolated twice from MeCN and cyclohexane.

TABLE 16

| Sample ID | Solvent | Observation at 1 week | Observation at 1 weeks | XRPD at 2 weeks |
|---|---|---|---|---|
| DC1156-1 | TBME | solid | solid | amorphous |
| DC1156-2 | THF | gel | gel | — |
| DC1156-3 | water | gel | gel | — |
| DC1156-4 | 2-Me—THF | gel | gel | — |
| DC1156-5 | EtOAc | solid | solid | amorphous |
| DC1156-6 | IPAC | solid | solid | amorphous |
| DC1156-7 | acetone | solid | solid | amorphous + peak |
| DC1156-8 | MIBK | gel | gel | — |
| DC1156-9 | anisole | solid | solid | amorphous |
| DC1156-10 | toluene | solid | solid | amorphous |
| DC1156-11 | chlorobenzene | solid | solid | amorphous |
| DC1156-12 | MeCN | solid | solid | Pattern A |
| DC1156-13 | heptane | solid | solid | amorphous |
| DC1156-14 | cyclohexane | solid | solid | Pattern A |

Anti-Solvent Mediated Crystallization of D-LSD HBr Salt (DC1159)

Anti-solvent mediated crystallisation is a useful method for identifying new forms or versions of a solid as once dissolved, the API has no form memory and can recrystallize without bias. Solubility assessment of the API during the initial solvent maturation experiment had identified several solvents and anti-solvents to be used.

Experimental: D-LSD HBr salt stock solutions were prepared by dissolving the material (200 mg, DC1152) in the

TABLE 15

| ID | Solvent | Anti-solvent | Volume added | Observations at ambient temperature | Form by XRPD | Observations after evaporation |
|---|---|---|---|---|---|---|
| DC1158-1 | EtOH | heptane | 20 | solid | amorphous | N/A |
| DC1158-2 | (10 vol) | TBME | 20 | solution | — | glassy |
| DC1158-3 | | THF | 20 | solution | — | gel |
| DC1158-4 | | toluene | 5 | Solution | — | gel |
| DC1158-5 | | MEK | 20 | solution | — | glassy |
| DC1158-6 | | Ethyl acetate | 18 | solid | amorphous | N/A |
| DC1158-7 | | 1,4-dioxane | 20 | solution | — | gel |
| DC1158-8 | | acetone | 20 | solid | amorphous | N/A |
| DC1158-9 | MeOH | TBME | 20 | solution | — | gel |
| DC1158-10 | (10 vol) | THF | 20 | solution | — | gel |
| DC1158-11 | | toluene | 20 | solid | amorphous | N/A |
| DC1158-12 | | MEK | 20 | solid | amorphous | N/A |
| DC1158-13 | | Ethyl acetate | 20 | solution | — | gel |
| DC1158-14 | | 1,4-dioxane | 20 | solution | — | glassy | minimum amount of MeOH and EtOH. The stock solutions were then clarified into clean sample vials. Aliquots (25 mg API) of the stock solutions were placed into 16 crystallisation tubes, pre-heated to 50° C. (30° C. for DCM). Anti-solvents, pre-heated to 50° C. were then added in 2 volume charges until a hazy solution was seen or until 20 volumes of anti-solvent were added. The solutions were then cooled and equilibrated at 25° C. for 24 hours.

Results and observations are presented in TABLE 17. XRPD analysis showed that Pattern A was mainly isolated. The solution recovered after the anti-solvent cooling crystallisation experiments were slowly evaporated. Gels were mainly isolated.

which can be exploited to provide a variety of modes of crystallization. The form fate of D-LSD sulfate salt (lot: DC1151) was further assessed by a series of mixed solvent cooling crystallizations.

Experimental: amorphous D-LSD sulfate (DC1151, 21×25 mg) was weighed into crystallisation tubes and suspended in the relevant anti-solvent (TABLE 18). Temperature was increased to 50° C. and solvent was added in aliquots until a solution was achieved. Solutions were cooled and equilibrated at room temperature for 16 hours. Solids were isolated by filtration and dried in vacuo at 40° C. for 18 hours prior to data collection. If solutions were observed, they were placed in a fridge at 0° C. for 24 hours and the recovered suspensions were filtered and analysed by XRPD. The solutions recovered after cooling were evaporated under ambient conditions and the solids observed were analysed by XRPD. Gel samples and amorphous materials were recovered.

TABLE 17

| ID | Solvent | Anti-solvent | Volume added | Observations at ambient temperature | Form by XRPD | Observations after evaporation |
|---|---|---|---|---|---|---|
| DC1159-1 | EtOH | heptane | 15 | solid | Pattern A | N/A |
| DC1159-2 | (10 vol) | TBME | 18 | solid | Pattern A | N/A |
| DC1159-3 | | THF | 20 | solution | — | gel |
| DC1159-4 | | toluene | 20 | solution | — | gel |
| DC1159-5 | | DCM | 20 | solution | — | gel |
| DC1159-6 | | Ethyl acetate | 20 | solid | Pattern A | N/A |
| DC1159-7 | | cyclohexane | 11 | solid | Pattern A | N/A |
| DC1159-8 | | acetone | 20 | solution | — | glassy |
| DC1159-9 | MeOH | heptane | 20 | solid | amorphous | N/A |
| DC1159-10 | (10 vol) | TBME | 20 | solid | Pattern A | N/A |
| DC1159-11 | | THF | 20 | solution | — | gel |
| DC1159-12 | | toluene | 20 | solid | amorphous | N/A |
| DC1159-13 | | DCM | 20 | solution | — | gel |
| DC1159-14 | | Ethyl acetate | 20 | solid | amorphous | N/A |
| DC1159-15 | | cyclohexane | 20 | solid | amorphous | N/A |
| DC1159-16 | | acetone | 20 | solution | — | glassy |

Example 47

Polymorph Screen for D-LSD Sulfate Salt
Mixed Solvent Cooling Crystallizations of Amorphous D-LSD Sulfate Salt (DC1160)

Investigations conducted during the programme of works identified a range of solvents and anti-solvents of the API

TABLE 18

| Entry | Solvent | Anti-Solvent | Volume solvent added | Observation at 0° C. | Observation after Slow evaporation | XRPD |
|---|---|---|---|---|---|---|
| DC1160-1 | EtOH | TBME | 8 | solution | solid | amorphous |
| DC1160-2 | | THF | 5 | solution | gel | — |
| DC1160-3 | | 1,4-dioxane | 2 | solution | gel | — |
| DC1160-4 | | EtOAc | 3 | solution | gel | — |
| DC1160-5 | | IPAC | 3 | solution | solid | amorphous |
| DC1160-6 | | acetone | 2 | solution | solid | amorphous |
| DC1160-7 | | MEK | 2 | solution | solid | amorphous |
| DC1160-13 | | p-cymene | 5 | solution | gel | — |
| DC1160-14 | | heptane | 3 | solution | gel | — |
| DC1160-15 | | cyclohexane | 3 | solution | gel | — |
| DC1160-08 | MeOH | MIBK | 3 | solution | solid | amorphous |
| DC1160-11 | | chlorobenzene | 3 | solution | gel | — |
| DC1160-12 | | cumene | 2 | solution | solid | amorphous |
| DC1160-13 | | toluene | 2 | solution | gel | — |
| DC1160-14 | | heptane | 3 | solution | gel | — |
| DC1160-15 | | cyclohexane | 3 | solution | solid | amorphous |
| DC1160-16 | | pentane | 1 | solution | gel | — |
| DC1160-17 | | TBME | 3 | solution | gel | — |
| DC1160-18 | water | DCM | 6 | solution | gel | — |
| DC1160-19 | | THF | 1 | solution | gel | — |
| DC1160-20 | | 1,4-dioxane | 3 | solution | gel | — |

Polymorph Screen for D-LSD HBr Salt
Mixed Solvent Cooling Crystallizations of Amorphous D-LSD HBr Salt (DC1161)

Investigations conducted during the programme of works identified a range of solvents and anti-solvents of the API which can be exploited to provide a variety of modes of crystallization. The form fate of D-LSD HBr salt (lot: DC1152) was further assessed by a series of mixed solvent cooling crystallizations.

Experimental: amorphous D-LSD HBr (DC1152, 17×25 mg) was weighed into crystallisation tubes and suspended in the relevant anti-solvent (detailed in TABLE 19) (10 vol). Temperature was increased to 50° C. and solvent (detailed in TABLE 19) was added in aliquots until a solution was achieved. Solutions were cooled and equilibrated at room temperature for 16 hours. Solids were isolated by filtration and dried in vacuo at 40° C. for 18 hours prior to data collection. If solutions were observed, they were placed in a fridge at 0° C. for 24 hours and the recovered suspensions were filtered and analysed by XRPD. The solutions recovered after cooling were evaporated under ambient conditions and the solids observed were analysed by XRPD.

Figure 83:
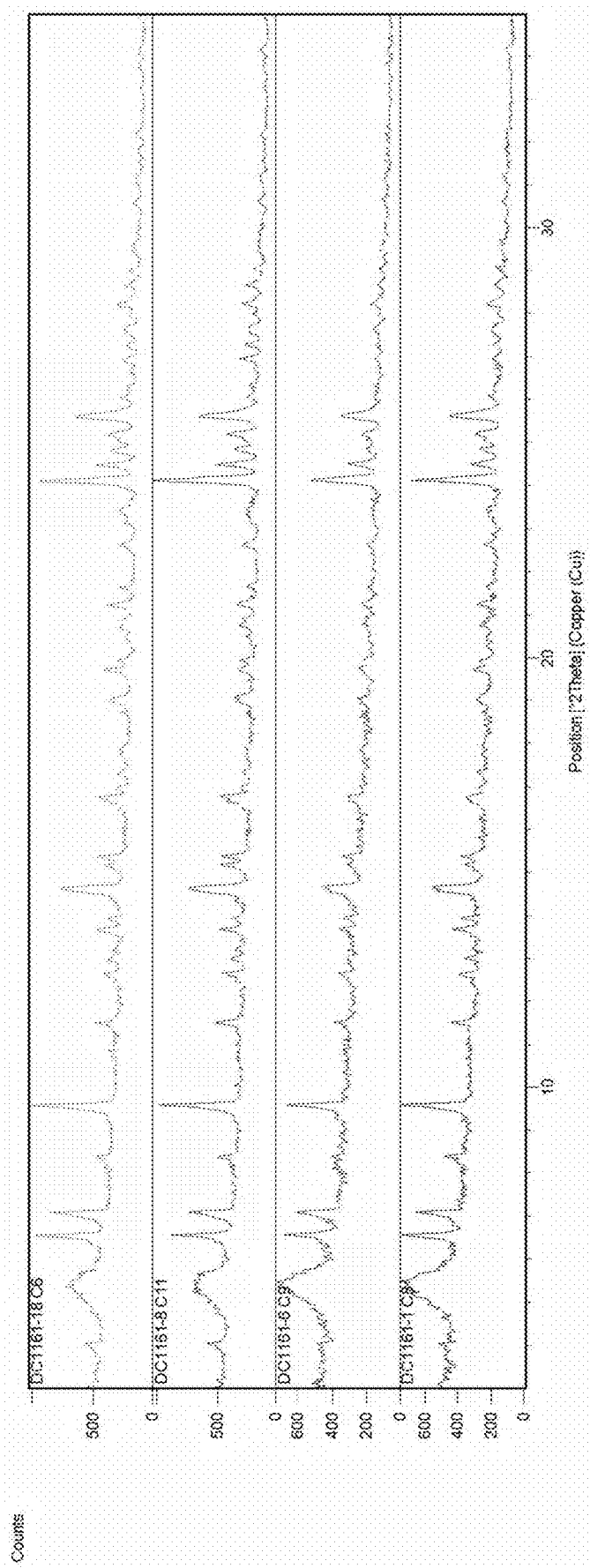
FIG. 83 shows XRPD patterns of D-LSD sulfate Pattern A obtained after the mixed solvent cooling crystallisation experiments.

Results and observations shown in TABLE 19. Gels samples and amorphous materials were mainly recovered. D-LSD sulfate Pattern A was isolated from EtOH/TBME, EtOH/IPAC, EtOH/heptane and MeOH/MIBK. XRPD patterns of the isolated D-LSD sulfate Pattern A solids are shown in FIG. 83.

TABLE 19

| Entry | Solvent | Anti-Solvent | Volume solvent added | Obs 50° C. | Obs RT cool | Observation at 0° C. | Slow evap. | XRPD |
|---|---|---|---|---|---|---|---|---|
| DC1161-1 | EtOH | TBME | 4 | hazy | suspension | — | — | Pattern A |
| DC1161-2 | | THF | 2 | solution | solution | solution | gel | — |
| DC1161-3 | | water | 5 | solution | solution | solution | gel | — |
| DC1161-5 | | EtOAc | 6 | solution | solution | solution | gel | — |
| DC1161-6 | | IPAC | 5 | hazy | suspension | — | — | Pattern A |
| DC1161-7 | | acetone | 2 | solution | solution | solution | solid | amorphouss |
| DC1161-18 | | heptane | 4 | solution | suspension | — | — | Pattern A |
| DC1161-8 | MeOH | MIBK | 2 | solution | suspension | — | — | Pattern A |
| DC1161-9 | | cumene | 2 | hazy | suspension | — | solid | amorphous |
| DC1161-10 | | toluene | 2 | solution | suspension | — | solid | amorphous |
| DC1161-11 | | chlorobenzene | 2 | hazy | suspension | — | solid | amorphous |
| DC1161-12 | | pentane | 2 | solution | solution | solution | gel | — |
| DC1161-13 | | heptane | 2 | hazy | suspension | — | — | amorphous |
| DC1161-15 | | p-cymene | 3 | solution | solution | solution | gel | — |
| DC1161-14 | water | cyclohexane | 5 | hazy | suspension | — | — | amorphous + peaks |
| DC1161-16 | | THF | 1 | solution | solution | solution | gel | — |
| DC1161-20 | | DCM | 2 | solution | solution | solution | solid | amorphous |

Throughout this application, various publications, including United States patents, are referenced by author and year and patents by number. Full citations for the publications are listed below. The disclosures of these publications and patents in their entireties are hereby incorporated by reference into this application in order to more fully describe the state of the art to which this invention pertains.

The invention has been described in an illustrative manner, and it is to be understood that the terminology, which has been used is intended to be in the nature of words of description rather than of limitation.

Obviously, many modifications and variations of the present invention are possible in light of the above teachings. It is, therefore, to be understood that within the scope of the appended claims, the invention can be practiced otherwise than as specifically described.

What is claimed is:

1. A crystalline salt form of LSD D-tartrate, characterized by an x-ray powder diffraction (XRPD) pattern obtained by irradiation with Cu Kα x rays having signals expressed as 2θ at about 9.7 and about 17.5.

2. The crystalline salt form of claim 1, wherein LSD D-tartrate has a molecular ratio of tartrate to LSD of from about 0.25 to about 3.

3. A pharmaceutical composition comprising the crystalline salt form of claim 1, and one or more pharmaceutically acceptable excipients.

4. The crystalline salt form of claim 1, wherein LSD D-tartrate has a molecular ratio of tartrate to LSD of about 1:1.

5. The crystalline salt form of claim 1, wherein the crystalline form is further characterized by one or more XRPD signals expressed as 2θ at about 15.5, about 20.4, or about 23.4.

6. The crystalline salt form of claim 1, wherein the crystalline form is characterized by an XRPD pattern as shown in FIG. 16.

7. The crystalline salt form of claim 1, wherein the crystalline form is further characterized by a TGA pattern as shown in FIG. 28.

Figure 31:
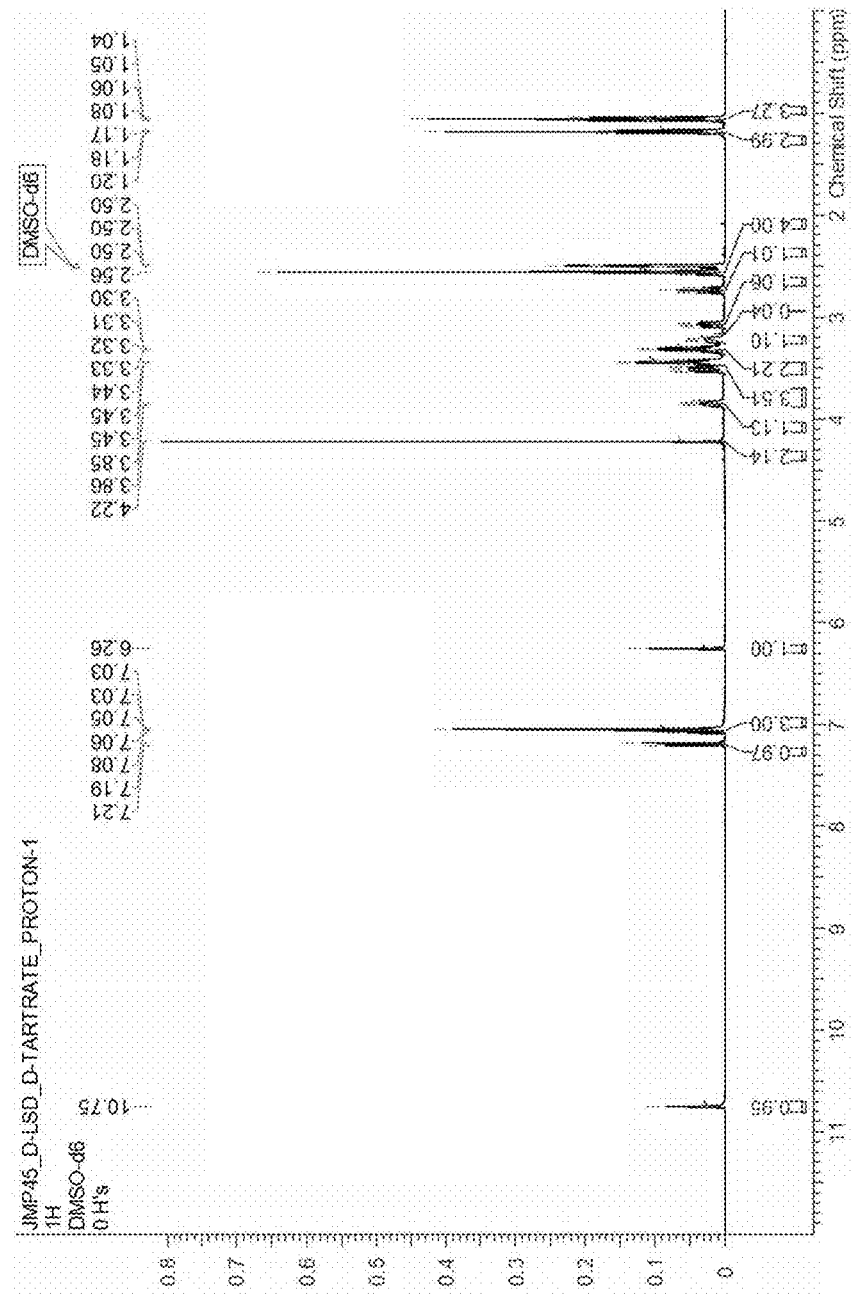
FIG. 31 is an $^1$H NMR of D-LSD D-tartaric acid salt.

8. The crystalline salt form of claim 1, wherein the crystalline form is further characterized by an $^1$H-NMR pattern as shown in FIG. 31.

9. The crystalline salt form of claim 1, wherein the crystalline form is further characterized by a DVS profile as shown in FIG. 35.

10. The pharmaceutical composition of claim 3, wherein the pharmaceutical composition is formulated for oral, intravenous, topical, subcutaneous, intramuscular, or intranasal administration.

11. The pharmaceutical composition of claim 3, wherein the pharmaceutical composition is formulated for sublingual, transdermal or rectal administration.

12. The pharmaceutical composition of claim 10, wherein the pharmaceutical composition is for oral administration.

13. The pharmaceutical composition of claim 12, wherein the pharmaceutical composition is formulated in a unit dosage form as a solution, suspension, emulsion, tablet, or capsule.

14. The pharmaceutical composition of claim 11, wherein the pharmaceutical composition is for sublingual administration.

15. The pharmaceutical composition of claim 14, wherein the pharmaceutical composition is formulated in a unit dosage form as a tablet or strip.

16. The pharmaceutical composition of claim 10, wherein the pharmaceutical composition is for topical administration.

17. The pharmaceutical composition of claim 16, wherein the pharmaceutical composition is formulated in a unit dosage form as a cream or ointment.

18. The pharmaceutical composition of claim 11, wherein the pharmaceutical composition is for transdermal administration.

19. The pharmaceutical composition of claim 18, wherein the pharmaceutical composition is formulated in a unit dosage form as a patch.

20. The pharmaceutical composition of claim 11, wherein the pharmaceutical composition is for rectal administration.

21. The pharmaceutical composition of claim 20, wherein the pharmaceutical composition is formulated in a unit dosage form as a suppository.

22. The pharmaceutical composition of claim 10, wherein the pharmaceutical composition is for intranasal administration.

23. The pharmaceutical composition of claim 22, wherein the pharmaceutical composition is formulated in a unit dosage form as a dry powder, a solution, or an emulsion.

24. The pharmaceutical composition of claim 10, wherein the pharmaceutical composition is for intravenous, subcutaneous, or intramuscular administration.

25. The pharmaceutical composition of claim 24, wherein the pharmaceutical composition is formulated in a unit dosage form as a solution, suspension, or emulsion.

26. A method of treating anxiety, comprising administering to a subject in need thereof the crystalline salt form of claim 1.

27. A method of treating depression, comprising administering to a subject in need thereof the crystalline salt form of claim 1.

28. A method of treating anxiety, comprising administering to a subject in need thereof the pharmaceutical composition of claim 3.

29. A method of treating depression, comprising administering to a subject in need thereof the pharmaceutical composition of claim 3.

* * * * *